United States Patent [19]
Kageneck et al.

[11] Patent Number: 5,404,514
[45] Date of Patent: Apr. 4, 1995

[54] METHOD OF INDEXING AND RETRIEVAL OF ELECTRONICALLY-STORED DOCUMENTS

[76] Inventors: Karl-Erbo G. Kageneck, Jameson Hill Rd., Clinton Corners, N.Y. 12514; Ted Young, 300 Mercer St., Apt. 15A, New York, N.Y. 10003

[21] Appl. No.: 121,370

[22] Filed: Sep. 13, 1993

Related U.S. Application Data

[63] Continuation of Ser. No. 998,023, Dec. 29, 1992, abandoned, which is a continuation-in-part of Ser. No. 456,558, Dec. 26, 1989, abandoned.

[51] Int. Cl.⁶ ............................................. G06F 15/403
[52] U.S. Cl. ................................. 395/600; 364/419.19; 364/DIG. 2; 364/963; 364/963.4
[58] Field of Search ..................... 395/600; 364/419.19

[56] References Cited

U.S. PATENT DOCUMENTS

| | | | |
|---|---|---|---|
| 4,495,566 | 1/1985 | Dickinson et al. | 395/600 |
| 4,674,066 | 6/1987 | Kucera | 395/600 |
| 5,062,074 | 10/1991 | Kleinberger | 395/600 |
| 5,168,565 | 1/1993 | Morita | 395/600 |
| 5,263,159 | 11/1993 | Mitsui | 395/600 |
| 5,301,109 | 4/1994 | Landaver et al. | 364/419.19 |
| 5,307,266 | 4/1994 | Hayashi et al. | 364/419.07 |

*Primary Examiner*—Paul V. Kulik
*Attorney, Agent, or Firm*—Cohen, Pontani, Lieberman, Pavane

[57] ABSTRACT

A document indexing and retrieval system and method which assigns weights to the key words and assigns a relative value to pairs of key words (i.e. defines a relative relation on K×K) based on their frequency of occurrence and co-occurrence in the document data base. In response to a query both the weights and this relative relation are used to suggest additional and/or alternative key words which are very likely to find relevant documents. Documents are then ranked by number of hits adjusted for the weights of hit words and their relative values.

6 Claims, 15 Drawing Sheets

```
MAIN
 |--Config
 |    |--CreateTables
 |    |--LoadData
 |--AddSentence
 |    |--ReadText
 |    |--WordParse
 |    |--FindCombKey
 |    |    |--FirstLast
 |    |--FindSingKey
 |    |    |--FirstLast
 |--ShowExpr
 |--ShowQuery
 |--SelectMenu
 |    |--OtherWords
 |    |    |--FindRelatives
 |    |    |--ShowExpr
 |    |    |--BuildCombTable
 |    |    |--AddSwaps
 |    |    |    |--ComboSum
 |    |    |    |--SortT
 |    |    |--SelectRelatives
 |    |    |--ShowExpr
 |    |--DeleteWord
 |    |--InsertWord
 |    |--AddSearchTerms
 |    |    |--ShowExpr
 |    |--RankRecords
 |    |    |--BuildCombTable
 |    |    |--ComboSum
 |    |    |--SortT
 |    |--ShowDoc
 |    |    |--ShowExpr
 |    |    |--ShowQuery
 |    |    |--ShowAbstr
 |    |    |    |--PrintAbstr
 |    |    |--ShowKeywords
 |    |    |--ShowHist
 |    |    |--ScrolHist
 |    |    |--ReWriteHist
 |--ShowExpr
```

FIG. 3

```
                    QSEARCH

#Docs
1837    agreement-contract
 624    enforcement
  90    can

SWAPS terms
 499    collective bargaining
 585    bargain
1738    summary judgement
 887    cause of action
 684    labor
 289    National Labor Relations Board
1808    employer-employee
 228    labor-management relations-Taft Har
2309    plaintiff-defendant-respondent
 934    statues
1808    employer-employee when can a contract be enforced
```

FIG. 4

```
                    QSEARCH

#Docs
1837    agreement-contract
 934    statutes
 624    enforcement
  90    can MENU SELECTIONS
        Related Terms
        Add Search Words
        Restore Deleted Word
        View Documents
        New Search
        Exit Program when can a contract be enforced
```

FIG. 5

```
                    QSEARCH

#Docs
1837    agreement-contract
 934    statues
 624    enforcement
  90    can SWAPS terms
1738    summary judgement
 887    cause of action
 228    labor-management relations-Taft Har
2309    plaintiff-defendant-respondent
 629    statute of limitations
1808    employer-employee when can a contract be enforced
```

FIG. 6

```
                    QSEARCH

#Docs
 629    statute of limitations
1837    agreement-contract
 934    statutes
 624    enforcement
  90    can MENU SELECTIONS
        Related Terms
        Add Search Words
        Restore Deleted Word
        View Documents
        New Search
        Exit Program when can a contract be enforced
```

```
MAIN
|--Config
|    |--CreateTables
|    |--LoadData
|
|--AddSentence
|    |--ReadText
|    |--WordParse
|    |--FindCombKey
|    |    |--FirstLast
|    |
|    |--FindSingKey
|    |    |--FirstLast
|
|--ShowExpr
|--ShowQuery
|--SelectMenu
|    |--OtherWords
|    |    |--FindRelatives
|    |    |--ShowExpr
|    |    |--BuildCombTable
|    |    |--AddSwaps
|    |    |    |--ComboSum
|    |    |    |--SortT
|    |    |
|    |    |--SelectRelatives
|    |    |--ShowExpr
|    |
|    |--DeleteWord
|    |--InsertWord
|    |--AddSearchTerms
|    |    |--ShowExpr
|    |
|    |--RankRecords
|    |    |--BuildCombTable
|    |    |--ComboSum
|    |    |--SortT
|    |
|    |--ShowDoc
|    |    |--ShowExpr
|    |    |--ShowQuery
|    |    |--ShowAbstr
|    |    |    |--PrintAbstr
|    |    |
|    |    |--ShowKeywords
|    |    |--ShowHist
|    |    |--ScrolHist
|    |    |--ReWriteHist
|
|--ShowExpr
```

FIG.9

```
' AIM.BAS: Automatic Indexing Module
' Invoked: aim configfile machine # firstdoc lastdoc
' Creates: DocKeys. AH, DocIndex.AH, IDF.SIN, Stats#.Txt
' Uses: Doc.Txt, Doc.Ndx, SingKey.Str, CombKey1.Str, CombKey2.Str, CombKey3.Str
'       KeyWord.Tbl, KeyComb.Tbl ' DocKeys hold ALL of the Keywords and Counts for all documents
  TYPE DocKeyType
    Code AS INTEGER
    Freq AS INTEGER
' DocNdx (x).NDX points at the element in DocKeys () where the Keys for
  TYPE DocIndexType
    Ndx AS LONG
    Num AS INTEGER
    Tot AS LONG
    Pad AS STRING * 6

' Document # x are, .NUM is how many keys are in the document,
' and .TOT is the total sum of all occurrences of keys
' Idf.Sin holds the inverse document frequency i.e. # docs key is in
  INTEGER (Not a TYPE)
' Stats #.Txt (# = machine # supplied on command line)
```

FIG. 10A

```
AIMPASS2. BAS
'Invoked: aimpass2 ConfigFile
'Creates: Key.Ndx, Weight.Ndx, \Aim\Command$.Dat
'Uses: Dict. Wrd, Idf. Sin, DocIndex.Ah, DocKeys.Ah
'nth Rec of Key.Ndx contains NumKeysinDocn followed by 63 codes
'   TYPE KeyNdx
'      Num AS INTEGER
'      Code(1 TO 63) AS INTEGER
'nth Rec of Weight. Ndx contains 63 Salton Weights computed with the following
'salton weight formula
'   TYPE WeightNdx
'      Weight (1 TO 63) AS SINGLE
'SALTON WEIGHT FORMULA
```

$$\text{Weight(Word)} = \frac{\text{Log2(FreqinDoc+1)} * \text{Log2((TotDocs*2)/DocsWithWord+2+2*TotDocs)}}{\text{Log2 (2 + TotalKWordsInDoc / 10)}}$$

*FIG. 10B*

```
'KYINVERT.BAS
'Invoked: kyinvert ConfigFile
'Creates: kyinvert.Ndx, KyInvert.Dat
'Uses: Key.Ndx, Weight.Ndx & Dict.Wrd for NumKeys
'nth Rec of KyInvert.Ndx contains nth Code, ptr into KyInvert.Dat &
'NumDocsWith Word
'   TYPE NdxType
'        Code AS INTEGER
'        Index AS LONG
'        Num AS INTEGER
'pointed to record of KyInvert.Dat contains first DocWithWord & 1000*WeightInDoc
'   TYPE RecValue
'        Rec AS INTEGER
'        Value AS INTEGER
```

*FIG. 10C*

```
'FREQCOMP.BAS
' Implements the Inverted Index access method along with the weighted values
' to calculate the frequent companions for each of the words used in the
' document collection.
' Invoked: freqcomp ConfigFile
' Creates: Freqcomp.127
' Uses: KyInvert.Ndx, KyInvert.Dat, Key.Ndx, Weight.Ndx
' nth Rec of FreqComp.127 contains nth code, Num of companions of this code &
' 127 pairs of (code, 100*weight)
'   TYPE Freqcomp127
'       Num AS INTEGER
'       code AS INTEGER
'       comp (1 TO 127) AS INTEGER
'       Value (1 TO 127) AS STRING * 1
```

*FIG.10D*

```
'RELATIVE.BAS
'    '----are there any FreqComps for this keyword?
'    '----we found the word in j's FCList
'    '----look for the word itself in word j's FCList
'    '---- apply formula of (Lower * 6 + Higher)/7
'    '----sort in decreasing order, by value
'    '----save first 63 as the relatives
'Invoked: relative ConfigFile
'Creates: Relative.63
'Uses: FreqComp.127 & Dict.Wrd for Numkeys
'nth Rec of Relative.63 contains nth Code, Num of relatives of this code &
' 127 pairs of (code, 100*weight)
'   TYPE FreqComp63
'       Num AS INTEGER
'       Code AS INTEGER
'       Comp (1 TO 63) AS INTEGER
'       Value (1 TO 63) AS STRING * 1
```

*FIG.10E*

```
'REL-INV. BAS
'Invoked: rel-inv ConfigFile
'Creates: Rel-Inv.Ndx, Rel_Inv.Dat
'Uses: Relative.63 & Dict.Wrd for NumKeys
'nth Rec of Rel-Inv.Ndx, contains nth code, ptr into Rel-Inv. Dat & NumRelsOfCode
'   TYPE NdxType
'       Code AS INTEGER
'       Index AS LONG
'       Num AS INTEGER
'pointed to record of Rel-Inv.Dat contains code of the first FreqComp list
'of nth code & the nth code's value in that list
'   TYPE RecValue
'       Rec AS INTEGER
'       Value AS STING *1
```

*FIG. 10F*

```
'POLYSEMY. BAS
'Invoked: polysemy ConfigeFile
'Creates: PolySemy. Dat & PolyAvg. Dat, PolySemy. Lst
'Uses: Relative.63, Rel_Inv.Ndx, Dict.Wrd
'nth Rec of PolySemy. Dat contains Poly Value of nth word calculated as follows:
'POLY FORMULA:
'Poly!=(Avg3!*/Avg3!/Avg20!)+Avg6!*(Avg6!/Avg□63!))^.5*(RelFreq/DocFreq)^.4
'   TYPE PolyType
'       Code AS INTEGER
'       Value AS SINGLE
'       Pas AS STRING *2
```

*FIG. 10G*

```
'COMBOOST. BAS
'boosts poly of combined keywords by mutliplying by them 1.4
'Invoked: comboost ConfigFile
'Creates:
'Uses: PolySemy.Dat, DictSort.Cod
```

FIG. 10H

```
'NEWKEY. BAS
'Invoked: newkey ConfigFile
'Creates: NewKey.Ndx, NewVal.Ndx
'Uses: Key.Ndx, Weight.Ndx, PoltSemy.Dat, KyInvrts.Ndx
'NewVal.Ndx contains new weights for Doc n sorted by new weight where
'  NewWeight=(Weight * Poly)^.125
'    TYPE WeightAvgNdx
'        Weight (I TO 63) AS SINGLE
'        Mult AS SINGLE
'Mult is used to vary the number of sentences in the abstract program
'NewKey.Ndx contains the corresponding codes for Doc n i.e sorted by
' their new weights
' TYPE KeyNdx
'     Num AS INTEGER
'     Code (I TO 63) AS INTEGER
```

FIG. 10 I

```
'CHANGEFL. BAS
'Invoked changefl ConfigFile
'Creates: KyInvrts.Ndx, Rel-Invs.Ndx
'   TYPE SmallNdxType
'       Index AS LONG
'       Num AS INTEGER
'Uses: KyInvert.Ndx, RelInv.Ndx
'   TYPE NdxType
'       Code AS INTEGER
'       Index AS LONG
'       Num AS INTEGER
'makes copies of KyInvert.Ndx & Rel-Inv.Ndx without the code field
```

FIG. 10J

| | |
|---|---|
| Main: | Put up Menu For User |
| Config: | Initializes Data & Variables |
| LoadData: | Open Files & Load Some Files into Memory |
| AddSentence: | Get User Query & Convert Terms Found to Codes |
| ReadText: | Replace Punctuation etc. in Query |
| WordParse: | Build Table of Query Words |
| FindCombKey: | Match Query Table Against Combined Term Vocabulary |
| FirstLast: | Use Index to Find Range to Check in Vocabulary |
| FindSingKey: | Match Query Table Words Against Single Word Vocabulary & Strip Prefixes to Find Stem |
| ShowExpr: | Display Matched Query Terms |
| ShowQuery: | Display Query |
| SelectMenu: | Get User Menu Choice |
| OtherWords: | Find & Display Related Terms & Get User Choices |
| FindRelatives: | Retrieves Relatives for Given Word |
| BuildCombTable: | Build CombTable of Relative Percentages Modified by Relative Document Freq's For All Pairs of Query Terms |
| AddSwaps: | Build Sorted (Ranked) Table of Swap Terms |
| ComboSum: | Calculate Multiplier For Swap & Document Values |
| SelectRelatives: | Get User Choices of Swap Terms |
| DeleteWord: | Delete Term From Query Table |
| InsertWord: | Add the Last Deleted Term Back Into Query |
| AddSearchTerms: | Display All Terms Beginning With A User Entered String of Letters & Get User Choices |
| RankRecords: | Build Sorted (Ranked) Tables of Documents |
| ShowDoc: | Get User Choice After Ranking Documents |
| ShowAbstr: | Get Abstract Text From File |
| PrintAbstr: | Display Abstract Text |
| ShowKeywords: | Display Highest Weight Terms in the Document Chosen |
| ShowHist: | Display Histogram Showing Relative Document Values |
| ScrolHist: | Scroll Histrogram Horizontally |
| ReWriteHist: | Scroll Histrogram Horizontally |

*FIG. 11*

Abstract specs

Sentence ENDS ALGORITHM:

```
    _ = space
    U = upper case letter
    l = lower case letter
    X = any character
    N = upper case noise word
    # = number
    E = . or ? or !
```

1) E_[_]U      ENDS
2) E_[_]l      NOTENDS
3) E_N         ENDS
4) _UE_U       NOTENDS
5) AE          NOTENDS
   where A =   zB, ggf, inkl, vgl, grunds, ausschl, einschl, Kl,
               Bekl, Nr, Ger, BerGer, ff, subj, obj
6) LEN<6       NOTENDS Sentence RANKING ALGORITHM:

WORD WEIGHT Formula:
  AbstractWordWeightValue = DocumentWeight * (PolyValue^.125)

SENTENCE VALUE Formula:
  SentVal! = sum over keywords in sentence of AbstractWordWeightValue
  FinalSentValue! = SentVal! / SQR (NumWordsinSent)

FIG. 12A

Sanitize Specs

GermanData:

DATA "\ion\ung\", "\heit\nzip\satz\keit\", "\ionen\nzips\ungen\viele\"
DATA "\kosten\schaft\heiten\keiten\manche\einige\vielen\saetze\satzes\"
DATA "\pflicht\saetzen\manchem\einigen\mehrere\"
DATA "\schaften\mehreren\", "\pflichten\"
DATA "\er\ow\", "\mann\burg\berg\"

EnglishData:

DATA "\al\", "\ion\ity\als\", "\ment\ions\ency\ancy\ness\", "\ments\ional\ities\"
DATA "\mental\encies\ancies\"
DATA "\o\i\", "\er\rg\os\ey\tz\", "\man\son\ong\ham\ton\scn\", "\mann\fein\"
a$ = "\ein\eine\einem\einen\eines\diese\dieses\dieser\diesem\dieser"
b$ = "\kein\keine\keiner\keinem\keines\"
eng$ = "\a\an\any\this\such\no\several\many\"

FIG. 12B

Sanitizing ALGORITHM

IF UC word at beginning of sentence or after "." or ":" or ")" THEN keep (Don't XXXXX)IF 1. noise word
2. combined keyword
3. Article, Articles, Art, Section, Sections, Sec., Paragraph, Subparagraph, Title, Title, Chapter, Chapters
4. matches a single keyword > 2 AND ends in : ment, ments, mental, ion, ions, ional, ity ities, ency, encies, ancy, ancies, ness, al, als
5. matches a single keyword>3 AND preceded by: a, an, any, this, such, no, several, many
6. matches a single keyword>9 AND ends in: er, man, mann, rg, i, o, son, os, ong, ey, ham ton, tein, scn, tz
7. matches a single keyword>4 AND preceded by: the
8. matches a single keyword >7

ELSE
    XXXXX the word out

IF UC word NOT at beginning of sentence AND NOT after "." or ":" or ")" THEN keep (Don't XXXXX)IF
2-8
ELSE
    XXXXX the word out IF U[U]-1[1] THEN keep (Don't XXXXX)

*FIG. 12C*

METHOD OF INDEXING AND RETRIEVAL OF ELECTRONICALLY-STORED DOCUMENTS

This is a continuation of application Ser. No. 97/998,023, filed Dec. 29, 1992; which is a continuation-in-part of U.S. application Ser. No. 07/456,558, filed Dec. 26, 1989, both now abandoned.

BACKGROUND OF THE INVENTION

1. Field of the Invention

This invention relates generally to document storage and retrieval systems and more particularly to a method of indexing documents so that they can be retrieved in response to a query in order of their relevance to the query. It also permits, general query to be easily modified based on the content of the documents so that the new query will retrieve documents that are relevant to the original query.

2. Description of the Prior Art

Document retrieval based on indexing of the documents in a document data base is well known. Typically the documents are indexed by creating an index file which records the documents that each word is in. Then when the user inputs a query, the documents that contain one or more words of the query can be quickly identified. However, if the query consists of general words that are not terms of art, the query may produce unsatisfactory retrieval results by either producing few documents that are of interest to the user or producing many documents that are not interesting to the user or both.

SUMMARY OF THE INVENTION

A principal object of the present invention is to provide an improved method of indexing and retrieving documents which:

(A) allows a user to easily modify his query based on the content of the documents so that the new query will retrieve documents that are of interest to the user;

(B) accurately ranks the documents in order of relevance to the query; and (C) allows the user to peruse the documents extremely quickly.

Another object of the present invention is to use the Soft Boolean Connector concept to adjust the number of hits (i.e., the number of query words that a document is credited with for ranking purposes) by giving less than a full hit to a word that often co-occurs with other query words. Another object of the present invention is to use the Soft Boolean Connector concept to adjust the number of hits (i.e. the number of query words that a word is credited with by virtue of its being related to those query words) for a possible suggested word by giving less than a full hit to a word that often co-occurs with the other query words.

These objects, as well as other objects which will become apparent from the discussion that follows, are achieved according to the present invention by the following steps (note: in the following the words "term" and "keyword" stand for both a single word and a phrase consisting of a group of words, e.g., "patent application".):

1. Indexing the documents by creating index files of which documents contain each term, how many times the term appears in the document, and how many documents each term appears in.

2. Assigning as many weights to each term as there are documents that contain that term, where the weight of a term in a document depends on the number of times the term appears in the document, the number of documents that the term appears in, and the total number of terms in the document.

3. Constructing for each term a ranked list of companions of said term which list contains the terms (companions) that appear in the same documents as said term in order of the sum of the weights of the companions over all documents that contain both the term and the companion. Associated with each companion is the companion percentage which is the sum used to rank the companions.

4. Using the companion lists to construct relative lists for each term which relative lists usually contain only those companions which also have said term as a companion. Associated with each relative is the relative percentage which is a weighted average of the companion's percentage as a companion of the term and the term's companion percentage as a companion of the companion. The relative percentages are used to rank the relatives.

5. Assigning a "polysemantic" weight to each term, which polysemantic weight depends on the number of documents that the term is in, the number of relatives that the term has, and the relative strength of the first few relatives to the other relatives.

6. Presenting to the user, in response to a query, a list of "SWAPS" (Synthetic Word Association Pattern Search) terms that are the best relatives to the entire group of terms contained in the query and allowing the user to add one or more of the presented terms to the query.

7. Ranking the documents according to how many query terms are contained in the document, their polysemantic weights and their weights in the documents.

The present invention facilitates the rapid searching of a document data base for documents that are of interest to the user. By using the suggested SWAPS terms the user can modify his query so as to retrieve those documents, if they exist in the data base, which are of interest. Since the SWAPS terms that are presented are in many of the documents that the original query terms are in, adding them to the query is guaranteed to retrieve those documents and others containing the SWAPS terms. By using the SWAPS feature repeatedly the user can in effect roam around the data base without actually retrieving and reading documents. Only after the query has been modified to include all the interesting SWAPS terms, does the user need to actually retrieve the documents. The user can start with a poor query and modify it using SWAPS so that it becomes a good query. The user need not waste time formulating a good query that will not retrieve any relevant documents because there happen to be no such documents in the data base. The SWAPS terms that are suggested will always retrieve documents that contain them i.e. documents that are likely to be relevant.

The ranking of the documents also facilitates rapid searching because the user can be confident that the highest ranked documents will be the documents that are most relevant to the query and that all documents which have any relevance will be retrieved and ranked.

The foregoing and other objects, features and advantages of the present invention will become apparent from the following, more particular description of the preferred embodiments of the invention, as illustrated in the accompanying drawings.

BRIEF DESCRIPTION OF THE DRAWINGS

FIG. 3 is a view of the display screen showing suggested SWAPS terms for the query of FIG. 2;

FIG. 4 is a view of the display screen showing the modified query;

FIG. 5 is a view of the display screen showing suggested SWAPS terms for the modified query of FIG. 4;

FIG. 6 is a view of the display screen showing a second modification of the query based on choosing SWAPS terms from FIG. 5;

FIG. 9 is a procedure tree for the QSEARCH program used for searching an indexed set of documents using the SWAPS and RANKING features;

FIGS. 10A to 10J are description of the program modules in FIG. 8;

FIG. 11 is a description of the program modules in FIG. 9; and

FIGS. 12A to 12C are description of the ABSTRACT program module.

DESCRIPTION OF THE PREFERRED EMBODIMENTS

Figure 1:
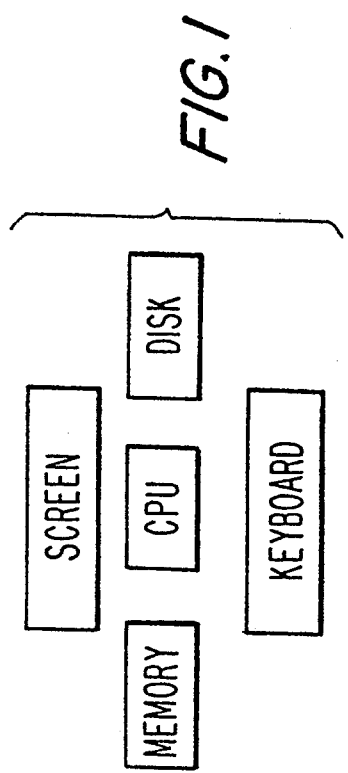
FIG. 1 is a block diagram of a computer system embodying the present invention.

This invention will now be described as embodied in a computer system of the type shown in FIG. 1. This embodiment utilizes the following computer hardware and software:

(1) IBM compatible personal computer with at least 4 MB of RAM, a large capacity hard drive, a display screen, and a keyboard.

(2) MS-DOS compatible operating system and LIM 3.2 compatible expanded memory manager.

(3) A vocabulary file of terms (words and phrases)

(4) A series of programs that index the documents by constructing various files that hold information about which terms are in which documents, which documents contain which terms, the weights of the terms, and which terms are relatives of other terms by virtue of occurring in the same documents and how strongly are they are related.

(5) A user program that accepts a query, suggests modifications to the query, and ranks the documents based on the modified query using the weights and relative strengths of the terms of the query.

The Vocabulary file is structured as a list of headwords each with a short synonym list. All of the synonyms of a given headword are assigned the same code.

The full list of indexing programs can be found in FIG. 10. Here we will describe the most important of these programs: AIM, AIMPASS2, FREQCOMP, RELATIVE, and POLYSEMY.

The first indexing program is AIM.BAS: Automatic Indexing Module. It creates DocKeys, DocIndex, and IDF. DocKeys holds all of the Keywords and Keyword-Counts for all documents. IDF holds the document frequency, i.e., the number of documents a keyword appears in.

As the words in the documents are checked against the vocabulary to see if they are keywords, the case (upper or lower) is possibly changed and they are stripped of prefixes to see if the different case or stem is a keyword according to the following algorithms: (UC=upper-case and LC=lower-case)

IF UC word is at the beginning of a sentence AND we don't have it in our vocabulary as a LC word THEN look for it the Vocabulary as an UC word IF UC word in middle of sentence AND we don't have it UC THEN look for it if it doesn't have a typical proper name ending In USER Program Only: IF word NOT found THEN find both the stem AND find the Good prefix (In the following "find" means that the stem and/or prefix is said to be in the document if the prefix is of the right type and the stem has the indicated length and is a keyword.)

IF GOOD prefix THEN

Find GOOD prefix if stem>3 characters long

IF word is found THEN find if stem >8 characters long

IF word is NOT found THEN find if stem >5 characters long

IF POOR prefix THEN

If word is found THEN DON'T find stem

If word is NOT found THEN find if stem >5 characters long

List of Poor Prefixes:

hi, co, de, en, ex, im, in, un, re, con, eco, dis, epi, mal, mid, mis, non, off, out, pre, pan, sub, uni, demi, down, fore, hemi, high, meta, over para, peri, post, self, semi, after, inter, quasi, trans, under List of Good Prefixes:

air, bio, sea, sky, top, aero, anti, auto, back, head, home, homo, hemo, mega, mini, mono, rear, poly, self, tele, viro, chemo, ferro, homeo, hyper, infra, intra, macro, micro, multi, hydro, super, supra, ultra, contra, hetero, thermo, techno, nucleo, counter, electro, magneto The next indexing program is AIMPASS2.BAS. It creates Key and Weight files. The nth Rec of Key.Ndx contains NumKeysinDoc(n) followed by up to 127 Key codes which have Weight greater than or equal to the Adaptive Threshold Value. The Adaptive Threshold Value is the average Weight value of the 80th Keyword in each document (0 if there are less than 80 Keywords in a document). The nth Rec of Weight. Ndx contains up to 127 (or as many Keywords are above the Adaptive Threshold Value) Document Weights computed with the following weight formula:

$$\text{Weight(Word)} = \frac{\text{Log}_2(\text{FreqInDoc} + 1) \times \text{Log}_2\left(\frac{\text{TotDocs} \times 1.5}{\text{DocsWithWord} + 3 + \frac{\text{TotDocs}}{1000}}\right)}{\text{Log}_2\left(2 + \frac{\text{TotalKeywordsInDoc}}{10}\right)}$$

FREQCOMP.BAS implements the Inverted Index access method along with the weighted values to calculate the frequent companions for each of the words used in the document collection.

For each word ("A") in the controlled vocabulary dictionary, the WEIGHT (see above formula) values for each co-occurring word in the document (a co-occurring word to A is one that appears as a Keyword in the same document that A appears as a Keyword) are summed, along with the WEIGHT values for A in that document, respectively in all documents in which they co-occur. The sum values for each co-occurring word are converted to a percentage, scaled to the sum value for A (i.e., percentage=sum for word's WEIGHT values divided by the sum for A's WEIGHT values). Note that the percentages for the co-occurring words can be higher than 100% if they are heavily weighted in the same records in which A appears. The co-occurring words are then sorted in descending order (from highest percentage value to lowest) and the top 127 are written to a file (see below for structure). If there are 127 co-occurring words or fewer, then all of the co-occurring words will be written in descending sorted order..

---

Definitions:
   { } = co-occurring
   weight = WEIGHT value

Example:

| Doc# 1 | Doc# 2 | Doc# 3 | Doc# 4 | Doc# 5 |
|---|---|---|---|---|
| A 0.5 | A 1.5 | A 2.0 | A 0.7 | A 0.8 |
| B 0.8 | . | B 1.9 | B 1.2 | B 2.5 |
| . | . | . | . | . |

A { } B   C   D   E   ...
B { } A   C   D   E   ...

5.5 = sum of weight of all A's
6.4 = sum of weights of B's co-occurring with A

Sample:
   A 5.5 { }   B 6.4/116% ...
   B 6.4 { }   A 4.0/63% ...

Resulting File:

| Main Word | Co-Occurring Words ... (sorted) |
|---|---|
| A | B 116% ... |
| B | A 63% ... |
| . | |
| . | |

---

After the frequent companions have been found RELATIVE.BAS is run to define the relatives of each Keyword (A) according to the following algorithm:
  are there any FreqComps for A? If so, then for each FreqComp of A (F):
    look for F in A's FreqComp List and get its value
    look for the word itself (A) in word A's FreqComp List and get its value
    a apply formula of (Lower×6+Higher)/7, where Lower is the lower of the two values obtained in the above two steps and Higher is the higher of the two values.
    a sort in the resulting list of words and values in decreasing order, by value
    a save the first 63 (or as many as are found) of this list as the relatives for keyword A For each word (called "A") in the dictionary which has Frequent Companions (not all do, because some words in the dictionary are not used at all in a database), take each Frequent Companion of A (called "F") and its Frequent Companion Percentage Value [FCPVal] in A's Frequent Companion List [FCList](called "F-VAL") and look for the FCPVal of A in F's FCList (called "A-VAL"). NOTE: If A is not found in F's FCList, then A-VAL is zero (0). The RELATIVE value for F is calculated by multiplying the smaller of F-VAL and A-VAL by 6, adding the larger of F-VAL and A-VAL, and then dividing that sum by 7. If both A and F are in each other's FC lists, the resulting Relative value will be added to both words' Relative lists. If F is in A's FC List, but A is not in F's then F-VAL will be divided by seven and added only to A's Relative list.

After all the RELATIVE values are calculated for each Frequent Companion (F) in A's FCList, they are sorted in descending order and the top 63 of these words are written to A's Relative List. If there are fewer than 63 Relatives, then all of the Relatives will be written to A's Relative List, in descending order of RELATIVE value.

---

(based on above Frequency Companion File)
Formula:

Relative Value =

$$\frac{(\text{SmallerPercent Value} \times 6) + \text{LargerPercent Value}}{7 \ (12 \text{ if not mutual})}$$

Here the SmallerPercent Value is the smaller of the A-VAL and the F-VAL and the LargerPercent Value is the larger of the A-VAL and the F-VAL.

---

Sample:

$$70 = \frac{(A_{(63\%)} \times 6) + B_{(116\%)}}{7}$$

Resulting File:

| Main Word | Relatives ... (sorted) |
|---|---|
| A | B 70 ... |
| B | A 70 ... |
| . | |
| . | |

---

After the relatives have been found each of the keywords is given a single polysemantic weight that does not change from document to document by the program POLYSEMY.BAS which uses the following formula:

$$\text{PolyValue} = \sqrt{\left( \text{Avg}_3 \times \frac{\text{Avg}_3}{\text{Avg}_{20}} + \text{Avg}_6 \times \frac{\text{Avg}_6}{\text{Avg}_{63}} \right) \times \sqrt{\frac{\text{TotRelVal}}{\text{DocFreq}^{1.2}}}}$$

Here $\text{Avg}_n$ is the average of the relative percentages of the first n relatives of the keyword, TotRelVal is the sum of relative percentages over all relative lists that the keyword is in, and DocFreq is the number of documents that the keyword is in (having a WEIGHT above the adaptive threshold).

Once the indexing programs have been run, the ABSTRACT program is run to create highlights of the full text that will be presented to the user before or in place of the full text itself. First the documents are broken into sentences using a Sentence Ends Algorithm. Then the sentences are assigned weights (values) as a whole and the top ranked sentences are chosen to be part of the highlight. Finally a Sanitize algorithm is used to "X" out (eliminate) proper names from in the highlights. See FIG. 12 for specific details on the algorithms used in the ABSTRACT program.

Once the indexing and optionally the ABSTRACT programs have been run, the QSEARCH program can be used to search for documents. This is done by entering a query in natural language. The user program will parse the query to find all the keywords it contains using algorithms similar to those in the AIM program.

After the query is parsed the user is shown the keywords that are contained in the query in order of their polysemantic weight and is given the opportunity to add and delete words in the query and to have the program suggest SWAPS terms based on the query. These SWAPS terms are generated by generating for each keyword in the vocabulary a summed-relpoly-percentage which is the sum, over all terms that are in the query, of the relpoly percentages of that keyword, where the relpoly percentage is the product of the relative percentage and the polysemantic weight. Then the summed RelPoly percentages are adjusted using a concept called Soft Boolean Connectors to come up with a final SWAPS value for each keyword. The keywords are then ranked by SWAPS value and the highest ranked are presented to the user as suggested SWAPS terms to be added to the query.

The Soft Boolean Connectors concept involves penalizing pairs of terms that co-occur often (i.e., in many documents) when calculating the adjustment to be applied to the summed relpoly percentages.

---

First, Multiply the last group of SWAPS words by
    Boost Factor (=2)
    Then add relative values of relatives of
    main word after each is multiplied by the
        PolyValue of the Word
(The previous value will be called "Temp Value")
Create table for every pair combination of query words, e.g.,
for words A, B, & C, there are three pairs:
    AB
    AC
    BC

---

For each pair of query words, ("A" & "B"), the Relative Value used in the formula below is B's Relative Value in A's Relative List, or, if B doesn't appear in A's Relative List, then the value is taken from A's Relative Value in B's Relative List (this is possible because the Relative Value between any two words is mutual), i.e., if B is found in A's Relative list, take just that value. You don't need to look at B's list to find A's value there because, if it is there, it would have the same value as B has in A's list. Only if B is not in A's Relative list check for A in B's list. Enter the Relative Penalty value resulting from the following formula into the table for each combination (pair):

$$\frac{\text{Relative Value} \times \sqrt{\text{avg doc freq of the respective combination (e.g., A \& B)}}}{\dfrac{\sqrt{\text{avg doc freq of all words in the database}}}{42}}$$

Example:
  if Relative values are
    AB = 70
    AC = 75
    BC = 65
and A appears in 5 documents and B appears in 4 and the avg. doc freq is 4, then using the following formula for AB $$1.77 = \frac{70 \times \dfrac{\sqrt{4.5}}{\sqrt{4}}}{42}$$

the table value for AB is 1.77
(look below for maximum, making this 1.0 instead)

for a hit of 3 words - 3 relatives of main word or
3 words in a document
  A  B  C
Adjust Value = $2.5^{(\# \text{ of hits} - \text{sum of penalties})}$ Note: The "# of hits" value is:

$$\sum_i^n \sqrt[4]{\frac{\text{PolyValue of word}}{\sqrt[4]{\text{Avg PolyValue}}}} \quad \text{where } n \text{ is 3 in this example}$$

Word/Document Value = Temp Value × Adjust Value

---

| MAXIMUM PENALTY TABLE (SWAPS) | |
|---|---|
| query words | Max. |
| (for each pair) | |
| 2 | 0.3 |
| 3 | 1.0 |
| 4 & up | 0.9 |
| (for sum of pairs) | |
| 2 | 0.3 |
| 3 | 1.4 |
| 4 | 1.8 |
| 5 | 2.3 |
| 6 & up | 2.8 |

After the user has modified the query by choosing SWAPS terms, he can have the program suggest new SWAPS terms based on the new query. In this case the program boosts the relative percentages of the last chosen set of SWAPS terms before calculating summed relpoly percentages. This allows the user to navigate in the data base by modifying his query so that it will find documents containing the SWAPS terms.

Figure 2:
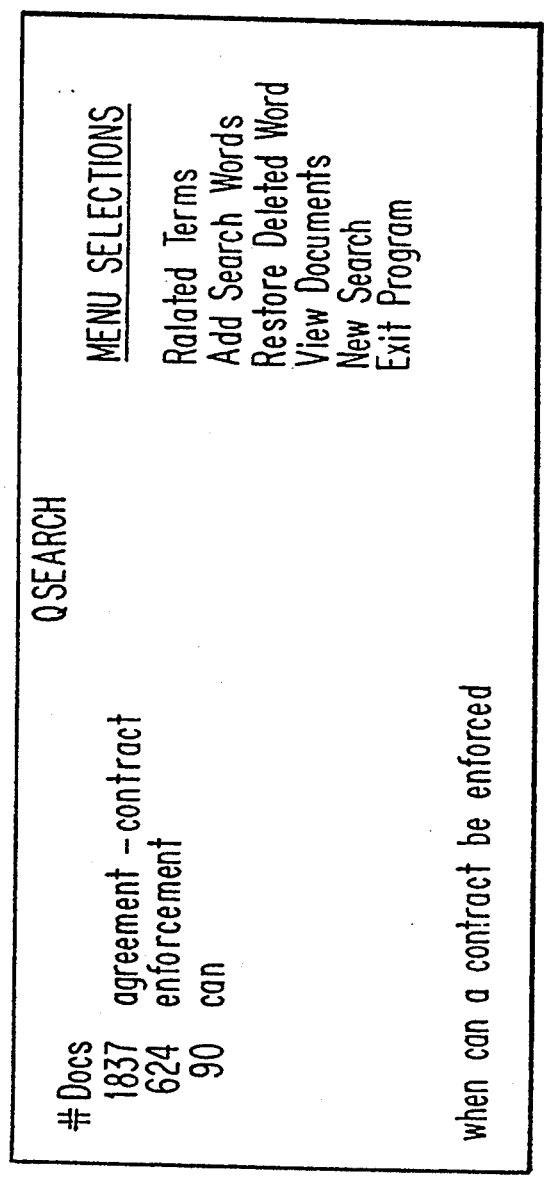
FIG. 2 is a view of the display screen showing an entered query and the result of parsing it.

For example, FIG. 2 shows the options the user will be presented with after entering the query "when can a contract be enforced". If the user chooses the menu option "Related Terms" he will be shown a list of SWAPS terms as shown in FIG. 3. This first set of SWAPS terms that are presented to the user includes the term "statutes". The user may choose one or more of these suggested SWAPS terms to add to the query. In FIG. 4 we see that the user has chosen to add the term "statutes" to the query. At this point the user can again ask the system to suggest SWAPS words. This time the previously added SWAPS term "statutes" will be given extra weight in determining which new terms are suggested to the user. In FIG. 5 we see the resulting suggested SWAPS terms generated from the four query terms "agreement", "statutes", "enforcement", and "can", with "statutes" given more weight than the other three terms. Notice that the SWAPS words are ranked somewhat differently than in FIG. 3 and in particular a new SWAPS term "statute of limitations" is suggested. By adding the term "statutes" to the query and then asking again for suggested SWAPS terms the user has "moved" the query to "an area of the database" that contains documents dealing with "statute of limitations", which is a term of art that makes the original query more focused and is likely to find documents that are relevant to the intent of the original query. Here the fact that both terms "statutes" and "statute of limitations" contain the same word is fortuitous. It is the meaning of the term "statutes" which makes it a close relative of "statute of limitations" by virtue of the fact that these two terms co-occur in many of the same documents.

Once the user is satisfied with his query he asks the program to retrieve documents that are relevant to the query. In FIG. 6 he would choose the View Documents option. The system will then use its index files to assign a value to each document and then rank the documents. The documents are ranked by generating for each document a summed-weightpoly-value which is the sum, over all terms that are in the query, of the weightpoly values of that keyword, where the weightpoly value is the product of the weight of the keyword in that document and its polysemantic weight. Then the summed-weightpoly values are adjusted using the Soft Boolean Connectors concept to come up with a final value for each document. The documents are then ranked by value and presented to the user in order of rank.

The Soft Boolean Connectors concept involves penalizing pairs of terms that co-occur often (i.e. in many documents) when calculating the adjustment to be applied to the summed relpoly percentages. First, multiply original query words by Boost Factor (=2)

Then add WEIGHT values of key words in a document after each is multiplied by the PolyValue of the word.

---

(The previous value will be called "Temp Value")
Create table for every pair combination of query words (A B C)
    AB
    AC
    BC

---

For each pair of query words, ("A" & "B"), the Relative Value used in the formula below is B's Relative Value in A's Relative List, or, if B doesn't appear in A's Relative List, then the value is taken from A's Relative Value in B's Relative List (this is possible because the Relative Value between any two words is mutual), i.e., if B is found in A's Relative list, take just that value. You don't need to look at B's list to find A's value there because, if it is there, it would have the same value as B has in A's list. Only if B is not in A's Relative list check for A in B's list. Enter the Relative Penalty value resulting from the following formula into the table for each combination.

Eample:
  if Relative values are
    AB = 70
    AC = 75
    BC = 65
and A appears in 5 documents and B appears in 4
and the avg doc freq is 4
then using the following formula for AB -continued $$2.65 = \frac{70 \times \frac{\sqrt{4.5}}{\sqrt{4}}}{28}$$

the table value for AB is 2.65
(look below for maximum, making this 1.0 instead)
for a hit of 3 words - 3 words in a document
  A  B  C
Adjust Value = $1.8^{(\# \text{ of hits} - \text{sum of penalties})}$
Note: The "# of hits" is the same as above for the SWAPS.
Word/Document Value = Temp Value × Adjust Value

| MAXIMUM PENALTY TABLE (RANKING) | |
|---|---|
| query words | Max. |
| *(for each pair)* | |
| 2 | 0.5 |
| 3 | 1.3 |
| 4 | 1.2 |
| 5 & up | 1.1 |
| *(for sum of pairs)* | |
| 2 | 0.5 |
| 3 | 1.6 |
| 4 | 1.9 |
| 5 | 2.3 |
| 6 & up | 2.8 |

Figure 7:
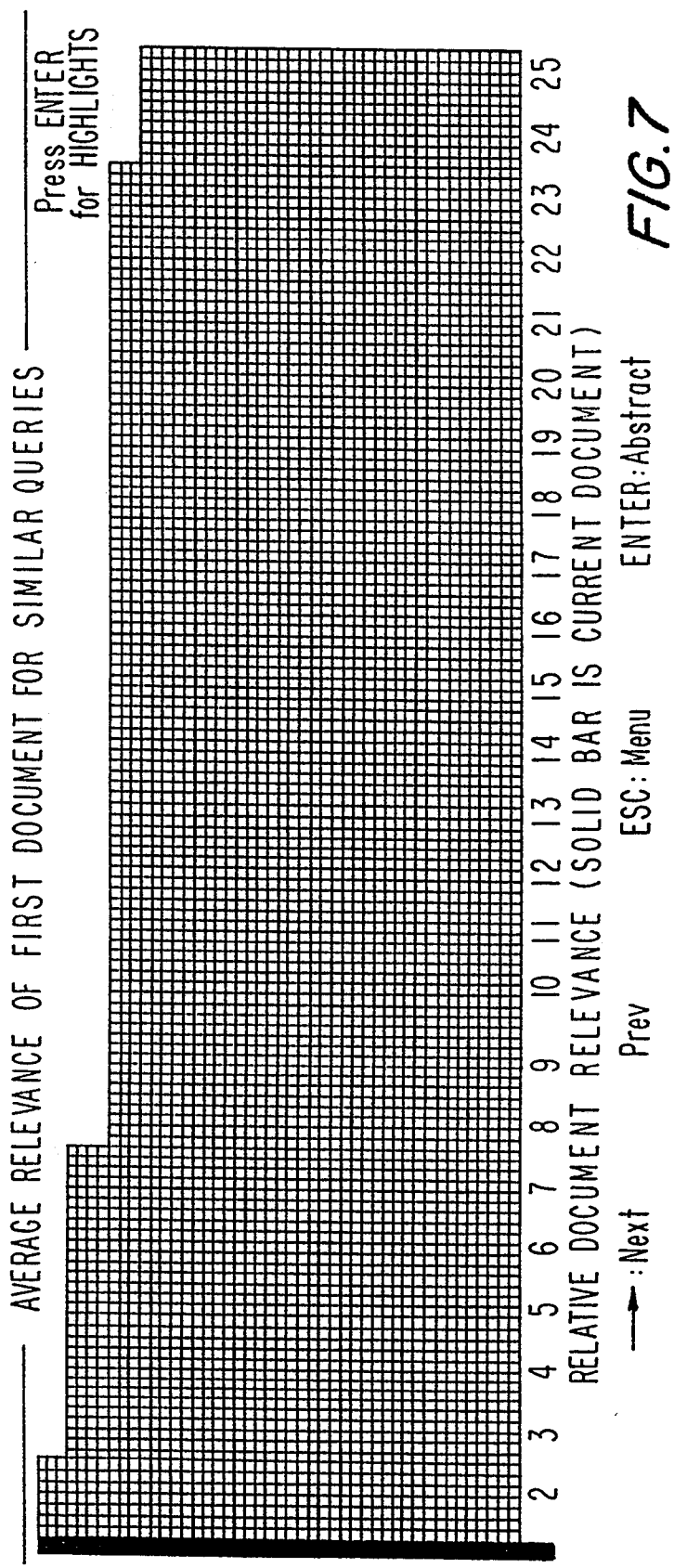
FIG. 7 is a view of the display screen as a result of ranking the documents for the query of FIG. 6.
Figure 8:
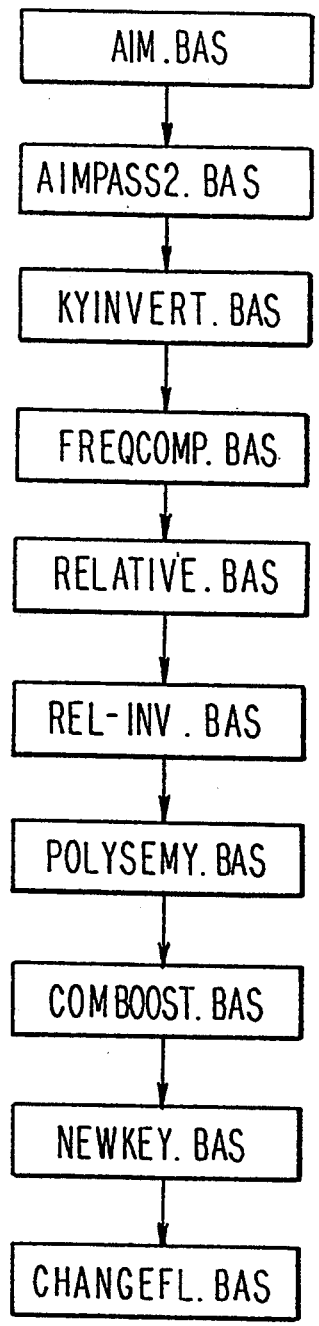
FIG. 8 is an operational flow diagram for indexing a set of documents.

To facilitate very rapid perusal of the ranked documents, the document values (used in the ranking) are presented as a bar graph as shown in FIG. 7. Also the documents are presented in 3 forms. The first form consists of a ranked array of the highest ranked terms in the document that requires only about ⅓ of the display screen (FIG. 7). The second form consists of a program generated "highlight" of the document which consists of very short portions of the document of less than a dozen words that contain the highest ranked terms. This highlight scrolls in about ⅔ of the screen and is shown along with the array of highest ranked terms. The third form consists of the full text of the document which can be scrolled. The user can use arrow keys to move rapidly from one document to the next.

Appendix 1 contains the full BASIC program source code that implements the preferred embodiment described above. This code must be compiled using the Microsoft 7.1 BASIC compiler to produce object modules which must then be linked along with libraries containing object code for assembler routines from the Crescent Software QuickPak Professional Advanced Programming Library for BASIC Compilers Version 4.12 to produce an executable file.

There has thus been shown and described a novel document indexing and retrieval system which fulfills all the objects and advantages sought therefor. Many changes, modifications, variations and other uses and applications of the subject invention will, however, become apparent to those skilled in the art after considering this specification and the accompanying drawings which disclose the preferred embodiments therefor. All such changes, modifications, variations and other uses and applications which do not depart from the spirit and scope of the invention are deemed to be covered by the invention which is limited only by the claims which follow.

APPENDIX 1: PROGRAM LISTINGS

```
DEFINT A-Z
```

```
            AIM: Automatic Indexing Module $Revision:   8.05 VN $
```

```
'check U-case word against Lcase also (CheckUpperCaseWord)

'$INCLUDE: '\USER\INCLUDE\TYPES.BI'

TYPE CodeType
        Code AS INTEGER
END TYPE

TYPE DocIndexType
        Ndx AS LONG
        Num AS INTEGER
        'Tot AS INTEGER   '-- Total Number of keys in doc for DJ (shorter docs)
        Tot AS LONG       '-- Total Number of keys in doc for WEST (longer docs)
        Pad AS STRING * 6 '-- need to pad it out to 16 bytes for > 12,800 docs
                          '   when using Tot as LONG
END TYPE TYPE DocKeyType
        Code AS INTEGER
        Freq AS INTEGER
END TYPE TYPE Str47
        Str AS STRING * 47
END TYPE TYPE Str18
        Str AS STRING * 18
END TYPE TYPE NewCombType
        Str AS STRING * 45
        Code AS INTEGER
END TYPE TYPE NewSingType
        Str AS STRING * 16
        Code AS INTEGER
END TYPE
DECLARE SUB CheckUCaseWord (Word$, PrevWord$, Length%, NoNameFlag%)
DECLARE SUB Config (Machine$, First&, Last&)
DECLARE SUB DispMsg (Msg$, r%, c%)
DECLARE SUB DispStat (s$)
DECLARE SUB EmsAlloc (NumPages%, Handle%, LoadFILE$)
DECLARE SUB FindCombKey (WordEMS%, NumWords&, KyEMS%, NumKy%, CombKeyEMS%, NumCombKey%)
DECLARE SUB FindSingKey (WordEMS%, NumWords&, KeyEMS%, NumKey%, SingFoundEMS%, NumSingFound&)
DECLARE SUB pause (Tiks%)
DECLARE SUB ReadEnglishText (FirstLine&, LastLine&, Handle%, Lin%)
DECLARE SUB ReadGermanText (FirstLine&, LastLine&, Handle%, Lin%)
DECLARE SUB ReadSection (Txt$, SecArray$(), ArtArray$())
DECLARE SUB WindMgr (ULRo=%, ULCol%, LRRow%, LRCol%, Frame%, BoxColr%, TextColr%, Text$)
DECLARE SUB WordParse (TextHandle%, Lines%, WordHandle%, Words&)
DECLARE FUNCTION FirstLast% (Word$, First%, Last%, KeyType%)
DECLARE FUNCTION LoadIntoEMS% (File$)
DECLARE FUNCTION Num$ (x%)
DECLARE FUNCTION XLate% (x$)

'----------------------------------------------- External routines

'$INCLUDE: '\USER\INCLUDE\DECLARES.BI'

'----------------------------------------------- PROGRAM START

CONST Sing = 0, Comb = 1

COMMON SHARED NormAttr, RevAttr, File&, SecCode, ArtCode
COMMON SHARED DocDir$, LstDir$, AtList$, Lang$
COMMON SHARED XLateTable%(), SingTable%(), CombTable%(), NLG$(), LENNLG()
COMMON SHARED ThirtyTwo, SixtyFour, SixteenK, ThirtyTwoK&
COMMON SHARED ASCEND, DESCEND, FALSE, TRUE
COMMON SHARED ENTER, ESCAPE, ASCa, ASCz, ASCupperA, ASCupperZ, ASCslash, ASC0, ASC9, ASCat
COMMON SHARED CodeTemp AS CodeType, LENCode, LenComb, LenSing
COMMON SHARED NumComb1Keyword, NumComb2Keyword, NumComb3Keyword
COMMON SHARED Comb1KeywordEMS%, Comb2KeywordEMS%, Comb3KeywordEMS%
COMMON SHARED NumSing1Keyword, NumSing2Keyword
COMMON SHARED Sing1KeywordEMS%, Sing2KeywordEMS%, Prefixes$(), MeanPrefixes$()
COMMON SHARED Numbers$(), Section$(), Article$(), Paragraph$(), Artikel$()
COMMON SHARED NoNameEndings$(), NameEndings$()
NLGData:
DATA "mr","mrs","messrs","sen","rep","ms","dr","drs"

EnglishData:
DATA "Section","Sec","Sec."
DATA "Article","Art.","Art."

GermanData:
DATA "Paragraph","Par","Par.","Para."
DATA "Artikel","Art","Art."

NumData:
DATA "I","II","III","IV","V","VI","VII","VIII","IX","X"
DATA "XI","XII","XIII","XIV","XV","XVI","XVII","XVIII","XIX","XX"
DATA "XXI","XXII","XXIII","XXIV","XXV","XXVI","XXVII","XXVIII","XXIX","XXX"
```

```
NameEnd:
DATA "\i\o\","\er\rg\os\ey\tz\","\man\son\ong\ham\ton\scn\","\mann\tein\"
NoNameEnd:
DATA "\al\","\ion\als\ity\","\ment\ions\ency\ancy\ness\"
DATA "\ments\ional\ities\encies\ancies\","\mental\"
'$INCLUDE: '\user\include:prefpat.bi'

'--------------------------------------------------------------
Config Machine$, FirstDoc&, LastDoc&
Rev$ = "$Revision:   5.12 VN $"
Rev$ = MID$(Rev$, 14, 7)
a12! = 0
a14! = 0
CLS
WindMgr 2, 2, 24, 79, 2, NormAttr, RevAttr, "Automatic Indexing Module (Rev " + Rev$ + ")"

'-------------------------------------------- Read in Combined Keys

IF Lang$ = "GERMAN" THEN
        LenComb = 64  '62+2
ELSE
        LenComb = 47  '45+2
END IF 'it had to divide combkey.str to 3 files because array can't be > 128k
'and there is no memory to make element size power of 2

LoadFILE$ = LstDir$ + "COMBKEY1.STR"
IF NOT Exist%(LoadFILE$) THEN CLS : PRINT LoadFILE$; " not found.": END
NumComb1Keyword = FileSize&(LoadFILE$) \ LenComb
DispMsg "Loading " + Num$(NumComb1Keyword) + " Combined Keywords", r, c
Comb1KeywordEMS% = LoadIntoEMS%(LoadFILE$)
DispMsg "", r, c LoadFILE$ = LstDir$ + "COMBKEY2.STR"
IF NOT Exist%(LoadFILE$) THEN CLS : PRINT LoadFILE$; " not found.": END
NumComb2Keyword = FileSize&(LoadFILE$) \ LenComb
DispMsg "Loading " + Num$(NumComb2Keyword) + " Combined Keywords", r, c
Comb2KeywordEMS% = LoadIntoEMS%(LoadFILE$)
DispMsg "", r, c LoadFILE$ = LstDir$ + "COMBKEY3.STR"
IF NOT Exist%(LoadFILE$) THEN CLS : PRINT LoadFILE$; " not found.": END
NumComb3Keyword = FileSize&(LoadFILE$) \ LenComb
DispMsg "Loading " + Num$(NumComb3Keyword) + " Combined Keywords", r, c
Comb3KeywordEMS% = LoadIntoEMS%(LoadFILE$)
DispMsg "", r, c '-------------------------------------------- Read Single Keys
LoadFILE$ = LstDir$ + "SINGKEY.STR"
IF NOT Exist%(LoadFILE$) THEN
        CLS
        PRINT "AIM Fatal Error:"
        PRINT
        PRINT LoadFILE$; " not found."
        PRINT
        chime 10
        PRINT "Press the SPACE BAR to exit:"
        i$ = INPUT$(1)
        END
END IF DIM SingKeyTemp AS STR32
NumKeyword = FileSize&(LoadFILE$) \ ThirtyTwo DispMsg "Loading " + Num$(NumKeyword) + " Single Keywords", r, c SingKeywordEMS% = LoadIntoEMS%(LoadFILE$)

DispMsg "", r, c

'-------------------------------------------- Read 3-Char Tables

Symb = 28: First = 1: Last = 2
REDIM XLateTable%(38 TO 122)
REDIM SingTable%(1 TO Symb, 1 TO Symb, 1 TO Symb, 1 TO 2)
REDIM CombTable%(1 TO Symb, 1 TO Symb, 1 TO Symb, 1 TO 2)

XLateTable(47) = 1' / char, as used in non-wildcard words
XLateTable(38) = 2' & char, as used in S&P, A&P, etc.
FOR i = ASCa TO ASCz
        XLateTable(i) = i - 94' so that a=3, b=4,...,z=28
NEXT FGetAH LstDir$ + "KEYWORD.TBL", SEG SingTable%(1, 1, 1, 1), (4 * 28), (28 * 28)
FGetAH LstDir$ + "KEYCOMB.TBL", SEG CombTable%(1, 1, 1, 1), (4 * 28), (28 * 28)

'-------------------------------------------- Open Documents

'-- actual count for total number of documents
Count& = FileSize&(DocDir$ + ".NDX") \ 8

OPEN DocDir$ + ".NDX" FOR RANDOM ACCESS READ SHARED AS #8 LEN = 8
OPEN DocDir$ + ".TXT" FOR RANDOM ACCESS READ SHARED AS #9 LEN = 80

'DocKeys hold ALL of the Keywords and Counts for all documents
'DocNdx(x).NDX points at the element in DocKeys() where the Keys for
'Document #x are, .NUM is how many keys are in the document,
'and .TOT is the total sum of all occurrences of keys
```

```
'store ems for dockey and docndx-no need anymore because we write to disk each doc.
'4096 elements per 16k EMS page (4 bytes per element)
'NumPages = 600' MaxDocKeys& \ 4096&
'MaxDocKeys& = CLNG(NumPages) * SixteenK \ 4
'QPrintRC STR$(NumPages) + " EMS pgs for DocKeys.", 4, 2, -1
'QPrintRC "MaxDocKeys:" + STR$(MaxDocKeys&), 4, 59, -1
'EmsAllocMem NumPages, DocKeysEMS%
'IF EmsError% THEN PRINT "Couldn't allocate"; CLNG(NumPages) * SixteenK; "bytes of EMS for DocKeysEMS.": Chime 2: STOP
'EMSNdxPages = 20 '360k can hold 36000 doc
'EmsAllocMem EMSNdxPages, DocNdxEMS%
'IF EmsError% THEN PRINT "Couldn't allocate"; CLNG(EMSNdxPages) * SixteenK; "bytes of EMS for DocNdxEMS.": Chime 2: STOP CurrDocKey& = 1        ' current pointer into DocKeys()
Debug = FALSE
Start& = FirstDoc&
'— only use the LastDoc& parameter if there are at least
'  that many documents in the database, otherwise use the
'  actual number of documents
IF Count& > LastDoc& THEN Count& = LastDoc&

'— create the DOCKEYS.AH file for output
FCreate LstDir$ + "DOCKEYS.AH" + Machine$
FOpen LstDir$ + "DOCKEYS.AH" + Machine$, DocKeyFile%
IF DocKeyFile% = -1 THEN
        PRINT "Can't create DOCKEYS.AH"
        chime 2
        END
END IF FCreate LstDir$ + "DOCINDEX.AH" + Machine$
FOpen LstDir$ + "DOCINDEX.AH" + Machine$, DocNdxFile%
IF DocNdxFile% = -1 THEN
        PRINT "Can't create DOCINDEX.AH"
        chime 2
        END
END IF 'AHSavePoint& = 1  '— intermediate save point
'NdxPoint = Start&

DIM DocNdx AS DocIndexType
LenDocNdx = LEN(DocNdx)

DIM DictTemp AS DictType  'only for getting size dependening only on DictType
DictWordNum = FileSize&(LstDir$ + "DICT.WRD") \ LEN(DictTemp)

REDIM Idf&(1 TO DictWordNum) ' total number of word-codes  idf shows numofdoc where this word is
IF NOT Debug THEN
        '— open a new file for statistics
        OPEN LstDir$ + "STATS" + Machine$ + ".TXT" FOR APPEND SHARED AS #5
        PRINT #5, "---------------------------------------------"
        PRINT #5, "Start Time:"; TIME$; TStart!
        PRINT #5, ""
ELSE
        OPEN "\DEV\NUL" FOR OUTPUT AS #5
END IF Proc = 0' number of files actually processed
TStart! = TIMER
MaxTempKey = 1000  'number of unique keys in one doc. if more then redim preserve DIM Doc AS ISAMtype
CodeString$ = ""
FreeStrSp& = FRE("")

'*********************** S T A R T ******************************************

FOR File& = Start& TO Count&

REDIM DocKeyTemp(1 TO MaxTempKey) AS DocKeyType
LENDocKeyTemp = LEN(DocKeyTemp(1))

PRINT #5, "File #"; MID$(STR$(File&), 2)

GET #8, File&, Doc
NumLines = Doc.Last - Doc.First + 1' Lines of text in the file '----- Allocate EMS to hold the Text file
NumPages = 80& * NumLines / SixteenK + 1' 80 bytes per line, 16k per EMS page
CALL EmsAllocMem(NumPages, TextEMS%)
IF EmsError% THEN PRINT "Couldn't allocate"; NumPages * SixteenK; "bytes of EMS.": STOP '----- Allocate EMS for the parsed word array (32 bytes per word)
NumPages = CLNG(NumLines) * 12 \ 512 + 1' max number of words (512 per 16K EMS page)
CALL EmsAllocMem(NumPages, WordEMS%)
IF EmsError% THEN PRINT "Couldn't allocate"; NumPages * SixteenK; "bytes of EMS.": STOP Row = 4
CALL WindMgr(Row, 30, Row + 1, 50, 2, RevAttr, RevAttr, "CURRENT DOCUMENT")
QPrintRC MID$(STR$(File&), 2) + "/" + MID$(STR$(Count&), 2), Row + 1, 35, -1

'------------------------ Read Document into EMS eliminating blank lines
'                         strip non-alpha chars and crunch extra spaces IF Lang$ = "ENGLISH" THEN
        ReadEnglishText Doc.First, Doc.Last, TextEMS%, NumLines%
ELSEIF Lang$ = "GERMAN" THEN
        ReadGermanText Doc.First, Doc.Last, TextEMS%, NumLines%
END IF
```

```
'-------------------------------------------------- Parse Text into Words
' NumWords = number of words parsed WordParse TextEMS%, NumLines, WordEMS%, NumWords&
EmsRelMem TextEMS%' release handle of DOC file, not needed anymore '-------------------------------------------------- Find Combined Keys
' 50% ratio for expected combined keys '. 8192 keys per page (16384 page size/2 keycode size)

CombRatio! = .5
DispStat MID$(STR$(CLNG(NumWords& * CombRatio!)), 2) + " Combined Keys allocated."

NumPages = NumWords& * CombRatio! \ 8192 + 1
EmsAlloc NumPages, CombCodeEMS%, "CombCodeEMS"
a11! = TIMER
FindCombKey WordEMS%, NumWords&, CombKeywordEMS%, NumCombKeyword, CombCodeEMS%, NumCombCode
a12! = a12! + TIMER - a11!
DispStat Num$(NumCombCode) + " combined keys found."

'---- Store the Combined Keywords in DocKeysEMS

DocNdx.Ndx = CurrDocKey&
Index& = CurrDocKey&

'if this is a first appearence then put code to DocKeyTemp,i.e. store it and
'increase number of documents contained this word (IDF) and increase string(we
'keep previous codes as string (\**\**\**...))
'if not add frequency this word in this particular documente
k = 0
FOR i = 1 TO NumCombCode
        EmsGet1El CodeTemp, LENCode, i, CombCodeEMS%
        CodeStr$ = "\" + MKIS(CodeTemp.Code)
        CodePos = INSTR(CodeString$, CodeStr$)
        IF CodePos = 0 THEN
                k = k + 1
                Idf&(CodeTemp.Code) = Idf&(CodeTemp.Code) + 1
                DocKeyTemp(k).Code = CodeTemp.Code
                DocKeyTemp(k).Freq = 1
                '-- since it wasn't found, it's new so we'll put it at CurrDocKey&
                '    and increment CurrDocKey& to point to the next available slot
                CurrDocKey& = CurrDocKey& + 1
                CodeString$ = CodeString$ + CodeStr$ ELSE
                CodePos = CodePos \ 3 + 1
                DocKeyTemp(CodePos).Freq = DocKeyTemp(CodePos).Freq + 1
        END IF
NEXT
EmsRelMem CombCodeEMS%

'QPrintRC STR$(CurrDocKey& - 1), 3, 70, -1

'-------------------------------------------------- Find Single Keywords

SingRatio! = 1.5  'we need more space for word with and without prefixes
DispStat LTRIM$(STR$(CLNG(NumWords& * SingRatio!))) + " Single Keys allocated."
NumPages = NumWords& * SingRatio! \ 8192 + 1 '-- 8192 keycodes per 16k EMS page
EmsAlloc NumPages, SingCodeEMS%, "SingleCodeEMS"
a13! = TIMER
FindSingKey WordEMS%, NumWords&, SingKeywordEMS%, NumKeyword, SingCodeEMS%, NumSingCode&
a14! = a14! + TIMER - a13!
DispStat LTRIM$(STR$(NumSingCode&)) + " single keys found."

'---- don't need the parsed word list anymore so release the EMS
EmsRelMem WordEMS%

'the same as for combined keywords:
'if this is a first appearence then put code to DocKeyTemp,i.e. store it and
'increase number of documents contained this word (IDF) and increase string(we
'keep previous codes as string (\**\**\**...))
'if not add frequency this word in this particular documente k& = LEN(CodeString$) \ 3  'number of unique keywords
FOR i& = 1 TO NumSingCode&
        EmsGet CodeTemp, LENCode, i&, SingCodeEMS%
        CodeStr$ = "\" + MKIS(CodeTemp.Code)
        CodePos = INSTR(CodeString$, CodeStr$)
        IF CodePos = 0 THEN
                k& = k& + 1
                IF k& > MaxTempKey THEN REDIM PRESERVE DocKeyTemp(1 TO k&) AS DocKeyType
                Idf&(CodeTemp.Code) = Idf&(CodeTemp.Code) + 1
                DocKeyTemp(k&).Code = CodeTemp.Code
                DocKeyTemp(k&).Freq = 1
                '-- since it wasn't found, it's new so we'll put it at CurrDocKey&
                '    and increment CurrDocKey& to point to the next available slot
                CurrDocKey& = CurrDocKey& + 1
                CodeString$ = CodeString$ + CodeStr$
        ELSE
                CodePos = CodePos \ 3 + 1
                DocKeyTemp(CodePos).Freq = DocKeyTemp(CodePos).Freq + 1
        END IF
NEXT 'QPrintRC STR$(CurrDocKey& - 1), 3, 70, -1

DocNdx.Num = CurrDocKey& - Index&
DocNdx.Tot = NumSingCode& + NumCombCode

DispStat MID$(STR$(NumSingCode& + NumCombCode), 2) + " Keywords."
DispStat MID$(STR$(CurrDocKey& - Index&), 2) + " Unique Keywords."
```

```
'release memory for the combined and single keywords in EMS
EmsRelMem SingCodeEMS%

'store DockeyTemp Array on disk , there is not enough memory to keep it in RAM
'and there is no sense to put it to EMS and later read back to RAM & put to disk
k& = LEN(CodeString$) \ 3
FOR i& = 1 TO k&
        CALL FPutRT(DocKeyFile%, DocKeyTemp(i&), Index& + i& - 1, LENDocKeyTemp)
NEXT
CALL FPutRT(DocNdxFile%, DocNdx, CLNG(File&), LenDocNdx) 'write ndx for each document IF INKEY$ = CHR$(27) THEN
        chime 10
        DO: LOOP UNTIL INKEY$ = ""
        x$ = INPUT$(1)
        IF x$ = CHR$(13) THEN Proc = File&: File& = Count&
END IF
CodeString$ = ""
FreeStrSp& = FRE("")

'-- do an intermediate save every 100 docs
IF (File& MOD 100) = 0 THEN
        DispMsg "Intermediate Save at" + STR$(File&), r, c '       '-- dump out the portion of the DocNdx() used (i.e., from Start to File)
'       FOR i& = NdxPoint TO File&
'               CALL EmsGet(SEG DocNdx, LenDocNdx, i&, DocNdxEMS%)
'               CALL FPutRT(DocNdxFile%, DocNdx, i&, LenDocNdx)
'       NEXT
'       NdxPoint = File& + 1
'       FPutAH LstDir$ + "DOCINDEX.AH" + Machine$, SEG DocNdx(Start&), LEN(DocNdx(Start&)), File& - Start& + 1
'
'       '-- save DocKeys from the last save point
'       FOR i& = AHSavePoint& TO CurrDocKey& - 1
'               CALL EmsGet(SEG DocKeyTemp, LENDocKeyTemp, i&, DocKeysEMS%)
'               CALL FPutRT(DocKeyFile%, DocKeyTemp, i&, LENDocKeyTemp)
'       NEXT
'       '-- set the save point to the next dockey
'       AHSavePoint& = CurrDocKey&

'-- save the IDF.SIN
        CALL FPutAH(LstDir$ - "IDF" + Machine$ + ".SIN", SEG Idf&(1), -2, UBOUND(Idf&))

DispMsg "", 0, 0

END IF
DispStat ""
NEXT File&
'*************************************************************************
CLOSE #8, #9

IF Proc <> 0 THEN Count& = Proc
TEnd! = TIMER
PRINT #5, ""
PRINT #5, "End Time:"; TIME$; TEnd!; (TEnd! - TStart!) / Count&; "seconds per document."
CLOSE #5
TotalTime! = TEnd! - TStart!
IF TotalTime! < 0 THEN TotalTime! = TotalTime! + 86400!
PRINT TotalTime! / 60; "minutes elapsed time."
PRINT "FindCombKey"; a12!
PRINT "FindSingKey"; a14!
'==========================================================================

'release memory for COMBKEY and SINGKEY lists and the DICT.COD list

IF SingKeywordEMS% THEN EmsRelMem SingKeywordEMS%
IF Comb1KeywordEMS% THEN EmsRelMem Comb1KeywordEMS%
IF Comb2KeywordEMS% THEN EmsRelMem Comb2KeywordEMS%
IF Comb3KeywordEMS% THEN EmsRelMem Comb3KeywordEMS%
IF Sing1KeywordEMS% THEN EmsRelMem Sing1KeywordEMS%
IF Sing2KeywordEMS% THEN EmsRelMem Sing2KeywordEMS%

'decrement current pointer so that it points to the end of the array
'not at the next available space
CurrDocKey& = CurrDocKey& - 1

'---- Save storage to disk
IF NOT Debug THEN

DispMsg "Saving IDF" + Machine$ + ".SIN", r, c
        FPutAH LstDir$ + "Idf" + Machine$ + ".SIN", SEG Idf&(1), -2, UBOUND(Idf&)
        DispMsg "", 0, 0

'       DispMsg "Saving DocIndex.AH" + Machine$, r, c
'       FOR i& = NdxPoint TO File&
'               CALL EmsGet(SEG DocNdx, LenDocNdx, i&, DocNdxEMS%)
'               CALL FPutRT(DocNdxFile%, DocNdx, i&, LenDocNdx)
'       NEXT
'
'       FPutAH LstDir$ + "DOCINDEX.AH" + Machine$, SEG DocNdx(Start&), LEN(DocNdx(Start&)), Count& - Start& + 1
'       DispMsg "", 0, 0
'
'       DispMsg "Saving DocKeys.AH" + Machine$ + " from EMS", r, c
'
'       FOR i& = AHSavePoint& TO CurrDocKey&
'               EmsGet SEG DocKeyTemp, LENDocKeyTemp, i&, DocKeysEMS%
'               FPutRT DocKeyFile%, DocKeyTemp, i&, LENDocKeyTemp
'       NEXT FClose DocKeyFile%
        FClose DocNdxFile%
END IF
```

```
'EmsRelMem DocKeysEMS%    '— release memory for Doc Keys
DispMsg "", 0, 0
chime 10
'$Page
END SUB CheckUCaseWord (Word$, PrevWord$, Length, NoNameFlag) STATIC NoNameFlag = FALSE FOR i = 1 TO 4
        IF INSTR(NameEndings$(i), RIGHT$(Word$, i)) THEN
                IF Length > 9 THEN
                        NoNameFlag = TRUE
                        EXIT SUB
                END IF
        END IF
NEXT IF Length > 7 THEN
        NoNameFlag = TRUE
        EXIT SUB
END IF IF INSTR("\a//\an/\any\no/\this\such\many\several\", "\" + PrevWord$ + "\") THEN
        IF Length > 3 THEN
                NoNameFlag = TRUE
                EXIT SUB
        END IF
END IF IF LCASE$(PrevWord$) = "the" AND Length > 4 THEN
        NoNameFlag = TRUE
        EXIT SUB
END IF FOR i = 2 TO 6
        IF INSTR(NoNameEnding$(i), RIGHT$(Word$, i)) THEN
                IF Length > 2 THEN
                        NoNameFlag = TRUE
                        EXIT SUB
                END IF
        END IF
NEXT

END SUB

SUB Config (Machine$, First&, Last&) STATIC

IF NOT EmsLoaded% THEN
        CLS
        PRINT "AIM Fatal Error:"
        PRINT
        PRINT "No EMS driver was found."
        PRINT
        chime 10
        PRINT "Press the SPACE BAR to exit:"
        i$ = INPUT$(1)
        END
END IF LENCode = LEN(CodeTemp)
SixteenK = 16 * 1024
SixtyFour = 64
ThirtyTwo = 32
ThirtyTwoK& = ThirtyTwo * 1024&
ASCEND = 0
DESCEND = NOT ASCEND
FALSE = 0
TRUE = NOT FALSE
ENTER = 13
ESCAPE = 27
ASCa = ASC("a")
ASCz = ASC("z")
ASCupperA = ASC("A")
ASCupperZ = ASC("Z")
ASCslash = ASC("/")
ASC0 = ASC("0")
ASC9 = ASC("9")
ASCat = ASC("a")

Cmd$ = QPTrim$(COMMAND$)

Parms = InCount(Cmd$, " ") - 1    '— number of parameters

IF Parms = 4 THEN

'— Expected information on command line:
        '    Config file, Machine #, First Doc, Last Doc Extract Cmd$, " ", 1, Strt, SLen '— extract first parm
        ConfigFile$ = MID$(Cmd$, Strt, SLen) + ".CFG"

Extract Cmd$, " ", 2, Strt, SLen '— extract second parm
        Machine$ = MID$(Cmd$, Strt, SLen)

Extract Cmd$, " ", 3, Strt, SLen '— extract third parm
        First& = VAL(MID$(Cmd$, Strt, SLen))

Extract Cmd$, " ", 4, Strt, SLen '— extract fourth parm
        Last& = VAL(MID$(Cmd$, Strt, SLen))
```

```
ELSE

PRINT
        PRINT "AIM Program Error: Missing Parameters"
        PRINT
        PRINT
        PRINT "Required Parameters are:"
        PRINT
        PRINT "AIM  Config File  Machine Number  First Doc  Last Doc"
        PRINT
        chime 10
        PRINT "Press the SPACE BAR to exit:"
        i$ = INPUT$(1)
        END

END IF

IF NOT Exist(ConfigFile$) THEN
        chime 10
        PRINT "File "; ConfigFile$; " was not found."
        PRINT "Press any key to return to the system."
        DO: ch$ = INKEY$: LOOP UNTIL LEN(ch$) <> 0
        END
END IF
OPEN ConfigFile$ FOR INPUT ACCESS READ SHARED AS #1
        INPUT #1, Fg, Bg, Brdr, LstDir$, DocDir$, NdxDir$, AbstrDir$, Lang$
CLOSE #1

COLOR Fg, Bg, Brdr

NormAttr = OneColor%(Fg, Bg)
RevAttr = OneColor%(Bg, Fg AND 7)

File$ = LstDir$ + "@" + Lang$ + ".LST"
IF NOT Exist(File$) THEN
        chime 10
        PRINT "File "; File$; " was not found."
        PRINT "Press any key to return to the system."
        DO: ch$ = INKEY$: LOOP UNTIL LEN(ch$) <> 0
        END
END IF
OPEN File$ FOR INPUT ACCESS READ SHARED AS 1
        INPUT #1, AtList$
CLOSE #1

File$ = LstDir$ + Lang$ + ".SEC"
IF NOT Exist(File$) THEN
        chime 10
        PRINT "File "; File$; " was not found."
        PRINT "Press any key to return to the system."
        DO: ch$ = INKEY$: LOOP UNTIL LEN(ch$) <> 0
        END
END IF
OPEN File$ FOR INPUT ACCESS READ SHARED AS 1
        INPUT #1, SecCode, ArtCode
CLOSE RESTORE NLGData
REDIM NLG$(1 TO 8), LENNLG(1 TO 8)
FOR i = 1 TO 8
        READ NLG$(i)
        LENNLG(i) = LEN(NLG$(i))
NEXT RESTORE EnglishData
REDIM Section$(1 TO 3)
FOR i = 1 TO 3
        READ Section$(i)
NEXT REDIM Articles$(1 TO 3)
FOR i = 1 TO 3
        READ Articles$(i)
NEXT RESTORE GermanData
REDIM Paragraph$(1 TO 4)
FOR i = 1 TO 4
        READ Paragraph$(i)
NEXT REDIM Artikel$(1 TO 3)
FOR i = 1 TO 3
        READ Artikel$(i)
NEXT RESTORE NumData
REDIM Numbers$(1 TO 30)
FOR i = 1 TO 30
        READ Numbers$(i)
NEXT IF Lang$ <> "GERMAN" THEN
        REDIM NameEndings$(1 TO 4)
        REDIM NoNameEndings$(2 TO 6)
        RESTORE NameEnd
        FOR i = 1 TO 4
                READ NameEndings$(i)
        NEXT
        RESTORE NoNameEnd
```

```
                FOR i = 2 TO 6
                        READ NoNameEnding$(i)
                NEXT
        END IF
        IF Lang$ = "GERMAN" THEN
                RESTORE GermanPrefixes
        ELSE
                RESTORE EnglishPrefixes
        END IF
        REDIM Prefixes$(2 TO 9)
        IF Lang$ = "GERMAN" THEN
                FOR i = 2 TO 9
                        READ FirstHalf$, SecondHalf$
                        Prefixes$(i) = FirstHalf$ + SecondHalf$
                NEXT
        ELSE
                FOR i = 2 TO 9
                        READ Prefixes$(i)
                NEXT
        END IF REDIM MeanPrefixes$(3 TO 14)
        IF Lang$ = "GERMAN" THEN
                FOR i = 3 TO 14
                        READ FirstHalf$, SecondHalf$, ThirdHalf$
                        MeanPrefixes$(i) = FirstHalf$ + SecondHalf$ + ThirdHalf$
                NEXT
        ELSE
                FOR i = 3 TO 14
                        READ MeanPrefixes$(i)
                NEXT
        END IF
        END SUB SUB DispMsg (Msg$, r, c) STATIC STATIC WindOpen, Scr%() ' is there already a message displayed?

SHARED Fg, Bg

IF Msg$ = "" THEN
                IF WindOpen THEN GOSUB MsgClose
                EXIT SUB
        END IF IF WindOpen THEN
                CALL chime(9)
                OPEN "DEBUG" FOR OUTPUT AS 10
                PRINT #10, "WindOpen="; WindOpen; HEX$(WindOpen)
                PRINT #10, "Msg$= |"; Msg$; "|"
                PRINT #10, "TRUE="; TRUE; HEX$(TRUE)
                PRINT #10, "FALSE="; FALSE; HEX$(FALSE)
                CLOSE 10
                CALL chime(8)
                CLS
                END
                i$ = INPUT$(1)
                GOSUB MsgClose
        END IF Wid = LEN(Msg$)
        IF Wid > 50 THEN Wid = 50

Msg$ = Msg$ + " "' make sure there's a space to find at the end (see below)

MaxLin = LEN(Msg$) \ Wid + 3
        IF MaxLin > 23 THEN MaxLin = 23
        REDIM Text$(MaxLin)
        Lin = 0
        DO
                Lin = Lin + 1' incr current Lin # (also element in text display array)
                Lastspc = QInstrEX(Wid + 1, Msg$, " ")' look for the last space so we can word wrap
                Text$(Lin) = LEFT$(Msg$, Lastspc - 1)
                Msg$ = MID$(Msg$, Lastspc + 1)'remove portion of string that's in t$
        LOOP WHILE LEN(Msg$) > Wid Msg$ = RTRIM$(Msg$)
        IF LEN(Msg$) THEN
                Lin = Lin + 1
                Text$(Lin) = Msg$
        END IF vertmargin = (25 - Lin) / 2
        IF r <> 0 AND c = 0 THEN
                ULr = r
        ELSE
                ULr = 9'ulr = INT(vertmargin - .5)
        END IF
          DULr = ULr - 1
          LRr = ULr + Lin + 1'LRr = 25 - INT(vertmargin)
          DLRr = LRr + 2 horizmargin = (80 - Wid) \ 2
          ULc = horizmargin
          DULc = ULc - 3
          LRc = 80 - INT(horizmargin)
          IF Wid / 2 = Wid \ 2 THEN LRc = LRc + 1
          DLRc = LRc + 1

REDIM Scr%(ArraySize%(DULr, DULc, DLRr, DLRc))
        CALL ScrnSave0(DULr, DULc, DLRr, DLRc, SEG Scr%(0))
        CALL WindMgr(ULr, ULc, LRr, LRc, 4, NormAttr, RevAttr, "Status")
        FOR i = 1 TO Lin
                CALL QPrintRC(Text$(i), ULr + i, ULc + 1, -1)
```

```
    NEXT r = ULr + Lin
    c = ULc + 1 + LEN(Text$(Lin))
    IF LEN(Text$(Lin)) + 2 = W THEN c = ULc + 1: r = r + 1

ERASE Text$
    WindOpen = TRUE

EXIT SUB

'---------------------------------------------------------- Close Window
    MsgClose:

CALL ScrnRest0(DULr, DULc, DLRr, DLRc, SEG Scr%(0))
    ERASE Scr%
    WindOpen = FALSE
    RETURN

END SUB

SUB DispStat (s$) STATIC

STATIC Row

IF Row = 0 THEN
            Row = 15
            Col = 23
            Height = 8
            Wid = 34
            CALL WindMgr(Row, Col - 1, Row + Height, Col + Wid, 1, NormAttr, RevAttr, "FILE STATISTICS")
            Col = Col + 2
    ELSE
            Row = Row + 1
    END IF IF s$ = "" THEN
            Row = 0
    ELSE
            CALL QPrintRC(s$, Row, Col, -1)
    END IF IF INSTR(s$, "alloc") = 0 THEN PRINT #5, s$

END SUB

SUB EmsAlloc (NumPages%, Handle%, LoadFILE$) STATIC

EmsAllocMem NumPages%, Handle%
    IF EmsError% THEN
            PRINT "Couldn't allocate"; CLNG(NumPages) * SixteenK; "bytes of EMS for "; LoadFILE$
            chime 2
            DO: LOOP UNTIL LEN(INKEY$) = 0
            i$ = INPUT$(1)
            END
    END IF

END SUB

SUB FindCombKey (WordEMS%, NumWords&, KeyEMS%, NumKey%, CombFoundEMS%, NumCombFound%) STATIC 'EMS ARRAY  LEN DESCRIPTION               DIRECTION   MODIFIED?
    '---------  --- -----------               ---------   ---------
    'WordH:     32  Document Words            (Passed)    (Unchanged)
    'KeyH:      64  Combined Keywords         (Passed)    (Unchanged)
    'CombFoundH: 64 Combined Keywords Found   (Returned)  (Changed)

DIM WordTemp AS STR32    '-- current document word
    DIM WordCompare AS STR32 '-- current word in CombKey to check
    DIM KeyTemp AS CombKeyType '-- entire Combined Keyword
    IF Lang$ = "GERMAN" THEN
            REDIM Comb1ArrayGer(1 TO NumComb1Keyword)  AS CombKeyType
            REDIM Comb2ArrayGer(1 TO NumComb2Keyword)  AS CombKeyType
            REDIM Comb3ArrayGer(1 TO NumComb3Keyword)  AS CombKeyType
            EMS2ARRAY Comb1ArrayGer(1), LenComb, NumComb1Keyword, Comb1KeywordEMS%
            EMS2ARRAY Comb2ArrayGer(1), LenComb, NumComb2Keyword, Comb2KeywordEMS%
            EMS2ARRAY Comb3ArrayGer(1), LenComb, NumComb3Keyword, Comb3KeywordEMS%
    ELSE
            REDIM Comb1Array(1 TO NumComb1Keyword) AS NewCombType
            REDIM Comb2Array(1 TO NumComb2Keyword) AS NewCombType
            REDIM Comb3Array(1 TO NumComb3Keyword) AS NewCombType
            EMS2ARRAY Comb1Array(1), LenComb, NumComb1Keyword, Comb1KeywordEMS%
            EMS2ARRAY Comb2Array(1), LenComb, NumComb2Keyword, Comb2KeywordEMS%
            EMS2ARRAY Comb3Array(1), LenComb, NumComb3Keyword, Comb3KeywordEMS%
    END IF
    NumCombFound = 0
    SecondEnd = NumComb2Keyword + NumComb1Keyword
    LenWord = LEN(WordTemp)
    LENKey = LEN(KeyTemp)

Slash$ = "///"
    ASCslash = ASC("/")

IF Lang$ = "ENGLISH" THEN English = TRUE ELSE English = FALSE d$ = "Marking Combined Keywords: x     out of" + STR$(NumWords&)
    x = LEN(d$) - INSTR(d$, "x")
    DispMsg d$, r, c
    c = c - x - 1

FOR i& = 1 TO NumWords&' number of words in document
```

```
QPrintRC MID$(STR$(i&), 2), r, c, -1

'-- get word from list of parsed document words
EmsGet WordTemp, LenWord, i&, WordEMS
'-- convert it to a variable-length for speed
WordTempStr$ = RTRIM$(WordTemp.Str)

'-- if it's English, then make it lowercase since we ignore case
'   for Combined Keywords
IF English THEN
        Lower WordTempStr$
        IF RIGHT$(WordTempStr$, 1) = CHR$(255) THEN
                WordTempStr$ = LEFT$(WordTempStr$, LEN(WordTempStr$) - 1)
        END IF
END IF
'-- if it's a valid range, then check words in range
IF FirstLast%(WordTempStr$, First, Last, Comb) THEN FOR j = Last TO First STEP -1

'-- get word from Combined Keyword List (COMBKEY.STR)
            IF Lang$ = "GERMAN" THEN
                    IF j <= NumComb1Keyword THEN
                            KeyTempStr$ = RTRIM$(Comb1ArrayGer(j).Str)
                    ELSEIF j <= SecondEnd THEN
                            KeyTempStr$ = RTRIM$(Comb2ArrayGer(j - NumComb1Keyword).Str)
                    ELSE
                            KeyTempStr$ = RTRIM$(Comb3ArrayGer(j - SecondEnd).Str)
                    END IF
            ELSE
                    IF j <= NumComb1Keyword THEN
                            KeyTempStr$ = RTRIM$(Comb1Array(j).Str)
                    ELSEIF j <= SecondEnd THEN
                            KeyTempStr$ = RTRIM$(Comb2Array(j - NumComb1Keyword).Str)
            ELSE
                    KeyTempStr$ = RTRIM$(Comb3Array(j - SecondEnd).Str)
            END IF
END IF
Words = InCount(KeyTempStr$, " ") + 1 'count number of words
        CALL Extract(KeyTempStr$, " ", 1, Strt, SLen) 'extract first word
        CurrKey$ = MID$(KeyTempStr$, Strt, SLen)'    of combined keyword IF MidChar%(CurrKey$, SLen) = ASCslash THEN
                Exact = TRUE
                CurrKey$ = LEFT$(CurrKey$, SLen - 1)
                SLen = SLen - 1
        ELSE
                Exact = FALSE
        END IF IF SLen < 3 THEN
                CurrKey$ = CurrKey$ + LEFT$(Slash$, 3 - SLen)
                SLen = 3
        END IF 'compare first word of combined key [CurrKey$]
        'against the current document word [WordTempStr$]

IF English THEN
                IF NOT Exact THEN
                        Match = (LCASE$(CurrKey$) = LEFT$(WordTempStr$, SLen))
                ELSE ' check for *exact* match
                        Match = (LCASE$(CurrKey$) = WordTempStr$)
                END IF
        ELSE '-- German
                IF NOT Exact THEN
                        Match = (CurrKey$ = LEFT$(WordTempStr$, SLen))
                ELSE ' check for *exact* match
                        Match = (CurrKey$ = WordTempStr$)
                END IF
        END IF ' no match, skip to next combined key in the First-Last range
        IF NOT Match GOTO SkipCombKey ' continue matching the rest of the words in the combined key
        ' exiting out as soon as there's a non-match AtFlag = FALSE
        NotFlag = FALSE FOR k = 2 TO Words' number of words left in combined key ' extract the next word from the current combined keyword (j)
                CALL Extract(KeyTempStr$, " ", k, Strt, SLen)
                CurrKey$ = MID$(KeyTempStr$, Strt, SLen)

IF MidChar%(CurrKey$, SLen) = ASCslash THEN
                        Exact = TRUE
                        CurrKey$ = LEFT$(CurrKey$, SLen - 1)
                        SLen = SLen - 1
                ELSE
                        Exact = FALSE
                END IF IF SLen < 3 THEN
                        CurrKey$ = CurrKey$ + LEFT$(Slash$, 3 - SLen)
                        SLen = 3
                END IF IF AtFlag = FALSE AND NotFlag = FALSE THEN
                        EmsGet WordCompare, LenWord, i& + k - 1, WordEMS
```

```
                    ELSE
                        IF AtFlag = FALSE AND NotFlag = TRUE THEN
                                EmsGet WordCompare, LenWord, i& + k, WordEMS%
                        ELSE
                            IF AtFlag = TRUE AND NotFlag = FALSE THEN
                                    EmsGet WordCompare, LenWord, i& + k - 2, WordEMS%
                            ELSE
                                    EmsGet WordCompare, LenWord, i& + k - 1, WordEMS%
                            END IF
                        END IF
                    END IF
                    DocWord$ = RTRIM$(WordCompare.Str)' Document word to compare IF English THEN Lower DocWord$ IF ASCII(CurrKey$) <> ASCat THEN
                        IF English THEN
                            IF Exact THEN ' check for *exact* match
                                    Match = (LCASE$(CurrKey$) = DocWord$)
                            ELSE ' wildcard match, only compare # of chars in CurrKey$
                                    Match = (LCASE$(CurrKey$) = LEFT$(DocWord$, SLen))
                            END IF
                        ELSE '-- German: no need to use Lcase$
                            IF Exact THEN ' check for *exact* match
                                    Match = (CurrKey$ = DocWord$)
                            ELSE ' wildcard match, only compare # of chars in CurrKey$
                                    Match = (CurrKey$ = LEFT$(DocWord$, SLen))
                            END IF
                        END IF
                    ELSE '-- special processing for a wildcard
                        IF INSTR(AtList$, "/" + DocWord$ + "/") THEN
                                Match = TRUE' the word was in the a list, so continue
                        ELSE
                            IF English THEN
                                    Match = FALSE
                            ELSE
                                    Match = TRUE
                                    AtFlag = TRUE
                            END IF
                        END IF
                        IF Match THEN
                                EmsGet WordCompare, LenWord, i& + k, WordEMS%
                                DocWord$ = RTRIM$(WordCompare.Str)
                                IF DocWord$ = "not" OR DocWord$ = "be" OR DocWord$ = "nicht" THEN NotFlag = TRUE
                        END IF
                    END IF IF NOT Match GOTO SkipCombKey NEXT' word in current combined keyword IF Match THEN ' this is a combined keyword, so add it to the list
                    NumCombFound = NumCombFound + 1
                    IF Lang$ = "GERMAN" THEN
                        IF j <= NumComb1Keyword THEN
                            CodeTemp.Code = Comb1ArrayGer(j).Code
                        ELSEIF j <= SecondEnd THEN
                            CodeTemp.Code = Comb2ArrayGer(j - NumComb1Keyword).Code
                        ELSE
                            CodeTemp.Code = Comb3ArrayGer(j - SecondEnd).Code
                        END IF
                    ELSE
                        IF j <= NumComb1Keyword THEN
                            CodeTemp.Code = Comb1Array(j).Code
                        ELSEIF j <= SecondEnd THEN
                            CodeTemp.Code = Comb2Array(j - NumComb1Keyword).Code
                        ELSE
                            CodeTemp.Code = Comb3Array(j - SecondEnd).Code
                        END IF
                    END IF
                    EmsSet1EL CodeTemp, LENCode, NumCombFound, CombFoundEMS%
                    IF EmsError% THEN '-- probably ran out of storage in EMS
                            NumCombFound = NumCombFound - 1
                    END IF

EXIT FOR
                END IF

SkipCombKey:

NEXT
        END IF' Table range was valid

IF EmsError% THEN EXIT FOR

NEXT' key in list

DispMsg "", r, c
    IF Lang$ = "GERMAN" THEN
            ERASE Comb1ArrayGer
            ERASE Comb2ArrayGer
            ERASE Comb2ArrayGer
    ELSE
            ERASE Comb1Array
            ERASE Comb2Array
            ERASE Comb2Array
    END IF
END SUB SUB FindSingKey (WordEMS%, NumWords&, KeyEMS%, NumKey%, SingFoundEMS%, NumSingFound&) STATIC 'EMS ARRAY  LEN DESCRIPTION            * DIRECTION   MODIFIED?
'---------- --- ----------------------   ---------   ---------
```

```
'WordH:        32 Document Words         (Passed)    (Unchanged)
'KeyH:         32 Single Keywords        (Passed)    (Unchanged)
'SingFoundH:   32 Single Keywords Found  (Returned)  (Changed)

DIM WordTemp AS STR32        '— current document word
DIM KeyTemp AS SingKeyType   '— Single Keyword to be compared
LenWord = LEN(WordTemp)
LENKey = LEN(KeyTemp)

ASCslash = ASC("/")

NumSingFound& = 0 d$ = "Marking Single Keywords: x     out of" + STR$(NumWords&)
x = LEN(d$) - INSTR(d$, "x")
DispMsg d$, r, c
c = c - x - 1

FOR i& = 1 TO NumWords&' number of words in document

QPrintRC LTRIM$(STR$(i&)), r, c, -1
        EmsGet WordTemp, LenWord, i&, WordEMS%
        PrefixFlag = FALSE: MeanPrefixFlag = FALSE: UpperCaseFlag = FALSE
        Limit = 0
        WordTempStr$ = RTRIM$(WordTemp.Str)
        IF RIGHT$(WordTempStr$, 1) = CHR$(255) THEN
                WordTempStr$ = LEFT$(WordTempStr$, LEN(WordTempStr$) - 1)
                NewSentFlag = TRUE
        ELSE
                NewSentFlag = FALSE
        END IF ' check if the first 3 letters of the word return
        ' a valid range from the 3-dimensional table array
TryAgain:
        IF FirstLast%(LCASE$(WordTempStr$), First, Last, Sing) THEN   ' yes, so search thru range FOR j = Last TO First STEP -1

'— get the word from the SINGKEY.STR list
                        EmsGet1El KeyTemp, LENKey, j, KeyEMS%
                        CurrKey$ = RTRIM$(KeyTemp.Str)
                        SLen = LEN(CurrKey$)

'— compare the single keyword [CurrKey$/KeyTemp.Str]
                        '   against the document word [WordTemp.Str]
                        '— [replaced] IF RIGHT$(CurrKey$, 1) = "/" THEN IF MidChar%(CurrKey$, SLen) = ASCslash THEN
                                CurrKey$ = LEFT$(CurrKey$, SLen - 1)
                                Match = (CurrKey$ = RTRIM$(WordTempStr$))
                        ELSE
                                Match = (CurrKey$ = LEFT$(WordTempStr$, SLen))
                        END IF IF Match AND LEN(CurrKey$) >= Limit THEN   '— add the single keyword to the list
                                IF NOT UpperCaseFlag THEN
                                        NumSingFound& = NumSingFound& + 1
                                        CodeTemp.Code = KeyTemp.Code
                                        EmsSet CodeTemp, LENCode, NumSingFound&, SingFoundEMS%

IF EmsError% THEN '— probably ran out of storage in EMS
                                                NumSingFound = NumSingFound - 1
                                        END IF
                                END IF
                                EXIT FOR
                        END IF
                NEXT' key in range ELSE 'check for sections
        Letter$ = LEFT$(WordTemp.Str, 2)
        IF Letter$ = "zs" OR Letter$ = "za" THEN
                SecNum& = VAL(MID$(WordTemp.Str, 3))
                IF SecNum& <= 3000 THEN
                        IF SecNum& THEN
                                IF Letter$ = "zs" THEN
                                        CodeTemp.Code = SecNum& + SecCode      '10563
                                ELSE
                                        CodeTemp.Code = SecNum& + ArtCode      '13563
                                END IF
                                IF CodeTemp.Code <= ArtCode + 30 THEN
                                        NumSingFound& = NumSingFound& + 1
                                        EmsSet CodeTemp, LENCode, NumSingFound&, SingFoundEMS%
                                        IF EmsError% THEN '— probably ran out of storage in EMS
                                                NumSingFound = NumSingFound - 1
                                        END IF
                                        Match = TRUE
                                ELSE  '— there's an error
                                        ErrorFILE% = FREEFILE
                                        OPEN "error.txt" FOR APPEND AS ErrorFILE%
                                                PRINT #ErrorFILE%, "Document =:"; File&
                                                PRINT #ErrorFILE%, "A Code was out of range:"; CodeTemp.Code
                                                PRINT #ErrorFILE%, "WordTemp.Str='"; WordTemp.Str; "'"
                                                PRINT #ErrorFILE%, "SecNum="; SecNum&
                                                PRINT #ErrorFILE%, ""
                                        CLOSE ErrorFILE%
                                END IF
                        END IF    '— there was a number following zs or za
                END IF    '— if the secnum <=3000
        END IF    '— this was a zs (section) or za (section) word
```

```
END IF' the range was valid

'for the first word try upper-case
IF (NOT Match OR UpperCaseFlag) AND Lang$ <> "GERMAN" THEN
        IF NewSentFlag THEN 'try upper-case
                WordTempStr$ = UCASE$(LEFT$(WordTempStr$, 1)) + MID$(WordTempStr$, 2)
                NewSentFlag = FALSE
                GOTO TryAgain
        ELSE
                IF UpperCaseFlag THEN 'the word was changed already, check can we store it
                        IF Match THEN
                                EmsGet WordTemp, LenWord, i& - 1, WordEMS%
                                PrevWord$ = RTRIM$(WordTemp.Str)
                                CALL CheckUCaseWord(WordTempStr$, PrevWord$, LEN(CurrKey$), NoNameFlag)
                                IF NoNameFlag THEN 'can store the word
                                        NumSingFound& = NumSingFound& + 1
                                        CodeTemp.Code = KeyTemp.Code
                                        EmsSet CodeTemp, LENCode, NumSingFound&, SingFoundEMS%
                                END IF
                        END IF
                        UpperCaseFlag = FALSE
                ELSE
                        'if it is upper-case word check it as a low-case only if it matches > 6 letters
                        FirstLet = ASC(LEFT$(WordTempStr$, 1))
                        IF FirstLet >= 65 AND FirstLet <= 90 THEN
                                MID$(WordTempStr$, 1, 1) = LCASE$(LEFT$(WordTempStr$, 1))
                                UpperCaseFlag = TRUE
                                GOTO TryAgain
                        END IF
                END IF
        END IF
END IF IF NOT MeanPrefixFlag THEN
        'check for meaningful prefixes. If found, divide word in two parts
        WordTempStr$ = LCASE$(WordTempStr$)
        LenW = LEN(WordTempStr$)
        FOR NumLet = 14 TO 3 STEP -1
                IF LenW > NumLet + 3 THEN 'should leave at least 3 letters
                        IF INSTR(MeanPrefixes$(NumLet), "\" + LEFT$(WordTempStr$, NumLet) + "\") THEN
                                WordTemp1$ = MID$(WordTempStr$, NumLet + 1)
                                WordTempStr$ = LEFT$(WordTempStr$, NumLet)
                                MeanPrefixFlag = TRUE
                                PrevMatch = Match 'save, because Match will change for the pref.
                                EXIT FOR
                        END IF
                END IF
        NEXT
        IF MeanPrefixFlag THEN GOTO TryAgain 'check again
ELSE
        IF WordTemp1$ <> "" THEN
                IF PrevMatch THEN
                        Limit = 9
                ELSE
                        Limit = 6
                END IF
                        WordTempStr$ = WordTemp1$
                        WordTemp1$ = ""
                        IF LEN(WordTempStr$) >= Limit THEN GOTO TryAgain
        END IF
END IF 'check for meaningless prefixes and delete it IF LEN(WordTempStr$) >= 6
        IF NOT PrefixFlag AND NOT Match THEN 'only one time
                WordTempStr$ = LCASE$(WordTempStr$)
                LenW = LEN(WordTempStr$)
                FOR NumLet = 9 TO 2 STEP -1
                        IF LenW > NumLet + 3 THEN 'should leave at least 3 letters
                                IF INSTR(Prefixes$(NumLet), "\" + LEFT$(WordTempStr$, NumLet) - "\") THEN
                                        WordTempStr$ = MID$(WordTempStr$, NumLet + 1)
                                        PrefixFlag = TRUE
                                        EXIT FOR
                                END IF
                        END IF
                NEXT
                IF PrefixFlag THEN
                        Limit = 6
                        IF LEN(WordTempStr$) >= Limit THEN GOTO TryAgain
                END IF
        END IF
        IF EmsError% THEN EXIT FOR NEXT' word in document DispMsg "", 0, 0

END SUB

FUNCTION FirstLast% (Word$, First%, Last%, KeyType%) STATIC

'-- returns the starting (First) and ending (Last) range for the word
'   by looking it up in the Table%() array SHARED SingTable%(), CombTable%()

a = XLateTable%(ASCII%(Word$))
b = XLateTable%(MidChar(Word$, 2))
c = XLateTable%(MidChar(Word$, 3))
IF a = 0 OR b = 0 OR c = 0 THEN FirstLast% = 0: EXIT FUNCTION
```

```
        IF KeyType% = Sing THEN
                First% = SingTable%(a, b, c, 1)
                Last% = SingTable%(a, b, c, 2)
        ELSE
                First% = CombTable%(a, b, c, 1)
                Last% = CombTable%(a, b, c, 2)
        END IF '-- Return FALSE if there was no valid range (i.e., First%=0)
        FirstLast% = (First% <> 0)

END FUNCTION

FUNCTION LoadIntoEMS (File$) STATIC

'--------- Returns the handle where the file was loaded into ---------

EMSPg = EmsGetPFSeg%
SizeofFile& = FileSize&(File$)

NumPages = SizeofFile& \ SixteenK + 2' round off to nearest 2 pages
EmsAlloc NumPages, FileEMS, File$ Num32kBlocks = SizeofFile& \ ThirtyTwoK&
LeftOver& = SizeofFile& - (Num32kBlocks * ThirtyTwoK&)
FOpenAll File$, 0, 4, LoadFILE
FOR i = 1 TO Num32kBlocks + 1

BoxO 14, 10, 18, 70, 2, RevAttr
        PaintBoxO 14, 10, 18, 70, RevAttr
        QPrintRC "Loading " + File$ + " block" + STR$(i) + " /" + STR$(Num32kBlocks + 1) + " ", 16, 12, RevAttr
        '-- map pages of the EMS memory to the EMS upper mem page frame
        FOR j = 1 TO 2
                EmsMapMem FileEMS, j, (i - 1) * 2 + j
                IF EmsError% THEN PRINT "Ems error:"; EmsError%: STOP
        NEXT '-- seek to beginning of current block
        FSeek LoadFILE, (i - 1) * ThirtyTwoK&

IF DOSError% THEN PRINT "Dos Error:"; WhichError%: STOP

IF i < Num32kBlocks + 1 THEN

'-- get the 32k block and put it directly into the EMS page frame
                FGetA LoadFILE, BYVAL EMSPg, BYVAL 0, ThirtyTwoK&

IF DOSError% THEN PRINT "Dos Error:"; ErrorMsg$(WhichError%): STOP

ELSE

'-- load the left over (<32k) bytes
                FGetA LoadFILE, BYVAL EMSPg, BYVAL 0, LeftOver&

IF DOSError% THEN PRINT "Dos Error:"; ErrorMsg$(WhichError%): STOP

END IF
NEXT

FClose LoadFILE

ClearScrO 14, 10, 18, 70, NormAttr

LoadIntoEMS = FileEMS

END FUNCTION

FUNCTION Num$ (x) STATIC

Num$ = MID$(STR$(x), 2)

END FUNCTION

SUB ReadEnglishText (FirstLine&, LastLine&, Handle%, Lin%) STATIC

DIM Temp AS STR80' for use in storing in EMS

LENTemp = LEN(Temp)

DispMsg "Loading file into memory, Line #:   ", r, c

NumLines = 0   ' total number of lines input from file
ActualLin = 0  ' total number of lines minus any blank lines EndOfSentence$ = ".!?"

FOR i& = FirstLine& TO LastLine&
        GET #9, i&, Temp.Str
        '-- replace all quotes with spaces so as not to complicate the
        '   lower casing of the first words of sentences
        ReplaceChar Temp.Str, CHR$(34), " "
        ReadSection Temp.Str, Section$(), Article$()
        NumLines = NumLines + 1
        EmsSet1EL Temp, LENTemp, NumLines, Handle
NEXT '---- Process text, first making all first letters of sentences lower case CurrLine = 0
GOSUB GetNextLine
```

```
DO
      DO
                '— skip over blank lines, or if we've gone too far
                DO WHILE Start > LenTxt
                        IF CurrLine = NumLines GOTO EndOfFile
                        GOSUB GetNextLine
                LOOP
                p = InstrTbl2%(Start, Txt$, EndOfSentence$)

IF p = 0 THEN

IF CurrLine = NumLines GOTO EndOfFile
                        GOSUB GetNextLine
                        p = 0

ELSE  '— check for a NLG (honorific/title)

Start = p + 2

FOR i = 1 TO UBOUND(NLG$)

IF LENNLG(i) < p THEN
                                        IF LCASE$(MID$(Txt$, p - LENNLG(i), LENNLG(i))) = NLG$(i) THEN p = 0
                                                EXIT FOR

END IF
                                END IF

NEXT

END IF

LOOP UNTIL p p = p + 2
      IF p > LenTxt THEN
              IF CurrLine = NumLines THEN
                      GOTO EndOfFile
              ELSE
                      GOSUB GetNextLine
              END IF
      END IF CurrChar = MidChar%(Txt$, p)

DO WHILE CurrChar < ASCupperA OR CurrChar > ASCupperZ p = p + 1
              IF p > LenTxt THEN
                      IF CurrLine = NumLines THEN
                              GOTO EndOfFile
                      ELSE
                              GOSUB GetNextLine
                      END IF
              END IF CurrChar = MidChar%(Txt$, p)

LOOP

MID$(Txt$, p, 1) = CHR$(CurrChar + 32)
      'add CHR$(255) to the end of word to indicate beginning of the sentences
      SpLoc = InstrTbl2(p, Txt$, " ,)}].!?")
      IF SpLoc <> 0 THEN MID$(Txt$, SpLoc, 1) = CHR$(255)
      Temp.Str = Txt$
      EmsSet1EL Temp, LENTemp, CurrLine, Handle Start = p + 1

EndOfFile:

LOOP UNTIL CurrLine >= NumLines

New$ = " "        ' replacement string for punctuation
Old$ = ":/.-(){}"
FOR j = 91 TO 96: Old$ = Old$ + CHR$(j): NEXT
LENOld = LEN(Old$)

FOR i = 1 TO NumLines

EmsGet1El Temp, LENTemp, i, Handle

Txt$ = RTRIM$(Temp.Str)

CALL RemCtrl(Txt$, "")'         replace all ctrl chars with blanks
        ' replace only SOME punctuation with spaces
        FOR j = 1 TO LENOld
                CALL ReplaceChar(Txt$, MID$(Old$, j, 1), New$)
        NEXT CALL StripRange(Txt$, 33, 37, TLen)    '— strip Punctutation ! to %
        Txt$ = LEFT$(Txt$, TLen)
        CALL StripRange(Txt$, 39, 47, TLen)    '— strip ' to /   don't strip numbers
        Txt$ = LEFT$(Txt$, TLen)
        CALL StripRange(Txt$, 58, 64, TLen)    '— strip : to a
        Txt$ = LEFT$(Txt$, TLen)
        CALL StripRange(Txt$, 123, 254, TLen)  '— strip High chars
        Txt$ = LEFT$(Txt$, TLen)
```

```
            CALL Crunch(Txt$, " ", TLen)'   crunch all multiple spaces to 1
            Txt$ = LEFT$(Txt$, TLen)
            Txt$ = LTRIM$(RTRIM$(Txt$))'    remove spaces from left & right IF LEN(Txt$) THEN 'there's still text there, i.e. it wasn't all spaces
                    ActualLin = ActualLin + 1
                    Temp.Str = Txt$
                    EmsSet1EL Temp, LENTemp, ActualLin, Handle
            END IF CALL QPrintRC(STR$(ActualLin), r, c - 4, -1)
    NEXT
    CLOSE #1

CALL DispMsg("", r, c)
    CALL DispStat(Num$(ActualLin) + " lines in file.")

Lin = ActualLin'                return the actual number of lines saved

EXIT SUB

'------------------------------------------------------------

GetNextLine:

CurrLine = CurrLine + 1
            Start = 1    '-- start scanning at first position
            p = 1

EmsGet1EL Temp, LENTemp, CurrLine, Handle

'-- trim down end of line, but make sure there's one space at the end
            '   so that we can find end of sentences (looking for a DOT & SPACE)
            '   even if they're at the end of the line.

Txt$ = RTRIM$(Temp.Str) + " "
            LenTxt = LEN(Txt$)

RETURN

END SUB

SUB ReadGermanText (FirstLine&, LastLine&, Handle%, Lin%) STATIC

DIM Temp AS STR80' for use in storing in EMS
    LENTemp = LEN(Temp)

CALL DispMsg("Loading file into memory, line #:   ", r, c)

ActualLin = 0' number of lines minus any blank lines

FOR i& = FirstLine& TO LastLine&

GET #9, i&, Temp.Str
            Txt$ = QPRTrim$(Temp.Str)

'-- first process the ReadSection for German
            ReadSection Txt$, Paragraph$(), Artikel$()

Lower Txt$        '-- convert all chars to lower case
            RemCtrl Txt$, ""  '-- replace all ctrl chars with blanks '-- replace only SOME punctuation with spaces
            New$ = " "
            Old$ = ":/.-()[]{}"
            FOR j = 1 TO LEN(Old$)
                    CALL ReplaceChar(Txt$, MID$(Old$, j, 1), New$)
            NEXT CALL StripRange(Txt$, 33, 37, TLen)' strip Punctutation ! to %
            Txt$ = LEFT$(Txt$, TLen)

' Note: the range is thru chr$(96) because all the letters are lower case
            '  and all numbers are being stripped out too.  We've skipped over 38
            '  because it's the & char which is allowed
            ' NOTE 2 [VN]: we no longer strip out numbers since we now use the section
            '  and article numbers CALL StripRange(Txt$, 39, 47, TLen)    '-- strip ' to /
            Txt$ = LEFT$(Txt$, TLen)
            CALL StripRange(Txt$, 58, 96, TLen)    '-- strip : to `
            Txt$ = LEFT$(Txt$, TLen)
            CALL StripRange(Txt$, 123, 255, TLen)' strip High chars
            Txt$ = LEFT$(Txt$, TLen)
            CALL Crunch(Txt$, " ", TLen)'-- crunch all multiple spaces to 1
            Txt$ = LEFT$(Txt$, TLen)
            Txt$ = QPTrim$(Txt$)       '-- remove spaces from left & right IF Txt$ <> "" THEN '       there's still text there, i.e. it wasn't all spaces
                    ActualLin = ActualLin + 1
                    Temp.Str = Txt$
                    EmsSet1EL SEG Temp, LENTemp, ActualLin, Handle
            END IF QPrintRC STR$(ActualLin), r, c - 4, -1

NEXT
    CLOSE #1
```

```
DispMsg "", r, c
DispStat Num$(ActualLin) + " lines in file."

Lin = ActualLin'              return the actual number of lines saved

END SUB

SUB ReadSection (Txt$, SecArray$(), ArtArray$()) STATIC

'---Look for "sections" or "articles"

IF Lang$ = "GERMAN" THEN
        '-- In German it's Par
        SearchStr$ = "Par"
ELSE
        '-- In English it's Sec
        SearchStr$ = "Sec"
END IF Letter$ = "zs"

FOR LookStep = 1 TO 2

Start = 1

DO
                m = INSTR(Start, Txt$, SearchStr$)  '-- column of start of Sec. or Art.

IF m THEN j = INSTR(m, Txt$, " ") '-- position of the end of the word

IF j THEN    '-- if this is not a last word
                                Word$ = MID$(Txt$, m, j - m)  '-- get the whole word
                        ELSE
                                EXIT DO  '-- this was the last word, so exit
                        END IF '-- check if the word matches variations on Section or Article IF Lang$ = "GERMAN" AND LookStep = 1 THEN
                                NumFound = 4
                        ELSE
                                NumFound = 3   '-- there are three variations that we check for
                        END IF IF LookStep = 1 THEN
                CALL FindExact(VARPTR(SecArray$(1)), NumFound, Word$)
        ELSE
                CALL FindExact(VARPTR(ArtArray$(1)), NumFound, Word$)
        END IF IF NumFound <> -1 THEN  '-- it did match, so check the number
                k = j + 1   '-- starting position of [potential] number DO '-- skip over blank spaces
                        ch = MidChar(Txt$, k)
                        k = k + 1
                LOOP UNTIL ch <> 32 OR k > LEN(Txt$)

m1 = 0

DO '-- collect the whole number
                        ch = MidChar(Txt$, k + m1 - 1)
                        m1 = m1 + 1
                        IF k + m1 - 1 > LEN(RTRIM$(Txt$)) THEN m1 = m1 + 1: EXIT DO
                LOOP UNTIL ch < ASC0 OR ch > ASC9

IF m1 > 1 THEN 'there is a number
                        Numb$ = MID$(Txt$, k - 1, m1 - 1)
                        IF VAL(Numb$) <= 3000 AND VAL(Numb$) > 0 THEN
                                'if we picked up one character more because of end of line, delete it
                                IF RIGHT$(Numb$, 1) < "0" OR RIGHT$(Numb$, 1) > "9" THEN Numb$ = LEFT$(Numb$, LEN(Numb
                                '-- if we're looking for Article numbers, don't accept
                                '   article numbers over 30
                                IF LookStep = 2 AND VAL(Numb$) > 30 THEN GOTO NextStep NewWord$ = Letter$ + Numb$
                                m1 = INSTR(k, Txt$, " ")
                                Txt1$ = LEFT$(Txt$, m - 1) + NewWord$
                                IF m1 <> 0 THEN
                                        Txt$ = Txt1$ + MID$(Txt$, m1)
                                ELSE
                                        Txt$ = Txt1$
                                END IF
                        END IF
                ELSE
                        IF SearchStr$ = "Art" THEN m1 = 0

'-- loop while it's a Roman numeral and we're not
                                '   past the end of the string
                                DO
                                        ch$ = MID$(Txt$, k + m1 - 1, 1)
                                        m1 = m1 + 1
                                        IF k + m1 - 1 > LEN(RTRIM$(Txt$)) THEN EXIT DO
                                LOOP WHILE INSTR("IVX", ch$)

Numb$ = MID$(Txt$, k - 1, m1 - 1)
```

```
                        '-- translate the Roman numeral(s) to Arabic numerals
                        NumFound = 30  '-- there are 30 Roman numbers to check
                        CALL FindExact(VARPTR(Numbers$(1)), NumFound, Numb$)

IF NumFound <> -1 THEN

NewWord$ = "za" + Num$(NumFound + 1)
                                m1 = INSTR(k, Txt$, " ")

IF m1 = 0 THEN
                                        Txt$ = LEFT$(Txt$, m - 1) + NewWord$
                                ELSE
                                        Txt$ = LEFT$(Txt$, m - 1) + NewWord$ + RIGHT$(Txt$, LEN(Txt$) - m1 + 1
                                END IF

END IF

END IF    '-- are we searching for an Article #?

END IF    '-- there's a number after the Section/Article

END IF    '-- did we find a variation of Section or Article?

END IF    '-- INSTR(Text,"Sec.") was found
NextStep:

Start = m + 1

LOOP UNTIL m = 0

SearchStr$ = "Art"
        Letter$ = "za"

NEXT

'-- start looking at the beginning of the line
Start = 1

DO
        '-- look for the section symbol
        m = INSTR(Start, Txt$, CHR$(21))

'-- if we found one, process it
        IF m THEN

'-- position right after the symbol
                k = m + 1
                m1 = 0

'-- loop until it's not a number (a space is ok, however)
                '    or we've reached the end of the string
                DO
                        ch = MidChar(Txt$, k + m1)
                        m1 = m1 + 1
                        IF k + m1 - 1 > LEN(RTRIM$(Txt$)) THEN EXIT DO
                LOOP UNTIL (ch < ASC0 OR ch > ASC9) AND ch <> 32

'-- the number is the position from right after the symbol (k)
                '    to the non-number position found in the loop above (m1 - 1)
                Numb$ = QPTrim$(MID$(Txt$, k, m1 - 1))

IF VAL(Numb$) <= 3000 AND VAL(Numb$) > 0 THEN

NewWord$ = "zs" + Numb$
                        m1 = INSTR(k + 1, Txt$, " ")

IF m1 THEN
                                Txt$ = LEFT$(Txt$, m - 1) + NewWord$ + MID$(Txt$, m1)
                        ELSE
                                Txt$ = LEFT$(Txt$, m - 1) + NewWord$
                        END IF

END IF

'-- start looking at the next position
                Start = m + 1

END IF

'-- loop until we don't find any more section symbols
LOOP UNTIL m = 0

END SUB

SUB WindMgr (ULRow, ULCol, LRRow, LRCol, Frame, BoxColr, TextColr, Text$) STATIC CALL BoxO(ULRow - 1, ULCol - 1, LRRow + 1, LRCol + 1, Frame, BoxColr)
CALL ClearScrO(ULRow, ULCol, LRRow, LRCol, BoxColr)
CALL QPrintRC("[" + Text$ + "]", ULRow - 1, ULCol + 1, TextColr)

END SUB

SUB WordParse (TextHandle, Lines, WordHandle, Words&) STATIC

DIM Temp80 AS STR80' for retrieving lines of text from the file
DIM Temp32 AS STR32' for saving Words in the word list LENTemp80 = LEN(Temp80)
LENTemp32 = LEN(Temp32)

Words& = 0
CALL DispMsg("Parsing line #:    word #:    ", r, c)
```

```
FOR i = 1 TO Lines

QPrintRC STR$(i), r, c - 18, -1
        EmsGet1El Temp80, LENTemp80, i, TextHandle
        t$ = RTRIM$(Temp80.Str)
        TotW = InCount%(t$, " ") + 1' number of words in current line
        FOR Word = 1 TO TotW
                CALL Extract(t$, " ", Word, Start, SLen)
                IF SLen > 0 THEN
                        w$ = MID$(t$, Start, SLen)
'If there is chr(255), i.e. this is the first word in the sentence extract it
SecondPart:
                                IF Lang$ = "ENGLISH" THEN
                                        n = INSTR(w$, CHR$(255))
                                        IF n THEN
                                                w1$ = MID$(w$, n + 1)
                                                w$ = LEFT$(w$, n)
                                                WLen = LEN(w$)
                                                'put "/" before marker (chr$(24))
                                                IF WLen < 4 THEN
                                                        w$ = LEFT$(w$, WLen - 1) + STRING$(4 - WLen, "/") + CHR$(255)
                                                ELSEIF MID$(w$, WLen - 2, 2) = "'s" THEN w$ = LEFT$(w$, WLen - 3) + CHR$(255)
                                                ELSEIF MID$(w$, WLen - 1, 1) = "'" THEN w$ = LEFT$(w$, WLen - 2) + CHR$(255)
                                                END IF
                                        END IF
                                END IF 'fill out 1 and 2 char words with /'s
                                SLen = LEN(w$)
                                IF SLen < 3 THEN w$ = w$ + STRING$(3 - SLen, "/")
                                ' allow only words that start with alphabetic chars "a"-"z"
                                ASCw = ASC(w$)
                                IF (ASCw >= ASCa AND ASCw <= ASCz) OR (ASCw >= ASCupperA AND ASCw <= ASCupperZ) THEN
                                        Words& = Words& + 1
                                  'QPrintRC STR$(Words&), r, c - 5, -1
                                        IF Lang$ = "ENGLISH" THEN
                                                'the following doesn't apply to German -----------------
                                                IF RIGHT$(w$, 2) = "'s" THEN ' remove the 's
                                                        w$ = LEFT$(w$, SLen - 2)
                                                ELSEIF RIGHT$(w$, 1) = "'" THEN
                                                        w$ = LEFT$(w$, SLen - 1)
                                                END IF
                                        END IF
                                        '------------------------------------------------

'store the word in EMS now
                                        Temp32.Str = w$
                                        EmsSet Temp32, LENTemp32, Words&, WordHandle IF EmsError% THEN '-- probably ran out of storage in EMS
                                                Words& = Words& - 1
                                                EXIT FOR
                                        END IF END IF
                        IF w1$ <> "" THEN w$ = w1$: w1$ = "": GOTO SecondPart
                        END IF
        NEXT' word in current line IF EmsError% THEN EXIT FOR NEXT' line of text
CALL DispMsg("", r, c)
CALL DispStat(LTRIM$(STR$(Words&)) + " words were found.")

END SUB

SUB WriteIDFText STATIC

'***************************************************************

'load in Code-->Word dictionary directly into EMS
'LoadFile$ = LstDir$ + "DICT.WRD"
'DictWordNum = FileSize&(LoadFile$) \ SixtyFour
'CALL DispMsg("Loading " + Num$(DictWordNum) + " Dictionary Entries", r, c)
'DIM DictWordTemp AS DictType
'NumPages = DictWordNum \ 256 + 1
'CALL EmsAllocMem(NumPages, DictWordEMS%)
'IF EmsError% THEN PRINT "Couldn't allocate"; NumPages * SixteenK; "bytes of EMS.": STOP 'CALL FOpen(LoadFile$, DictFILE%)
'FOR i = 1 TO DictWordNum
'    CALL FGetT(DictFILE%, DictWordTemp, LEN(DictWordTemp))
'    CALL EmsSet1El(SEG DictWordTemp, LEN(DictWordTemp), i, DictWordEMS%)
'NEXT
'CALL FClose(DictFILE%)
'CALL DispMsg(Nul$, 0, 0)

'CALL DispMsg("Saving IDF.TXT and DOCKEYS.TXT for examination.", r, c)
''save arrays for examination later
'OPEN LstDir$ + "IDF.TXT" FOR OUTPUT AS 1
'FOR i = 1 TO UBOUND(IDF)
'    CALL EmsGet1El(SEG DictWordTemp, LEN(DictWordTemp), i, DictWordEMS%)
'    PRINT #1, DictWordTemp.Str; IDF(i)
'NEXT
'CLOSE #1

'OPEN LstDir$ + "DOCKEYS.TXT" FOR OUTPUT AS 1
'CALL FOpen(LstDir$ + "DOCKEYS.AH", DocKeysH%)
'FOR i& = 1 TO CurrDocKey&
```

```
'    CALL FGetRT(DocKeysH%, DocKeyTemp, i&, LENDocKeyTemp)
'    CALL EmsGet1El(SEG DictWordTemp, LEN(DictWordTemp), DocKeyTemp.Code, DictWordEMS%)
'    PRINT #1, DictWordTemp.Str; DocKeyTemp.Freq
'NEXT
'CALL FClose(DocKeysH%)
'CLOSE #1

'ERASE IDF

'CALL EmsRelMem(DictWordEMS%)

'CALL DispMsg("", 0, 0)

'CALL Chime(10)

END SUB

SUB ZZZRevisionLog STATIC

'$Log:    D:/aim/aim.ba/  S
'__
'__     Rev 2.10   06 Feb 1992 13:30:14
'__
'--   [Changed by TMY:]
'__
'--   * Config Modified: Returns the Machine # and First/Last document
'--     Number to process (entered on the command line) so that only one
'--     AIM.EXE is needed instead of one for each machine.
'__
'--   * [MAIN] Modified: Changed when writing out any machine specific file
'--     (IDF.SIN, STATS.TXT, etc.) to use the machine number instead of a
'--     hard-coded number.
'__
'--   * FindSingKey Modified: Changed the check for a final slash (/) from
'--     using RIGHT$(CurrKey$, 1) to use MIDCHAR%(CurrKey$, SLen)=ASC("/").
'__
'--   * LoadIntoEMS Added: loads a file quickly into EMS.
'__
'--   * EMSAlloc Added: used by LoadIntoEMS -- allocated EMS and displays an
'--     error if insufficient EMS space.
'__
'--   * Fixed bug where Start variable was COMMON SHARED and was used in
'--     multiple procedures which affected one another.
'__
'--   * Document Files (*DOC.TXT and *DOC.NDX) and configuration (*.CFG,
'--     [LANGUAGE].LST) are now opened ACCESS READ SHARED.
'__
'--   [Changed by VN:]
'__
'--   * ReadSection Added: looks for references to Section or Article
'--     numbers and "normalizes" their appearance by adding a ZS prefix for
'--     Sections and ZA for articles to the number (article numbers are
'--     converted from Roman numerals to Arabic) so that they can easily be
'--     recognized by the FindSingKey routine.
'__
'--   * ReadEnglishText Modified: added call to ReadSection before any
'--     parsing or stripping of characters is done.
'__
'--   * FindSingKey Modified: added check for section numbers (denoted by a
'--     ZS prefix to a number) and article numbers (ZA prefix) which returns
'--     a code of the Section number plus 10,563 (10,563 is the number of
'--     dictionary entries of words prior to the addition of the section and
'--     article numbers) or plus 13,563 for Article numbers.
'__
'--   * ReadEnglishText Modified: Change the StripRange code so that numbers
'--     would NOT be stripped out. [TMY Bug Fix:] Added in the
'--     Txt$ = LEFT$(Txt$, TLen) code which was left out (it's required
'--     since StripRange doesn't change the length of a string) and caused
'--     problems because the string could contain garbage at the end.
'__
'__
'--     Rev 2.9   24 Jan 1992 17:33:52
'__
'--   final 3-letter table version as of 7/1/91 by Ted M. Young
'--   uses the KEYWORD.TBL & KEYCOMB.TBL 3-letter indexes
'__
'__
'--     Rev 2.8   24 Jan 1991 10:43:38
'__
'--   Changed document loading to use the ISAMed text file (i.e., a single
'--   large file instead of many individual files).
'__
'--   EMSGet/Set are used instead of the paged EMSGet1El/Set1El access using
'--   the GetDocKey/SetDocKey SUBs.
'__
'--   COMBKEY.STR & SINGKEY.STR files are loaded directly into EMS since
'--   they are to large to load into normal memory.
'__
'__
'--     Rev 2.7   01 Aug 1990 15:06:16
'__
'--   Renamed CheckCombKey to FindCombKey to be more consistent with naming.
'__
'--   Fixed bug with non-wildcard words (i.e., those that end with a slash
'--   "/") where it would try and compare the word in the document with the
'--   word in the keyword list, but without removing the slash from the
'--   keyword, so the comparison would never be true.
'__
'--   Added feature where the FindCombKey would test for a slash for each
'--   word in the combined keyword.
```

```
'--
'--
'--     Rev 2.6    26 Jul 1990 16:29:52
'--
'-- Fixed bug where it wouldn't read the correct information from the
'-- configuration (.CFG) file. It wasn't reading the NdxDir$, so it would
'-- stop with a bad file name error.
'--
'--
'--     Rev 2.5    25 Jul 1990 18:20:28
'--
'-- Fixed bug: Sometimes the LineCount routine will return too many lines,
'-- so a check for EOF was put in before reading each line.
'--
'--
'--     Rev 2.4    13 Jul 1990 13:14:56
'-- Changed CONFIG so that it can read a configuration File& named on
'-- the command line, but will still default to reading AIM.CFG.
'--
'--
'--     Rev 2.3    13 Jul 1990 11:22:56
'--
'-- BC/PDS 7.00 Compatible, use of static arrays in typed storage
'-- for DocKeys

END SUB

'================
'  AIMPASS2.BAS
'================

'Invokation: AIMPASS2 ConfigFile
'----------

'Creates: Key.Ndx, Weight.Ndx, \Aim\[Command$].Dat
'--------

'Uses: Dict.Wrd, Idf.Sin, DocIndex.Ah, DocKeys.Ah
'-----
' nth Rec of Key.Ndx contains Number of Keywords in Document
'      followed by 127 codes ' TYPE KeyNdx127
'    Num AS INTEGER
'    Code(1 TO 127) AS INTEGER ' nth Rec of Weight.Ndx contains 127 Salton Weights
'      computed with the formula below .

' TYPE WeightNdx
'    Weight(1 TO 127) AS SINGLE

'SALTON WEIGHT FORMULA
'----------------------

'              Log2(FreqinDoc+1)*Log2((TotDocs*1.5)/DocsWithWord+3+TotDocs*0.001)
'Weight(Word)= -----------------------------------------------------------------
'                            Log2 (2 + TotalKWordsInDoc / 10)

DEFINT A-Z

'$INCLUDE: '\\VADIM\C-DRIVE\USER\INCLUDE\TYPES.BI'

TYPE WeightCode
        Code AS INTEGER
        Wt AS SINGLE
END TYPE

TYPE Flen
        Str AS STRING * 12
END TYPE

TYPE DocIndexType
        Ndx AS LONG
        Num AS INTEGER
        Tot AS LONG
        Padding AS STRING * 6
END TYPE TYPE SmallDocIndexType
        Ndx AS LONG
        Num AS INTEGER
        Tot AS LONG
END TYPE TYPE STR49
        Str AS STRING * 49
END TYPE TYPE DocKeyType
        Code AS INTEGER
        Freq AS INTEGER
END TYPE DECLARE SUB Config (Machine$, First, Last)
DECLARE SUB DispMsg (Msg$, r%, C%)
DECLARE SUB WindMgr (ULRow%, ULCol%, LRRow%, LRCol%, Frame%, BoxColr%, TextColr%, Text$)
DECLARE FUNCTION LoadIntoEMS% (File$)
DECLARE FUNCTION Log2! (x!)
DECLARE FUNCTION Num$ (x)
DECLARE FUNCTION Ems$ (Handle%, Element%, Size%)
```

```
'------------------------------------------------------------ External routines
'$INCLUDE: '\\VADIM\C-DRIVE\USER\INCLUDE\DECLARES.BI'

'------------------------------------------------------------ PROGRAM START
CONST Sing = 0, Comb = 1
COMMON SHARED ReProcess, Fg, Bg, NormAttr, RevAttr
COMMON SHARED DocDir$, KeyDir$, LstDir$, AtList$, Lang$, NdxDir$
COMMON SHARED XlateTable%(), SingTable%(), CombTable%()
COMMON SHARED ThirtyTwo, SixtyFour, SixteenK, ThirtyTwoK&
COMMON SHARED Log2Const!, Threshold!
COMMON SHARED Ascend, Descend, FALSE, TRUE
COMMON SHARED Enter, Escape '$$$keyword-flag$$$ "Last Author: %w  Revision: %v  Date: %f"
CONST Version$ = "Last Author: TED  Revision: 18  Date: 8-Sep-92,18:31:06"
Log2Const! = LOG(2!)
SixteenK = 16384
ThirtyTwoK& = 32768
SixtyFour = 64
ThirtyTwo = 32
Ascend = 0
Descend = 1
FALSE = 0
TRUE = NOT FALSE
Enter = 13
Escape = 27

ThresholdWord = 80

DIM AvgWeight AS SINGLE '— average of the ThresholdWord keywords' weights

'------------------------------------------------------------

Config Machine$, FirstDoc, LastDoc

QPrintRC "AIMPASS2 Started At " + TIME$, 1, 25, -1
Col = (80 - LEN(Version$)) \ 2
QPrintRC Version$, 2, Col, -1
LOCATE 4, 1

'— load in Code—>Word dictionary directly into EMS
LoadFile$ = LstDir$ + "DICT.WRD"
DIM DictWrdTemp AS DictType
DictWrdNum = FileSize&(LoadFile$) \ LEN(DictWrdTemp)
DictWrdEMS = LoadIntoEMS(LoadFile$)

'— load the IDF.SIN file
LoadFile$ = LstDir$ + "IDF.SIN"
IDFNum = FileSize&(LoadFile$) \ 4
PRINT "Loading "; LoadFile$; IDFNum
REDIM IDF!(1 TO IDFNum)
REDIM IDFTemp(1 TO IDFNum) AS LONG
FGetAH LoadFile$, SEG IDFTemp(1), LEN(IDFTemp(1)), IDFNum '— Store Average Doc Frequency in {COMMANDS}.DAT file in LST directory
FOR i = 1 TO IDFNum
        IF IDFTemp(i) > 0 THEN
                SumOfAllFreq& = SumOfAllFreq& + IDFTemp(i)
                NumWordsUsed = NumWordsUsed + 1
        END IF
NEXT AvgDocFreq! = SumOfAllFreq& / NumWordsUsed OPEN NdxDir$ + "AVGDOCFC.DAT" FOR OUTPUT AS #7
        PRINT #7, SQR(AvgDocFreq!)
CLOSE #7

LoadFile$ = LstDir$ + "DOCINDEX.AH"
DIM DocNdxTemp AS DocIndexType
Count& = FileSize&(LoadFile$) \ LEN(DocNdxTemp)
PRINT "Loading "; LoadFile$; Count&
DIM DocNdx AS DocIndexType
LenDocNdx = LEN(DocNdx)
FOpenAll LoadFile$, 0, 4, LoadHand LoadFile$ = LstDir$ + "DOCKEYS.AH"
NumDocKeys& = FileSize&(LoadFile$) \ 4
PRINT "Opening "; LoadFile$; NumDocKeys&
CALL FOpenAll(LoadFile$, 0, 4, DocKeysH%)' open up the file for use later with FGetRT's
DIM DocKeyTemp AS DocKeyType
DocKeyLEN = LEN(DocKeyTemp)

'============================================================

CALL DispMsg("2nd Pass: Calculating Inverse Document Frequencies", r, C)

CountLog! = Log2!(CSNG(Count&))

Log2of5! = Log2!(5!)
A& = FRE("")
WordUse$ = STRING$(DictWrdNum \ 8 + 1, 0)' setup and clear bit array — indicates which words were used MaxDF! = CLNG(Count&) * 1.5    '"TotDocs * 1.5"

IDFADD! = 3 + .001 * Count&    '"DocFreq + 3 + (TotDocs * 0.001)"
FOR Word = 1 TO DictWrdNum
        IF IDFTemp(Word) > 0 THEN
                IDF!(Word) = Log2!(MaxDF! / (IDFTemp(Word) + IDFADD!))
        END IF
```

```
NEXT

ERASE IDFTemp

CALL DispMsg("", 0, 0)

CALL DispMsg("2nd Pass: Calculating Formula Weights:     ", r, C)

OPEN LstDir$ + "Weights.Lst" FOR OUTPUT AS 1

DIM KeyNdxRec AS KeyNdx127
DIM WeightNdxRec AS WeightNdx127

OPEN NdxDir$ + "KEY.NDX" FOR RANDOM AS #3 LEN = LEN(KeyNdxRec)
OPEN NdxDir$ + "WEIGHT.NDX" FOR RANDOM AS #4 LEN = LEN(WeightNdxRec)

TotDocLen& = 0

AvgWeight = 0

Start& = 1

FOR DocNum& = Start& TO Count&

FGetRT LoadHand, DocNdx, DocNum&, LenDocNdx
        A$ = STR$(DocNum&)

TotDocLen& = TotDocLen& + DocNdx.Tot

'-- output every document to the WEIGHTS.LST File
        'PRINT #1, A$; " -------------------------------- Tot Freq:"; DocNdx.Tot
        'PRINT #1, USING "\   \ \    \ \     \ Code_# &"; "Freq"; "DocFr"; "Weight"; "Keyword"

KeyNdxRec.Num = 0
        NdxNum = DocNdx.Num
        IF NdxNum = 0 THEN
                PRINT #1, "No Keywords for document #"; A$
                GOTO Pass2Skip
        END IF
        CALL QPrintRC(STR$(DocNum&), r, C - 6, -1)

REDIM Weight(1 TO NdxNum) AS WeightCode

' total number of term appearances in this document, i.e., if 2 terms
        ' appear 10 times each, then this number would be 20, as opposed to
        ' .Num which would be 2 in this case.
        Tot! = DocNdx.Tot
        IF Tot! < 0 THEN
                Chime 2
                Tot! = ABS(Tot!)
        END IF IF Tot! = 0 THEN ' shouldn't happen!
                CALL Chime(10)
                PRINT #1, "There were no Term appearances in document "; A$
                PRINT #1, "However, there were"; NdxNum; "keywords."
                i$ = INPUT$(1)
                GOTO Done
        END IF TotLog2! = Log2!(2! + Tot! / 10!)   '"Log[(TotWords in Doc/10)+2]

FOR Word = 1 TO NdxNum
                Index& = Word + DocNdx.Ndx - 1
                FGetRT DocKeysH%, DocKeyTemp, Index&, DocKeyLEN
                Freq! = DocKeyTemp.Freq' frequency of word in current document '-- account for integers > 32767 which went negative
                IF Freq! < 0 THEN
                        Freq! = Freq! + 65536
                END IF
                Freq! = Freq! + 1
                Code = DocKeyTemp.Code
                Weight(Word).Code = Code
                Weight(Word).Wt = Log2!(Freq!) * IDF!(Code) / TotLog2!

'PRINT #1, USING "#### ##### #.#### ##### &"; Freq! - 1; IDFTemp(Code); Weight(Word).Wt; Code; Ems$(DictWrdEMS%, Code,
        NEXT 'sort in descending order according to weight
        'so the keys are output in decreasing importance
        SortT Weight(1), NdxNum, Descend, LEN(Weight(1)), LEN(Weight(1).Code), -3

'-- only add if there are ThresholdWord or more words
        '   otherwise we'd be adding zero
        IF NdxNum >= ThresholdWord THEN
                AvgWeight = AvgWeight + Weight(ThresholdWord).Wt
        END IF FOR k = 1 TO 127
                WeightNdxRec.Weight(k) = 0
        NEXT FOR Word = 1 TO NdxNum
                IF Weight(Word).Wt > Threshold! THEN
                        IF KeyNdxRec.Num < 127 THEN
                                Code = Weight(Word).Code
                                CALL SetBit(WordUse$, Code, 1)
                                KeyNdxRec.Num = KeyNdxRec.Num + 1
                                KeyNdxRec.Code(KeyNdxRec.Num) = Code
```

```
                        WeightNdxRec.Weight(KeyNdxRec.Num) = Weight(Word).Wt
                        IF WeightNdxRec.Weight(KeyNdxRec.Num) < Threshold! THEN STOP
                ELSE
                        NumOver127& = NumOver127& + 1
                        KeyNdxRec.Num = KeyNdxRec.Num + 1
                        WeightOver127! = WeightOver127! + Weight(Word).Wt
                END IF
                'PRINT #1, USING "###: #.#### &"; KeyNdxRec.Num; Weight(Word).Wt; Ems$(DictWrdEMS%, Weight(Word).Code, LEN(Dic
        END IF
    NEXT Pass2Skip:

PUT #3, DocNum&, KeyNdxRec
        PUT #4, DocNum&, WeightNdxRec

Totk& = Totk& + KeyNdxRec.Num
        IF INKEY$ = CHR$(27) THEN EXIT FOR

NEXT

'-- Calculate Threshold based on avg of the ThresholdWord keyword's Salton Weight
Threshold! = AvgWeight / Count&

'-- now go through the key.ndx and change the key count (KeyNdx.Num) so
'   that only the words that have weight >= the threshold will be used FOR DocNum& = Start& TO Count&

GET #3, DocNum&, KeyNdxRec
        GET #4, DocNum&, WeightNdxRec

'-- look through the weights until we find one that's lower than
        '   the threshold
        NewNdxNum = 0
        FOR i = 1 TO KeyNdxRec.Num
                IF WeightNdxRec.Weight(i) < Threshold! THEN
                        '-- this one is lower than the threshold, so the previous
                        '   word should be the last keyword for this document
                        NewNdxNum = i - 1
                        EXIT FOR
                END IF
        NEXT IF NewNdxNum > 0 THEN '-- save new Ndx Num keyword count
                KeyNdxRec.Num = NewNdxNum
                PUT #3, DocNum&, KeyNdxRec
        END IF

NEXT

CALL DispMsg("", 0, 0)

CLOSE 3, 4' close the random-access keycoded file

CALL FClose(DocKeysH%)
CALL EmsRelMem(DictWrdEMS%)

PRINT #1, "Total keys written:"; Totk&
PRINT #1, "Average # keys/record:"; Totk& / Count&
PRINT #1, "Average Document Length:"; TotDocLen& / Count&
PRINT #1, ""
PRINT #1, "Threshold:"; Threshold!
PRINT #1, ""

WordsInUse% = 0
FOR i = 1 TO DictWrdNum
        WordsInUse% = WordsInUse% - GetBit%(WordUse$, i)
NEXT PRINT #1, "Words used in collection:"; WordsInUse%; NumWordsUsed
PRINT #1, "Average Document Frequency of words used:"; AvgDocFreq!

PRINT #1, ""
PRINT #1, "Number of documents having more than 127 keywords:"; NumOver127&

Done:

CLOSE 1' close the Weights.Lst file

Chime 10

SUB Config (Machine$, First, Last) STATIC

Cmd$ = QPTrim$(COMMAND$)

IF COMMAND$ <> "" THEN
        ConfigFile$ = COMMAND$ + ".CFG"
ELSE
        Chime 10
        PRINT "No database specified."
        END
END IF 'IF NOT Exist(ConfigFile$) THEN
'    Chime 10
'    PRINT "File"; ConfigFile$; " was not found "
'    END
'END IF
OPEN ConfigFile$ FOR INPUT AS #1
INPUT #1, Fg, Bg, Brdr, LstDir$, DocDir$, NdxDir$, AbstrDir$, Lang$, Threshold!
```

```
    CLOSE #1

COLOR Fg, Bg, Brdr: CLS

NormAttr = OneColor%(Fg, Bg)
    RevAttr = OneColor%(Bg, Fg AND 7)

IF NOT EmsLoaded% THEN
            PRINT "No EMS!"
            BEEP
            END
    END IF

END SUB

SUB DispMsg (Msg$, r, C) STATIC
STATIC WindOpen, Scr%() ' is there already a message displayed?
SHARED Fg, Bg IF Msg$ = "" AND WindOpen THEN GOSUB MsgClose: EXIT SUB
IF WindOpen THEN
        CALL Chime(9)
        OPEN "DEBUG" FOR OUTPUT AS 9
        PRINT #9, "WindOpen="; WindOpen; HEX$(WindOpen)
        PRINT #9, "Msg$= |"; Msg$; "|"
        PRINT #9, "TRUE="; TRUE; HEX$(TRUE)
        PRINT #9, "FALSE="; FALSE; HEX$(FALSE)
        CLOSE 9
        CALL Chime(8)
        CLS
        END
        i$ = INPUT$(1)
        GOSUB MsgClose
END IF Wid = LEN(Msg$)
IF Wid > 50 THEN Wid = 50

Msg$ = Msg$ + " "' make sure there's a space to find at the end (see below)

MaxLin = LEN(Msg$) \ Wid + 3
IF MaxLin > 23 THEN MaxLin = 23
REDIM Text$(MaxLin)
Lin = 0
DO
        Lin = Lin + 1' incr current Lin # (also element in text display array)
        LastSpc = QInstrB%(Wid + 1, Msg$, " ")' look for the last space so we can word wrap
        Text$(Lin) = LEFT$(Msg$, LastSpc - 1)
        Msg$ = MID$(Msg$, LastSpc + 1)'remove portion of string that's in t$
LOOP WHILE LEN(Msg$) > Wid Msg$ = RTRIM$(Msg$)
IF LEN(Msg$) THEN
        Lin = Lin + 1
        Text$(Lin) = Msg$
END IF IF r <> 0 AND C = 0 THEN
        ULr = r
ELSE
        ULr = 9
END IF
        DULr = ULr - 1
        LRr = ULr + Lin + 1
        DLRr = LRr + 2 horizmargin = (80 - Wid) \ 2
        ULc = horizmargin
        DULc = ULc - 3
        LRc = 80 - INT(horizmargin)
        IF Wid / 2 = Wid \ 2 THEN LRc = LRc + 1
        DLRc = LRc + 1

REDIM Scr%(ArraySize%(DULr, DULc, DLRr, DLRc))
CALL ScrnSave0(DULr, DULc, DLRr, DLRc, SEG Scr%(0))
CALL WindMgr(ULr, ULc, LRr, LRc, 4, NormAttr, RevAttr, "Status")
FOR i = 1 TO Lin
        CALL QPrintRC(Text$(i), ULr + i, ULc + 1, -1)
NEXT r = ULr + Lin
C = ULc + 1 + LEN(Text$(Lin))
IF LEN(Text$(Lin)) + 2 = Wid THEN C = ULc + 1: r = r + 1

ERASE Text$
WindOpen = TRUE

EXIT SUB

'------------------------------------------------------------- close window
MsgClose:

CALL ScrnRest0(DULr, DULc, DLRr, DLRc, SEG Scr%(0))
ERASE Scr%
WindOpen = FALSE
RETURN

END SUB

FUNCTION Ems$ (Handle, Element, Size) STATIC
```

```
DIM Temp32 AS STR32
DIM Temp49 AS STR49

IF Size% = 32 THEN
        CALL EmsGet1El(SEG Temp32, Size, Element, Handle)
        Ems$ = RTRIM$(LEFT$(Temp32.Str, 30))
ELSEIF Size% = 49 THEN
        CALL EmsGet1El(SEG Temp49, Size, Element, Handle)
        Ems$ = RTRIM$(LEFT$(Temp49.Str, 47))
ELSE
        STOP
END IF

END FUNCTION

FUNCTION LoadIntoEMS (File$) STATIC

'-------- Returns the handle where the file was loaded into ---------

EMSPg = EmsGetPFSeg%
SizeofFile& = FileSize&(File$)

NumPages = SizeofFile& \ SixteenK + 2' round off to nearest 2 pages
EmsAllocMem NumPages, FileEMS Num32kBlocks = SizeofFile& \ ThirtyTwoK&
LeftOver& = SizeofFile& - (Num32kBlocks * ThirtyTwoK&)
FOpenAll File$, 0, 4, LoadFile
FOR i = 1 TO Num32kBlocks + 1

Box0 14, 10, 18, 70, 2, RevAttr
        PaintBox0 14, 10, 18, 70, RevAttr
        QPrintRC "Loading " + File$ + " block" + STR$(i) + " /" + STR$(Num32kBlocks + 1) + " ", 16, 12, RevAttr '-- map pages of the EMS memory to the EMS upper mem page frame
        FOR j = 1 TO 2
                EmsMapMem FileEMS, j, (i - 1) * 2 + j
                IF EmsError% THEN PRINT "Ems error:"; EmsError%: STOP
        NEXT '-- seek to beginning of current block
        FSeek LoadFile, (i - 1) * ThirtyTwoK&

IF DOSError% THEN PRINT "Dos Error:"; WhichError%: STOP

IF i < Num32kBlocks + 1 THEN

'-- get the 32k block and put it directly into the EMS page frame
                FGetA LoadFile, BYVAL EMSPg, BYVAL 0, ThirtyTwoK&

IF DOSError% THEN PRINT "Dos Error:"; ErrorMsg$(WhichError%): STOP

ELSE

'-- load the left over (<32k) bytes
                FGetA LoadFile, BYVAL EMSPg, BYVAL 0, LeftOver&

IF DOSError% THEN PRINT "Dos Error:"; ErrorMsg$(WhichError%): STOP

END IF
NEXT

FClose LoadFile

ClearScr0 14, 10, 18, 70, NormAttr

LoadIntoEMS = FileEMS

END FUNCTION

FUNCTION Log2! (x!) STATIC

SHARED Log2Const!

Log2! = LOG(x!) / Log2Const!

END FUNCTION

FUNCTION Num$ (x) STATIC

Num$ = LTRIM$(STR$(x))

END FUNCTION

SUB WindMgr (ULRow, ULCol, LRRow, LRCol, Frame, BoxColr, TextColr, Text$) STATIC CALL Box0(ULRow - 1, ULCol - 1, LRRow + 1, LRCol + 1, Frame, BoxColr)
CALL ClearScr0(ULRow, ULCol, LRRow, LRCol, BoxColr)
CALL QPrintRC("[" + Text$ + "]", ULRow - 1, ULCol + 1, TextColr)

END SUB

DEFINT A-Z
```

```
'==============
' KYINVERT.BAS
'==============

'Invoked: KYINVERT ConfigFile
'--------

'Creates: KyInvert.Ndx, KyInvert.Dat
'--------

'Uses: Key.Ndx, Weight.Ndx & Dict.Wrd for NumKeys
'-----

' nth Rec of KyInvert.Ndx contains nth Code,
' ptr into KyInvert.Dat & Number of Docs indexed with this word
'   TYPE NdxType
'       Code AS INTEGER
'       Index AS LONG
'       Num AS INTEGER ' Records are pointed to by .Index of KyInvert.Dat
' .Rec contains Document that is indexed with this word
' .Value 1000 * Salton Weight In Document
'   TYPE KeyInfoLONG
'       Rec AS LONG
'       Value AS INTEGER '$INCLUDE: '\\vadim\c-drive\user\include\types.bi'

'-- now in types.bi above
'TYPE KeyInfoLONG
'   Rec AS LONG          '-- record (document) number
'   Value AS INTEGER     '-- holds the weight of each keyword in the record
'                        '    scaled to fit an integer
'END TYPE TYPE LinkHead
        Num AS LONG         '-- number of nodes in the linked list
        FirstPtr AS LONG    '-- pointer to first node
        LastPtr AS LONG     '-- pointer to the last node
        Pad AS STRING * 4   '-- padding for huge arrays
END TYPE '-- holds the actual data, in this case the Keyword's record # and its value
TYPE LinkNode
        Info AS KeyInfoLONG
        Ptr AS LONG
END TYPE '-- Information for VMS routines
TYPE VMSTableType
        Handle AS INTEGER
        TempFile AS STRING * 62
END TYPE TYPE FileInfoType
        Year   AS INTEGER
        Month  AS INTEGER
        Day    AS INTEGER
        Hour   AS INTEGER
        Minute AS INTEGER
        Second AS INTEGER
        Size   AS LONG
        Attrib AS INTEGER
END TYPE

CONST NULL = 0

' Color Attributes
COMMON SHARED Fg, Bg, Brdr, NormAttr, RevAttr, ShiftValue%, MaxWgt ' Directories
COMMON SHARED LstDir$, DocDir$, KeyDir$, NdxDir$, ConfigName$ ' Temp variables
COMMON SHARED NodeLEN%, NodeTemp AS LinkNode '-- global EMS usage flag COMMON SHARED gfEMS AS INTEGER '-- number of allocations for VMS routines
COMMON SHARED gVMSNumAllocations AS INTEGER
COMMON SHARED VMSError%

'-- allocation information (handle and filename)
COMMON SHARED gVMSTable() AS VMSTableType '$INCLUDE: '\\vadim\c-drive\user\include\const.bi'

'---------------------------------------------------- Internal SUBs

DECLARE SUB AddNode (Head AS LinkHead, Info AS KeyInfoLONG, hStorage AS INTEGER, FreePtr AS LONG)
DECLARE SUB Config ()

'---------------------------------------------------- Internal FUNCTIONs

DECLARE FUNCTION EmsAlloc% (NumBytes&, Handle%)
DECLARE FUNCTION FileDate$ (FInfo AS ANY)
```

```
DECLARE FUNCTION Unique$ (Path$)
DECLARE FUNCTION VMSAlloc% (NumBytes&, Handle%)
DECLARE FUNCTION VMSRelease% (Handle%)

'------------------------------------------------------------ External SUBs

DECLARE SUB Chime (Number%)
DECLARE SUB DeleteT (SEG StartElement AS ANY, ElSize%, NumEls%)
DECLARE SUB EmsAllocMem (NumPages%, Handle%)
DECLARE SUB EmsGet (SEG Value AS ANY, ElSize%, ElNum&, Handle%)
DECLARE SUB EmsSet (SEG Value AS ANY, ElSize%, ElNum&, Handle%)
DECLARE SUB EmsRelMem (Handle%)
DECLARE SUB FClose (Handle%)
DECLARE SUB FCreate (FileName$)
DECLARE SUB FGetRT (Handle%, Destination AS ANY, RecNumber&, RecSize%)
DECLARE SUB FileInfo (FileName$, SEG Address AS ANY)
DECLARE SUB FOpen (FileName$, Handle%)
DECLARE SUB FOpenAll (FileName$, AccessMode%, ShareMode%, Handle%)
DECLARE SUB FPut (Handle%, Work$)
DECLARE SUB FPutAH (FileName$, SEG Element AS ANY, ElSize%, NumEls%)
DECLARE SUB FPutRT (Handle%, Destination AS ANY, RecNumber&, RecSize%)
DECLARE SUB FPutT (Handle%, Source AS ANY, RecSize%)
DECLARE SUB FSeek (Handle%, Location&)
DECLARE SUB QPrintRC (S:$, Row%, Col%, Colr%)

'------------------------------------------------------------ External FUNCTIONs DECLARE FUNCTION DOSError%
DECLARE FUNCTION WhichError%
DECLARE FUNCTION ErrorMsg$ (ErrNum%)
DECLARE FUNCTION EmsError%
DECLARE FUNCTION EmsLoaded%
DECLARE FUNCTION EmsPagesFree%
DECLARE FUNCTION Exist% (FileName$)
DECLARE FUNCTION FileSize& (FileName$)
DECLARE FUNCTION OneColor% (Fore%, Back%)
DECLARE FUNCTION Peek2% (Segment, Address)

'------------------------------------------------------------ PROGRAM START

'$$$keyword-flag$$$ "Last Author: %w  Revision: %v  Date: %f"
CONST Version$ = "Last Author: TED  Revision: 16  Date: 9-Sep-92,18:51:04"

CALL Config

LOCATE 18, 1

QPrintRC "Key Invert (KYINVERT) Started on " + DATE$ + " at " + TIME$, 1, 15, -1
Col = (80 - LEN(Version$)) \ 2
QPrintRC Version$, 2, Col, -1

'-- use dictionary to determine total number of keywords
LoadFile$ = LstDir$ + "DICT.WRD"
DIM DictEntry AS DictType
NumKeys = FileSize&(LoadFile$) \ LEN(DictEntry)

NodeLEN = LEN(NodeTemp)

KyLEN = LEN(Ky)

DIM Wgt AS WeightNdx127
WgtLEN = LEN(Wgt)

DIM KeyNdxFInfo AS FileInfoType
DIM CountFInfo AS FileInfoType

'-- use KEY.NDX to determine total number of documents
LoadFile$ = NdxDir$ + "KEY.NDX"
FileInfo LoadFile$, KeyNdxFInfo
NumDocs& = FileSize&(LoadFile$) \ KyLEN
FOpenAll LoadFile$, ACCESSREAD, SHAREDENYWRITE, KeyNdxH%
IF DOSError% THEN
        LOCATE 18, 1
        PRINT "Opening "; LoadFile$
        PRINT "A DOS Error Occurred:"; WhichError%; ErrorMsg$(WhichError%)
        STOP
END IF LoadFile$ = NdxDir$ + "WEIGHT.NDX"
FOpenAll LoadFile$, ACCESSREAD, SHAREDENYWRITE, WeightNdxH%
IF DOSError% THEN
        LOCATE 18, 1
        PRINT "Opening "; LoadFile$
        PRINT "A DOS Error Occurred:"; WhichError%; ErrorMsg$(WhichError%)
        STOP
END IF '-- array for the KYINVERT.NDX information
REDIM Ndx(1 TO NumKeys) AS NdxType DIM Info AS KeyInfoLONG
InfoLEN = LEN(Info)

-- count how many keywords there actually are
QPrintRC "Counting Number of Keywords in use...", 4, 1, -1
TotKeys& = 0
LoadFile$ = LstDir$ + ConfigName$ + ".CNT"
'-- make sure that the count file is at least as recent as the KEY.NDX file
IF Exist(LoadFile$) THEN
        FileInfo LoadFile$, CountFInfo
        IF FileDate$(CountFInfo) < FileDate$(KeyNdxFInfo) THEN
```

```
                    '-- delete the count file because it's outdated
                    KILL LoadFile$
            END IF
    END IF IF NOT Exist(LoadFile$) THEN
            FOR DocNum& = 1 TO NumDocs&
                    QPrintRC STR$(DocNum&), 4, 38, -1
                    FGetRT KeyNdxH%, Ky, DocNum&, KyLEN
                    TotKeys& = TotKeys& + Ky.Num
                    QPrintRC STR$(TotKeys&), 4, 45, -1
            NEXT
            hFile = FREEFILE
            OPEN LoadFile$ FOR OUTPUT AS #hFile
                    PRINT #hFile, TotKeys&
            CLOSE #hFile
    ELSE
            hFile = FREEFILE
            OPEN LoadFile$ FOR INPUT AS #hFile
                    INPUT #hFile, TotKeys&
            CLOSE #hFile
    END IF '-- divide into sections and allocate maximum EMS
    NumBytes& = 16384& * (EmsPagesFree% - 1)
    MaxNodes& = NumBytes& \ NodeLEN
    NumSections = 4
    SectionSize! = NumKeys / NumSections '-- try to allocate space in EMS
    NumPages = EmsAlloc(NumBytes&, InvertDatMEM)

IF NumPages > 0 THEN

'-- enough EMS was available
            QPrintRC "Number of EMS Pages Allocated =" + STR$(NumPages) + ", MaxNodes =" + STR$(MaxNodes&), 6, 1, -1
            gfEMS = TRUE

ELSE

'-- not enough EMS was available, use VMS routines
            QPrintRC "Insufficient EMS Available. Requested" + STR$(ABS(NumPages)) + " EMS pages.", 6, 1, -1
            QPrintRC STR$(EmsPagesFree%) + " EMS pages were available.", 7, 1, -1
            gfEMS = FALSE '-- try to allocate space using VMS
            IF VMSAlloc(NumBytes&, InvertDatMEM) THEN QPrintRC "Number of bytes of VMS Allocated =" + STR$(NumBytes&), 8, 1, -1

ELSE

QPrintRC "Unable to allocate VMS.", 8, 1, -1
                    STOP

END IF

END IF

SaveFile$ = NdxDir$ + "KYINVERT.DAT"
    FCreate SaveFile$
    FOpen SaveFile$, InvertDatFile Index& = 1

FOR Section = 1 TO NumSections

KeyLBound = (Section - 1) * SectionSize! + 1
            KeyUBound = Section * SectionSize!
            '-- make sure process to the last key in case of round-off errors
            IF Section = NumSections AND KeyUBound <> NumKeys THEN KeyUBound = NumKeys REDIM LinkList(KeyLBound TO KeyUBound) AS LinkHead QPrintRC "Section" + STR$(Section) + ": Processing Keys" + STR$(KeyLBound) + ' to" + STR$(KeyUBound), 10, 1, -1

'-- initialize element number of the next free pointer
            FreePtr& = 1

FOR DocNum& = 1 TO NumDocs&

QPrintRC "Doc #" + STR$(DocNum&) + STR$(FreePtr&) + "                ", 12, 1, -1

FGetRT KeyNdxH%, Ky, DocNum&, KyLEN
                    FGetRT WeightNdxH%, Wgt, DocNum&, WgtLEN Info.Rec = DocNum&

'-- process the list of keywords for this document
                    FOR j = 1 TO Ky.Num CurrCode = Ky.Code(j)

'-- only add this code to the linked list if it's
                            '   in the section we're currently processing
                            IF CurrCode >= KeyLBound AND CurrCode <= KeyUBound THEN '-- if the weight is larger than the maximum (scaled) weight
                                    '   then just assign it the maximum weight
                                    IF Wgt.Weight(j) > MaxWgt THEN
                                            Wgt.Weight(j) = MaxWgt
                                    END IF
```

```
                        '-- scale the single precision weight to an integer
                        Info.Value = Wgt.Weight(j) * ShiftValue%

'-- AddNode stores the current Info at FreePtr& and increments it
                        AddNode LinkList(CurrCode), Info, InvertDatMEM, FreePtr&

'-- if FreePtr& was just incremented above the allocation then stop
                        IF FreePtr& > MaxNodes& THEN
                                Chime 8
                                LOCATE 18, 1
                                PRINT "Exceeded allocation of"; MaxNodes&; "nodes."
                                PRINT "DocNum& ="; DocNum&; " j (keyword number) ="; j
                                STOP
                        END IF

END IF

NEXT

NEXT

'   ---------------------------------------------------------
  ' start writing inverted file by traversing the Linked List
  '   ---------------------------------------------------------

'-- write out keys for the current section
  FOR i = KeyLBound TO KeyUBound

'-- point to head of linked list for this keyword
          Ptr& = LinkList(i).FirstPtr QPrintRC STR$(i) + " out of" + STR$(KeyUBound) + ":" + STR$(LinkList(i).Num) + "        ", 14, 1, -1

Ndx(i).Code = i
          Ndx(i).Index = Index&
          Ndx(i).Num = LinkList(i).Num '-- traverse linked-list for this keyword
          DO WHILE Ptr&

IF gfEMS THEN
                          EmsGet NodeTemp, NodeLEN, Ptr&, InvertDatMEM
                  ELSE
                          FGetRT InvertDatMEM, NodeTemp, Ptr&, NodeLEN
                  END IF '-- write (append) the Info to disk
                  FPutT InvertDatFile, NodeTemp.Info, InfoLEN '-- get next pointer
                  Ptr& = NodeTemp.Ptr

LOOP

Index& = Index& + Ndx(i).Num

NEXT

NEXT Section

'-- release memory for inverted list data
IF gfEMS THEN
        EmsRelMem InvertDatMEM
ELSE
        IF NOT VMSRelease(InvertDatMEM) THEN
                Chime 8
                LOCATE 22, 1
                PRINT "Problem in VMSRelease."
                STOP
        END IF
END IF '-- close input files KEY.NDX and WEIGHT.NDX
FClose KeyNdxH%
FClose WeightNdxH%

'-- close KYINVERT.DAT output file
FClose InvertDatFile

'-- write the KYINVERT.NDX to disk from the Ndx() array
FPutAH NdxDir$ + "KYINVERT.NDX", Ndx(1), LEN(Ndx(1)), NumKeys DATA "   Copyright 1990-2 by Ted M. Young.  ALL RIGHTS RESERVED.   "

SUB AddNode (Head AS LinkHead, Info AS KeyInfoLONG, hStorage AS INTEGER, FreePtr AS LONG) STATIC IF Head.FirstPtr = NULL THEN Head.FirstPtr = FreePtr
        Head.LastPtr = FreePtr

ELSE

IF gfEMS THEN
                EmsGet NodeTemp, NodeLEN, Head.LastPtr, hStorage
                IF EmsError% THEN
                        Chime 8
                        PRINT "EMS Get Error in AddNode at Head.LastPtr="; Head.LastPtr
                        STOP
                END IF
```

```
                ELSE
                        FGetRT hStorage, NodeTemp, Head.LastPtr, NodeLEN
                END IF NodeTemp.Ptr = FreePtr     '-- point the node's next ptr to new node IF gfEMS THEN
                        EmsSet NodeTemp, NodeLEN, Head.LastPtr, hStorage
                        IF EmsError% THEN
                                Chime 8
                                PRINT "EMS Set Error in AddNode at Head.LastPtr="; Head.LastPtr
                                STOP
                        END IF
                ELSE
                        FPutRT hStorage, NodeTemp, Head.LastPtr, NodeLEN
                END IF Head.LastPtr = FreePtr     '-- set the last pointer to the new node

END IF

'-- increment count of nodes for this linked list
        Head.Num = Head.Num + 1

'-- store the info in the node and set its pointer to NULL
        NodeTemp.Info = Info
        NodeTemp.Ptr = NULL IF gfEMS THEN
                EmsSet NodeTemp, NodeLEN, FreePtr, hStorage
                IF EmsError% THEN
                        Chime 8
                        PRINT "EMS Error in AddNode at FreePtr="; FreePtr
                        STOP
                END IF
        ELSE
                FPutRT hStorage, NodeTemp, FreePtr, NodeLEN
        END IF '-- increment pointer to next free node
        FreePtr = FreePtr + 1

END SUB

SUB Config STATIC

IF COMMAND$ <> "" THEN
        ConfigFile$ = COMMAND$ + ".CFG"
        ConfigName$ = COMMAND$
ELSE
        PRINT "No configuration file was given."
        CALL Chime(6)
        DO: LOOP UNTIL LEN(INKEY$)
        END
END IF
IF Exist%(ConfigFile$) THEN
        OPEN ConfigFile$ FOR INPUT AS #1
                INPUT #1, Fg, Bg, Brdr, LstDir$, DocDir$, NdxDir$, AbstrDir$, Lang$, x$
        CLOSE #1
ELSE
        CALL Chime(6)
        PRINT "Configuration file "; ConfigFile$; " Does not exist."
        DO: LOOP UNTIL LEN(INKEY$)
        END
        END
END IF COLOR Fg, Bg, Brdr NormAttr = OneColor%(Fg, Bg)
RevAttr = OneColor%(Bg, Fg AND 7)

ShiftValue% = 1000
MaxWgt = 32767 \ ShiftValue%

CLS

IF NOT EmsLoaded% THEN
        PRINT "No EMS!"
        CALL Chime(6)
        DO: LOOP UNTIL LEN(INKEY$)
        END
END IF

END SUB

FUNCTION EmsAlloc% (NumBytes&, Handle%) STATIC

'-- calcuate number of 16K EMS pages to allocate
NumPgs% = NumBytes& \ 16384 + 1

'-- return number of pages allocated, 0 if insufficient EMS available
IF EmsPagesFree% < NumPgs% THEN
        EmsAlloc% = -NumPgs%
ELSE
        EmsAllocMem NumPgs%, Handle%
        EmsAlloc% = NumPgs%
END IF

END FUNCTION
```

```
            TempFile$ = RTRIM$(gVMSTable(Found).TempFile)
            KILL TempFile$ DeleteT gVMSTable(Found), LEN(gVMSTable(Found)), gVMSNumAllocations - Found gVMSNumAllocations = gVMSNumAllocations - 1
            REDIM gVMSTable(1 TO gVMSNumAllocations) AS VMSTableType VMSRelease = TRUE ELSE  '-- something's wrong!

VMSError% = 131 '-- invalid handle
            VMSRelease = FALSE

END IF

END FUNCTION

DEFINT A-Z

'FreqComp version 4.5 3/26/91 15:30
'----------------------------------

' Implements the Inverted Index access method along with the weighted values
' to calculate the frequent companions for each of the words used in the
' document collection.

'Invoked: freqcomp ConfigFile
'Creates: FreqComp.127
'Uses: KyInvert.Ndx, KyInvert.Dat, Key.Ndx, Weight.Ndx
'nth Rec of FreqComp.127 contains nth Code, Num of companions of this code &
'127 pairs of (code,100*weight)
'   TYPE FreqComp127
'       Num AS INTEGER
'       Code AS INTEGER
'       Comp(1 TO 127) AS INTEGER
'       Value(1 TO 127) AS STRING * 1

CONST ACCESSREAD = 0
CONST ACCESSWRITE = 1
CONST ACCESSREADWRITE = 2
CONST SHARECOMPAT = 0
CONST SHAREDENYREADWRITE = 1
CONST SHAREDENYWRITE = 2
CONST SHAREDENYREAD = 3
CONST SHAREDENYNONE = 4

COMMON SHARED TRUE, FALSE, NormAttr, RevAttr
COMMON SHARED NdxDir$, DocDir$, LstDir$, ASCEND, DESCEND
COMMON SHARED KeyEMS, KYInvertNdxEMS, KYInvertDatEMS, WeightEMS
COMMON SHARED SixteenK, ThirtyTwoK&

'$INCLUDE: '\\vadim\c-drive\USER\include\types.bi'

DECLARE FUNCTION ArraySize% (ULrow, ULcol, LRrow, LRcol)
DECLARE FUNCTION DosError%
DECLARE FUNCTION EmsError%
DECLARE FUNCTION EmsGetPFSeg%
DECLARE FUNCTION EmsPagesFree%
DECLARE FUNCTION EmsLoaded%
DECLARE FUNCTION EmsNumPages%
DECLARE FUNCTION Exist% (FileName$)
DECLARE FUNCTION FileSize& (FileName$)
DECLARE FUNCTION OneColor% (Fore%, Back%)
DECLARE FUNCTION QInstrE% (SPos%, Source$, Srch$)
DECLARE FUNCTION WhichError%

DECLARE SUB Array2EMS (SEG Element AS ANY, ElSize%, NumEls%, Handle%)
DECLARE SUB BCopyT (SEG FromEl AS ANY, SEG ToEl AS ANY, ElSize%, NumEls%)
DECLARE SUB Chime (Number%)
DECLARE SUB EmsAllocMem (NumPages%, Handle%)
DECLARE SUB EmsGet (SEG Value AS ANY, ElSize%, ElNum&, Handle%)
DECLARE SUB EmsGet1El (SEG Value AS ANY, ElSize%, ElNum%, Handle%)
DECLARE SUB EmsMapMem (Handle%, PhysPage%, LogPage%)
DECLARE SUB EmsRelMem (Handle%)
DECLARE SUB EmsSet (SEG Value AS ANY, ElSize%, ElNum&, Handle%)
DECLARE SUB EmsSet1El (SEG Value AS ANY, ElSize%, ElNum%, Handle%)
DECLARE SUB FClose (Handle%)
DECLARE SUB FGetA (Handle%, BYVAL SegAdr%, BYVAL Adr%, NumBytes&)
DECLARE SUB FGetAH (FileName$, SEG Address AS ANY, ElSize%, NumEls%)
DECLARE SUB FGetRT (Handle%, Dest AS ANY, RecNo&, RecSize%)
DECLARE SUB FOpen (FileName$, Handle%)
DECLARE SUB FOpenAll (FileName$, AccessMode%, ShareMode%, Handle%)
DECLARE SUB FSeek (Handle%, Location&)
DECLARE SUB InitInt (SEG Address%, StartValue%, NumEls%)
DECLARE SUB ISortS (SEG Element!, SEG IndexElement%, NumElements%, Direction%)
DECLARE SUB QPrintRC (Work$, Row%, Col%, Colr%)
DECLARE SUB SortT (SEG Array AS ANY, NumEls%, Direction%, ElSize%, MemOffset%, MemSize%)

'=========================================================================

DECLARE SUB Config ()
DECLARE SUB DispMsg (Msg$, r%, c%)
DECLARE SUB ReleaseEMS ()
DECLARE SUB WindMgr (ULrow%, ULcol%, LRrow%, LRcol%, Frame%, BoxColr%, TextColr%, Text$)
DECLARE FUNCTION EmsAlloc% (NumPages, Handle%, FileName$)
DECLARE FUNCTION LoadIntoEMS% (File$)

STACK 8192
```

```
FUNCTION FileDate$ (FInfo AS FileInfoType) STATIC

Year$ = MID$(STR$(FInfo.Year), 2)
Month$ = MID$(STR$(FInfo.Month), 2)
IF LEN(Month$) = 1 THEN Month$ = "0" + Month$
Day$ = MID$(STR$(FInfo.Day), 2)
IF LEN(Day$) = 1 THEN Day$ = "0" + Day$
Hour$ = MID$(STR$(FInfo.Hour), 2)
IF LEN(Hour$) = 1 THEN Hour$ = "0" + Hour$
Minute$ = MID$(STR$(FInfo.Minute), 2)
IF LEN(Minute$) = 1 THEN Minute$ = "0" + Minute$
Second$ = MID$(STR$(FInfo.Second), 2)
IF LEN(Second$) = 1 THEN Second$ = "0" + Second$ FileDate$ = Year$ + Month$ + Day$ + Hour$ + Minute$ + Second$

END FUNCTION

FUNCTION Unique$ (Path$)
        IF LEN(Path$) AND RIGHT$(Path$, 1) <> "\" THEN Path$ = Path$ + "\"
        Seed& = ABS(PeekZ%(0, &H46C))           'use the TIMER as a seed
        DO
                TempName$ = Path$ + MID$(STR$(Seed&), 2)  'make a string out of it
                Seed& = Seed& + 1                         'increment for next time
        LOOP UNTIL NOT Exist%(TempName$)                  'loop and try another name Unique$ = TempName$                               'this is the function output
END FUNCTION FUNCTION VMSAlloc (NumBytes&, Handle%) STATIC '-- create a temporary but unique filename
TempPath$ = ENVIRON$("TEMP")
TempFile$ = Unique$(TempPath$) + ".VMS"

'-- create the file
FCreate TempFile$
IF DOSError% THEN
        VMSAlloc = FALSE
        VMSError% = 133
        EXIT FUNCTION
END IF '-- open the file
FOpen TempFile$, Handle%
IF DOSError% THEN
        VMSAlloc = FALSE
        VMSError% = 133
        KILL TempFile$
        EXIT FUNCTION
END IF '-- allocate disk space: seek, write something, close, reopen
QPrintRC "Allocating Space...", 24, 20, -1
FSeek Handle%, NumBytes& - 1
x$ = "X"
FPut Handle%, x$
FClose Handle%
QPrintRC "                   ", 24, 20, -1
FOpen TempFile$, Handle%
IF DOSError% THEN
        VMSAlloc = FALSE
        VMSError% = 136
        FClose Handle%
        KILL TempFile$
        EXIT FUNCTION
END IF gVMSNumAllocations = gVMSNumAllocations + 1
REDIM gVMSTable(1 TO gVMSNumAllocations) AS VMSTableType gVMSTable(gVMSNumAllocations).Handle = Handle%
gVMSTable(gVMSNumAllocations).TempFile = TempFile$ VMSAlloc = TRUE

END FUNCTION

FUNCTION VMSRelease (Handle%) STATIC

IF Handle% = 0 THEN
        VMSRelease = FALSE
        EXIT FUNCTION
END IF

'-- close the file
FClose Handle%

'-- get the filename from the VMSTable
Found = 0
FOR i = 1 TO gVMSNumAllocations
        IF gVMSTable(i).Handle = Handle% THEN
                Found = i
                EXIT FOR
        END IF
NEXT '-- found it, so get the filename, delete the file and erase the entry
IF Found THEN
```

```
'$$$keyword-flag$$$ "Last Author: %w  Revision: %v  Date: %f"
CONST Version$ = "Last Author: TED  Revision: 11  Date: 11-Aug-92,14:10:06"

CALL Config

SpcLoc = INSTR(2, COMMAND$, " ")
IF SpcLoc = 0 THEN
        Start = 1
ELSE
        Cmd$ = MID$(COMMAND$, SpcLoc)
        Start = VAL(Cmd$)

END IF

'_____ K Y I N V E R T E D ___

'-- Load the KYInverted Index Data File

File$ = NdxDir$ + "KYINVERT.NDX"
IF NOT Exist%(File$) THEN
        CLS
        PRINT File$; " not found."
        CALL ReleaseEMS
        STOP
END IF
DIM NdxTemp AS NdxType
NdxLEN = LEN(NdxTemp)
TotKeys = FileSize&(File$) \ NdxLEN
REDIM InvertNdx(1 TO TotKeys) AS NdxType
CALL FGetAH(File$, SEG InvertNdx(1), NdxLEN, TotKeys)

'-- transfer it to EMS

CALL Array2EMS(SEG InvertNdx(1), NdxLEN, TotKeys, KYInvertNdxEMS)
IF EmsError% THEN
        PRINT "EMS Error"; EmsError%; "occurred."
        STOP
END IF '-- erase array: it's in EMS ERASE InvertNdx '---- open KYInvert.DAT for random access DIM RecTEMP AS KeyInfoLONG
RecLEN = LEN(RecTEMP)
File$ = NdxDir$ + "KYINVERT.DAT"
IF NOT Exist%(File$) THEN
        CLS
        Chime 2
        PRINT File$; " not found."
        CALL ReleaseEMS
        STOP
END IF
FOpenAll File$, ACCESSREAD, SHAREDENYWRITE, KYInvertDatFILE '==== load WEIGHT.NDX into EMS if enough room, else open for random access File$ = NdxDir$ + "WEIGHT.NDX"
IF NOT Exist%(File$) THEN
        CLS
        PRINT File$; " not found."
        CALL ReleaseEMS
        STOP
END IF
DIM WeightTEMP AS WeightNdx127
WeightLEN = LEN(WeightTEMP)
WeightEMS = LoadIntoEMS(File$)
IF WeightEMS = 0 THEN '-- not enough EMS to load it in, so just open it
        FOpenAll File$, ACCESSREAD, SHAREDENYWRITE, WeightFILE
END IF '==== load KEY.NDX into EMS if enough room, else open for random access File$ = NdxDir$ + "KEY.NDX"
IF NOT Exist%(File$) THEN
        CLS
        PRINT File$; " not found."
        CALL ReleaseEMS
        STOP
END IF
DIM KeyTEMP AS KeyNdx127
KeyLEN = LEN(KeyTEMP)
KeyEMS = LoadIntoEMS(File$)
IF KeyEMS = 0 THEN '-- not enough EMS to load it in, so just open it
        FOpenAll File$, ACCESSREAD, SHAREDENYWRITE, KeyFILE
END IF DIM Freq127 AS FreqComp127
DIM BlankFreq AS FreqComp127
Freq127LEN = LEN(Freq127)

'---- Open the FreqComp.127 file for writing (random access)
FreqFile$ = NdxDir$ + "FREQCOMP.127"
IF Exist%(FreqFile$) AND Start = 1 THEN KILL FreqFile$
OPEN FreqFile$ FOR RANDOM SHARED AS #1 LEN = Freq127LEN '-- Index() is used for the pointer-based integer sort
REDIM Index(0 TO TotKeys - 1) AS INTEGER
```

```
FS$ = "FREQCOMP Started At Record" + STR$(Start) + "On " + DATE$ + " " + TIME$
QPrintRC FS$, 1, (80 - LEN(FS$)) \ 2, -1
QPrintRC Version$, 2, 7, -1

CALL QPrintRC("Processing 0     out of" + STR$(TotKeys), 10, 10, -1)

FOR Word = Start TO TotKeys

CALL QPrintRC(STR$(Word), 10, 20, -1)

EmsGet1El NdxTemp, NdxLEN, Word, KYInvertNdxEMS

IF NdxTemp.Num THEN

'--- clear the Value() for each Word
                REDIM Value(0 TO TotKeys) AS SINGLE FOR InvIndex& = NdxTemp.Index TO NdxTemp.Index + NdxTemp.Num - 1

'---- get the document # pointed to by KYINVERT.NDX.Index
                        '      from KYINVERT.DAT
                        CALL FGetRT(KYInvertDatFILE, RecTEMP, InvIndex&, RecLEN)

'---- get the key codes and number for this record
                        IF KeyEMS THEN
                                EmsGet KeyTEMP, KeyLEN, RecTEMP.Rec, KeyEMS
                        ELSE
                                FGetRT KeyFILE, KeyTEMP, RecTEMP.Rec, KeyLEN
                        END IF '---- get the Weight values for this record
                        IF WeightEMS THEN
                                EmsGet WeightTEMP, WeightLEN, RecTEMP.Rec, WeightEMS
                        ELSE
                                FGetRT WeightFILE, WeightTEMP, RecTEMP.Rec, WeightLEN
                        END IF FOR Keyword = 1 TO KeyTEMP.Num Code = KeyTEMP.Code(Keyword)

'---- add Weight to Code's total value sum
                                IF WeightTEMP.Weight(Keyword) = 0 THEN STOP
                                Value(Code) = Value(Code) + WeightTEMP.Weight(Keyword)

NEXT' keyword in this record

NEXT 'next record that Word appears in

Freq127.Code = Word

'---- scale the values to the Freq127 word itself
                '     use the code number to obtain it's value
                ScaleValue! = Value(Freq127.Code)

'---- set the value to zero so it won't come up after sorting
                Value(Freq127.Code) = 0

'---- pointer sort in decreasing order
                CALL InitInt(SEG Index(0), 1, TotKeys)
                CALL ISortS(SEG Value(0), SEG Index(0), TotKeys, DESCEND)

FOR i = 1 TO 127' max number of Freq Comps

Value! = Value(Index(i - 1))

IF Value! > 0 THEN ' store it

Freq127.Comp(i) = Index(i - 1)
                                V% = Value! / ScaleValue! * 100
                                IF V% > 255 THEN V% = 255

Freq127.Value(i) = CHR$(V%)

ELSE

EXIT FOR

END IF

NEXT

Freq127.Num = i - 1' 127 if loop completed, else where it stopped

PUT #1, Word, Freq127

ELSE

PUT #1, Word, BlankFreq

END IF

IF INKEY$ = CHR$(27) THEN
                Chime 5
                PRINT "Press ENTER to abort."
                DO
                        i$ = INKEY$
                LOOP UNTIL LEN(i$)
                IF i$ = CHR$(13) THEN EXIT FOR
                CLS
        END IF
```

```
NEXT' next Word to process

CLOSE #1' close the freq comp 127 list

CALL ReleaseEMS

SUB Config STATIC

IF COMMAND$ <> "" THEN
        ConfigFile$ = COMMAND$
        SpcLoc = INSTR(ConfigFile$, " ")
        IF SpcLoc THEN ConfigFile$ = LEFT$(ConfigFile$, SpcLoc - 1)
        ConfigFile$ = ConfigFile$ + ".CFG"
        PRINT "Reading "; ConfigFile$
ELSE
        Chime 5
        PRINT "No configuration file was given."
        PRINT "Press any key to continue."
        DO: LOOP UNTIL LEN(INKEY$)
END IF
IF NOT Exist(ConfigFile$) THEN
        Chime 10
        PRINT "File"; ConfigFile$; "was not found."
        PRINT "Press any key to continue."
        DO: LOOP UNTIL LEN(INKEY$)
END IF OPEN ConfigFile$ FOR INPUT AS #1
        INPUT #1, Fg, Bg, Brdr, LstDir$, DocDir$, NdxDir$, AbstrDir$, Lang$, x!
CLOSE #1

COLOR Fg, Bg, Brdr

NormAttr = OneColor%(Fg, Bg)
RevAttr = OneColor%(Bg, Fg AND 7)

SixteenK = 16384
ThirtyTwoK& = SixteenK * 2&

CLS
IF NOT EmsLoaded% THEN
        Chime 8
        PRINT "No EMS loaded."
        STOP
END IF

FALSE = 0
TRUE = NOT FALSE
ASCEND = 0
DESCEND = NOT ASCEND

END SUB

SUB DispMsg (Msg$, r, c) STATIC
STATIC WindOpen, Scr%() ' is there already a message displayed?
SHARED Fg, Bg IF LEN(Msg$) = 0 AND WindOpen THEN GOSUB MsgClose: EXIT SUB
IF WindOpen THEN
        CALL Chime(9)
        OPEN "DEBUG" FOR OUTPUT AS #9
        PRINT #9, "WindOpen="; WindOpen; HEX$(WindOpen)
        PRINT #9, "Msg$= |"; Msg$; "|"
        PRINT #9, "TRUE="; TRUE; HEX$(TRUE)
        PRINT #9, "FALSE="; FALSE; HEX$(FALSE)
        CLOSE #9
        CALL Chime(8)
        CLS
        WHILE LEN(INKEY$) = 0: WEND
        GOSUB MsgClose
END IF Wid = LEN(Msg$)
IF Wid > 50 THEN Wid = 50

Msg$ = Msg$ + " "' make sure there's a space to find at the end (see below)

MaxLin = LEN(Msg$) \ Wid + 3
IF MaxLin > 23 THEN MaxLin = 23
REDIM Text$(MaxLin)
Lin = 0
DO
        Lin = Lin + 1' incr current lin # (also element in text display array)
        lastspc = QInstrB%(Wid + 1, Msg$, " ")' look for the last space so we can word wrap
        Text$(Lin) = LEFT$(Msg$, lastspc - 1)
        Msg$ = MID$(Msg$, lastspc + 1)'remove portion of string that's in t$
LOOP WHILE LEN(Msg$) > Wid Msg$ = RTRIM$(Msg$)
IF LEN(Msg$) THEN
        Lin = Lin + 1
        Text$(Lin) = Msg$
END IF IF r <> 0 AND c = 0 THEN
        ULr = r
ELSE
        ULr = 9
END IF
        DULr = ULr - 1
        LRr = ULr + Lin + 1
        DLRr = LRr + 2
```

```
        horizmargin = (80 - Wid) \ 2
        ULc = horizmargin
        DULc = ULc - 3
        LRc = 80 - horizmargin
        IF (Wid \ 2) * 2 = Wid THEN LRc = LRc + 1' if it's even WIDth, then bump up the LRcolumn
        DLRc = LRc + 1

REDIM Scr%(ArraySize%(DULr, DULc, DLRr, DLRc))
    CALL ScrnSave0(DULr, DULc, DLRr, DLRc, SEG Scr%(0))
    CALL WindMgr(ULr, ULc, LRr, LRc, 4, NormAttr, RevAttr, "Status")
    FOR i = 1 TO Lin
        CALL QPrintRC(Text$(i), ULr + i, ULc + 1, -1)
    NEXT r = ULr + Lin
    c = ULc + 1 + LEN(Text$(Lin))
    IF LEN(Text$(Lin)) + 2 = Wid THEN c = ULc + 1: r = r + 1

ERASE Text$
    WindOpen = TRUE

EXIT SUB

'------------------------------------------------------------ close window
    MsgClose:

CALL ScrnRest0(DULr, DULc, DLRr, DLRc, SEG Scr%(0))

ERASE Scr%
    WindOpen = FALSE
    RETURN

END SUB

FUNCTION EmsAlloc% (NumPgs%, Handle%, FileName$) STATIC

IF EmsPagesFree% < NumPgs THEN
        EmsAlloc = FALSE
ELSE
        EmsAllocMem NumPgs%, Handle%
        EmsAlloc = TRUE
END IF

END FUNCTION

FUNCTION LoadIntoEMS (File$) STATIC

'-------- Returns the handle where the file was loaded into ---------

EMSPg = EmsGetPFSeg%

SizeofFile& = FileSize&(File$)

NumPages = SizeofFile& \ SixteenK + 2' round off to nearest 2 pages
IF NOT EmsAlloc(NumPages, FileEMS, File$) THEN
        LoadIntoEMS = 0
        EXIT FUNCTION
END IF Num32kBlocks = SizeofFile& \ ThirtyTwoK&
LeftOver& = SizeofFile& - (Num32kBlocks * ThirtyTwoK&)

FOpen File$, LoadFile
FOR i = 1 TO Num32kBlocks + 1

QPrintRC "Loading " + File$ + " block" + STR$(i) + " /" + STR$(Num32kBlocks + 1) + "      ", 4, 1, -1

'-- map pages of the EMS memory to the EMS upper mem page frame
        FOR j = 1 TO 2
                EmsMapMem FileEMS, j, (i - 1) * 2 + j
                IF EmsError% THEN PRINT "Ems error:"; EmsError%: STOP
        NEXT '-- seek to beginning of current block
        FSeek LoadFile, (i - 1) * ThirtyTwoK&
        IF DosError% THEN PRINT "Dos Error:"; WhichError%: STOP IF i < Num32kBlocks + 1 THEN
                '-- get the 32k block and put it directly into the EMS page frame
                FGetA LoadFile, BYVAL EMSPg, BYVAL 0, ThirtyTwoK&
                IF DosError% THEN PRINT "Dos Error:"; WhichError%: STOP
        ELSE
                '-- load the left over (<32k) bytes
                FGetA LoadFile, BYVAL EMSPg, BYVAL 0, LeftOver&
                IF DosError% THEN PRINT "Dos Error:"; WhichError%: STOP
        END IF

NEXT

FClose LoadFile

LoadIntoEMS = FileEMS

END FUNCTION

SUB ReleaseEMS STATIC

IF KeyEMS THEN
        EmsRelMem KeyEMS
ELSEIF KeyFILE THEN
        FClose KeyFILE
END IF
```

```
IF KYInvertNdxEMS THEN EmsRelMem KYInvertNdxEMS

IF KYInvertDatEMS THEN EmsRelMem KYInvertDatEMS

IF WeightEMS THEN
        EmsRelMem WeightEMS
ELSEIF WeightFILE THEN
        FClose WeightFILE
END IF

END SUB

SUB WindMgr (ULrow, ULcol, LRrow, LRcol, Frame, BoxColr, TextColr, Text$) STATIC CALL BoxO(ULrow - 1, ULcol - 1, LRrow + 1, LRcol + 1, Frame, BoxColr)
CALL ClearScrO(ULrow, ULcol, LRrow, LRcol, BoxColr)
CALL QPrintRC("[" + Text$ + "]", ULrow - 1, ULcol + 1, TextColr)

END SUB

DEFINT A-Z

'==================
'    RELATIVE.BAS
'==================

'---- are there any FreqComps for this keyword?
'---- we found the word in j's FCList
'---- look for the word itself in word j's FCList
'---- apply formula of (Lower * 6 + Higher)/7
'---- sort in decreasing order, by value
'---- save first 63 as the relatives 'Invoked: RELATIVE ConfigFile
'--------

'Creates: Relative.63
'--------
'    nth Record of Relative.63 contains nth Code
'    Num of relatives of this code &

'Uses: FreqComp.127, Dict.Wrd (for NumKeys keyword count)
'-----

'63 paired values: Companion Codes (Comp()) and 100 * weight (Value())
'   TYPE FreqComp63
'       Num AS INTEGER
'       Code AS INTEGER
'       Comp(1 TO 63) AS INTEGER
'       Value(1 TO 63) AS STRING * 1

'$INCLUDE: '\\vadim\c-drive\user\include\types.bi'

' Color Attributes
COMMON SHARED Fg, Bg, Brdr, NormAttr, RevAttr

' Directories
COMMON SHARED LstDir$, DocDir$, KeyDir$, NdxDir$

'$INCLUDE: '\\vadim\c-drive\user\include\const.bi'

'---------------------------------------------------------- Internal SUBs

DECLARE SUB Config ()
DECLARE SUB EmsAlloc (NumPgs%, Handle%)

'---------------------------------------------------------- External SUBs

DECLARE SUB Chime (Number)
DECLARE SUB EmsAllocMem (NumPages%, Handle%)
DECLARE SUB EmsMapMem (Handle%, PhysicalPage%, LogicalPage%)
DECLARE SUB EmsGet (SEG Value AS ANY, ElSize%, ElNum&, Handle%)
DECLARE SUB EmsSet (SEG Value AS ANY, ElSize%, ElNum&, Handle%)
DECLARE SUB EmsRelMem (Handle%)
DECLARE SUB FClose (Handle%)
DECLARE SUB FCreate (FileName$)
DECLARE SUB FGetA (Handle%, BYVAL SegAdr%, BYVAL Adr%, NumBytes&)
DECLARE SUB FGetAH (FileName$, SEG Element AS ANY, ElSize%, NumEls%)
DECLARE SUB FGetRT (Handle%, Destination AS ANY, RecNumber&, RecSize%)
DECLARE SUB FOpen (FileName$, Handle%)
DECLARE SUB FPutT (Handle%, Source AS ANY, RecSize%)
DECLARE SUB FPutRT (Handle%, Source AS ANY, RecNumber&, RecSize%)
DECLARE SUB FSeek (Handle%, Location&)
DECLARE SUB QPrintRC (St$, Row%, Col%, Colr%)

DECLARE SUB SortT (SEG Address AS ANY, NumEls%, Dir%, ElSize%, MemOffset%, MemSize%)

'---------------------------------------------------------- External FUNCTIONs

DECLARE FUNCTION EmsLoaded%
DECLARE FUNCTION EmsError%
DECLARE FUNCTION EmsPagesFree%
DECLARE FUNCTION EmsGetPFSeg%
DECLARE FUNCTION Exist% (FileName$)
DECLARE FUNCTION OneColor% (Fore%, Back%)
DECLARE FUNCTION FileSize& (FileName$)
DECLARE FUNCTION WhichError%
DECLARE FUNCTION DosError%
DECLARE FUNCTION MaxInt% (a%, b%)
DECLARE FUNCTION MinInt% (a%, b%)
```

```
'--------------------------------------------------------- PROGRAM START
CALL Config DIM NonMutualCount AS LONG, MutualCount AS LONG Threshold = 0

ThirtyTwoK& = 32 * 1024&

EmsPg = EmsGetPFSeg%

'-- determine number of dictionary entries
File$ = LstDir$ + "DICT.WRD"
DIM DictEntry AS DictType
NumKeys = FileSize&(File$) \ LEN(DictEntry)

DIM Freq127 AS FreqComp127, Freq127obj AS FreqComp127
Freq127LEN = LEN(Freq127)

File$ = NdxDir$ + "FREQCOMP.127"
SizeofFile& = FileSize&(File$)
NumFreqComp = SizeofFile& \ Freq127LEN NumPages = SizeofFile& \ 16384 + 2' round off to nearest  ages
EmsAlloc NumPages, FreqCompEMS
IF EmsError% THEN PRINT "Ems error:"; EmsError%

Num32kBlocks = SizeofFile& \ ThirtyTwoK&
LeftOver& = SizeofFile& - (Num32kBlocks * ThirtyTwoK&)

FOpen File$, FreqCompFILE
FOR i = 1 TO Num32kBlocks + 1

QPrintRC "Loading block" + STR$(i) + " /" + STR$(Num32kBlocks + 1), 3, 1, -1

'-- map pages of the FreqCompEMS memory to the EMS upper mem page frame
        FOR j = 1 TO 2
                EmsMapMem FreqCompEMS, j, (i - 1) * 2 + j
                IF EmsError% THEN PRINT "Ems error:"; EmsError%: STOP
        NEXT '-- seek to beginning of current block
        FSeek FreqCompFILE, (i - 1) * ThirtyTwoK&
        IF DosError% THEN PRINT "Dos Error:"; WhichError%

IF i < Num32kBlocks + 1 THEN
                '-- get the 32k block and put it directly into the EMS page frame
                FGetA FreqCompFILE, BYVAL EmsPg, BYVAL 0, ThirtyTwoK&
                IF DosError% THEN PRINT "Dos Error:"; WhichError%
        ELSE
                '-- load the left over (<32k) bytes
                FGetA FreqCompFILE, BYVAL EmsPg, BYVAL 0, LeftOver&
                IF DosError% THEN PRINT "Dos Error:"; WhichError%
        END IF

NEXT

FClose FreqCompFILE

CLS

DIM Rel AS FreqComp63, BlankRel AS FreqComp63
RelLEN = LEN(Rel)

'---- Initialize the Blank Relative structure
BlankRel.Num = 0: BlankRel.Code = 0
FOR i = 1 TO 63
        BlankRel.Comp(i) = 0
        BlankRel.Value(j) = CHR$(0)
NEXT File$ = NdxDir$ + "RELATIVE.63"
FCreate File$
FOpen File$, RelativeFile

CLS

QPrintRC "Processing Keyword 0    out of " + STR$(NumKeys), 10, 10, -1

FOR i = 1 TO NumFreqComp

EmsGet Freq127, Freq127LEN, CLNG(i), FreqCompEMS

' fill this rec with 0's in case there are no FreqComps
        ' also to clear the variable in case there aren't 63 Relatives Rel = BlankRel Rel.Code = Freq127.Code QPrintRC STR$(i), 10, 29, -1

'---- are there any FreqComps for this keyword?

IF Freq127.Num THEN '-- yes, so process it

WordsInUse = WordsInUse + 1

REDIM RelVal(1 TO Freq127.Num) AS CodeValue
```

```
            FOR j = 1 TO Freq127.Num

RelVal(j).Code = Freq127.Comp(j)
                    RelVal(j).Value = ASC(Freq127.Value(j))

EmsGet Freq127obj, Freq127LEN, CLNG(Freq127.Comp(j)), FreqCompEMS

Found = FALSE

'-- Look for the word itself in word j's FCList
                    FOR k = 1 TO Freq127obj.Num IF Freq127obj.Comp(k) = Freq127.Code THEN '-- we found the word in j's FCList
                                    '   apply formula of Lower * 6 + Higher
                                    '                    -------------------
                                    '                            7

ObjValue = ASC(Freq127obj.Value(k))

Max = MaxInt(RelVal(j).Value, ObjValue)
                                    Min = MinInt(RelVal(j).Value, ObjValue)

RelVal(j).Value = (Max + (Min * 6)) / 7

Found = TRUE

EXIT FOR

END IF

NEXT

IF Found THEN   '- mutual
                            MutualCount = MutualCount + 1
                    ELSE    '- non-mutual
                            NonMutualCount = NonMutualCount + 1
                            RelVal(j).Value = RelVal(j).Value / 8
                    END IF

NEXT

'---- sort in decreasing order, by value

SortT RelVal(1), Freq127.Num, DESCEND, LEN(RelVal(1)), LEN(RelVal(1).Code), -1

'---- save first 63 as the relatives

MaxRel = 63
                    IF MaxRel > Freq127.Num THEN MaxRel = Freq127.Num FOR j = 1 TO MaxRel IF RelVal(j).Value >= Threshold THEN Rel.Comp(j) = RelVal(j).Code
                                    Rel.Value(j) = CHR$(RelVal(j).Value)
                                    Rel.Num = Rel.Num + 1

ELSE

EXIT FOR

END IF

NEXT

END IF

'---- store this record on disk

FPutRT RelativeFile, Rel, CLNG(i), RelLEN

IF INKEY$ = CHR$(27) THEN Chime 6: EXIT FOR

NEXT

' close output file
FClose RelativeFile

' release FreqComp use of EMS
EmsRelMem FreqCompEMS

OPEN "MUTUAL.DAT" FOR OUTPUT AS 1
        PRINT #1, "Number of Mutual:      "; MutualCount
        PRINT #1, "Number of Non-Mutual:  "; NonMutualCount
        PRINT #1, "Number of Words in use:"; WordsInUse
CLOSE #1

SUB Config STATIC

IF COMMAND$ <> "" THEN
        ConfigFile$ = COMMAND$ + ".CFG"
ELSE
        PRINT "No configuration file was given."
        CALL Chime(6)
        DO: LOOP UNTIL LEN(INKEY$)
        END
END IF
```

```
    IF Exist%(ConfigFile$) THEN
            OPEN ConfigFile$ FOR INPUT AS #1
                    INPUT #1, Fg, Bg, Brdr, LstDir$, DocDir$, NdxDir$, AbstrDir$, Lang$
            CLOSE #1
    ELSE
            CALL Chime(6)
            PRINT "Configuration file "; ConfigFile$; " Does not exist."
            PRINT "Press any key to continue."
            DO: LOOP UNTIL LEN(INKEY$)
            END
    END IF COLOR Fg, Bg, Brdr NormAttr = OneColor%(Fg, Bg)
    RevAttr = OneColor%(Bg, Fg AND 7)

CLS
    QPrintRC "RELATIVE", 1, 36, -1
    IF NOT EmsLoaded% THEN
            PRINT "No EMS!"
            CALL Chime(6)
            DO: LOOP UNTIL LEN(INKEY$)
            END
    END IF

END SUB

SUB EmsAlloc (NumPgs%, Handle%) STATIC

IF EmsPagesFree% < NumPgs THEN
            CALL Chime(8)
            PRINT "Couldn't Allocate "; CLNG(NumPgs) * SixteenK; " bytes of EMS ("; NumPgs; " pages)."
            PRINT "Only "; EmsPagesFree%; " pages were available."
            STOP
    ELSE
            EmsAllocMem NumPgs%, Handle%
    END IF

END SUB

DEFINT A-Z

'REL-INV.BAS
    'Invoked: rel-inv ConfigFile
    'Creates: Rel-Inv.Ndx, Rel_Inv.Dat
    'Uses: Relative.63 & Dict.Wrd for NumKeys
    'nth Rec of Rel-Inv.Ndx contains nth Code, ptr into Rel-Inv.Dat & NumRelsOfCode
    '   TYPE NdxType
    '       Code AS INTEGER
    '       Index AS LONG
    '       Num AS INTEGER
    'pointed to record of Rel-Inv.Dat contains code of the first FreqComp list
    'of nth code & the nth code's value in that list
    '   TYPE RecValue
    '       Rec AS INTEGER
    '       Value AS STING * 1

'$INCLUDE: '\\vadim\c-drive\user\include\types.bi'

TYPE LinkHead
            Num AS INTEGER
            FirstPtr AS LONG
            LastPtr AS LONG
            Pad AS STRING * 6
    END TYPE TYPE LinkNode
            ' holds the actual data, in this case the FC record # and its value
            Info AS RecValue
            Ptr AS LONG
    END TYPE ' Color Attributes
    COMMON SHARED Fg, Bg, Brdr, NormAttr, RevAttr ' Directories
    COMMON SHARED LstDir$, DocDir$, KeyDir$, NdxDir$ ' Temp variables
    COMMON SHARED NodeLEN%, NodeTemp AS LinkNode '$INCLUDE: '\\vadim\c-drive\user\include\const.bi'

'------------------------------------------------- Internal SUBs

DECLARE SUB AddNode (Head AS ANY, Info AS RecValue, StorageH AS INTEGER, FreePtr AS LONG)
    DECLARE SUB Config ()
    DECLARE SUB EmsAlloc (NumPgs%, Handle%)

'------------------------------------------------- External SUBs

DECLARE SUB EmsAllocMem (NumPages%, Handle%)
    DECLARE SUB EmsGet (SEG Value AS ANY, ElSize%, ElNum&, Handle%)
    DECLARE SUB EmsSet (SEG Value AS ANY, ElSize%, ElNum&, Handle%)
    DECLARE SUB EmsRelMem (Handle%)
    DECLARE SUB FClose (Handle%)
    DECLARE SUB FCreate (FileName$)
    DECLARE SUB FGetRT (Handle%, Destination AS ANY, RecNumber&, RecSize%)
    DECLARE SUB FOpen (FileName$, Handle%)
    DECLARE SUB FPutAH (FileName$, SEG Element AS ANY, ElSize%, NumEls%)
```

```
DECLARE SUB FPutT (Handle%, Source AS ANY, RecSize%)
DECLARE SUB QPrintRC (St$, Row%, Col%, Colr%)

'----------------------------------------------------- External FUNCTIONs

DECLARE FUNCTION EmsLoaded%
DECLARE FUNCTION EmsPagesFree%
DECLARE FUNCTION Exist% (FileName$)
DECLARE FUNCTION OneColor% (Fore%, Back%)
DECLARE FUNCTION FileSize& (FileName$)

'----------------------------------------------------- PROGRAM START

CALL Config

LoadFile$ = LstDir$ + "DICT.WRD"
DIM d AS DictType
NumKeys = FileSize&(LoadFile$) \ LEN(d)

DIM Freq63 AS FreqComp63
Freq63LEN = LEN(Freq63)

LoadFile$ = NdxDir$ + "RELATIVE.63"
NumFreqComp = FileSize&(LoadFile$) \ Freq63LEN
FOpen LoadFile$, FreqCompH%

REDIM LinkList(1 TO NumKeys) AS LinkHead

DIM Info AS RecValue
InfoLEN = LEN(Info)

NumPages = NodeLEN * CLNG(NumFreqComp) * 63 \ 16384 - 1
EmsAlloc NumPages, InvertDatEMS FreePtr& = 1

CLS

FOR i = 1 TO NumFreqComp

QPrintRC STR$(i) + " out of " + STR$(NumFreqComp), 10, 1, -1

FGetRT FreqCompH%, Freq63, CLNG(i), Freq63LEN

Info.Rec = Freq63.Code

FOR j = 1 TO Freq63.Num

Info.Value = Freq63.Value(j)

AddNode LinkList(Freq63.Comp(j)), Info, InvertDatEMS, FreePtr&

NEXT

NEXT

' close input file
FClose FreqCompH%

'--------------------------------------------------------
' start writing inverted file by traversing the linked list
'--------------------------------------------------------

CLS

REDIM Ndx(1 TO NumKeys) AS NdxType

FCreate NdxDir$ + "REL-INV.DAT"
FOpen NdxDir$ + "REL-INV.DAT", InvertDatFile

Index& = 1

FOR i = 1 TO NumKeys

QPrintRC STR$(i) + " " + STR$(LinkList(i).Num) + " ", 10, 1, -1

Ptr& = LinkList(i).FirstPtr

Ndx(i).Index = Index&
        Ndx(i).Num = LinkList(i).Num

DO WHILE Ptr&

EmsGet NodeTemp, NodeLEN, Ptr&, InvertDatEMS
                FPutT InvertDatFile, NodeTemp.Info, InfoLEN
                Ptr& = NodeTemp.Ptr

LOOP

Index& = Index& + Ndx(i).Num

NEXT

EmsRelMem InvertDatEMS

FClose InvertDatFile

FPutAH NdxDir$ + "REL-INV.NDX", Ndx(1), LEN(Ndx(1)), NumKeys

DATA "   Copyright 1990 by Ted M. Young.  ALL RIGHTS RESERVED.   "
```

```
SUB AddNode (Head AS LinkHead, Info AS RecValue, StorageH AS INTEGER, FreePtr AS LONG) STATIC IF Head.FirstPtr = NULL THEN Head.FirstPtr = FreePtr
        Head.LastPtr = FreePtr

ELSE

CALL EmsGet(NodeTemp, NodeLEN, Head.LastPtr, StorageH)
        NodeTemp.Ptr = FreePtr
        CALL EmsSet(NodeTemp, NodeLEN, Head.LastPtr, StorageH)

Head.LastPtr = FreePtr

END IF

Head.Num = Head.Num + 1

NodeTemp.Info = Info
NodeTemp.Ptr = NULL
CALL EmsSet(NodeTemp, NodeLEN, FreePtr, StorageH)

FreePtr = FreePtr + 1

END SUB

SUB Config STATIC

IF COMMAND$ <> "" THEN
        ConfigFile$ = COMMAND$ + ".CFG"
ELSE
        PRINT "No configuration file was given."
        PRINT "Press any key to continue."
        CALL Chime(6)
        DO: LOOP UNTIL LEN(INKEY$)
        END
END IF IF Exist%(ConfigFile$) THEN
        OPEN ConfigFile$ FOR INPUT AS #1
             INPUT #1, Fg, Bg, Brdr, LstDir$, DocDir$, NdxDir$, AbstrDir$
        CLOSE #1
ELSE
        CALL Chime(6)
        PRINT "Configuration file "; ConfigFile$; " Does not exist."
        PRINT "Press any key to continue."
        DO: LOOP UNTIL LEN(INKEY$)
        END
        END
END IF COLOR Fg, Bg, Brdr NormAttr = OneColor%(Fg, Bg)
RevAttr = OneColor%(Bg, Fg AND 7)

CLS
QPrintRC "REL-INV", 1, 36, -1
IF NOT EmsLoaded% THEN
        PRINT "No EMS!"
        CALL Chime(6)
        DO: LOOP UNTIL LEN(INKEY$)
        END
END IF NodeLEN = LEN(NodeTemp)

END SUB

SUB EmsAlloc (NumPgs%, Handle%) STATIC

IF EmsPagesFree% < NumPgs THEN
        CALL Chime(8)
        PRINT "Couldn't Allocate "; CLNG(NumPgs) * SixteenK; " bytes of EMS ("; NumPgs; " pages)."
        PRINT "Only "; EmsPagesFree%; " pages were available."
        STOP
ELSE
        EmsAllocMem NumPgs%, Handle%
END IF

END SUB

DEFINT A-Z

'POLYSEMY.BAS: Builds: PolySemy.Dat & PolyAvg
'              Uses  : Relative.63, Rel-InvS.Ndx, Rel-Inv.Dat
'nth Rec of PolySemy.Dat contains Poly Value of nth word calculated as follows:

'POLY FORMULA:
'------------
' PolySemy(Word) = LOG2( (1/600) * ( (Avg3 * (Avg3/Avg20) ) ^ 1.68 + (Avg6 * (Avg6/Avg63) ) ^ 1.8) * (5 ^ (NumWordsWhichAreRels/DocsWi 'New formula 5/28/92 EPG
' PolySemy(Word) = LOG2( (1/1000) * ( (Avg3 * (Avg3/Avg20) ) ^ 2.2 + (Avg6 * (Avg6/Avg63) ) ^ 2.2) * (4 ^ (NumWordsWhichAreRels/DocsWi
'     Equivalent formula=
' PolySemy(Word) = LOG2((Avg3*(Avg3/Avg20))^2.2+(Avg6*(Avg6/Avg63))^2.2)+LOG2(4)*(NumWordsWhichAreRels/DocsWithWord)-LOG2(1000)
' PolyAvg is average poly value 'New formula 6/1/92 VN
' PolySemy(Word) ={LOG2((Avg3*(Avg3/Avg20))^2.2+(Avg6*(Avg6/Avg63))^2.2)+1.8*(NumWordsWhichAreRels/DocsWithWord)-9)}*(DocsWithWord^(1/
```

```
'== New formula 8/19/92 TMY
'                                                /   Avg3          Avg6  \
' PolySemy(Word) = SQR( TotalRelValue / DocFreq ) x SQR( Avg3 * ----- + Avg6 * ----- )
'                                                \   Avg20         Avg63 /
'
'    TotRelVal is the sum of relative values from all relative lists
'    in which the word appears '$INCLUDE: '\\vadim\c-drive\user\include\types.bi'

TYPE PolyType
        Code AS INTEGER
        Value AS SINGLE
        Pad AS STRING * 2 '-- needed to make this type a ^2 for huge array
END TYPE '-- Color Attributes
COMMON SHARED Fg, Bg, Brdr, NormAttr, RevAttr '-- Common Temp Variables
COMMON SHARED Temp$, i%, j%, k%, l%, x%

'-- Common Constants
COMMON SHARED SixteenK, ThirtyTwoK&

'-- File Directories
COMMON SHARED LstDir$, DocDir$, KeyDir$, NdxDir$
COMMON SHARED DictWordEMS, RelInvDatEMS '$INCLUDE: '\\vadim\c-drive\user\include\const.bi'

'------------------------------------------------- Internal SUBs

DECLARE SUB Config ()
DECLARE SUB DispMsg (Msg$, r%, c%)
DECLARE SUB EmsAlloc (NumPgs%, Handle%, FileName$)
DECLARE SUB ReleaseEMS ()
DECLARE SUB WindMgr (ULRow%, ULCol%, LRRow%, LRCol%, Frame%, BoxColr%, TextColr%, Text$)

'------------------------------------------------- Internal FUNCTIONs

DECLARE FUNCTION Dict$ (Code%)
DECLARE FUNCTION Freq% (Array() AS NdxType, Tot%, Code%)
DECLARE FUNCTION LoadIntoEMS% (File$)

'------------------------------------------------- External Declares

'$INCLUDE: '\\vadim\c-drive\user\include\declares.bi'

'------------------------------------------------- PROGRAM START

CALL Config
QPrintRC "POLYSEMY", 1, 35, -1

'$$$keyword-flag$$$ "Last Author: %w  Revision: %v  Date: %f"
CONST Version$ = "Last Author: TED  Revision: 17  Date: 21-Aug-92,15:32:18"

Col = (80 - LEN(Version$)) \ 2
QPrintRC Version$, 2, Col, -1

'-- Load in Code-->Word dictionary directly into EMS

LoadFILE$ = LstDir$ + "DICT.WRD"
DictWordEMS = LoadIntoEMS(LoadFILE$)

'-- Load in REL-INV.DAT

LoadFILE$ = NdxDir$ + "REL-INV.DAT"
RelInvDatEMS = LoadIntoEMS(LoadFILE$)
DIM RelInvDat AS RecValue
RelInvDatLEN = LEN(RelInvDat)

'-- keyword inverted file index (which holds the keyword code and
'        the number of documents in which it appears [DocFreq])
LoadFILE$ = NdxDir$ + "KYINVERT.NDX"
DIM NdxTemp AS NdxType '-- get the number of keywords
IF Exist(LoadFILE$) THEN
        NumKey = FileSize&(LoadFILE$) \ LEN(NdxTemp)
ELSE
        PRINT LoadFILE$; " was not found."
        ReleaseEMS
        END
END IF '-- dimension array to hold the inverted index info
REDIM Ndx(1 TO NumKey) AS NdxType '-- load the file into the array
CALL FGetAH(LoadFILE$, Ndx(1), LEN(NdxTemp), NumKey)

DIM Rel AS FreqComp63
RelLEN = LEN(Rel)

LoadFILE$ = NdxDir$ + "RELATIVE.63"
NumRel = FileSize&(LoadFILE$) \ RelLEN
CALL FOpen(LoadFILE$, RelativeFile)

'** DIM RelInvNdx AS NdxType
```

```
REDIM RelInvNdx(1 TO NumRel) AS SmallNdxType
LoadFILE$ = NdxDir$ + "REL-INVs.NDX"

'** CALL FOpen(LoadFILE$, RelInvNdxFile)

'-- load the file into the array
FGetAH LoadFILE$, RelInvNdx(1), LEN(RelInvNdx(1)), NumRel

CLS

PRINT "Processing"; NumRel; " words..."

QPrintRC "First Pass Polyvalues:", 10, 1, -1
QPrintRC "Second Pass, Final Polyvalues:", 11, 1, -1

QPrintRC "Printing Pass, writing to disk:", 12, 1, -1

REDIM PolySemy(1 TO NumRel) AS PolyType
REDIM PolySemyOrig(1 TO NumRel) AS SINGLE
REDIM TotRelValue(1 TO NumRel) AS INTEGER FOR i = 1 TO NumRel CALL QPrintRC(STR$(i), 10, 23, -1)

CALL FGetRT(RelativeFile, Rel, CLNG(i), RelLEN)

PolySemy(i).Code = i
        PolySemy(i).Value = 0
        PolySemyOrig(i) = 0

IF Rel.Num > 0 THEN ' calculate it, otherwise skip it

Sum = 0

Avg3! = 0: Avg6! = 0: Avg20! = 0: Avg63! = 0

FOR j = 1 TO 63

IF j <= Rel.Num THEN
                                Code = Rel.Comp(j)
                                '** Fq = Ndx(Code).Num '** Not used?
                                Value = ASC(Rel.Value(j))
                        ELSE
                                Value = 0
                        END IF Sum = Sum + Value
                        SELECT CASE j
                                CASE 3
                                        Avg3! = Sum / 3
                                CASE 6
                                        Avg6! = Sum / 6
                                CASE 20
                                        Avg20! = Sum / 20
                                CASE 63
                                        Avg63! = Sum / 63
                                CASE ELSE
                        END SELECT

NEXT

IF Avg63! > 0 AND Avg20! > 0 ThEN
                        '-- SQR is the same as ^ .5
                        Poly! = SQR(Avg3! * (Avg3! / Avg20!) + Avg6! * (Avg6! / Avg63!))
                ELSE
                        Poly! = 0
                END IF PolySemy(i).Value = Poly!
                PolySemyOrig(i) = Poly!

END IF

IF INKEY$ = CHR$(27) THEN
                INPUT "Exit?", yn$
                IF UCASE$(LEFT$(yn$, 1)) = "Y" THEN EXIT FOR
        END IF

NEXT

CALL FClose(RelativeFile)

'================================================================

DIM PolyValue AS PolyValueType

OPEN NdxDir$ + "POLYSEMY.DAT" FOR RANDOM AS 1 LEN = LEN(PolyValue)

Log2! = LOG(2)
Log4! = LOG(4)
Log1000! = LOG(1000)

AvgPoly! = 0

FOR i = 1 TO NumRel

CALL QPrintRC(STR$(i), 11, 31, -1)

IF PolySemy(i).Value > 0 THEN

'** FGetRT RelInvNdxFile, RelInvNdx, CLNG(i), LEN(RelInvNdx)
                PolyFreq = Ndx(i).Num
```

```
'                PolyValue.Value = PolySemy(i).Value * ((RelInvNdx.Num / PolyFreq) ^ 4)
'       changed 3/12/92 VN
'                PolyValue.Value = PolySemy(i).Value / 20 * (5 ^ (RelInvNdx.Num / PolyFreq))
'       changed 3/17/92 VN
'                PolyValue.Value = LOG(PolySemy(i).Value)
'                IF RelInvNdx.Num > 0 THEN PolyTemp! = RelInvNdx(i).Num / PolyFreq '                ELSE
'                   polytemp! = 0
'                END IF
'                PolyValue.Value = PolyValue.Value + Log4! * polytemp! - Log1000!
'                PolyValue.Value = PolyValue.Value / Log2!
'**     Changed 6/01/92 VN
'**         IF RelInvNdx(i).Num > 0 THEN
'**             PolyTemp! = (RelInvNdx(i).Num / PolyFreq) ^ .7
'**         ELSE
'**             PolyTemp! = .1
'**         END IF '==== new calculation method 8/19/92 - TMY
                '-- TotRelVal is the sum of relative values from all relative lists
                '    in which the word appears
                TotRelVal& = 0
                FOR j& = RelInvNdx(i).Index TO RelInvNdx(i).Index + RelInvNdx(i).Num - 1
                        EmsGet RelInvDat, RelInvDatLEN, j&, RelInvDatEMS
                        TotRelVal& = TotRelVal& + ASC(RelInvDat.Value)
                NEXT Temp& = TotRelVal& AND &HFFFF&
                IF Temp& < 32768 THEN
                        TotRelValue(i) = Temp&
                ELSE
                        TotRelValue(i) = Temp& - 65536
                END IF
                IF TotRelVal& > 0 THEN
                        '-- changed 8/21/92: PolyFreq is now PolyFreq ^ 1.2
                        PolyTemp! = SQR(TotRelVal& / PolyFreq ^ 1.2)
                ELSE
                        PolyTemp! = .1
                END IF
                PolyValue.Value = PolyTemp! * PolySemy(i).Value
                IF PolyValue.Value < .4 THEN PolyValue.Value = .4
                PolySemy(i).Value = PolyValue.Value AvgPoly! = AvgPoly! + PolyValue.Value

ELSE

PolyValue.Value = 0

END IF

PUT #1, i, PolyValue

NEXT
AvgPoly! = AvgPoly! / NumRel

CLOSE #1
OPEN NdxDir$ + "PolyAvg.dat" FOR OUTPUT AS #1
        PRINT #1, AvgPoly!
CLOSE #1

'================================================================

IF INKEY$ = CHR$(27) GOTO PolySemyDone

SortT PolySemy(1), NumRel, DESCEND, LEN(PolySemy(1)), 2, -3

OPEN LstDir$ + "PolySemy.LST" FOR OUTPUT AS 1

PRINT #1, "New Value Freq  #RelList TotRelVal Rel/Freq OrigPoly Code  Word/Phrase"
'          "###.##### #####   #####    #####  ###.### ####.### ##### &"

'PRINT #1, "PolyValue Word/Phrase"
'          "###.##### &"

FOR i = 1 TO NumRel

CALL QPrintRC(STR$(i), 12, 32, -1)

PolyFreq = Ndx(PolySemy(i).Code).Num

IF PolySemy(i).Value > 0 AND PolyFreq > 3 THEN

'** FGetRT RelInvNdxFile, RelInvNdx, CLNG(PolySemy(i).Code), LEN(RelInvNdx)

'PRINT #1, USING "###.##### &"; PolySemy(i).Value; Dict$(PolySemy(i).Code)
                TotRelVal& = TotRelValue(PolySemy(i).Code)
                IF TotRelVal& < 0 THEN TotRelVal& = TotRelVal& + 65536
                PRINT #1, USING "###.##### #####    #####    ##### ###.### ####.### ##### &"; PolySemy(i).Value; PolyFreq; RelInvNdx Code; Dict$(PolySemy(i).Code)

END IF

NEXT

CLOSE 1

PolySemyDone:
```

```
'** FClose RelInvNdxFile

CALL ReleaseEMS

DATA "   Copyright 1990 by Ted M. Young.  ALL RIGHTS RESERVED.   "

SUB Config STATIC

CLS

IF COMMAND$ <> "" THEN
        ConfigFile$ = COMMAND$ + ".CFG"
ELSE
        PRINT "No Configuration file indicated."
        PRINT "Press any key to continue."
        CALL Chime(10)
        DO: LOOP UNTIL LEN(INKEY$)
        END
END IF IF Exist%(ConfigFile$) THEN
        OPEN ConfigFile$ FOR INPUT AS #1
                INPUT #1, Fg, Bg, Brdr, LstDir$, DocDir$, NdxDir$, AbstrDir$
        CLOSE #1
ELSE
        CALL Chime(9)
        PRINT "Configuration file "; ConfigFile$; " Does not exist."
        PRINT "Press any key to continue."
        DO: LOOP UNTIL LEN(INKEY$)
        END
END IF COLOR Fg, Bg, Brdr NormAttr = OneColor%(Fg, Bg)
RevAttr = OneColor%(Bg, Fg AND 7)

IF NOT EmsLoaded% THEN
        PRINT "No EMS!"
        CALL Chime(9)
        END
END IF SixteenK = 16384
ThirtyTwoK& = SixteenK * 2&

END SUB

FUNCTION Dict$ (Code%) STATIC

DIM DictTemp AS DictType
CALL EmsGet1El(SEG DictTemp, LEN(DictTemp), Code%, DictWordEMS)
Dict$ = RTRIM$(DictTemp.Str)

END FUNCTION

SUB DispMsg (Msg$, r, c) STATIC
STATIC WindOpen, Scr%()  ' is there already a message displayed?
SHARED Fg, Bg IF LEN(Msg$) = 0 AND WindOpen THEN GOSUB MsgClose: EXIT SUB
IF WindOpen THEN
        CALL Chime(9)
        OPEN "DEBUG" FOR OUTPUT AS #9
        PRINT #9, "WindOpen="; WindOpen; HEX$(WindOpen)
        PRINT #9, "Msg$= |"; Msg$; "|"
        PRINT #9, "TRUE="; TRUE; HEX$(TRUE)
        PRINT #9, "FALSE="; FALSE; HEX$(FALSE)
        CLOSE #9
        CALL Chime(8)
        CLS
        END
        WHILE LEN(INKEY$) = 0: WEND
        GOSUB MsgClose
END IF Wid = LEN(Msg$)
IF Wid > 50 THEN Wid = 50

Msg$ = Msg$ + "."' make sure there's a space to find at the end (see below)

MaxLin = LEN(Msg$) \ Wid + 3
IF MaxLin > 23 THEN MaxLin = 23
REDIM Text$(MaxLin)
Lin = 0
DO
        Lin = Lin + 1' incr current lin # (also element in text display array)
        lastspc = QInstrB%(Wid + 1, Msg$, " ")' look for the last space so we can word wrap
        Text$(Lin) = LEFT$(Msg$, lastspc - 1)
        Msg$ = MID$(Msg$, lastspc + 1)'remove portion of string that's in t$
LOOP WHILE LEN(Msg$) > Wid Msg$ = RTRIM$(Msg$)
IF LEN(Msg$) THEN
        Lin = Lin + 1
        Text$(Lin) = Msg$
END IF IF r <> 0 AND c = 0 THEN
        ULr = r
```

```
        ELSE
                ULr = 9
        END IF
                DULr = ULr - 1
                LRr = ULr + Lin + 1
                DLRr = LRr + 2 horizmargin = (80 - Wid) \ 2
                ULc = horizmargin
                DULc = ULc - 3
                LRc = 80 - horizmargin
                IF (Wid \ 2) * 2 = Wid THEN LRc = LRc + 1' if it's even WIDth, then bump up the LRcolumn
                DLRc = LRc + 1

REDIM Scr%(ArraySize%(DULr, DULc, DLRr, DLRc))
CALL ScrnSave0(DULr, DULc, DLRr, DLRc, SEG Scr%(0))
CALL WindMgr(ULr, ULc, LRr, LRc, 4, NormAttr, RevAttr, "Status")
FOR i = 1 TO Lin
        CALL QPrintRC(Text$(i), ULr + i, ULc + 1, -1)
NEXT r = ULr + Lin
c = ULc + 1 + LEN(Text$(Lin))
IF LEN(Text$(Lin)) + 2 = Wid THEN c = ULc + 1: r = r + 1

ERASE Text$
WindOpen = TRUE

EXIT SUB
'----------------------------------------------------------- close window
MsgClose:

CALL ScrnRest0(DULr, DULc, DLRr, DLRc, SEG Scr%(0))
ERASE Scr%
WindOpen = FALSE
RETURN

END SUB

SUB EmsAlloc (NumPgs%, Handle%, FileName$) STATIC

IF EmsPagesFree% < NumPgs THEN
        CALL Chime(8)
        PRINT "Couldn't Allocate "; CLNG(NumPgs) * SixteenK; " bytes of EMS ("; NumPgs; " pages) for "; FileName$
        PRINT "Only "; EmsPagesFree%; " pages were available."
        CALL ReleaseEMS
        STOP
ELSE
        CALL EmsAllocMem(NumPgs%, Handle%)
END IF

END SUB

FUNCTION LoadIntoEMS (File$) STATIC

'--------- Returns the EMS handle where the file was loaded into ---------

EMSPg = EmsGetPFSeg%
SizeofFile& = FileSize&(File$)

NumPages = SizeofFile& \ SixteenK + 2' round off to nearest 2 pages
EmsAlloc NumPages, FileEMS, File$ Num32kBlocks = SizeofFile& \ ThirtyTwoK&
LeftOver& = SizeofFile& - (Num32kBlocks * ThirtyTwoK&)
FOpenAll File$, 0, 4, LoadFILE
Box0 14, 8, 18, 72, 2, RevAttr
PaintBox0 14, 8, 18, 72, RevAttr
FOR i = 1 TO Num32kBlocks + 1

QPrintRC "Loading " + File$ + " block" + STR$(i) + " /" + STR$(Num32kBlocks - 1) + " ", 16, 10, RevAttr '-- map pages of the EMS memory to the EMS upper mem page frame
        FOR j = 1 TO 2
                EmsMapMem FileEMS, j, (i - 1) * 2 + j
                IF EmsError% THEN PRINT "Ems error:"; EmsError%: STOP
        NEXT '-- seek to beginning of current block
        FSeek LoadFILE, (i - 1) * ThirtyTwoK&

IF DOSError% THEN PRINT "Dos Error:"; WhichError%: STOP

IF i < Num32kBlocks + 1 THEN

'-- get the 32k block and put it directly into the EMS page frame
                FGetA LoadFILE, BYVAL EMSPg, BYVAL 0, ThirtyTwoK&

IF DOSError% THEN PRINT "Dos Error:"; ErrorMsg$(WhichError%): STOP

ELSE

'-- load the left over (<32k) bytes
                FGetA LoadFILE, BYVAL EMSPg, BYVAL 0, LeftOver&

IF DOSError% THEN PRINT "Dos Error:"; ErrorMsg$(WhichError%): STOP

END IF
NEXT
```

```
FClose LoadFILE

ClearScr0 14, 8, 18, 72, NormAttr

LoadIntoEMS = FileEMS

END FUNCTION

SUB ReleaseEMS STATIC

IF DictWordEMS THEN CALL EmsRelMem(DictWordEMS)
IF RelInvDatEMS THEN CALL EmsRelMem(RelInvDatEMS)

END SUB

SUB WindMgr (ULRow, ULCol, LRRow, LRCol, Frame, BoxColr, TextColr, Text$) STATIC CALL Box0(ULRow - 1, ULCol - 1, LRRow + 1, LRCol + 1, Frame, BoxColr)
CALL ClearScr0(ULRow, ULCol, LRRow, LRCol, BoxColr)
CALL QPrintRC("[" + Text$ + "]", ULRow - 1, ULCol + 1, TextColr)

END SUB

DEFINT A-Z

' ===========
'  NEWKEY.BAS
' ===========

'Invoked: NEWKEY ConfigFile

'Creates: NewKey.Ndx, NewVal.Ndx

'Uses: Key.Ndx, Weight.Ndx, PolySemy.Dat, KyInvrts.Ndx

'-- NewVal.Ndx contains new weights for Doc n sorted by a new weight
'    where NewWeight = Weight * (Poly ^ .125)

'  TYPE WeightAvgNdx127
'      Weight(1 TO 127) AS SINGLE
'      Mult AS SINGLE
'  Mult is used to vary the number of sentences in the abstract program '-- NewKey.Ndx contains the corresponding codes for Doc n
'    i.e., sorted by their new weights '  TYPE KeyNdx127
'      Num AS INTEGER
'      Code(1 TO 127) AS INTEGER '$INCLUDE: '\\vadim\c-drive\USER\INCLUDE\TYPES.BI'
'$INCLUDE: '\\vadim\c-drive\USER\INCLUDE\DECLARES.BI'

TYPE ValCodeType
        Value AS SINGLE
        Code AS INTEGER
END TYPE

'TYPE MultType
'   Code AS INTEGER
'   Num AS INTEGER
'END TYPE

CONST FALSE = 0, TRUE = NOT FALSE

DECLARE FUNCTION LoadIntoEMS% (File$, NoEMSFlag%)
DECLARE SUB NewKey ()
DECLARE SUB Config ()
DECLARE SUB EmsAlloc (NumPages%, Handle%, LoadFILE$)
DECLARE SUB LoadData ()
DECLARE SUB ReleaseEMS ()

'------------------- COMMON SHARED Variables/Arrays -------------------

' Color Attributes
COMMON SHARED Fg, Bg, Brdr, NormAttr, RevAttr

' Constants
COMMON SHARED ThirtyTwoK&, SixtyFour, SixteenK, sing, Comb, BlankBit$ ' Directories
COMMON SHARED NdxDir$, DocDir$, KeyDir$, LstDir$, AbstrDir$ ' Data file sizes and EMS handles COMMON SHARED KeyNdxFILE
COMMON SHARED PolysemyEMS, PolyValue AS PolyValueType, PolyLen
COMMON SHARED KeyEMS, WeightEMS, PolyEMS
COMMON SHARED KeyFile, WeightFile, PolyFile
COMMON SHARED WeightTemp AS WeightNdx127, WeightLen
COMMON SHARED KeyTemp AS KeyNdx127, KeyLen
COMMON SHARED ValArray AS WeightAvgNdx127, ValLen
COMMON SHARED LenTemp, NewKeyFile, NewValueFile, NewValueEMS
COMMON SHARED PolyNoEMSFlag, KeyNoEMSFlag, WeightNoEMSFlag
'----------- MAIN MODULE -------------------------------------------

CALL Config
ValLen = LEN(ValArray)
CALL LoadData
```

```
File$ = NdxDir$ + "NewKey.ndx"
FOpenAll File$, 1, 4, NewKeyFile
'-- if the file wasn't there, create it
IF NewKeyFile = -1 THEN
        FCreate File$
        FOpenAll File$, 1, 4, NewKeyFile
END IF File$ = NdxDir$ + "NewVal.ndx"
FOpenAll File$, 1, 4, NewValueFile
'-- if the file wasn't there, create it
IF NewValueFile = -1 THEN
        FCreate File$
        FOpenAll File$, 1, 4, NewValueFile
END IF QPrintRC "NEWKEY IS WORKING", 2, 30, -1

CALL NewKey
CALL ReleaseEMS

END

SUB Config STATIC

IF COMMAND$ <> "" THEN
                ConfigFile$ = COMMAND$
                SpcLoc = INSTR(ConfigFile$, " ")
                IF SpcLoc THEN ConfigFile$ = LEFT$(ConfigFile$, SpcLoc - 1)
                ConfigFile$ = ConfigFile$ + ".CFG"
        ELSE
                Chime 5
                PRINT "Usage NEWKEY [dataname]."
                STOP
        END IF IF NOT Exist(ConfigFile$) THEN
                PRINT ConfigFile$; " was not found."
                PRINT "Press any key to continue."
                DO: LOOP UNTIL LEN(INKEY$)
                END
        END IF
        OPEN ConfigFile$ FOR INPUT AS #1
                        INPUT #1, Fg, Bg, Brdr, LstDir$, DocDir$, NdxDir$, AbstrDir$, Lang$
        CLOSE #1

NormAttr = OneColor%(Fg, Bg)
RevAttr = OneColor%(Bg, Fg AND 7)
SixteenK = 16384
ThirtyTwoK& = SixteenK *.2&
CLS IF NOT EmsLoaded% THEN
        Chime 8
        PRINT "The EMS has not been loaded."
        STOP
END IF
END SUB SUB EmsAlloc (NumPages%, Handle%, LoadFILE$) STATIC CALL EmsAllocMem(NumPages%, Handle%)
IF EmsError% THEN
        PRINT "Couldn't allocate"; CLNG(NumPages) * SixteenK; "bytes of EMS for "; LoadFILE$
        PRINT "Use disk space."
        Handle = 0

END IF

END SUB

SUB LoadData STATIC

'---- Load Weight.Ndx into EMS
File$ = NdxDir$ + "WEIGHT.NDX"
IF NOT Exist%(File$) THEN
        CLS
        PRINT File$; " not found."
        CALL ReleaseEMS
        STOP
END IF
WeightLen = LEN(WeightTemp)
WeightEMS = LoadIntoEMS(File$, WeightNoEMSFlag)
IF WeightNoEMSFlag THEN  'use disk
        FOpenAll File$, 0, 4, WeightFile
END IF '---- Load Key.Ndx into EMS
File$ = NdxDir$ + "KEY.NDX"
IF NOT Exist%(File$) THEN
        CLS
        PRINT File$; " not found."
        CALL ReleaseEMS
        STOP
END IF
KeyLen = LEN(KeyTemp)
KeyEMS = LoadIntoEMS(File$, KeyNoEMSFlag)
IF KeyNoEMSFlag THEN
                FOpenAll File$, 0, 4, KeyFile
END IF
```

```
'---- Load PolySemy.DAT into EMS
FileS = NdxDirS + "POLYSEMY.DAT"
IF NOT Exist%(FileS) THEN
        CLS
        PRINT FileS; " not found."
        CALL ReleaseEMS
        STOP
END IF
DIM PolyVal AS PolyValueType
PolyLen = LEN(PolyVal)
PolyEMS = LoadIntoEMS(FileS, PolyNoEMSFlag)
IF PolyNoEMSFlag THEN
                FOpenAll FileS, 0, 4, PolyFile
END IF 'NumDoc& = FileSize&(NdxDirS + "KEY.NDX") / KeyLen
'NumPages = NumDoc& * CLNG(ValLen) \ SixteenK + 2' round off to nearest 2 pages
'EmsAlloc NumPages, NewValueEMS, "NewVal.Ndx"
'FOpenAll FileS, 0, 4, NewValueEMS
END SUB FUNCTION LoadIntoEMS (FileS, NoEMSFlag) STATIC '-------- Returns the handle where the file was loaded into --------
NoEMSFlag = FALSE
EMSPg = EmsGetPFSeg%
SizeofFile& = FileSize&(FileS)

NumPages = SizeofFile& \ SixteenK + 2' round off to nearest 2 pages
EmsAlloc NumPages, FileEMS, FileS
IF FileEMS = 0 THEN 'not enough EMS use disk instead
        NoEMSFlag = TRUE
        EXIT FUNCTION
END IF
Num32kBlocks = SizeofFile& \ ThirtyTwoK&
LeftOver& = SizeofFile& - (Num32kBlocks * ThirtyTwoK&)
FOpenAll FileS, 0, 4, LoadFILE
FOR i = 1 TO Num32kBlocks + 1
        BoxO 11, 5, 15, 70, 2, RevAttr
        'PaintBoxO 11, 5, 15, 70, RevAttr
        QPrintRC "Loading " + FileS + " block" + STR$(i) + " /" + STR$(Num32kBlocks + 1), 13, 12, RevAttr '-- map pages of the EMS memory to the EMS upper mem page frame
        FOR j = 1 TO 2
                EmsMapMem FileEMS, j, (i - 1) * 2 + j
                IF EmsError% THEN PRINT "Ems error:"; EmsError%: STOP
        NEXT
        '-- seek to beginning of current block
        FSeek LoadFILE, (i - 1) * ThirtyTwoK&
        IF DOSError% THEN PRINT "Dos Error:"; WhichError%: STOP
        IF i < Num32kBlocks + 1 THEN
                '-- get the 32k block and put it directly into the EMS page frame
                FGetA LoadFILE, BYVAL EMSPg, BYVAL 0, ThirtyTwoK&

IF DOSError% THEN PRINT "Dos Error:"; WhichError%: STOP

ELSE
                '-- Load the left over (<32k) bytes
                FGetA LoadFILE, BYVAL EMSPg, BYVAL 0, LeftOver&
                IF DOSError% THEN PRINT "Dos Error:"; WhichError%: STOP

END IF
NEXT

FClose LoadFILE

CLS

LoadIntoEMS = FileEMS

END FUNCTION

SUB NewKey STATIC

REDIM AvgRatio!(1 TO 127)

AvgW30! = 0

DocNum& = FileSize&(NdxDirS + "Key.ndx") \ LEN(KeyTemp)
FOR RecNum& = 1 TO DocNum&

QPrintRC "Document #" + STR$(RecNum&), 10, 30, -1
        IF KeyNoEMSFlag THEN
                FGetRT KeyFile, KeyTemp, RecNum&, KeyLen
        ELSE
                EmsGet KeyTemp, KeyLen, RecNum&, KeyEMS
        END IF IF WeightNoEMSFlag THEN
                FGetRT WeightFile, WeightTemp, RecNum&, WeightLen
        ELSE
                EmsGet WeightTemp, WeightLen, RecNum&, WeightEMS
        END IF IF KeyTemp.Num = 0 THEN KeyTemp.Num = 127

REDIM TempArray(1 TO KeyTemp.Num) AS ValCodeType

FOR i = 1 TO KeyTemp.Num
                IF PolyNoEMSFlag THEN
                        FGetRT PolyFile, PolyValue, CLNG(KeyTemp.Code(i)), PolyLen
```

```
            ELSE
                    EmsGet PolyValue, PolyLen, CLNG(KeyTemp.Code(i)), PolyEMS
            END IF
            TempArray(i).Value = WeightTemp.Weight(i) * PolyValue.Value ^ .125   '(i.e. ^1/8)
            TempArray(i).Code = KeyTemp.Code(i)
    NEXT SortT TempArray(1), KeyTemp.Num, 1, LEN(TempArray(1)), 0, -3

KeyTemp.Num = KeyTemp.Num
    FOR k = 1 TO KeyTemp.Num
            KeyTemp.Code(k) = TempArray(k).Code
            ValArray.Weight(k) = TempArray(k).Value
    NEXT FOR f = k TO 127
            KeyTemp.Code(f) = 0
            ValArray.Weight(f) = 0
    NEXT ValArray.Mult = 1

FPutRT NewValueFile, ValArray, RecNum&, ValLen
    FPutRT NewKeyFile, KeyTemp, RecNum&, KeyLen

IF INKEY$ = CHR$(27) THEN EXIT SUB

NEXT 'document

CLS
PRINT "Everything is OK"
CALL ReleaseEMS
FClose NewKeyFile
FClose NewValueFile

END SUB

SUB ReleaseEMS STATIC

IF KeyEMS THEN EmsRelMem KeyEMS
IF WeightEMS THEN EmsRelMem WeightEMS
IF PolyEMS THEN EmsRelMem PolyEMS
IF KeyFile THEN FClose KeyEMS
IF WeightFile THEN FClose WeightEMS
IF PolyFile THEN FClose PolyFile

END SUB

DEFINT A-Z
'CHANGEFL.BAS
'Invoked changefl ConfigFile
'Creates: KyInvrts.Ndx, Rel-Invs.Ndx
'  TYPE SmallNdxType
'      Index AS LONG
'      Num AS INTEGER
'Uses: KyInvert.Ndx, RelInv.Ndx
'  TYPE NdxType
'      Code AS INTEGER
'      Index AS LONG
'      Num AS INTEGER
'makes copies of KyInvert.Ndx & Rel-Inv.Ndx without the Code field '$INCLUDE: '\USER\INCLUDE\TYPES.BI'
'$INCLUDE: '\USER\INCLUDE\dECLARES.BI'
        IF COMMAND$ <> "" THEN
                ConfigFile$ = COMMAND$
                SpcLoc = INSTR(ConfigFile$, " ")
                IF SpcLoc THEN ConfigFile$ = LEFT$(ConfigFile$, SpcLoc - 1)
                ConfigFile$ = ConfigFile$ + ".CFG"
        ELSE
                Chime 5
                PRINT "Usage CHANGEFL [dataname]."
                END
        END IF OPEN ConfigFile$ FOR INPUT AS #1
                      INPUT #1, Fg, Bg, Brdr, LstDir$, DocDir$, NdxDir$, AbstrDir$, Lang$
        CLOSE #1
QPrintRC "CHANGEFL", 1, 37, -1
file$ = NdxDir$ + "REL-INV.NDX"
IF NOT Exist%(file$) THEN
        CLS
        PRINT file$; " was not found."
        END
END IF
NdxLEN = 8
FreqCompNum = FileSize&(file$) \ NdxLEN
REDIM TempFCIndx(1 TO FreqCompNum) AS NdxType
DIM FCIndx AS SmallNdxType
FGetAH file$, TempFCIndx(1), NdxLEN, FreqCompNum
CLS
OPEN NdxDir$ + "Rel-InvS.NDX" FOR RANDOM AS #1 LEN = 6

FOR i = 1 TO FreqCompNum
        FCIndx.Index = TempFCIndx(i).Index
        FCIndx.Num = TempFCIndx(i).Num
        LOCATE 10, 25
        PRINT i
        PUT #1, i, FCIndx
NEXT
ERASE TempFCIndx
CLOSE #1
```

' Load the Inverted Data Files

```
file$ = NdxDir$ + "KYINVERT.NDX"
IF NOT Exist%(file$) THEN
        CLS
        PRINT file$; " was not found."
        END
END IF
NumKeys = FileSize&(file$) \ NdxLEN
REDIM TempKYIndx(1 TO NumKeys) AS NdxType
FGetAH file$, SEG TempKYIndx(1), NdxLEN, NumKeys
DIM KYIndx  AS SmallNdxType
OPEN NdxDir$ + "KYINVRTS.NDX" FOR RANDOM AS #1 LEN = 6
FOR i = 1 TO NumKeys
        KYIndx.Index = TempKYIndx(i).Index
        KYIndx.Num = TempKYIndx(i).Num
        LOCATE 10, 25
        PRINT i
        PUT #1, i, KYIndx
NEXT
ERASE TempKYIndx
CLS
CLOSE #1
END DEFINT A-Z
'$INCLUDE: '\USER\INCLUDE\TYPES.BI'
'$INCLUDE: '\USER\INCLUDE\DECLARES.BI'

CONST MaxText = 2500, ASC0 = 48, ASC9 = 57, FALSE = 0, TRUE = NOT FALSE
CONST SixteenK = 16384, ThirtyTwoK& = 32768

TYPE WrdLen
        Wrd AS INTEGER
        Len AS INTEGER
END TYPE

DECLARE FUNCTION GetSentValue! (SentNum, NumWord, Value AS WeightAvgNdx127, KeyTemp AS KeyNdx127)
DECLARE FUNCTION InstrTbl% (Start%, Source$, Char$)
DECLARE FUNCTION LoadIntoEMS% (File$)
DECLARE FUNCTION ExtractWord$ (Source$, Char$, Start%)
DECLARE SUB ChangeChar (Txt$, KeepStr$)
DECLARE SUB Config (Machine$, Beg&, Fin&)
DECLARE SUB Chopping (Best)
DECLARE SUB CutSentence (BestSent, Sent$, NumWord)
DECLARE SUB DictSortSearch (KeyTemp AS KeyNdx127, KeepNum, SingList() AS WordCode, CombList() AS WordCode)
DECLARE SUB DosErrHandler ()
DECLARE SUB ExtractDoc (DocNum&, TotSentNum%, Handle%, NoTextFlag)
DECLARE SUB ExtractFullText (TxtEMS%, FullEMS%)
DECLARE SUB ExtractSent (SentNum%, Sent$, LenSen%, Handle%)
DECLARE SUB ExtractWordNum (Source$, WordNum%, Start%, Slen%)
DECLARE SUB EmsAlloc (NumPages%, Handle%, LoadFILE$)
DECLARE SUB FillScrn0 (UL, LC, BL, RC, Colr, Char)
DECLARE SUB FindCombKey (WordList$(), NumWord%, NumKeyWordFound%, SentNum, NumKey, CombList() AS WordCode)
DECLARE SUB FindSingKey (WordList$(), NumWord%, NumKeyWordFound%, SentNum, NumKey, SingList() AS WordCode)
DECLARE SUB GetKWList (DocNum&, SingList() AS WordCode, CombList() AS WordCode, KeyTemp AS KeyNdx127)
DECLARE SUB LoadData ()
DECLARE SUB Rank (BestSent, NoMoreFlag, NumKeyWords(), NumWord(), Value AS WeightAvgNdx127, KeyTemp AS KeyNdx127)
DECLARE SUB ReadEnglishText (FirstLine&, LastLine&, Handle%, TotSentNum%)
DECLARE SUB ReadGermanText (FirstLine&, LastLine&, Handle%, TotSentNum%)
DECLARE SUB ReleaseEMS ()
DECLARE SUB ReadSection (Txt$, SecArray$(), ArtArray$())
DECLARE SUB WordParse (Sent$, LenSen, SentNum%, WordList$(), Words%)
DECLARE SUB WriteSentence (Sent$, Best, AbstrPos&)

'--------------- COMMON SHARED Variables/Arrays------------------

COMMON SHARED Fg, Bg, Brdr, NormAttr, RevAttr
COMMON SHARED LstDir$, NdxDir$, DocDir$, AbstrDir$, AtList$, Lang$
COMMON SHARED DictCodeNum%, DictCodeH%, KeyEMS, ValueEMS, NumComb, NumSing
COMMON SHARED DocNdxFile, DocFile, AbstrNdxFile, AbstrFile, TextNum&
COMMON SHARED KeyWordFoundNdx() AS WordNdxType, KeyWordFound() AS ListType
COMMON SHARED SentNdx() AS SentNdxType, TextArray() AS TextType, TotSentNum
COMMON SHARED KeepNoNumbers$, Keep$, Abbrev1$(), Noise$(), AbbrevEngl$()
COMMON SHARED Section$(), Article$(), Paragraph$(), Artikel$(), Numbers$()
COMMON SHARED MeanPrefixes$(), Prefixes$()
'------------MAIN MODULE--------------------------------------

CALL Config(Machine$, Beg&, Fin&)

CALL LoadData
File$ = DocDir$ + ".NDX"
FOpenAll File$, 0, 2, DocNdxFile
File$ = DocDir$ + ".TXT"
FOpenAll File$, 0, 2, DocFile
File$ = AbstrDir$ + ".ND" + Machine$
FCreate File$
FOpenAll File$, 1, 4, AbstrNdxFile
File$ = AbstrDir$ + ".TX" + Machine$
FCreate File$
FOpenAll File$, 1, 4, AbstrFile CountAll& = FileSize&(DocDir$ + ".NDX") \ 8' number of records (i.e., files)

'ON ERROR GOTO ErrorHandler

DIM Abstr AS ISAMtype
LenAbstr = LEN(Abstr)
AbstrPos& = 1
a11# = TIMER
```

```
FOR DocNum& = Beg& TO Fin& 'CountALL&    '-- IN REAL PROGRAMM TO CountALL&
        PRINT FRE("")
        NumKey = 0
        CALL ExtractDoc(DocNum&, TotSentNum, TxtEMS%, NoTextFlag)
        IF NoTextFlag THEN NoTextFlag = FALSE: GOTO NextDoc'if no text in ndx file for such doc. num.(doc. 3291 in west)
        REDIM NumWord(1 TO TotSentNum)
        REDIM NumKeyWords(1 TO TotSentNum)
        REDIM KeyWordFoundNdx(1 TO TotSentNum) AS WordNdxType
        REDIM KeyWordFound(1 TO 1) AS ListType
        REDIM SingList(1 TO 1) AS WordCode
        REDIM CombList(1 TO 1) AS WordCode
        DIM KeyTemp AS KeyNdx127
        CALL GetKWList(DocNum&, SingList(), CombList(), KeyTemp)
        UL = 6: LC = 25: BL = 9: RC = 55
        BoxO UL, LC, BL, RC, 2, RevAttr
        PaintBoxO UL, LC, BL, RC, RevAttr
        QPrintRC "Document  " + STR$(DocNum&), UL + 1, LC + 9, RevAttr
        QPrintRC "Total Sentences" + STR$(TotSentNum), UL + 2, LC + 5, RevAttr
        UL = 12: LC = 30: BL = 17: RC = 50
        BoxO UL, LC, BL, RC, 2, RevAttr
        FOR SentNum = 1 TO TotSentNum  'How many sentences?
                CALL ExtractSent(SentNum, Sent$, LenSen, TxtEMS%)
                REDIM WordList$(1 TO 1)
                CALL WordParse(Sent$, LenSen, SentNum, WordList$(), NumWord(SentNum))
                IF NumWord(SentNum) > 5 THEN
                        CALL FindCombKey(WordList$(), NumWord(SentNum), NumKeyWords(SentNum), SentNum, NumKey, CombList())
                        CALL FindSingKey(WordList$(), NumWord(SentNum), NumKeyWords(SentNum), SentNum, NumKey, SingList())
                        FillScrnO UL + 1, LC + 1, BL - 1, RC - 1, RevAttr, 32
                        QPrintRC "Sentence " + STR$(SentNum), UL + 1, LC + 5, RevAttr
                        QPrintRC "Words    " + STR$(NumWord(SentNum)), UL + 2, LC + 5, RevAttr
                        QPrintRC "KeyWords " + STR$(NumKeyWords(SentNum)), UL + 3, LC + 5, RevAttr
                        ERASE WordList$
                END IF
        NEXT
        'erase text without punctuation and extract the full text
        CALL ExtractFullText(TxtEMS, FullEMS)
'--------create abstract and write it onto the disk
        CLS
        UL = 4: LC = 25: BL = 7: RC = 55
        BoxO UL, LC, BL, RC, 2, RevAttr
        PaintBoxO UL, LC, BL, RC, RevAttr
        QPrintRC "Document  " + STR$(DocNum&), UL + 1, LC + 9, RevAttr
        QPrintRC "Total Sentences" + STR$(TotSentNum), UL + 2, LC + 5, RevAttr
        LENTxt = 80
        Abstr.First = AbstrPos&
        NoMoreFlag = FALSE
        DIM WordValue AS WeightAvgNdx127
'    EMSGet WordValue, LEN(WordValue), DocNum&, ValueEMS
        FGetRT ValueEMS, WordValue, DocNum&, LEN(WordValue)
'   OPEN "Origin" FOR OUTPUT AS #8
'   OPEN "New" FOR OUTPUT AS #9
        DO
                REDIM KeyWords$(1 TO 1)
                CALL Rank(BestSent, NoMoreFlag, NumKeyWords(), NumWord(), WordValue, KeyTemp)
                IF NoMoreFlag THEN EXIT DO
                CALL ExtractSent(BestSent, Sent$, LenSen, FullEMS%)
'       PRINT #8, Sent$
                CALL CutSentence(BestSent, Sent$, NumWord)
                CALL WriteSentence(Sent$, BestSent, AbstrPos&)
                CALL Chopping(BestSent)
        LOOP UNTIL NoMoreFlag
'   CLOSE #8, #9
        Abstr.Last = AbstrPos& - 1
        FPutRT AbstrNdxFile, Abstr, DocNum&, 8
        CALL DosErrHandler
        IF TextNum& > MaxText THEN
                CALL EmsRelMem(FullEMS%)
        ELSE
                ERASE TextArray
                FreSpace& = FRE("")
        END IF
        cht$ = INKEY$
        IF LEFT$(cht$, 1) = CHR$(27) THEN
                GOTO FinishWork
        END IF
NextDoc:
ERASE NumWord, NumKeyWords, KeyWordFound, KeyWordFoundNdx, SingList, CombList
CALL FFlush(AbstrNdxFile)
CALL FFlush(AbstrFile)
CALL FFlush(DocNdxFile)
CALL FFlush(DocNdxFile)
NEXT 'document
FinishWork:
a12# = TIMER - a11#
H = a12# \ 3600
M = (a12# MOD 3600) \ 60
s = ((a12# MOD 3600) MOD 60)
QPrintRC "Total : " + STR$(H) + " H " + STR$(M) + " m " + STR$(s) + " s", 19, 25, NormAttr
QPrintRC "Total : " + STR$(a12#), 20, 25, NormAttr
FClose AbstrNdxFile
FClose AbstrFile
FClose DocNdxFile
FClose DocFile
ReleaseEMS END 'program

'---------------------END OF MAIN MODULE----------------------
```

```
'------------------ DATA
GermanAbbreviature:
DATA "zB","ggt","inkl",".gl","grunds","ausschl","einschl"
DATA "Kl","Bekl","Nr","Ger","BerGer","ff","subj","obj"
EnglAbbreviature:
DATA "mr","mrs","messrs","sen","rep","ms","dr","drs"
EnglSections:
DATA "Section","Sec","Sec."
DATA "Article","Art","Art."
GermanSections:
DATA "Paragraph","Par","Par.","Para."
DATA "Artikel","Art","Art."
NumData:
DATA "I","II","III","IV","V","VI","VII","VIII","IX","X"
DATA "XI","XII","XIII","XIV","XV","XVI","XVII","XVIII","XIX","XX"
DATA "XXI","XXII","XXIII","XXIV","XXV","XXVI","XXVII","XXVIII","XXIX","XXX"

'$INCLUDE: '\user\include\prefixes.bi'

SUB ChangeChar (Txt$, KeepStr$) STATIC

'-- replace all chars except contained in Keep$
New$ = " "
FOR i = 1 TO LEN(Txt$)
        IF INSTR(KeepStr$, MID$(Txt$, i, 1)) = 0 THEN
                MID$(Txt$, i, 1) = New$
        END IF
NEXT

END SUB

SUB Chopping (Best) STATIC
'-------delete kw which is found already from the kwList
        NumCodes = KeyWordFoundNdx(Best).Last - KeyWordFoundNdx(Best).First + 1
        REDIM CodeDelete(1 TO NumCodes) 'array of the codes which should be deleted
        j = 0
        FOR i = KeyWordFoundNdx(Best).First TO KeyWordFoundNdx(Best).Last
                IF KeyWordFound(i).Code <> 0 THEN
                        j = j + 1
                        CodeDelete(j) = KeyWordFound(i).Code
                ELSE
                        NumCodes = NumCodes - 1
                END IF
        NEXT
        FOR i = 1 TO UBOUND(KeyWordFound)
                CALL Search(SEG CodeDelete(1), NumCodes, KeyWordFound(i).Code, Found, 0, 0, -1)
                IF Found <> -1 THEN 'delete this word
                    KeyWordFound(i).Code = 0
                        KeyWordFound(i).Num = 0
                END IF
        NEXT
END SUB SUB Config (Machine$, Beg&, Fin&) STATIC
        Cmd$ = RTRIM$(LTRIM$(COMMAND$))
        Parms = InCount(Cmd$, " ") + 1   '-- number of parameters IF Parms = 4 THEN '-- Expected information on command line:
        '   Config file, First Doc, Last Doc Extract Cmd$, " ", 1, Strt, Slen '-- extract first parm
        DBName$ = MID$(Cmd$, Strt, Slen)
        ConfigFile$ = DBName$ + ".CFG"

Extract Cmd$, " ", 2, Strt, Slen '-- extract second parm
        Machine$ = MID$(Cmd$, Strt, Slen)

Extract Cmd$, " ", 3, Strt, Slen '-- extract third parm
        Beg& = QPValL&(MID$(Cmd$, Strt, Slen))

Extract Cmd$, " ", 4, Strt, Slen '-- extract fourth parm
        Fin& = QPValL&(MID$(Cmd$, Strt, Slen))

ELSE
        PRINT
        PRINT "ABSTRACT Program Error: Missing Parameters"
        PRINT
        PRINT
        PRINT "Required Parameters are:"
        PRINT
        PRINT "Abstr  Config File  First Doc  Last Doc"
        PRINT
        Chime 10
        PRINT "Press the SPACE BAR to exit:"
        i$ = INPUT$(1)
        END
END IF OPEN ConfigFile$ FOR INPUT ACCESS READ SHARED AS #1
  INPUT #1, Fg, Bg, Brdr, LstDir$, DocDir$, NdxDir$, AbstrDir$, Lang$
CLOSE #1

OPEN LstDir$ + "a" + Lang$ + ".LST" FOR INPUT AS #1
        LINE INPUT #1, AtList$
CLOSE #1

NormAttr = OneColor%(Fg, Bg)
RevAttr = OneColor%(Bg, Fg AND 7)
CLS
```

```
' replacement string for punctuation
Keep$ = " "
KeepNoNumbers$ = " "
FOR j = 65 TO 90: Keep$ = Keep$ + CHR$(j): NEXT
FOR j = 97 TO 122: Keep$ = Keep$ + CHR$(j): NEXT
Keep$ = Keep$ + "'&"
KeepNoNumbers$ = Keep$
FOR j = 48 TO 57: Keep$ = Keep$ + CHR$(j): NEXT
RESTORE GermanAbbreviature
REDIM Abbrev1$(1 TO 15)
FOR i = 1 TO 15
   READ Abbrev1$(i)
NEXT
i = 1
REDIM Noise$(1 TO 1)
IF Lang$ = "GERMAN" THEN
        OPEN LstDir$ + "NOISE.DAT" FOR INPUT ACCESS READ SHARED AS #1
        DO UNTIL EOF(1)
           REDIM PRESERVE Noise$(1 TO i)

INPUT #1, Noise$(i)
           n$ = LEFT$(Noise$(i), LEN(Noise$(i)) - 1)
           Noise$(i) = UCASE$(LEFT$(n$, 1)) + MID$(n$, 2)
           i = i + 1
        . LOOP
        CLOSE #1
END IF
IF NOT EmsLoaded% THEN
        Chime 8
        PRINT "The EMS Driver has not been loaded."
        STOP
END IF DIM AbbrevEngl$(1 TO 8)
FOR i = 1 TO 8
        READ AbbrevEngl$(i)
NEXT
DIM Section$(1 TO 3)
FOR i = 1 TO 3
        READ Section$(i)
NEXT
DIM Article$(1 TO 3)
FOR i = 1 TO 3
        READ Article$(i)
NEXT
DIM Paragraph$(1 TO 4)
FOR i = 1 TO 4
        READ Paragraph$(i)
NEXT
DIM Artikel$(1 TO 3)
FOR i = 1 TO 3
        READ Artikel$(i)
NEXT
DIM Numbers$(1 TO 30)
FOR i = 1 TO 30
        READ Numbers$(i)
NEXT IF Lang$ = "GERMAN" THEN
        RESTORE GermanPrefixes
ELSE
        RESTORE EnglishPrefixes
END IF
REDIM Prefixes$(2 TO 9)
IF Lang$ = "GERMAN" THEN
        FOR i = 2 TO 9
                READ FirstHalf$, SecondHalf$
                Prefixes$(i) = FirstHalf$ + SecondHalf$
        NEXT
ELSE
        FOR i = 2 TO 9
                READ Prefixes$(i)
        NEXT
END IF REDIM MeanPrefixes$(3 TO 14)
IF Lang$ = "GERMAN" THEN
        FOR i = 3 TO 14
                READ FirstHalf$, SecondHalf$, ThirdHalf$
                MeanPrefixes$(i) = FirstHalf$ + SecondHalf$ + ThirdHalf$
        NEXT
ELSE
        FOR i = 3 TO 14
                READ MeanPrefixes$(i)
        NEXT
END IF

END SUB

SUB CutSentence (BestSent, Sent$, NumWord) STATIC

'this procedure leaves in the sentence only keywords with 30 characters of
'both sides but always full word and changes the rest with "..."
' 1. Collect the keywords into array
' 2. Find this kw's in the sentence
' 3. Take 40 characters (but full word) of both sides and if there is
'    something else then cut it n = 0: OldStr$ = ""
        'move numbers into array
```

```
NumCodes = KeyWordFoundNdx(BestSent).Last - KeyWordFoundNdx(BestSent).First + 1
REDIM KeyWords$(1 TO NumCodes)
FOR i = KeyWordFoundNdx(BestSent).First TO KeyWordFoundNdx(BestSent).Last
        IF KeyWordFound(i).Num <> 0 THEN
                IF INSTR(OldStr$, RTRIM$(KeyWordFound(i).Str) + " ") = 0 THEN
                        n = n + 1
                        KeyWords$(n) = RTRIM$(KeyWordFound(i).Str)
                        OldStr$ = OldStr$ + KeyWords$(n) + " "
                END IF
        END IF
NEXT
REDIM PRESERVE KeyWords$(1 TO n)

'for each kw find position
SentClean$ = Sent$
CALL ChangeChar(SentClean$, KeepNoNumbers$)
IF Lang$ = "GERMAN" THEN CALL Lower(SentClean$)
NumKey = 0
REDIM KeyStart(1 TO NumCodes) AS WrdLen
FirstTime = TRUE
FOR i = 1 TO n
        Start = 1
        DO
                NumKey = NumKey + 1
                'check the first word with capital letter before
                IF Lang$ = "GERMAN" THEN
                        KeyStart(NumKey).Wrd = INSTR(Start, SentClean$, KeyWords$(i) + " ")
                ELSE
                        IF FirstTime THEN
                                KeyStart(NumKey).Wrd = INSTR(SentClean$, RTRIM$(UCASE$(LEFT$(KeyWords$(i), 1)) + MID$(KeyWord
                        END IF
                        IF KeyStart(NumKey).Wrd = 0 THEN
                                KeyStart(NumKey).Wrd = INSTR(Start, SentClean$, KeyWords$(i) + " ")
                        END IF
                        'if still not found try add "'s" to the end of the first word
                        IF KeyStart(NumKey).Wrd = 0 THEN
                                SpLoc = INSTR(KeyWords$(i), " ")
                                IF SpLoc THEN
                                        KW$ = LEFT$(KeyWords$(i), SpLoc - 1) - "'s" + MID$(KeyWords$(i), SpLoc)
                                ELSE
                                        KW$ = KeyWords$(i) + "'s"
                                END IF
                                KeyStart(NumKey).Wrd = INSTR(Start, SentClean$, KW$)
                        END IF
                        FirstTime = FALSE
                END IF
                KeyStart(NumKey).Len = LEN(KeyWords$(i))
                IF KeyStart(NumKey).Wrd <> 0 THEN
                        MID$(SentClean$, KeyStart(NumKey).Wrd, KeyStart(NumKey).Len) = STRING$(KeyStart(NumKey).Len, 32)
                        Start = KeyStart(NumKey).Wrd + KeyStart(NumKey).Len
                END IF
        LOOP UNTIL KeyStart(NumKey).Wrd = 0 OR NumKey = NumCodes OR Start >= LEN(Sent$)
        IF KeyStart(NumKey).Wrd = 0 THEN NumKey = NumKey - 1
        IF NumKey = NumCodes THEN EXIT FOR
NEXT CALL SortT(SEG KeyStart(1), NumKey, 0, LEN(KeyStart(1)), 0, -1)
j = 0: Shift = 0
'cut the first part
IF KeyStart(1).Wrd > 40 THEN
        DelPoint = QInstrB(KeyStart(1).Wrd - 40, Sent$, " ")
        IF DelPoint <> 0 THEN
                Sent$ = "..." + MID$(Sent$, DelPoint)
                Shift = DelPoint - 3
        END IF
END IF
'cut the middle parts
FOR i = 1 TO NumKey - 1
        IF KeyStart(i + 1).Wrd - KeyStart(i).Wrd + KeyStart(i).Len > 80 THEN
                DelPointStart = INSTR(KeyStart(i).Wrd + KeyStart(i).Len + 40 - Shift, Sent$, " ")
                DelPointEnd = QInstrB(KeyStart(i + 1).Wrd - Shift - 40, Sent$, " ")
                IF DelPointStart <> 0 AND DelPointEnd > DelPointStart THEN
                        Sent$ = LEFT$(Sent$, DelPointStart) + "..." + MID$(Sent$, DelPointEnd)
                        Shift = Shift + DelPointEnd - DelPointStart - 3
                END IF
        END IF
NEXT
'cut the last part
IF KeyStart(NumKey).Wrd <> 0 THEN 'overinsurance
        IF LEN(Sent$) - (KeyStart(NumKey).Wrd + KeyStart(NumKey).Len - Shift) > 40 THEN DelPoint = INSTR(KeyStart(NumKey).Wrd + KeyStart(NumKey).Len - Shift + 40, Sent$, " ")
                        IF DelPoint <> 0 AND DelPoint < LEN(Sent$) THEN
                                Sent$ = LEFT$(Sent$, DelPoint) + "..."
                        END IF
                END IF
        END IF
END SUB SUB DictSortSearch (KeyTemp AS KeyNdx127, KeepNum, SingList() AS WordCode, CombList() AS WordCode) STATIC '== Binary searches thru an array of DictType (word & code#) for a
'== word and returns the code #.  The EMS Handle and the number of
'== DictCode entries are Common Shared.

DIM DictTemp AS DictType, DictTemp2 AS DictType
LENDict = LEN(DictTemp)
FOR i = 1 TO KeepNum
        Code = KeyTemp.Code(i)
        L = 1: R = DictCodeNum%   ' total number of code entries
        DO
```

```
        x = (CLNG(L) + R) \ 2
        EmsGet1El DictTemp, LENDict, x, DictCodeH%

IF Code < DictTemp.Code THEN
                R = x - 1
        ELSE
                IF Code <> DictTemp.Code OR Lang$ <> "ENGLISH" THEN
                        L = x + 1
                ELSE
                        '-- save it temporarily in case we need to restore it
                        '   if the forward/backward look doesn't bring any
                        '   positive results (i.e., we didn't get a match, and we
                        '   need the original DictTemp for the LOOP test)
                        SWAP DictTemp2, DictTemp
                        EmsGet1El DictTemp, LENDict, x + 1, DictCodeH%
                        IF Code = DictTemp.Code THEN
                                x = x + 1
                                EXIT DO
                        ELSE
                                EmsGet1El DictTemp, LENDict, x - 1, DictCodeH%
                                IF Code = DictTemp.Code THEN
                                        x = x - 1
                                        EXIT DO
                                END IF
                        END IF
                        SWAP DictTemp, DictTemp2
                        L = L + 1
                END IF
        END IF
LOOP UNTIL Code = DictTemp.Code OR L > R
'store previous words with the same code
n = x
DO
   EmsGet1El DictTemp, LENDict, n, DictCodeH%
   IF DictTemp.Code = Code THEN
                IF INSTR(QPRTrim$(DictTemp.Str), " ") THEN
                        NumComb = NumComb + 1
                        REDIM PRESERVE CombList(1 TO NumComb) AS WordCode
                        CombList(NumComb).Code = DictTemp.Code
                        CombList(NumComb).Str = DictTemp.Str
                ELSE
                        NumSing = NumSing + 1
                        REDIM PRESERVE SingList(1 TO NumSing) AS WordCode
                        SingList(NumSing).Code = DictTemp.Code
                        SingList(NumSing).Str = DictTemp.Str
                END IF
        END IF
        n = n - 1
LOOP UNTIL DictTemp.Code <> Code OR n = 0
n = x + 1
DO
   EmsGet1El DictTemp, LENDict, n, DictCodeH%
   IF DictTemp.Code = Code THEN
                IF INSTR(QPRTrim$(DictTemp.Str), " ") THEN
                        NumComb = NumComb + 1
                        REDIM PRESERVE CombList(1 TO NumComb) AS WordCode
                        CombList(NumComb).Code = DictTemp.Code
                        CombList(NumComb).Str = DictTemp.Str
                ELSE
                        NumSing = NumSing + 1

REDIM PRESERVE SingList(1 TO NumSing) AS WordCode
                                SingList(NumSing).Code = DictTemp.Code
                                SingList(NumSing).Str = DictTemp.Str
                END IF
                END IF
                n = n + 1
        LOOP UNTIL DictTemp.Code <> Code OR n > DictCodeNum
NEXT
SortT SingList(1), NumSing, 0, 66, 2, 64
SortT CombList(1), NumComb, 0, 66, 2, 64
END SUB SUB DosErrHandler STATIC
        IF DOSError% THEN
                Chime 5
                PRINT "Error "; ErrorMsg$(WhichError%); " occurred while writing Abstract Index Doc #"; DocNum&
                FClose AbstrNdxFile
                FClose AbstrFile
                FClose DocNdxFile
                FClose DocFile
                ReleaseEMS
                END
        END IF
END SUB SUB EmsAlloc (NumPages%, Handle%, LoadFILE$) STATIC CALL EmsAllocMem(NumPages%, Handle%)
IF EmsError% THEN
        PRINT "Couldn't allocate"; CLNG(NumPages) * SixteenK; "bytes of EMS for "; LoadFILE$
        CALL ReleaseEMS
        CALL Chime(2)
        END
END IF

END SUB

SUB ExtractDoc (DocNum&, TotSentNum%, Handle%, NoTextFlag) STATIC
```

```
DIM Doc AS ISAMtype
CLS
Box0 11, 25, 15, 55, 2, RevAttr
PaintBox0 11, 25, 15, 55, RevAttr
QPrintRC "extracting document #" + STR$(DocNum&), 13, 28, RevAttr
Handle = 0
NoTextFlag = FALSE
'---EXTRACT document from file
        FGetRT DocNdxFile, Doc, DocNum&, 8
        TextNum& = Doc.Last& - Doc.First& + 1'  Lines of text in the file
        IF TextNum& > MaxText THEN
          QPrintRC "*", 2, 2, -1
          '---- Allocate EMS to hold the Text file
          NumPages = 80& * TextNum& / SixteenK + 1' 80 bytes per line,
          CALL EmsAllocMem(NumPages, Handle%)    ' 16K per EMS page
          IF EmsError% THEN PRINT "Couldn't allocate"; NumPages * SixteenK; "bytes of EMS.": STOP
        ELSE
                    IF TextNum& <= 0 THEN NoTextFlag = TRUE: EXIT SUB
                    REDIM TextArray(1 TO TextNum&) AS TextType
        END IF
'---------------------------- Read Document into EMS eliminating blank lines
'                             change non-alpha chars into spaces
IF Lang$ = "ENGLISH" THEN
        CALL ReadEnglishText(Doc.First&, Doc.Last&, Handle%, TotSentNum%)
ELSEIF Lang$ = "GERMAN" THEN
        CALL ReadGermanText(Doc.First&, Doc.Last&, Handle%, TotSentNum%)
END IF
CLS
END SUB SUB ExtractFullText (TxtEMS, FullEMS) STATIC
        '---EXTRACT full document from file (should be moved into subroutine)
        DIM Doc AS ISAMtype
        IF TextNum& > MaxText THEN
                CALL EmsRelMem(TxtEMS%)
                '---EXTRACT full document from file
                '---Allocate EMS to hold the Text file
                NumPages = 80& * TextNum& / SixteenK + 1         ' 80 bytes per line,
                CALL EmsAllocMem(NumPages, FullEMS%)             ' 16K per EMS page
                IF EmsError% THEN PRINT "Couldn't allocate"; NumPages * SixteenK; "bytes of EMS.": STOP
                NumLines = 0
                DIM Temp1 AS STR80
                LenTemp = LEN(Temp1)
                        FOR i& = Doc.First& TO Doc.Last&
                                FGetRT DocFile, Temp1, i&, 80
                                NumLines = NumLines + 1
                                EmsSet1El Temp1, LenTemp, NumLines, FullEMS%
                        NEXT
        ELSE
                                ERASE TextArray
                                REDIM TextArray(1 TO TextNum&) AS TextType
                                Num = TextNum&
                                Ems2Array TextArray(1), 128, Num, TxtEMS
                                CALL EmsRelMem(TxtEMS%)
        END IF

END SUB

SUB ExtractSent (SentNum%, Sent$, LenSen%, Handle%) STATIC

DIM Temp1 AS STR80
LenTemp = LEN(Temp1)

'--------Get one sentence from the document i = SentNdx(SentNum).BL
  IF TextNum& > MaxText THEN
          EmsGet1El Temp1, LenTemp, i, Handle%
  ELSE
          Temp1.Str = TextArray(i).Str
  END IF
  Sent$ = RTRIM$(LTRIM$(RIGHT$(Temp1.Str, 80 - SentNdx(SentNum).BC + 1))) + " "
        IF SentNdx(SentNum).EL > SentNdx(SentNum).BL THEN
                FOR i = SentNdx(SentNum).BL + 1 TO SentNdx(SentNum).EL
                        IF TextNum& > MaxText THEN
                                EmsGet1El Temp1, LenTemp, i, Handle%
                        ELSE
                                Temp1.Str = TextArray(i).Str
                        END IF
                        Sent$ = Sent$ + LTRIM$(RTRIM$((Temp1.Str))) + " "
                NEXT
                l = LEN(RTRIM$(Temp1.Str)) - SentNdx(SentNum).EC
                Sent$ = LEFT$(Sent$, LEN(Sent$) - l)
        ELSE
                Sent$ = LEFT$(Sent$, (SentNdx(SentNum).EC - SentNdx(SentNum).BC + 1))
        END IF
  LenSen = LEN(Sent$)
END SUB FUNCTION ExtractWord$ (Source$, Char$, Start) STATIC 'extract word from Source$ from Start to Char$ Source$ = QPTrim$(Source$)
  LenStr = LEN(Source$)
  Slen = 0
        FOR i = Start TO LenStr
                IF MID$(Source$, i, 1) = Char$ AND Slen > 0 THEN
          EXIT FOR
                ELSE
```

```
              SLen = SLen + 1
           END IF
        NEXT
  ExtractWord$ = LTRIM$(MID$(Source$, Start, SLen))
END FUNCTION SUB ExtractWordNum (Source$, WordNum, Start, SLen) STATIC
SpLoc = 0: Count = 0
DO
   Start = SpLoc + 1
   SpLoc = INSTR(Start, Source$, " ")
   IF SpLoc <> Start THEN
        Count = Count + 1
   END IF LOOP UNTIL Count = WordNum
SLen = INSTR(Start, Source$, " ") - Start
END SUB SUB FindCombKey (WordList$(), NumWord%, NumKeyWordFound%, SentNum, NumKey, CombList() AS WordCode) STATIC IF SentNum = 1 THEN
        KeyWordFoundNdx(SentNum).First = 1
ELSE
        ii = 1
        DO WHILE KeyWordFoundNdx(SentNum - ii).Last = 0 AND ii < SentNum - 1
        ii = ii + 1
        LOOP
        KeyWordFoundNdx(SentNum).First = KeyWordFoundNdx(SentNum - ii).Last + 1
END IF
NumKeyWordFound = 0
IF NumComb = 0 THEN EXIT SUB
FOR i = 1 TO NumWord' number of words to process '---- make lower case since combined keywords ignore case
        Word$ = LCASE$(WordList$(i))

IF Word$ = "" GOTO SkipCombKey
                IF (ASC(Word$) >= 48 AND ASC(Word$) <= 57) GOTO SkipCombKey '********************************************************
'== Binary searches thru an CombList for a range for first letter Last = 0
w$ = LCASE$(LEFT$(Word$, 1))
L = 1: R = NumComb% ' total number of code entries

DO x = (CLNG(L) + R) \ 2
IF w$ < LCASE$(LEFT$(CombList(x).Str, 1)) THEN
                R = x - 1
        ELSE
                IF w$ > LCASE$(LEFT$(CombList(x).Str, 1)) THEN
                        L = x + 1
                ELSE    'if equal, check every other word for first and last
                        M = 2
                        IF x > 2 THEN
                                DO
                                   IF LCASE$(LEFT$(CombList(x - M).Str, 1)) < w$ THEN
                                        IF LCASE$(LEFT$(CombList(x - M + 1).Str, 1)) < w$ THEN
                                                First = x - M + 2
                                        ELSE
                                                First = x - M + 1
                                        END IF
                                        EXIT DO
                                   ELSE
                                        M = M + 2
                                        IF x - M <= 0 THEN First = 1: EXIT DO
                                   END IF
                                LOOP
                        ELSE
                                First = 1
                        END IF
                        IF x <= NumComb - 2 THEN
                                M = 2
                                DO
                                        IF LCASE$(LEFT$(CombList(x + M).Str, 1)) > w$ THEN
                                                IF LCASE$(LEFT$(CombList(x + M - 1).Str, 1)) > w$ THEN
                                                        Last = x + M - 2
                                                ELSE
                                                        Last = x + M - 1
                                                END IF
                                                EXIT DO
                                        ELSE
                                                M = M + 2
                                                IF x + M > NumComb THEN Last = NumComb: EXIT DO
                                        END IF
                                LOOP
                        ELSE
                                Last = NumComb
                        END IF
                END IF
        END IF
LOOP UNTIL w$ = LCASE$(LEFT$(CombList(x).Str, 1)) OR L > R IF Last THEN

'********************************************************

'---- if it's a valid range, then do comparisons for words in the range
```

```
FOR j = Last TO First STEP -1
        Words = InCount(QPRTrim$(CombList(j).Str, " ") + 1'count number of words '---- if the keyword has more words than are left in the word list
        '     skip it, because there's no possibility of a match.
        IF Words > NumWord - i + 1 GOTO SkipCombKey CurrKey$ = ExtractWord$(CombList(j).Str, " ", 1)'extract first word
        Slen = LEN(CurrKey$)                          'of combined keyword
        Start = Slen + 1
        IF RIGHT$(CurrKey$, 1) = "/" THEN
                Exact = TRUE
                CurrKey$ = LEFT$(CurrKey$, Slen - 1)
                Slen = Slen - 1
        ELSE
                Exact = FALSE
        END IF '---- compare first word of combined key [CurrKey$]
        '     against the current document word [Word$]

IF RIGHT$(Word$, 1) = "/" THEN Word$ = LEFT$(Word$, LEN(Word$) - 1)

IF Exact THEN ' check for *exact* match
                Match = (LCASE$(CurrKey$) = LCASE$(Word$))
        ELSE
                Match = (LCASE$(CurrKey$) = LCASE$(LEFT$(Word$, Slen)))
        END IF ' no match, skip to next combined key in the First-Last range
        IF NOT Match GOTO SkipCombKey ' continue matching the rest of the words in the combined key
        ' exiting out as soon as there's a non-match
        AtFlag = FALSE
        NotFlag = FALSE FOR k = 1 TO Words - 1' number of words left in combined key ' extract the next word from the current combined keyword (j)
                CurrKey$ = ExtractWord$(CombList(j).Str, " ", Start)
                Slen = LEN(CurrKey$)
                Start = Start + Slen + 1

IF RIGHT$(CurrKey$, 1) = "/" THEN
                        Exact = TRUE
                        CurrKey$ = LEFT$(CurrKey$, Slen - 1)
                        Slen = Slen - 1
                ELSE
                        Exact = FALSE
                END IF
                IF AtFlag = FALSE AND NotFlag = FALSE THEN
                        DocWord$ = WordList$(i + k)' Document word to compare
                ELSE
                        IF AtFlag = FALSE AND NotFlag = TRUE THEN
                                IF k < Words - 1 THEN DocWord$ = WordList$(i + k + 1)  'next word
                        ELSE
                                IF AtFlag = TRUE AND NotFlag = FALSE THEN
                                        DocWord$ = WordList$(i + k - 1) 'previous word
                                ELSE
                                        DocWord$ = WordList$(i + k)
                                END IF
                        END IF
                END IF
                IF RIGHT$(DocWord$, 1) = "/" THEN DocWord$ = LEFT$(DocWord$, LEN(DocWord$) - 1)

IF CurrKey$ = "@" THEN ' special processing for @ wildcard
                        IF INSTR(AtList$, "/" + DocWord$ + "/") THEN
                                Match = TRUE' the word was in the @ list, so continue
                        ELSE
                                IF Lang$ = "GERMAN" THEN
                                        Match = TRUE
                                        AtFlag = TRUE
                                ELSE
                                        Match = FALSE
                                END IF
                        END IF
                        IF Match THEN IF k < Words - 1 THEN
                                        DocWord$ = WordList$(i + k + 1)
                                        IF DocWord$ = "not" OR DocWord$ = "be" OR DocWord$ = "nicht" THEN NotFlag = TRUE
                                END IF
                        END IF
                ELSE
                        IF Exact THEN ' check for *exact* match
                                Match = (LCASE$(CurrKey$) = LCASE$(DocWord$))
                        ELSE ' wildcard match, only compare # of chars in CurrKey$
                                Match = (LCASE$(CurrKey$) = LCASE$(LEFT$(DocWord$, Slen)))
                        END IF
                END IF IF NOT Match THEN EXIT FOR NEXT' word in current combined keyword IF Match THEN ' this is a combined keyword, so add it to the list
                NumKeyWordFound = NumKeyWordFound + 1
                NumKey = NumKey + 1
                REDIM PRESERVE KeyWordFound(1 TO NumKey) AS ListType
                KeyWordFound(NumKey).Code = CombList(j).Code
```

```
                                DO
                                    SlashLoc = INSTR(CombStr$, "/")
                                    IF SlashLoc THEN MID$(CombStr$, SlashLoc, 1) = " "
                                LOOP UNTIL SlashLoc = 0
                                KeyWordFound(NumKey).Num = i
                                '-- blank out combined word from list so that single keys
                                '   are not generated from parts of combined keys found
                                TempStr$ = ""
                                FOR k = i TO i + Words - 1
                                        DO
                                                IF RIGHT$(WordList$(k), 1) = "/" THEN
                                                        WordList$(k) = LEFT$(WordList$(k), LEN(WordList$(k)) - 1)
                                                ELSE
                                                        EXIT DO
                                                END IF
                                        LOOP
                                        TempStr$ = TempStr$ + WordList$(k) + " "
                                        WordList$(k) = ""
                                NEXT
                                KeyWordFound(NumKey).Str = RTRIM$(TempStr$)
                                EXIT FOR

END IF

SkipCombKey:
                NEXT
END IF

NEXT' key in list

END SUB

SUB FindSingKey (WordList$(), NumWord%, NumKeyWordFound%, SentNum, NumKey, SingList() AS WordCode) STATIC 'ARRAY NAME      LEN DESCRIPTION              DIRECTION  MODIFIED?
'----------      --- -----------              ---------  ---------
'SingList()      VAR Single Keyword List      (Shared)   (Unchanged)
'KeyWordFound()  VAR Single Keywords Found    (Returned) (Changed)
'WordList$()     VAR Document Words           (Passed)   (Unchanged)

IF NumSing = 0 THEN EXIT SUB
FOR i = 1 TO NumWord' number of words in document

Word$ = WordList$(i)

IF Word$ = "" GOTO SkipSingKey
        IF (ASC(Word$) >= 48 AND ASC(Word$) <= 57) GOTO SkipSingKey
        PrefixFlag = FALSE: MeanPrefixFlag = FALSE
'*********************************************************
'== Binary searches thru an SingList for a range for first letter TryAgain:
Last = 0
w$ = LCASE$(LEFT$(Word$, 1))
L = 1: R = NumSing% ' total number of code entries

DO x = (CLNG(L) + R) \ 2
    IF w$ < LCASE$(LEFT$(SingList(x).Str, 1)) THEN
                    R = x - 1
            ELSE
                    IF w$ > LCASE$(LEFT$(SingList(x).Str, 1)) THEN
                            L = x + 1
                    ELSE    'if equal, check every other word for first and last
                      M = 2
                      IF x > 2 THEN
                            DO
                                IF LCASE$(LEFT$(SingList(x - M).Str, 1)) < w$ THEN
                                        IF LCASE$(LEFT$(SingList(x - M + 1).Str, 1)) < w$ THEN
                                                First = x - M + 2
                                        ELSE
                                                First = x - M + 1
                                        END IF
                                        EXIT DO
                                ELSE
                                        M = M + 2
                                        IF x - M <= 0 THEN First = 1: EXIT DO
                                END IF
                            LOOP
                      ELSE
                            First = 1
                      END IF
                      IF x <= NumSing - 2 THEN
                            M = 2
                            DO
                                IF LCASE$(LEFT$(SingList(x + M).Str, 1)) > w$ THEN
                                        IF LCASE$(LEFT$(SingList(x + M - 1).Str, 1)) > w$ THEN
                                                Last = x + M - 2
                                        ELSE
                                                Last = x + M - 1
                                        END IF
                                        EXIT DO
                                ELSE
                                        M = M + 2
                                        IF x + M > NumSing THEN Last = NumSing: EXIT DO
                                END IF
                            LOOP.
                      ELSE
                            Last = NumSing
```

```
                        END IF
                    END IF
                END IF
        LOOP UNTIL w$ = LCASE$(LEFT$(SingList(x).Str, 1)) OR L > R
        IF Last THEN
                FOR j = Last TO First STEP -1
                        CurrKey$ = QPRTrim$(SingList(j).Str)
                        Slen = LEN(CurrKey$)
                        IF RIGHT$(CurrKey$, 1) = "/" THEN
                                Exact = TRUE
                                CurrKey$ = LEFT$(CurrKey$, Slen - 1)
                                Slen = Slen - 1
                        ELSE
                                Exact = FALSE
                        END IF
                        'compare the single keyword [CurrKey$/SingList(j).Str]
                        'against the document word [Word$]
                        IF Exact THEN ' check for *exact* match
                                Match = (CurrKey$ = Word$)
                        ELSE ' check for wildcard match
                                Match = (CurrKey$ = LEFT$(Word$, Slen))
                        END IF
                        IF Match THEN ' add the single keyword to the list
                                NumKeyWordFound = NumKeyWordFound + 1
                                NumKey = NumKey + 1
                                REDIM PRESERVE KeyWordFound(1 TO NumKey) AS ListType
                                KeyWordFound(NumKey).Code = SingList(j).Code
                                KeyWordFound(NumKey).Str = Word$
                                KeyWordFound(NumKey).Num = i
                                EXIT FOR
                        END IF NEXT' key in range
        ELSE
                Letter$ = LEFT$(Word$, 2)
                IF Letter$ = "zs" OR Letter$ = "za" THEN
                        SecNum = GPVaLL&(RIGHT$(Word$, LEN(Word$) - 2))
                        IF SecNum > 0 AND SecNum <= 3000 THEN
                                IF Letter$ = "zs" THEN
                                        NumKeyWordFound = NumKeyWordFound + 1
                                        NumKey = NumKey + 1
                                        REDIM PRESERVE KeyWordFound(1 TO NumKey) AS ListType
                                        KeyWordFound(NumKey).Code = SecNum + SecCode    '10563
                                        KeyWordFound(NumKey).Str = "Sec" + STR$(SecNum)
                                        KeyWordFound(NumKey).Num = i
                                ELSE
                                        NumKeyWordFound = NumKeyWordFound + 1
                                        NumKey = NumKey + 1
                                        REDIM PRESERVE KeyWordFound(1 TO NumKey) AS ListType
                                        IF SecNum <= 30 THEN
                                                KeyWordFound(NumKey).Code = SecNum + ArtCode '13563
                                                KeyWordFound(NumKey).Str = "Art" + STR$(SecNum)
                                                KeyWordFound(NumKey).Num = i
                                        END IF
                                END IF
                        END IF
                END IF
        END IF
        IF NOT MeanPrefixFlag THEN
        'check for meaningful prefixes. If found, divide word in two parts
        Word$ = LCASE$(Word$)
        LenW = LEN(Word$)
        FOR NumLet = 14 TO 3 STEP -1
                IF LenW > NumLet + 3 THEN  'should leave at least 3 letters
                        IF INSTR(MeanPrefixes$(NumLet), "\" + LEFT$(Word$, NumLet) + "\") THEN
                                WordTemp1$ = MID$(Word$, NumLet + 1)
                                Word$ = LEFT$(Word$, NumLet)
                                MeanPrefixFlag = TRUE
                                PrevMatch = Match 'save, because Match will change for the pref.
                                EXIT FOR
                        END IF
                END IF
        NEXT
        IF MeanPrefixFlag THEN GOTO TryAgain 'check again
        ELSE
                IF WordTemp1$ <> "" THEN
                        IF PreMatch THEN
                                Limit = 9
                        ELSE
                                Limit = 6
                        END IF
                        Word$ = WordTemp1$
                        WordTemp1$ = ""
                        IF LEN(Word$) >= Limit THEN GOTO TryAgain
                END IF
        END IF
        'check for meaningless prefixes and delete it
        IF NOT PrefixFlag AND NOT Match THEN  'only one time
                Word$ = LCASE$(Word$)
                LenW = LEN(Word$)
                FOR NumLet = 8 TO 2 STEP -1
                        IF LenW > NumLet + 3 THEN  'should leave at least 3 letters
                                IF INSTR(Prefixes$(NumLet), "\" + LEFT$(Word$, NumLet) + "\") THEN
                                        Word$ = MID$(Word$, NumLet + 1)
                                        PrefixFlag = TRUE
                                        EXIT FOR
                                END IF
                        END IF
                NEXT
```

```
          IF PrefixFlag THEN
                  Limit = 6
                  IF LEN(wordS) >= Limit THEN GOTO TryAgain
          END IF
    END IF SkipSingKey:

NEXT' word in document
    KeyWordFoundNdx(SentNum).Last = NumKey
    END SUB

SUB GetKWList (DocNum&, SingList() AS WordCode, CombList() AS WordCode, KeyTemp AS KeyNdx127) STATIC KeyLen = LEN(KeyTemp)
    'EMSGet KeyTemp, KeyLen, DocNum&, KeyEms%
           FGetRT KeyEMS, KeyTemp, DocNum&, KeyLen
          '— get only first 27% keywords and store them with synonims in RAM
          IF KeyTemp.Num > 10 THEN
                  KeepNum = KeyTemp.Num * .27
                  IF KeepNum < 7 THEN KeepNum = 7
          ELSE
                  KeepNum = KeyTemp.Num
          END IF NumComb = 0: NumSing = 0 'both are common shared
          CALL DictSortSearch(KeyTemp, KeepNum, SingList(), CombList())
    END SUB FUNCTION GetSentValue! (SentNum, NumWord, Value AS WeightAvgNdx127, KeyTemp AS KeyNdx127) STATIC
    '*** Value =SUMofUniqueKW(SV*PV^1/8) /SQR(TotalNumberOfWords)
          SentVal! = 0
          OldStr$ = ""
          FOR i = KeyWordFoundNdx(SentNum).First TO KeyWordFoundNdx(SentNum).Last
                  'don't take word which is chopped already
                  IF KeyWordFound(i).Num <> 0 THEN
                          'don't take the same word twice
                          IF INSTR(OldStr$, STR$(KeyWordFound(i).Code)) = 0 THEN
                                  'find the word
                                  FOR j = 1 TO KeyTemp.Num
                                          IF KeyTemp.Code(j) = KeyWordFound(i).Code THEN
                                                  SentVal! = SentVal! + Value.Weight(j)
                                                  OldStr$ = OldStr$ + STR$(KeyTemp.Code(j))
                                                  EXIT FOR
                                          END IF
                                  NEXT
                          END IF
                  END IF
          NEXT
          GetSentValue! = SentVal! / SQR(NumWord)

END FUNCTION

FUNCTION InstrTbl% (Start%, Source$, Chars$) STATIC

'returns position first met char from chars$ in Source$
      V% = 0
      FOR i = 1 TO LEN(Chars$) STEP 2
              V% = INSTR(Start, Source$, MID$(Chars$, i, 2))
              IF V% > 0 THEN EXIT FOR
      NEXT
      InstrTbl% = V%
    END FUNCTION SUB LoadData STATIC
    ' Load in Word Sorted Dictionary directly into EMS (translate Code# to Word$)

EmsPg = EmsGetPFSeg%

DIM DictWrdTemp AS DictType
    File$ = LstDir$ + "DICT.Wrd" 'to get SecCode only
    IF NOT Exist%(File$) THEN CLS : PRINT File$; " not found.": END
    SizeofFile& = FileSize&(File$)
    DictWrdNum = SizeofFile& \ LEN(DictWrdTemp)
    SecCode = DictWrdNum - 3030 + 1
    ArtCode = DictWrdNum - 30 + 1

File$ = LstDir$ + "DICTSORT.COD"
    DIM DictCodeTemp AS DictType
    IF NOT Exist%(File$) THEN CLS : PRINT File$; " not found.": END
    SizeofFile& = FileSize&(File$)
    DictCodeNum = SizeofFile& \ LEN(DictCodeTemp)
    NumPages = SizeofFile& \ SixteenK + 2' round off to nearest 2 pages
    EmsAlloc NumPages, DictCodeH%, File$
    'IF EmsError% GOTO EMSErrHandler Num32kBlocks = SizeofFile& \ ThirtyTwoK&
    LeftOver& = SizeofFile& - (Num32kBlocks * ThirtyTwoK&)

FOpenS File$, DictCodeFILE
    FOR i = 1 TO Num32kBlocks + 1

Box0 11, 5, 15, 70, 2, RevAttr
            PaintBox0 11, 5, 15, 70, RevAttr
            QPrintRC "Loading " + File$ + " block" + STR$(i) + " /" + STR$(Num32kBlocks + 1), 13, 12, RevAttr '— map pages of the DictCodeH% memory to the EMS upper mem page frame FOR j = 1 TO 2
                    EmsMapMem DictCodeH%, j, (i - 1) * 2 + j
                    IF EmsError% GOTO EMSErrHandler
```

```
            NEXT

'-- seek to beginning of current block
            FSeek DictCodeFILE, (i - 1) * ThirtyTwoK&

IF i < Num32kBlocks + 1 THEN
                    '-- get the 32k block and put it directly into the EMS page frame
                    FGetA DictCodeFILE, BYVAL EmsPg, BYVAL 0, ThirtyTwoK&

ELSE
                    '-- load the left over (<32k) bytes
                    FGetA DictCodeFILE, BYVAL EmsPg, BYVAL 0, LeftOver&

END IF

NEXT

FClose DictCodeFILE
CLS
'---- Load Weight.Ndx into EMS
File$ = NdxDir$ + "NEWVAL.NDX"
IF NOT Exist%(File$) THEN
        CLS
        PRINT File$; " not found."
        CALL ReleaseEMS
        STOP
END IF
FOpenAll File$, 0, 4, ValueEMS
'ValueEMS = LoadIntoEMS(File$)
CLS
'---- Load Key.Ndx into EMS
File$ = NdxDir$ + "NEWKEY.NDX"
IF NOT Exist%(File$) THEN
        CLS
        PRINT File$; " not found."
        CALL ReleaseEMS
        STOP
END IF
FOpenAll File$, 0, 4, KeyEMS
'KeyEMS = LoadIntoEMS(File$)
END SUB FUNCTION LoadIntoEMS (File$) STATIC '-------- Returns the handle where the file was loaded into --------

EmsPg = EmsGetPFSeg%
SizeofFile& = FileSize&(File$)

NumPages = SizeofFile& \ SixteenK + 2' round off to nearest 2 pages
EmsAlloc NumPages, FileEMS, File$ Num32kBlocks = SizeofFile& \ ThirtyTwoK&
LeftOver& = SizeofFile& - (Num32kBlocks * ThirtyTwoK&)
FOpenAll File$, 0, 4, LoadFILE
FOR i = 1 TO Num32kBlocks + 1
        Box0 11, 5, 15, 70, 2, RevAttr
        PaintBox0 11, 5, 15, 70, RevAttr
        QPrintRC "Loading " + File$ + " block" + STR$(i) + " /" + STR$(Num32kBlocks + 1), 13, 12, RevAttr '-- map pages of the EMS memory to the EMS upper mem page frame
        FOR j = 1 TO 2
            EmsMapMem FileEMS, j, (i - 1) * 2 + j
            IF EmsError% THEN PRINT "Ems error:"; EmsError%: STOP NEXT
        '-- seek to beginning of current block
        FSeek LoadFILE, (i - 1) * ThirtyTwoK&
        IF DOSError% THEN PRINT "Dos Error:"; WhichError%: STOP
        IF i < Num32kBlocks + 1 THEN
            '-- get the 32k block and put it directly into the EMS page frame
            FGetA LoadFILE, BYVAL EmsPg, BYVAL 0, ThirtyTwoK&

IF DOSError% THEN PRINT "Dos Error:"; WhichError%: STOP
        ELSE
            '-- load the left over (<32k) bytes
            FGetA LoadFILE, BYVAL EmsPg, BYVAL 0, LeftOver&
            IF DOSError% THEN PRINT "Dos Error:"; WhichError%: STOP

END IF
NEXT

FClose LoadFILE

CLS

LoadIntoEMS = FileEMS

END FUNCTION

SUB Rank (BestSent, NoMoreFlag, NumKeyWords(), NumWord(), Value AS WeightAvgNdx127, KeyTemp AS KeyNdx127) STATIC 'this procedure calculates value for each sentence and finds the best one.

REDIM SentValue(1 TO TotSentNum) AS SentValueType
FOR SentNum = 1 TO TotSentNum
        IF NumKeyWords(SentNum) > 0 THEN
                SentValue(SentNum).Value = GetSentValue!(SentNum, NumWord(SentNum), Value, KeyTemp)
```

```
            ELSE
                   SentValue(SentNum).Value = 0
            END IF
                   SentValue(SentNum).Num = SentNum
NEXT 'find the sentence with biggest value
 k! = 0: Best = 0
 FOR i = 1 TO TotSentNum
                 IF SentValue(i).Value > k! THEN
                    Best = i
                    k! = SentValue(i).Value
                 END IF
 NEXT
 IF Best = 0 THEN NoMoreFlag = TRUE: EXIT SUB
 BestSent = SentValue(Best).Num
 ERASE SentValue
END SUB SUB ReadEnglishText (FirstLine&, LastLine&, Handle%, TotSentNum%) STATIC DIM Temp1 AS STR80
        REDIM SentNdx(1 TO 1) AS SentNdxType
        LenTemp = LEN(Temp1)  ' = 80
        NumLines = 0    ' total number of lines input from file
        ActualLin = 0
        EndOfSentence$ = ". ! ? ; "
        LineNum = 0: SentNum = 1: SentNdx(1).BL = 1: SentNdx(1).BC = 1: s = 1
        EL = 0: EC = 0: BL = 0: BC = 0
        IF TextNum& > MaxText THEN
                FOR i& = FirstLine& TO LastLine&
                        FGetRT DocFile, Temp1, i&, LenTemp
                        CALL ReadSection(Temp1.Str, Section$(), Articles$())
                        NumLines = NumLines + 1
                        EmsSet1El Temp1, LenTemp, NumLines, Handle
                NEXT
        ELSE
                FOR i& = FirstLine& TO LastLine&
                        FGetRT DocFile, Temp1, i&, LenTemp
                        NumLines = NumLines + 1
                        TextArray(NumLines).Str = Temp1.Str
                NEXT
                Array2Ems TextArray(1), 128, NumLines, Handle
                FOR i = 1 TO NumLines
                        CALL ReadSection(TextArray(i).Str, Section$(), Articles$())
                NEXT
        END IF
           '---- Process text
CurrLine = 0
GOSUB GetNextLine
DO
            DO
                        '-- skip over blank lines, or if we've gone too far
                        DO WHILE Start > LENTxt
                                IF CurrLine = NumLines GOTO EndOfFile
                                GOSUB GetNextLine
        _____
            LOOP p = InstrTbl%(Start, Txt$, EndOfSentence$)
        IF p = 0 THEN
                IF CurrLine = NumLines GOTO EndOfFile
                GOSUB GetNextLine
                p = 0
        ELSE
                Start = p + 2
                EndSign$ = MID$(Txt$, p, 1)
        END IF
LOOP UNTIL p    '-- loop until we've found the end of sentence IF p > 2 THEN   '-- it's an end of sentence
                   ' (i.e., can't have x. as the end of a sentence)
        IF MID$(Txt$, p - 2, 1) <> " " THEN  '-- 2nd char before end of sentence location is not a space
                IF p + 2 < LENTxt THEN  '-- we're not at the end of the line, so check the next word/chars
                        IF MID$(Txt$, p + 2, 1) = " " THEN  '-- we have two spaces after the end of sentence
                                '-- save potential end of sentence (line & column)
                                EL = LineNum: EC = p
                                '-- look for beginning of sentence and
                                '   the first alphanumeric character in that sentence
                                ch = MidChar(Txt$, p)
                                FirstFlag = TRUE
                                DO UNTIL (ch >= 97 AND ch <= 122) OR (ch >= 48 AND ch <= 57) OR (ch >= 65 AND ch <= 90)
                                        p = p + 1
                                        IF ch <> 32 AND ch <> 0 AND FirstFlag THEN BC = p: BL = LineNum: FirstFlag =
                                                IF p > LENTxt THEN
                                                        IF CurrLine = NumLines GOTO EndOfFile
                                                        GOSUB GetNextLine
                                                END IF
                                        ch = MidChar(Txt$, p)
                                LOOP
                                IF (ch >= 65 AND ch <= 90) OR MidChar(Txt$, p + 1) = 46 OR MidChar(Txt$, p + 1) = 41 0
                                        '-- this is definitely a new sentence or sequential number
                                        ' so save location info
                                        SentNdx(SentNum).EL = EL: SentNdx(SentNum).EC = EC
                                        s = SentNum
                                        SentNum = SentNum + 1
                                        REDIM PRESERVE SentNdx(1 TO SentNum) AS SentNdxType
                                        IF TextNum& > MaxText THEN
                                                MID$(Txt$, p, 1) = LCASE$(MID$(Txt$, p, 1))
                                                Temp1.Str = Txt$
                                                EmsSet1El Temp1, LenTemp, CurrLine, Handle
```

```
                                    ELSE
                                          MID$(TextArray(CurrLine).Str, p, 1) = LCASE$(MID$(TextArray(CurrLine).
                                    END IF
                                    SentNdx(SentNum).BL = BL: SentNdx(SentNum).BC = BC
                                    Start = p
                              END IF   '-- end check for uppercase letter '-- search for the next [potential] EOS no matter
                              '   if we found a sentence (above) or not
                              GOTO NextEnglSearch
                        END IF   '-- two spaces after EOS
                  END IF   '-- not end of line '-- at this point we have: xx._x
                  EL = LineNum: EC = p  '-- save potential EOS info
                  '-- this loop extracts the word to the left of the EOS
                  n = QInstrB(p, Txt$, " ")
                  '-- extract the previous word
                  PrevWord$ = LCASE$(MID$(Txt$, n + 1, p - n - 1))
                  '-- check to see if the previous is among the 8 abbreviations
                  AbbrevEnglNum = 8
                  CALL FindExact(VARPTR(AbbrevEngl$(1)), AbbrevEnglNum, PrevWord$)
                  '-- if we found the abbreviation then this wasn't an EOS
                  IF AbbrevEnglNum <> -1 THEN GOTO NextEnglSearch
                  '-- wasn't found, move p to point to the space (after the EOS char)
                  p = p + 1
                  IF p > LENTxt THEN    '-- we were already at the end of the line
                                        '     so get the next line of text
                        IF CurrLine = NumLines THEN
                              GOTO EndOfFile
                        ELSE
                              GOSUB GetNextLine
                        END IF
                  END IF
                  '[same loop as above]
                  FirstFlag = TRUE DO
                  ch = MidChar(Txt$, p)
                  IF ch <> 32 AND ch <> 0 AND FirstFlag THEN BC = p: BL = LineNum: FirstFlag = FALSE
                  p = p + 1
                  IF p > LENTxt THEN
                        IF CurrLine = NumLines GOTO EndOfFile
                        GOSUB GetNextLine
                  END IF
            LOOP UNTIL (ch >= 97 AND ch <= 122) OR (ch >= 48 AND ch <= 57) OR (ch >= 65 AND ch <= 90)
            '-- if it's not an uppercase letter, continue searching (this wasn't an EOS)
            IF (ch >= 65 AND ch <= 90) OR MidChar(Txt$, p) = 46 OR MidChar(Txt$, p) = 41 OR EndSign$ = ";" THEN   '-- U
                  '-- now we assume that it's an EOS, save info
                  SentNdx(SentNum).EL = EL: SentNdx(SentNum).EC = EC
                  s = SentNum
                  SentNum = SentNum + 1
                  REDIM PRESERVE SentNdx(1 TO SentNum) AS SentNdxType
                  IF TextNum& > MaxText THEN
                        IF p > 1 THEN
                              MID$(Txt$, p - 1, 1) = LCASE$(MID$(Txt$, p - 1, 1))
                        ELSE
                              MID$(Txt$, p, 1) = LCASE$(MID$(Txt$, p, 1))
                        END IF
                        Temp1.Str = Txt$
                        EmsSet1El Temp1, LenTemp, CurrLine, Handle
                  ELSE
                        IF p > 1 THEN
                              MID$(TextArray(CurrLine).Str, p - 1, 1) = LCASE$(MID$(TextArray(CurrLine).Str,
                        ELSE
                              MID$(TextArray(CurrLine).Str, p, 1) = LCASE$(MID$(TextArray(CurrLine).Str, p,
                        END IF
                  END IF
                  SentNdx(SentNum).BL = BL: SentNdx(SentNum).BC = BC
                  Start = p
            END IF
      END IF
      END IF
NextEnglSearch:
      LOOP UNTIL CurrLine >= NumLines EndOfFile:
      SentNdx(SentNum).EL = EL: SentNdx(SentNum).EC = 80
      TotSentNum = SentNum
      IF TextNum& > MaxText THEN
            FOR i = 1 TO ActualLin
                  EmsGet1El Temp1, LenTemp, i, Handle
                  Txt$ = QPRTrim$(Temp1.Str)
                  CALL ChangeChar(Txt$, Keep$)
                  Temp1.Str = Txt$
                  EmsSet1El Temp1, LenTemp, i, Handle
            NEXT
      ELSE
            FOR i = 1 TO ActualLin
                  CALL ChangeChar(TextArray(i).Str, Keep$)
            NEXT
      END IF
      EXIT SUB

'--------------

GetNextLine:
      CurrLine = CurrLine + 1
      Start = 1   '-- start scanning at first position
      p = 1
```

```
            LineNum = LineNum + 1
            ActualLin = ActualLin + 1
            IF TextNum& > MaxText THEN
                    EmsGet1El Temp1, LenTemp, CurrLine, Handle
                    Txt$ = QPRTrim$(Temp1.Str) + " "
            ELSE
                    Txt$ = QPRTrim$(TextArray(CurrLine).Str) + " "
            END IF
            '-- trim down end of line, but make sure there's one space at the end
            '   so that we can find end of sentences (looking for a DOT & SPACE)
            '   even if they're at the end of the line.
            LENTxt = LEN(Txt$)
            RETURN END SUB
SUB ReadGermanText (FirstLine&, LastLine&, Handle%, Lin%) STATIC DIM Temp1 AS STR80
        REDIM SentNdx(1 TO 1) AS SentNdxType
        LenTemp = LEN(Temp1) ' = 80
        NumLines = 0    ' total number of lines input from file
        ActualLin = 0
        EndOfSentence$ = ". ! ? "
        LineNum = 0: SentNum = 1: SentNdx(1).BL = 1: SentNdx(1).BC = 1: s = 1
        IF TextNum& > MaxText THEN
                FOR i& = FirstLine& TO LastLine&
                        FGetRT DocFile, Temp1, i&, 80
                        CALL ReadSection(Temp1.Str, Paragraph$(), Artikel$())
                        NumLines = NumLines + 1
                        EmsSet1El Temp1, LenTemp, NumLines, Handle
                NEXT
        ELSE
                FOR i& = FirstLine& TO LastLine&
                        FGetRT DocFile, Temp1, i&, LenTemp
                        NumLines = NumLines + 1
                        TextArray(NumLines).Str = Temp1.Str
                NEXT
                        Array2Ems TextArray(1), 128, NumLines, Handle
                FOR i = 1 TO NumLines
                        CALL ReadSection(TextArray(i).Str, Paragraph$(), Artikel$())
                NEXT
        END IF '---- Process text
    CurrLine = 0
    GOSUB NextLine
    DO
            DO
                        '-- skip over blank lines, or if we've gone too far
                        DO WHILE Start > LENTxt
                                IF CurrLine = NumLines GOTO EndFile
                                GOSUB NextLine
                        LOOP p = InstrTbl%(Start, Txt$, EndOfSentence$)
                        IF p = 0 THEN
                                IF CurrLine = NumLines GOTO EndFile
                                GOSUB NextLine
                                p = 0
                        ELSE
                                Start = p + 2
                        END IF
                LOOP UNTIL p    '-- loop until we've found the end of sentence IF p > 2 THEN   '-- it's an end of sentence
                                             ' (i.e., can't have x. as the end of a sentence)
                        '-- extract the previous word
                        n = QInstrB(p, Txt$, " ")
                        PrevWord$ = LCASE$(MID$(Txt$, n + 1, p - n - 1))

NOSFlag = FALSE
                        IF MID$(Txt$, p - 2, 1) = " " THEN NOSFlag = TRUE '-- 2nd char before end of sentence location is not a
                        IF p + 2 < LENTxt THEN  '-- we're not at the end of the line, so check the next word/chars
                                        IF MID$(Txt$, p + 2, 1) = " " THEN '-- we have two spaces after the end of sentence
                                                '-- save potential end of sentence (line & column)
                                                EL = LineNum: EC = p
                                                '-- look for beginning of sentence and
                                                '   the first alphanumeric character in that sentence
                                                ch = MidChar(Txt$, p)
                                                FirstFlag = TRUE
                                                DO UNTIL (ch >= 97 AND ch <= 122) OR (ch >= 48 AND ch <= 57) OR (ch >= 65 AND ch <= 90
                                                        p = p + 1
                                                        IF ch <> 32 AND ch <> 0 AND FirstFlag THEN BC = p: BL = LineNum: FirstFlag =
                                                                IF p > LENTxt THEN
                                                                        IF CurrLine = NumLines GOTO EndFile
                                                                        GOSUB NextLine
                                                                END IF
                                                        ch = MidChar(Txt$, p)
                                                LOOP
                                                IF ch >= 65 AND ch <= 90 THEN '-- Uppercase letter
                                                        '-- this is definitely a new sentence, so save location info
                                                        SentNdx(SentNum).EL = EL: SentNdx(SentNum).EC = EC
                                                        s = SentNum
                                                        SentNum = SentNum + 1

REDIM PRESERVE SentNdx(1 TO SentNum) AS SentNdxType
                                                        SentNdx(SentNum).BL = BL: SentNdx(SentNum).BC = BC
                                                        Start = p
                                                END IF '-- end check for uppercase letter
```

```
                        '-- search for the next [potential] EOS no matter
                        '   if we found a sentence (above) or not
                        GOTO NextSearch
                END IF    '-- two spaces after EOS
        END IF    '-- not end of line '-- at this point we have: x._x
        EL = LineNum: EC = p    '-- save potential EOS info
        ' look for the first alphanumeric character
        FirstFlag = TRUE
        DO
                p = p + 1
                ch = MidChar(Txt$, p)
                IF ch <> 32 AND ch <> -1 AND ch <> 0 AND FirstFlag THEN BC = p: BL = LineNum: FirstFlag = FALS
                IF p > LENTxt THEN
                        IF CurrLine = NumLines GOTO EndFile
                        GOSUB NextLine
                END IF
        LOOP UNTIL (ch >= 97 AND ch <= 122) OR (ch >= 48 AND ch <= 57) OR (ch >= 65 AND ch <= 90)
        '-- if it's not an uppercase letter, continue searching (this wasn't an EOS)
        IF ch < 65 OR ch > 90 THEN GOTO NextSearch
        '-- extract the word following the EOS
        n = p
        DO
          ch$ = MID$(Txt$, n, 1)
          n = n + 1
        LOOP UNTIL (ch$ < "A" OR ch$ > "Z") AND (ch$ < "a" OR ch$ > "z") OR n > LENTxt
        '-- "following word"
        FollWord$ = MID$(Txt$, p, n - p - 1)
        '-- check to see if this is one of the 316 noise words
        NoiseNum = 316
        CALL FindExact(VARPTR(Noise$(1)), NoiseNum, FollWord$)
        IF NoiseNum <> -1 THEN    '-- it was a noise word, so we know it's an EOS
                SentNdx(SentNum).EL = EL: SentNdx(SentNum).EC = EC
                s = SentNum
                SentNum = SentNum + 1
                REDIM PRESERVE SentNdx(1 TO SentNum) AS SentNdxType
                SentNdx(SentNum).BL = BL: SentNdx(SentNum).BC = BC
                Start = p
                GOTO NextSearch
        END IF
                IF NOSFlag THEN GOTO NextSearch
                '-- check to see if the previous is among the 15 abbreviations
                Abbrev1Num = 15
                CALL FindExact(VARPTR(Abbrev1$(1)), Abbrev1Num, PrevWord$)
                '-- if we found the abbreviation then this wasn't an EOS
                IF Abbrev1Num <> -1 THEN GOTO NextSearch
                '-- wasn't found, move p to point to the space (after the EOS char)

'-- check to see if Length < 6 (which would not be a new sentence)
        TrySent$ = ""
        IF SentNdx(SentNum).BL = LineNum THEN    '-- sentence starts on current line
                TrySent$ = MID$(Txt$, SentNdx(SentNum).BC, EC - SentNdx(SentNum).BC + 1)
        ELSE
                IF SentNdx(SentNum).BL = LineNum - 1 THEN
                   TrySent$ = RIGHT$(PrevLine$, LEN(PrevLine$) - SentNdx(SentNum).BC + 1) + LEFT$(Txt$, EC)
                END IF
        END IF
        TLen = LEN(TrySent$)
        IF TLen THEN
                CALL CRUNCH(TrySent$, " ", TLen)
                TrySent$ = LEFT$(TrySent$, TLen)
                Num = InCount(TrySent$, " ") + 1
                IF Num < 6 THEN GOTO NextSearch    '-- Sentence has less than 6 words, so it wasn't an EOS
        END IF
        '-- now we assume that it's an EOS, save info
        SentNdx(SentNum).EL = EL: SentNdx(SentNum).EC = EC
        s = SentNum
        SentNum = SentNum + 1
        REDIM PRESERVE SentNdx(1 TO SentNum) AS SentNdxType
        SentNdx(SentNum).BL = BL: SentNdx(SentNum).BC = BC
        Start = p
     END IF NextSearch:

LOOP UNTIL CurrLine >= NumLines

EndFile:
        SentNdx(SentNum).EL = TextNum&: SentNdx(SentNum).EC = 80
        TotSentNum = SentNum
        IF TextNum& > MaxText THEN
                FOR i = 1 TO ActualLin
                        EmsGet1El Temp1, LenTemp, i, Handle
                                CALL Lower(Temp1.Str)
                                Txt$ = QPRTrim$(Temp1.Str)
                                CALL ChangeChar(Txt$, Keep$)
                                Temp1.Str = Txt$
                                EmsSet1El Temp1, LenTemp, i, Handle
                        NEXT
        ELSE
                FOR i = 1 TO ActualLin
                        CALL Lower(TextArray(i).Str)
                        CALL ChangeChar(TextArray(i).Str, Keep$)
                NEXT
        END IF
        EXIT SUB '---------------
NextLine:
        CurrLine = CurrLine + 1
```

```
        Start = 1   '-- start scanning at first position
        p = 1
        LineNum = LineNum + 1
        ActualLin = ActualLin + 1
        '-- save the previous line for checking length of sentence
        '   (in the cases where a sentence crosses the line boundary)
        PrevLine$ = Txt$
        IF TextNum& > MaxText THEN
                EmsGet1EL Temp1, LenTemp, CurrLine, Handle
                Txt$ = QPRTrim$(Temp1.Str) + " "
        ELSE
                Txt$ = QPRTrim$(TextArray(CurrLine).Str) + " "
        END IF
        '-- trim down end of line, but make sure there's one space at the end
        '    so that we can find end of sentences (looking for a DOT & SPACE)
        '    even if they're at the end of the line.
        LENTxt = LEN(Txt$)
        RETURN

END SUB

SUB ReadSection (Txt$, SecArray$(), ArtArray$()) STATIC
'---Look for "sections" or "articles"

IF Lang$ = "GERMAN" THEN
        '-- In GERMAN it's Par
        SearchStr$ = "Par"
ELSE
        '-- In English it's Sec
        SearchStr$ = "Sec"
END IF Letter$ = "zs"

FOR LookStep = 1 TO 2

Start = 1

DO
                M = INSTR(Start, Txt$, SearchStr$)  '-- column of start of Sec. or Art.

IF M THEN j = INSTR(M, Txt$, " ")  '-- position of the end of the word

IF j THEN   '-- if this is not a last word
                                Word$ = MID$(Txt$, M, j - M)  '-- get the whole word
                        ELSE
                                EXIT DO  '-- this was the last word, so exit
                        END IF '-- check if the word matches variations on Section or Article
                        IF Lang$ = "GERMAN" AND LookStep = 1 THEN ELSE
        NumFound = 3   '-- there are three variations that we check for
END IF IF LookStep = 1 THEN
        CALL FindExact(VARPTR(SecArray$(1)), NumFound, Word$)
ELSE
        CALL FindExact(VARPTR(ArtArray$(1)), NumFound, Word$)
END IF IF NumFound <> -1 THEN  '-- it did match, so check the number
        k = j + 1   '-- starting position of [potential] number DO '-- skip over blank spaces
                ch = MidChar(Txt$, k)
                k = k + 1
        LOOP UNTIL ch <> 32 OR k > LEN(Txt$)

m1 = 0

DO '-- collect the whole number
                ch = MidChar(Txt$, k + m1 - 1)
                m1 = m1 + 1
                IF k + m1 - 1 > LEN(RTRIM$(Txt$)) THEN EXIT DO
        LOOP UNTIL ch < 48 OR ch > 57

IF m1 > 1 THEN 'there is a number
                Numb$ = MID$(Txt$, k - 1, m1 - 1)
                IF QPValL&(Numb$) <= 3000 AND QPValL&(Numb$) > 0 THEN '-- if we're looking for Article numbers, don't accept
                        '    article numbers over 30
                        IF LookStep = 2 AND QPValL&(Numb$) > 30 THEN GOTO NextStep
                        NewWord$ = Letter$ + Numb$
                        m1 = INSTR(k, Txt$, " ")
                        IF m1 = 0 THEN
                                m1 = LEN(Txt$)
                        ELSE
                                NewWord$ = NewWord$ + STRING$(m1 - M - LEN(NewWord$), 32)
                        END IF
                        Txt$ = LEFT$(Txt$, M - 1) + NewWord$ + MID$(Txt$, m1)
                END IF
        ELSE
                IF SearchStr$ = "Art" THEN m1 = 0
```

```
                        '-- loop while it's a Roman numeral and we're not
                        '   past the end of the string
                        DO
                                ch$ = MID$(Txt$, k + m1 - 1, 1)
                                m1 = m1 + 1
                                IF k + m1 - 1 > LEN(RTRIM$(Txt$)) THEN EXIT DO
                        LOOP WHILE INSTR("IVX", ch$)

Numb$ = MID$(Txt$, k - 1, m1 - 1)

'-- translate the Roman numeral(s) to Arabic numerals
                        NumFound = 30  '-- there are 30 Roman numbers to check
                        CALL FindExact(VARPTR(Numbers$(1)), NumFound, Numb$)

IF NumFound <> -1 THEN

NewWord$ = "za" + LTRIM$(STR$(NumFound + 1))
                                m1 = INSTR(k, Txt$, " ")
                                IF m1 = 0 THEN
                                        Txt$ = LEFT$(Txt$, M - 1) + NewWord$
                                ELSE
                                        NewWord$ = NewWord$ + STRING$(m1 - M - LEN(NewWord$), 32)
                                        Txt$ = LEFT$(Txt$, M - 1) + NewWord$ + RIGHT$(Txt$, LEN(Txt$) - m1 + 1
                                END IF

END IF

END IF    '-- are we searching for an Article #?

END IF   '-- there's a number after the Section/Article

END IF   '-- did we find a variation of Section or Article?

END IF    '-- INSTR(Text,"Sec.") was found

NextStep:

Start = M + 1

LOOP UNTIL M = 0

SearchStr$ = "Art"
        Letter$ = "za"

NEXT

'-- start looking at the beginning of the line
Start = 1

DO
        '-- look for the section symbol
        M = INSTR(Start, Txt$, CHR$(21))

'-- if we found one, process it
        IF M THEN

'-- position right after the symbol
                k = M + 1
                m1 = 0

'-- loop until it's not a number (a space is ok, however)
                '   or we've reached the end of the string
                DO
                        ch = MidChar(Txt$, k + m1)
                        m1 = m1 + 1
                        IF k + m1 - 1 > LEN(RTRIM$(Txt$)) THEN EXIT DO
                LOOP UNTIL (ch < ASC0 OR ch > ASC9) AND ch <> 32

'-- the number is the position from right after the symbol (k)
                '   to the non-number position found in the loop above (m1 - 1)
                Numb$ = QPTrim$(MID$(Txt$, k, m1 - 1))

IF QPVall&(Numb$) <= 3000 AND QPVall&(Numb$) > 0 THEN

NewWord$ = "zs" + Numb$
                        m1 = INSTR(k + 1, Txt$, " ")

IF m1 THEN
                                Txt$ = LEFT$(Txt$, M - 1) + NewWord$ + MID$(Txt$, m1)
                        ELSE
                                Txt$ = LEFT$(Txt$, M - 1) + NewWord$
                        END IF

END IF

'-- start looking at the next position
                Start = M + 2

END IF

'-- loop until we don't find any more section symbols
LOOP UNTIL M = 0

END SUB

'-------------------------------------------------------------------
SUB ReleaseEMS STATIC IF KeyEMS THEN EmsRelMem KeyEMS
IF ValueEMS THEN EmsRelMem ValueEMS
IF DictCodeH THEN EmsRelMem DictCodeH%
```

```
END SUB

SUB WordParse (Sent$, LenSen, SentNum, WordList$(), Words%) STATIC

'---------- Parse Sentence into Words
'--Words=number of words parsed

Words = 0: Slen = 0: Start = 1
        DO UNTIL Start >= LenSen
              Slen = 0
              FOR i = Start TO LenSen
                      ch$ = MID$(Sent$, i, 1)
                      IF ch$ = " " THEN
                              EXIT FOR
                      ELSE
                              Slen = Slen + 1
                      END IF
              NEXT
              IF Slen > 0 THEN
              '---- extract word
                      w$ = MID$(Sent$, Start, Slen)
                      '---- fill out 1 and 2 char words with /'s
                      IF Slen < 3 THEN w$ = w$ + STRING$(3 - Slen, "/")
                      '---- allow only words that start with alphabetic chars "a"-"z" or 1-9
                      ASCw = ASC(w$)
                      IF (ASCw >= 97 AND ASCw <= 122) OR (ASCw >= 65 AND ASCw <= 90) THEN
                              Words = Words + 1
                              '---- the following doesn't apply to GERMAN
                              IF Lang$ = "ENGLISH" THEN
                                      IF RIGHT$(w$, 2) = "'s" THEN       '-- remove the 's
                                              w$ = LEFT$(w$, Slen - 2)
                                      ELSEIF RIGHT$(w$, 1) = "'" THEN    '-- and any final '
                                              w$ = LEFT$(w$, Slen - 1)
                                      END IF
                              END IF '---- store the word
                              REDIM PRESERVE WordList$(1 TO Words)
                              WordList$(Words) = w$
                      END IF
              END IF
 Start = Start + Slen - 1
 LOOP 'next word in sentence

END SUB

SUB WriteSentence (Sent$, Best, AbstrPos&) STATIC

' this procedure wraps sentence, saves highligting information and write
' sentence to the disk. Marking EOS - add 100 to the position of the first
' highlighted word.

Wid = 78: OldStr$ = ""
        'create array of words which should be hihglighted
        n = 0
        'move numbers into array
        NumCodes = KeyWordFoundNdx(Best).Last - KeyWordFoundNdx(Best).First + 1
        REDIM KeyWords$(1 TO NumCodes)
        FOR i = KeyWordFoundNdx(Best).First TO KeyWordFoundNdx(Best).Last
        ' to not highlight word, appeared in the previous sentence take out this
        IF KeyWordFound(i).Num <> 0 THEN                       ' comments.
                      IF INSTR(OldStr$, RTRIM$(KeyWordFound(i).Str) + " ") = 0 THEN
                              n = n + 1
                              KeyWords$(n) = RTRIM$(KeyWordFound(i).Str)
                              OldStr$ = OldStr$ + KeyWords$(n) + " "
              END IF
                    END IF
        NEXT
        REDIM PRESERVE KeyWords$(1 TO n)

'collecting higlighting information
        SentClean$ = Sent$
        CALL ChangeChar(SentClean$, KeepNoNumbers$)
        IF Lang$ = "GERMAN" THEN CALL Lower(SentClean$)
        NumHigh = 0
        REDIM Highligt(1 TO NumCodes)
        REDIM LenHigh(1 TO NumCodes)
        FirstTime = TRUE
        FOR i = 1 TO LBOUND(KeyWords$)
              Start = 1
              DO
                      NumHigh = NumHigh + 1
                      IF Lang$ = "GERMAN" THEN
                              Highligt(NumHigh) = INSTR(Start, SentClean$, KeyWords$(i) + " ")
                      ELSE
                              IF FirstTime THEN
                                      Highligt(NumHigh) = INSTR(SentClean$, UCASE$(LEFT$(KeyWords$(i), 1)) + MID$(KeyWords$(i), 2)
                              END IF
                              Highligt(NumHigh) = INSTR(Start, SentClean$, KeyWords$(i) + " ")
                      END IF
              END IF
              LenHigh(NumHigh) = LEN(KeyWords$(i))
              'if still not found try add "'s"
              IF Highligt(NumHigh) = 0 THEN
                      SpLoc = INSTR(KeyWords$(i), " ")
                      IF SpLoc THEN
                              KW$ = LEFT$(KeyWords$(i), SpLoc - 1) + "'s" + MID$(KeyWords$(i), SpLoc)
                      ELSE
                              KW$ = KeyWords$(i) + "'s"
```

```
                        END IF
                        Highligt(NumHigh) = INSTR(Start, SentClean$, KW$)
                        LenHigh(NumHigh) = LEN(KW$)
                END IF FirstTime = FALSE
                IF Highligt(NumHigh) <> 0 THEN
                        MID$(SentClean$, Highligt(NumHigh), LenHigh(NumHigh)) = STRING$(LenHigh(NumHigh), 32)
                END IF
                Start = Highligt(NumHigh) + LenHigh(NumHigh)
        LOOP UNTIL Highligt(NumHigh) = 0 OR NumHigh = NumCodes OR Start >= LEN(Sent$)
        IF Highligt(NumHigh) = 0 THEN NumHigh = NumHigh - 1
        IF NumHigh = NumCodes THEN EXIT FOR
NEXT 'wrapping
DIM AbstrLine AS AbstrType
DO
  IF LEN(Sent$) > Wid THEN
        LastSpc = CInstrB%(Wid + 1, Sent$, " ")
        IF LastSpc <> 0 THEN
                Text$ = RTRIM$(LEFT$(Sent$, LastSpc))
                '-- remove portion of string that's been moved to the Text$
                Sent$ = MID$(Sent$, LastSpc + 1)
                j = 0
                'save highlighting information
                FOR i = 1 TO NumHigh
                        IF Highligt(i) <> 0 THEN
                                IF Highligt(i) <= LastSpc THEN 'save it
                                        j = j + 1
                                        IF j > 5 THEN EXIT FOR
                                        AbstrLine.Word(j) = CHR$(Highligt(i))
                                        IF Highligt(i) + LenHigh(i) > LastSpc THEN
                                                'probably it is comb. kw which was wrapped
                                                AbstrLine.Lenth(j) = CHR$(LastSpc - Highligt(i))
                                                LenHigh(i) = LenHigh(i) - (LastSpc - Highligt(i) + 1)
                                                Highligt(i) = 1
                                        ELSE
                                                AbstrLine.Lenth(j) = CHR$(LenHigh(i))
                                                Highligt(i) = 0
                                        END IF
                                ELSE
                                        Highligt(i) = Highligt(i) - LastSpc 'substract the lenth of Line
                                END IF
                        END IF
                NEXT
        ELSE
                Text$ = RTRIM$(LEFT$(Sent$, Wid))
                Sent$ = MID$(Sent$, Wid + 1)
        END IF
        FOR k = j + 1 TO 5
                AbstrLine.Word(k) = CHR$(0)
                AbstrLine.Lenth(k) = CHR$(0)
        NEXT IF LEN(Sent$) = 0 THEN
                'mark EOS
                AbstrLine.Word(1) = CHR$(ASC(AbstrLine.Word(1)) + 100)
        END IF
        AbstrLine.Str = Text$
        'PRINT #9, Text$
        FPutRT AbstrFile, AbstrLine, AbstrPos&, 88
        CALL DosErrHandler
        AbstrPos& = AbstrPos& + 1
  END IF
LOOP WHILE LEN(Sent$) > Wid
IF LEN(Sent$) <> 0 THEN
        Text$ = RTRIM$(Sent$)
        j = 0
                'save highlighting information
                FOR i = 1 TO NumHigh
                        IF Highligt(i) <> 0 THEN
                                j = j + 1
                                IF j > 5 THEN EXIT FOR
                                AbstrLine.Word(j) = CHR$(Highligt(i))
                                AbstrLine.Lenth(j) = CHR$(LenHigh(i))
                        END IF
                NEXT
                FOR k = j + 1 TO 5
                        AbstrLine.Word(k) = CHR$(0)
                        AbstrLine.Lenth(k) = CHR$(0)
                NEXT
                AbstrLine.Word(1) = CHR$(ASC(AbstrLine.Word(1)) + 100)
'PRINT #9, Text$
                AbstrLine.Str = Text$
                FPutRT AbstrFile, AbstrLine, AbstrPos&, 88
                CALL DosErrHandler
                AbstrPos& = AbstrPos& + 1
        END IF
END SUB 'this program sanitizes both english and german abstract 'If you are going to try to understand this program then
'you need at least one bottle of vodka.
'I feel sorry for you. Go ahead.

DEFINT A-Z
TYPE AbstrSanType
        Str AS STRING * 78
        Rest AS STRING * 6
END TYPE
```

```
CONST FALSE = 0, TRUE = NOT FALSE, Sing = 0, Comb = NOT Sing

'$INCLUDE: '\user\include\types.bi'
'$INCLUDE: '\user\include\declares.bi'

DECLARE SUB FindSingKey (Word$, KeyEMS%, NewSentFlag, SingFlag, Limit)
DECLARE SUB FindCombKey (WordPhrase$(), KeyEMS%, CombFlag)
DECLARE SUB EmsAlloc (NumPages%, Handle%, LoadFILE$)
DECLARE SUB InsertStr (BYVAL Address%, Inserted$, Size%)
DECLARE SUB Config ()
DECLARE SUB LoadData ()
DECLARE SUB Wrapping (Sent$, Text$(), NumLines%)

DECLARE FUNCTION LoadIntoEMS% (File$)
DECLARE FUNCTION FirstLast% (Word$, First%, Last%, KeyType%)
DECLARE FUNCTION NotInstr (Start%, Searched$, Table$)

COMMON SHARED Fg, Bg, Eror, LstDir$, DocDir$, NdxDir$, AbstrDir$, Lang$
COMMON SHARED SixteenK, SixtyFour, ThirtyTwo, ThirtyTwoK&
COMMON SHARED Beg, Fin, Machine$, Noise$(), SingKeywordEMS%, CombKeyWordEMS%
COMMON SHARED SingTable%(), CombTable%(), XLateTable%(), NextStart, Articles$ x$ = ""

CALL Config
CALL LoadData

FileName$ = AbstrDir$ + ".NDX"
FOpenAll FileName$, 2, 4, AbstrNdxFile
FileName$ = AbstrDir$ + ".txt"
FOpenAll FileName$, 2, 4, AbstrFile
'File$ = AbstrDir$ + ".TX" + Machine$
'OPEN File$ FOR OUTPUT AS #1
DIM AbstrNdx AS ISAMtype
LenNdx = LEN(AbstrNdx)
DIM Txt AS AbstrSanType
LenTxt = LEN(Txt)
NoFirst$ = CHR$(0) + " '({[" + CHR$(34)
UpTable$ = "QWERTYUIOPLKJHGFDSAZXCVBNM"

REDIM GermanNotName$(3 TO 9)
FOR i = 3 TO 9
        READ GermanNotName$(i)
NEXT
REDIM EnglishNotName$(2 TO 6)
FOR i = 2 TO 6
        READ EnglishNotName$(i)
NEXT
GermanData:
DATA "\ion\ung\","\heit\nzip\satz\keit\","\ionen\nzips\ungen\viele\"
DATA "\kosten\schaft\heiten\keiten\manche\einige\vielen\saetze\satzes\","\pflicht\saetzen\manchem\einigen\mehrere\"
DATA "\schaften\mehreren\","\pflichten\"

EnglishData:
DATA "\al\","\ion\ity\als\","\ment\ions\ency\ancy\ness\","\ments\ional\ities\"
DATA "\mental\encies\ancies\"

REDIM GermanName$(1 TO 2)
FOR i = 1 TO 2
        READ GermanName$(i)
NEXT
DATA "\er\ow\","\mann\burg\berg\"

REDIM EnglishName$(1 TO 4)
FOR i = 1 TO 4
        READ EnglishName$(i)
NEXT
DATA "\o\i\","\er\rg\os\ey\tz\","\man\son\ong\ham\ton\scn\","\mann\tein\"

a$ = "\ein\eine\einem\einen\eines\diese\dieses\dieser\diesen\diesem\dieser"
b$ = "\kein\keine\keinem\keinen\keinem\keines\"
eng$ = "\a\an\any\this\such\no\several\many\"
IF Lang$ = "GERMAN" THEN
        Articles1$ = a$ + b$
        Articles2$ = "\der\die\das\den\dem\des\"
ELSE
        Articles1$ = eng$
        Articles2$ = "\the\"
END IF IF Lang$ = "GERMAN" THEN
        SectionLine$ = "\Artikel\Art\Art.\Paragraph\Par\Par.\"
ELSE
        SectionLine$ = "\Article\Articles\Art\Art.\Section\Sections\Sec\Sec.\Title\"
        SectionLine$ = SectionLine$ + "Titles\Paragraph\Subparagraph\Chapter\Chapters\"
END IF
'********************* S T A R T *********************************
CLS
FOR DocNum& = Beg TO Fin
  FreSp& = FRE("")
  QPrintRC "Document" + STR$(DocNum&), 15, 25, -1
  AbstrLine$ = ""
  FGetRT AbstrNdxFile, AbstrNdx, DocNum&, LenNdx
  NewSentFlag = TRUE
  NumberOfLines& = AbstrNdx.Last - AbstrNdx.First + 1
  IF NumberOfLines& > 1 AND NumberOfLines& < 300 THEN
        REDIM Highlight$(1 TO NumberOfLines&) 'highlighting information, just
        i = 1                                 'temporary keep it.
        FOR LineNum& = AbstrNdx.First TO AbstrNdx.Last
                        FGetRT AbstrFile, Txt, LineNum&, LenTxt
```

```
                    AbstrLine$ = AbstrLine$ + Txt.Str + " "
                    Highlights$(i) = Txt.Rest
                    i = i + 1
PRINT Txt.Str
 NEXT
 Start = 1
 DO
        CombFlag = FALSE: SingFlag = FALSE: SectionFlag = FALSE: HyphenFlag = FALSE
        UpCaseLet = InstrTbl(Start, AbstrLine$, UpTable$)
        IF UpCaseLet > 0 THEN         'is there upper-case word?
                 IF UpCaseLet <= 2 THEN    ' the first word in the abstract?
                         NewSentFlag = TRUE
                 ELSE
                    'check if it is preceeded by '.' or ":" or ")" , i.e. it is a new sentence
                         PrevPos = 2
                         ch$ = MID$(AbstrLine$, UpCaseLet - 2, 1)
                         DO WHILE (ch$ < "a" OR ch$ > "z") AND (ch$ < "A" OR ch$ > "Z") AND InstrTbl2(1, ch$, ".:)") = 0 AND Up
                                 PrevPos = PrevPos + 1
                                 ch$ = MID$(AbstrLine$, UpCaseLet - PrevPos, 1)
                         LOOP
                         IF InstrTbl2(1, ch$, ".:)") THEN
                                 NewSentFlag = TRUE
                         ELSE
                                 NewSentFlag = FALSE
                         END IF
                 END IF
'extract the upper-case word
LastLet = INSTR(UpCaseLet, AbstrLine$, " ")
FirstWord$ = MID$(AbstrLine$, UpCaseLet, LastLet - UpCaseLet)
'take out commas,quotes etc.
ch$ = RIGHT$(FirstWord$, 1)
DO WHILE (ch$ < "a" OR ch$ > "z") AND (ch$ < "A" OR ch$ > "Z")
        IF LEN(FirstWord$) > 1 THEN
                FirstWord$ = LEFT$(FirstWord$, LEN(FirstWord$) - 1)
              ch$ = RIGHT$(FirstWord$, 1)
        ELSE
                EXIT DO
        END IF
LOOP
'if it is UU-ll don't sanitize it
HyphenLoc = INSTR(FirstWord$, "-")
IF HyphenLoc THEN
        IF MID$(FirstWord$, HyphenLoc + 1, 1) >= "a" AND MID$(FirstWord$, HyphenLoc + 1, 1) <= "z" THEN
                HyphenFlag = TRUE
        END IF
END IF
IF NOT HyphenFlag THEN
        'compare word with noise word list if it a new sentence only
        IF NewSentFlag THEN
                NumNoise = UBOUND(Noise$)
                CALL FindExact(BYVAL VARPTR(Noise$(1)), NumNoise, FirstWord$)
        ELSE
                NumNoise = -1
        END IF
        IF NumNoise = -1 THEN   'it is not a noise word, check for the
                REDIM WordPhrase$(1 TO 5)                   'combined kw
                WordPhrase$(1) = LCASE$(FirstWord$)
                WPos = NotInstr(LastLet + 1, AbstrLine$, NoFirst$)
                IF WPos > 0 THEN
                        i = 1
                        DO
                            LastLet = INSTR(WPos, AbstrLine$, " ")
                            NextWord$ = MID$(AbstrLine$, WPos, LastLet - WPos)
                            ch$ = RIGHT$(NextWord$, 1)
                            DO WHILE (ch$ < "a" OR ch$ > "z") AND (ch$ < "A" OR ch$ > "Z")
                                    IF LEN(NextWord$) > 1 THEN
                                            NextWord$ = LEFT$(NextWord$, LEN(NextWord$) - 1)
                                            ch$ = RIGHT$(NextWord$, 1)
                                    ELSE
                                            EXIT DO
                                    END IF
                            LOOP
                            IF LEN(NextWord$) > 1 THEN
                                    WordPhrase$(i + 1) = LCASE$(NextWord$)
                                    i = i + 1
                            END IF
                            WPos = NotInstr(LastLet + 1, AbstrLine$, NoFirst$)
                        LOOP UNTIL i = 4 OR WPos = 0
                        FindCombKey WordPhrase$(), CombKeyWordEMS%, CombFlag
                        IF NOT CombFlag THEN 'not a combined kw check further
                                IF NOT NewSentFlag THEN
                                        'extract previous word
                                        Prev = QInstrB(UpCaseLet - PrevPos, AbstrLine$, " ")
                                        PrevWord$ = MID$(AbstrLine$, Prev + 1, UpCaseLet - 2 - Prev)
                                        'take out commas,quotes etc.
                                        ch$ = LEFT$(PrevWord$, 1)
                                        DO WHILE (ch$ < "a" OR ch$ > "z") AND (ch$ < "A" OR ch$ > "Z")
                                                IF LEN(PrevWord$) > 1 THEN
                                                        PrevWord$ = MID$(PrevWord$, 2)
                                                        ch$ = LEFT$(PrevWord$, 1)
                                                ELSE
                                                        EXIT DO
                                                END IF
                                        LOOP
                                        'check for comb. kw, beginning from previous word
                                        FOR i = 1 TO 4
                                                WordPhrase$(i + 1) = WordPhrase$(i)
                                        NEXT
                                        WordPhrase$(1) = LCASE$(PrevWord$)
                                        FindCombKey WordPhrase$(), CombKeyWordEMS%, CombFlag
                                END IF  'not NewSentFlag
                        END IF    'NOT CombFlag with previous word
```

```
            END IF  'WPos -the last word in the abstract
            IF NOT CombFlag THEN  'still not a combined k= check further
                    'check against "Section", etc.
                    IF INSTR(SectionLine$, "\" + FirstWords + "\") THEN
                            SectionFlag = TRUE
            END IF
            IF NOT SectionFlag THEN
                    'check for ending of the word against not-name ending
                    NotNameEndFlag = FALSE
                    IF Lang$ = "GERMAN" THEN
                            FOR i = 3 TO 9
                                    IF INSTR(GermanNotName$(i), "\" + RIGHT$(FirstWord$, i) + "\")
                                            NotNameEndFlag = TRUE
                                            FindSingKey FirstWord$, SingKeywordEMS%, NewSentFlag,
                                            EXIT FOR
                                    END IF
                            NEXT
                    ELSE  'english
                            FOR i = 2 TO 6
                                    IF INSTR(EnglishNotName$(i), "\" + RIGHT$(FirstWord$, i) + "\"
                                            NotNameEndFlag = TRUE
                                            FindSingKey FirstWord$, SingKeywordEMS%, NewSentFlag,
                                            EXIT FOR
                                    END IF
                            NEXT
                    END IF
                    IF NOT NotNameEndFlag THEN
                        'ending of the word was not found, check further
                        'check if the previous word is an article
                            IF NOT NewSentFlag THEN
                                    Prev = QInstrB(UpCaseLet - PrevPos, AbstrLine$, " ")
                                    PrevWord$ = MID$(AbstrLine$, Prev + 1, UpCaseLet - 2 - Prev)
                                    PrevWord$ = "\" + PrevWord$ + "\"
                                    IF INSTR(Articles1$, LCASE$(PrevWord$)) THEN
                                            FindSingKey FirstWord$, SingKeywordEMS%, NewSentFlag,
                                    END IF
                            END IF
                            IF NOT SingFlag THEN
                                'no articles: check further
                                'check for ending of the word against name ending
                                NameEndFlag = FALSE
                                IF Lang$ = "GERMAN" THEN
                                        FOR i = 1 TO 2
                                                IF INSTR(GermanName$(i), "\" + RIGHT$(FirstWo
                                                        NameEndFlag = TRUE
                                                        FindSingKey FirstWord$, SingKeywordEM
                                                        EXIT FOR
                                                END IF
                                        NEXT
                                ELSE
                                        FOR i = 1 TO 4
                                                IF INSTR(EnglishName$(i), "\" + RIGHT$(FirstW
                                                        NameEndFlag = TRUE
                                                        FindSingKey FirstWord$, SingKeywordEM
                                                        EXIT FOR
                                                END IF
                                        NEXT
                                END IF
                                IF NOT NameEndFlag THEN
                                    'ending of the word was not found, check further
                                        'check if the previous word is an article2
                                        IF NOT NewSentFlag THEN
                                                IF INSTR(Articles2$, LCASE$(PrevWord$)) THEN
                                                        IF Lang$ = "GERMAN" THEN
                                                                FindSingKey FirstWord$, SingKe
                                                        ELSE
                                                                FindSingKey FirstWord$, SingKe
                                                        END IF
                                                END IF
                                        END IF
                                        IF NOT SingFlag THEN
                                            'no articles2 check further
                                                IF LEN(FirstWord$) >= 8 THEN    'no sense to
                                                        FindSingKey FirstWord$, SingKeywordEM
                                                END IF
                                                IF NOT SingFlag THEN GOSUB ChangeWord
                                        END IF
                                ELSE  'if NameEndFlag = TRUE
                                        IF NOT SingFlag THEN GOSUB ChangeWord
                                END IF  'NameEndFlag
                            END IF    ' SingFlag
                    ELSE          'if NotNameEndFlag = TRUE
                            IF NOT SingFlag THEN GOSUB ChangeWord
                    END IF          'NotNameEndFlag
                            END IF            'SectionFlag
                    END IF                  'NOT CombFlag without previous word
            END IF                  'not a noise word
        END IF                  'not HyphenFlag
    END IF                  'UpCaseLet > 0
    IF CombFlag THEN
            Start = UpCaseLet + NextStart
    ELSE
            Start = UpCaseLet + LEN(FirstWord$)
    END IF
LOOP UNTIL UpCaseLet = 0
REDIM Text$(1 TO 1)
CALL Wrapping(AbstrLine$, Text$(), NumLines)
FOR i = 1 TO NumberOfLines&
    IF INSTR(Text$(i), "XX") THEN  'this line was changed, save it
            Txt.Str = Text$(i)
            Txt.Rest = Highlight$(i)
```

```
        PRINT #1, Txt.Str
                FPutRT AbstrFile, Txt, CLNG(AbstrNdx.First + i - 1), LenTxt
                END IF
        NEXT
   END IF 'NumberOfLines& valid range
   q$ = INKEY$
   IF q$ = CHR$(27) THEN EXIT FOR
NEXT 'document
FClose AbstrFile
END ChangeWord:
        'not a single kw - change it!
        IF RIGHT$(FirstWord$, 1) = "/" THEN FirstWord$ = LEFT$(FirstWord$, LEN(FirstWord$) - 1)
        MID$(AbstrLine$, UpCaseLet, LEN(FirstWord$)) = STRING$(LEN(FirstWord$), 88)
RETURN SUB Config STATIC Cmd$ = COMMAND$
Parms = InCount(Cmd$, " ") + 1    '-- number of parameters
IF Parms = 4 THEN '-- Expected information on command line:
        '   Config file, First Doc, Last Doc Extract Cmd$, " ", 1, Strt, SLen '-- extract first parm
        DBName$ = MID$(Cmd$, Strt, SLen)
        ConfigFile$ = DBName$ + ".CFG"

Extract Cmd$, " ", 2, Strt, SLen '-- extract second parm
        Machine$ = MID$(Cmd$, Strt, SLen)

Extract Cmd$, " ", 3, Strt, SLen '-- extract third parm
        Beg = VAL(MID$(Cmd$, Strt, SLen))

Extract Cmd$, " ", 4, Strt, SLen '-- extract fourth parm
        Fin = VAL(MID$(Cmd$, Strt, SLen))

ELSE

PRINT
        PRINT "SANITIZE Program Error: Missing Parameters"
        PRINT
        PRINT
        PRINT "Required Parameters are:"
        PRINT
        PRINT "SANITIZE  Config File  Machine  First Doc  Last Doc"
        PRINT
        Chime 10
        PRINT "Press the SPACE BAR to exit:"
        i$ = INPUT$(1)
        END

END IF

OPEN ConfigFile$ FOR INPUT ACCESS READ SHARED AS #1
   INPUT #1, Fg, Bg, Brdr, LstDir$, DocDir$, NdxDir$, AbstrDir$, Lang$
CLOSE #1 i = 1
OPEN LstDir$ + "NOISE.DAT" FOR INPUT ACCESS READ SHARED AS #1
DO UNTIL EOF(1)
   REDIM PRESERVE Noise$(1 TO i)
   INPUT #1, Noise$(i)
   n$ = LEFT$(Noise$(i), LEN(Noise$(i)) - 1)
   Noise$(i) = UCASE$(LEFT$(n$, 1)) + MID$(n$, 2)
   i = i + 1
LOOP
CLOSE #1

IF NOT EmsLoaded% THEN
        Chime 8
        PRINT "The EMS has not been loaded."
        STOP
END IF SixteenK = 16 * 1024
SixtyFour = 64
ThirtyTwo = 32
ThirtyTwoK& = ThirtyTwo * 1024&

END SUB

SUB EmsAlloc (NumPages%, Handle%, LoadFILE$) STATIC

EmsAllocMem NumPages%, Handle%
IF EmsError% THEN
        PRINT "Couldn't allocate"; CLNG(NumPages) * SixteenK; "bytes of EMS for "; LoadFILE$
        Chime 2
        DO: LOOP UNTIL LEN(INKEY$) = 0
        i$ = INPUT$(1)
        END
END IF
```

```
END SUB

SUB FindCombKey (WordPhrase$(), KeyEMS%, CombFlag) STATIC

CombFlag = FALSE
DIM KeyTemp AS CombKeyType '-- entire Combined Keyword
LENKey = LEN(KeyTemp)
Slash$ = "///"
ASCslash = ASC("/")
        '-- if it's a valid range, then check words in range
        IF FirstLast%(WordPhrase$(1), First, Last, Comb) THEN
                FOR j = Last TO First STEP -1
                '-- get word from Combined Keyword List (COMBKEY.STR)
                EmsGetTEi KeyTemp, LENKey, j, KeyEMS%
                '-- convert it to a variable-length string for speed
                KeyTempStr$ = RTRIM$(KeyTemp.Str)
                Words = InCount(KeyTempStr$, " ") + 1 'count number of words
                IF Words <= 4 THEN
                        CALL Extract(KeyTempStr$, " ", 1, Strt, SLen) 'extract first word
                        CurrKey$ = MID$(KeyTempStr$, Strt, SLen)'    of combined keyword IF MidChar%(CurrKey$, SLen) = ASCslash THEN
                                Exact = TRUE
                                CurrKey$ = LEFT$(CurrKey$, SLen - 1)
                                SLen = SLen - 1
                        ELSE
                                Exact = FALSE
                        END IF
                        'compare first word of combined key [CurrKey$]
                        'against the current document word [WordTempStr$]

IF Lang$ = "GERMAN" THEN
                                IF NOT Exact THEN
                                        Match = (CurrKey$ = LEFT$(WordTempStr$, SLen))
                                ELSE ' check for *exact* match
                                        Match = (CurrKey$ = WordTempStr$)
                                END IF
                        ELSE
                                IF NOT Exact THEN
                                        Match = (LCASE$(CurrKey$) = LEFT$(WordPhrase$(1), SLen))
                                ELSE ' check for *exact* match
                                        Match = (LCASE$(CurrKey$) = WordPhrase$(1))
                                END IF
END IF ' no match, skip to next combined key in the First-Last range
IF NOT Match GOTO SkipCombKey ' continue matching the rest of the words in the combined key
' exiting out as soon as there's a non-match AtFlag = FALSE
NotFlag = FALSE FOR k = 2 TO Words ' number of words left in combined key ' extract the next word from the current combined keyword (j)
        CALL Extract(KeyTempStr$, " ", k, Strt, SLen)
        CurrKey$ = MID$(KeyTempStr$, Strt, SLen)

IF MidChar%(CurrKey$, SLen) = ASCslash THEN
                Exact = TRUE
                CurrKey$ = LEFT$(CurrKey$, SLen - 1)
                SLen = SLen - 1
        ELSE
                Exact = FALSE
        END IF IF AtFlag = FALSE AND NotFlag = FALSE THEN
                DocWord$ = WordPhrase$(k)
        ELSE
                IF AtFlag = FALSE AND NotFlag = TRUE THEN
                        DocWord$ = WordPhrase$(k + 1)
                ELSE
                        IF AtFlag = TRUE AND NotFlag = FALSE THEN
                                DocWord$ = WordPhrase$(k - 1)
                        ELSE
                                DocWord$ = WordPhrase$(k)
                        END IF
                END IF
        END IF IF English THEN Lower DocWord$ IF ASCII(CurrKey$) <> ASC("@") THEN
                IF Lang$ = "GERMAN" THEN
                        '-- German: no need to use Lcase$
                        IF Exact THEN ' check for *exact* match
                                Match = (CurrKey$ = DocWord$)
                        ELSE ' wildcard match, only compare = of chars in CurrKey$
                                Match = (CurrKey$ = LEFT$(DocWord$, SLen))
                        END IF
                ELSE
                        IF Exact THEN ' check for *exact* match
                                Match = (LCASE$(CurrKey$) = DocWord$)
                        ELSE ' wildcard match, only compare = of chars in CurrKey$
                                Match = (LCASE$(CurrKey$) = LEFT$(DocWord$, SLen))
                        END IF
                END IF
        ELSE '-- special processing for @ wildcard
                IF INSTR(AtList$, "/" + DocWord$ + "/") THEN
                        Match = TRUE ' the word was in the @ list, so continue
```

```
                    ELSE
                        IF English THEN
                                Match = FALSE
                        ELSE
                                Match = TRUE
                                AtFlag = TRUE
                        END IF
                END IF
                IF Match THEN
                        DocWord$ = WordPhrase$(k + 1)
                        IF DocWord$ = "not" OR DocWord$ = "be" OR DocWord$ = "nicht" THEN NotFlag = TRUE
                END IF
        END IF IF NOT Match GOTO SkipCombKey NEXT' word in current combined keyword IF Match THEN ' this is a combined keyword, so add it to the list
        CombFlag = TRUE NextStart = LEN(KeyTempStr$)
                                EXIT FOR
                        END IF
                END IF
SkipCombKey:
                NEXT
        END IF' Table range was valid

END SUB

SUB FindSingKey (Word$, KeyEMS%, NewSentFlagFS, SingFlag, Limit) STATIC

Count = 0
IF LEN(Word$) < Limit THEN EXIT SUB  'it can't satisfied us
DIM KeyTemp AS SingKeyType '-- Single Keyword to be compared
LENKey = LEN(KeyTemp)
ASCslash = ASC("/")
SingFlag = FALSE
IF RIGHT$(FirstWord$, 2) = "'s" THEN FirstWord$ = LEFT$(FirstWord$, LEN(FirstWord$) - 2)
IF LEN(Word$) < 3 THEN Word$ = Word$ + STRING$(3 - LEN(Word$), ASC("/"))
IF Lang$ = "GERMAN" THEN Lower Word$
' check if the first 3 letters of the word return
' a valid range from the 3-dimensional table array
  IF FirstLast%(LCASE$(Word$), First, Last, Sing) THEN  ' yes, so search thru range
            DO
                    FOR j = Last TO First STEP -1

'-- get the word from the SINGKEY.STR list
                                EmsGet1El KeyTemp, LENKey, j, KeyEMS%
                                CurrKey$ = RTRIM$(KeyTemp.Str)
                                SLen = LEN(CurrKey$)

'-- compare the single keyword [CurrKey$/KeyTemp.Str]
                        '   against the document word [Word$]
                        '== [replaced] IF RIGHT$(CurrKey$, 1) = "/" THEN IF MidChar%(CurrKey$, SLen) = ASCslash THEN
                                CurrKey$ = LEFT$(CurrKey$, SLen - 1)
                                Match = (CurrKey$ = Word$)
                        ELSE
                                Match = (CurrKey$ = LEFT$(Word$, SLen))
                        END IF IF Match THEN
                                IF LEN(CurrKey$) >= Limit THEN
                                        SingFlag = TRUE
                                        EXIT FOR
                                END IF
                        END IF NEXT' key in range
            IF NewSentFlagFS THEN
                        'now check against  upper- and low-case words, even if they are in the middle
                        IF Count = 0 THEN  'try low case
                                Word$ = LCASE$(Word$)
                        END IF
                Count = Count + 1
            END IF
         LOOP UNTIL Count > 1 OR SingFlag
        END IF' the range was valid

END SUB

DEFSNG A-Z
'***************************************************
FUNCTION FirstLast% (Word$, First%, Last%, KeyType%) STATIC '-- returns the starting (First) and ending (Last) range for the word
'  ·by looking it up in the Table%() array
First% = 0
a0 = ASCII(Word$)
IF a0 > 37 AND a0 < 123 THEN
        a1 = MidChar(Word$, 2)
        IF a1 > 37 AND a1 < 123 THEN
                a2 = MidChar(Word$, 3)
                IF a2 > 37 AND a2 < 123 THEN
                        a = XLateTable%(a0)
                        b = XLateTable%(a1)
                        c = XLateTable%(a2)
                        IF a = 0 OR b = 0 OR c = 0 THEN FirstLast% = 0: EXIT FUNCTION
```

```
                    IF KeyType% = Sing THEN
                            First% = SingTable%(a, b, c, 1)
                            Last% = SingTable%(a, b, c, 2)
                    ELSE
                            First% = CombTable%(a, b, c, 1)
                            Last% = CombTable%(a, b, c, 2)
                    END IF
            END IF
    END IF
END IF
'-- Return FALSE if there was no valid range (i.e., First%=0)
FirstLast% = (First% <> 0)

END FUNCTION

DEFINT A-Z
SUB LoadData STATIC

'------------------------------------------------ Read in Combined Keys

LoadFILES = LstDir$ + "COMBKEY.STR"
IF NOT Exist%(LoadFILES) THEN CLS : PRINT LoadFILES; " not found.": END
DIM CombKeyTemp AS STR64
NumCombKeyword = FileSize&(LoadFILES) \ SixtyFour
CombKeyWordEMS% = LoadIntoEMS%(LoadFILES)

'------------------------------------------------------ Read Single Keys

LoadFILES = LstDir$ + "SINGKEY.STR"
IF NOT Exist%(LoadFILES) THEN CLS : PRINT LoadFILES; " not found.": END
DIM SingKeyTemp AS STR32
NumKeyword = FileSize&(LoadFILES) \ ThirtyTwo SingKeywordEMS% = LoadIntoEMS%(LoadFILES)

'------------------------------------------------ Read 3-Char Tables

Symb = 28: First = 1: Last = 2
REDIM XLateTable%(38 TO 122)
REDIM SingTable%(1 TO Symb, 1 TO Symb, 1 TO Symb, 1 TO 2)
REDIM CombTable%(1 TO Symb, 1 TO Symb, 1 TO Symb, 1 TO 2)

XLateTable(47) = 1' / char, as used in non-wildcard words
XLateTable(38) = 2' & char, as used in S&P, A&P, etc.
ASCa = ASC("a")
ASCz = ASC("z")
FOR i = ASCa TO ASCz
        XLateTable(i) = i - 94' so that a=3, b=4,...,z=28
NEXT FGetAH LstDir$ + "KEYWORD.TBL", SEG SingTable%(1, 1, 1, 1), (4 * 28), (28 * 28)
FGetAH LstDir$ + "KEYCOMB.TBL", SEG CombTable%(1, 1, 1, 1), (4 * 28), (28 * 28)

END SUB

FUNCTION LoadIntoEMS (File$) STATIC

'-------- Returns the handle where the file was loaded into --------

EMSPg = EmsGetPFSeg%
SizeofFile& = FileSize&(File$)

NumPages = SizeofFile& \ SixteenK + 2' round off to nearest 2 pages
EmsAlloc NumPages, FileEMS, File$ Num32kBlocks = SizeofFile& \ ThirtyTwoK&
LeftOver& = SizeofFile& - (Num32kBlocks * ThirtyTwoK&)
FopenAll File$, 0, 4, LoadFILE
FOR i = 1 TO Num32kBlocks + 1

Box0 14, 10, 18, 70, 2, -1
        PaintBox0 14, 10, 18, 70, -1
        QPrintRC "Loading " + File$ + " block" + STR$(i) + " /" + STR$(Num32kBlocks - 1) + " ", 16, 12, -1
'-- map pages of the EMS memory to the EMS upper mem page frame
FOR j = 1 TO 2
        EmsMapMem FileEMS, j, (i - 1) * 2 + j
        IF EmsError% THEN PRINT "Ems error:"; EmsError%: STOP
NEXT '-- seek to beginning of current block
FSeek LoadFILE, (i - 1) * ThirtyTwoK&

IF DOSError% THEN PRINT "Dos Error:"; WhichError%: STOP

IF i < Num32kBlocks + 1 THEN

'-- get the 32k block and put it directly into the EMS page frame
        FGetA LoadFILE, BYVAL EMSPg, BYVAL 0, ThirtyTwoK&

IF DOSError% THEN PRINT "Dos Error:"; ErrorMsg$(WhichError%): STOP

ELSE

'-- load the left over (<32k) bytes
        FGetA LoadFILE, BYVAL EMSPg, BYVAL 0, LeftOver&
```

```
                IF DOSError% THEN PRINT "Dos Error:"; ErrorMsg$(WhichError%): STOP
        END IF
NEXT FClose LoadFILE ClearScr0 14, 10, 18, 70, NormAttr LoadIntoEMS = FileEMS

END FUNCTION

SUB Wrapping (Sent$, Text$(), NumLines) STATIC
Wid = 78
MaxNumLines = LEN(Sent$) \ Wid + 3
REDIM Text$(1 TO MaxNumLines)
NumLines = 0
DO
        '-- increment NumLinese counter for number of NumLineses of text
        NumLines = NumLines + 1
        IF NumLines > MaxNumLines THEN
           REDIM PRESERVE Text$(1 TO NumLines)
        END IF
        '-- look for the ...st space so we can word wrap at that point
        NewSent = QInstrB%(Wid + 1, Sent$, CHR$(1))
        IF NewSent > 2 THEN
                IF RIGHT$(RTRIM$(Sent$), 1) = CHR$(1) THEN
                        Text$(NumLines) = RTRIM$(LEFT$(Sent$, NewSent))
                ELSE
                        Text$(NumLines) = RTRIM$(LEFT$(Sent$, NewSent - 1))
                END IF
                Sent$ = MID$(Sent$, NewSent + 1)
        ELSE
                LastSpc = QInstrB%(Wid + 1, Sent$, " ")
                Text$(NumLines) = RTRIM$(LEFT$(Sent$, LastSpc))
                '-- remove portion of string that's been moved to the Text$() array
                Sent$ = MID$(Sent$, LastSpc + 1)
        END IF
LOOP WHILE LEN(Sent$) > Wid
Sent$ = RTRIM$(Sent$)
IF LEN(Sent$) THEN
        NumLines = NumLines + 1
        IF NumLines > MaxNumLines THEN
           REDIM PRESERVE Text$(1 TO NumLines)
        END IF
        Text$(NumLines) = Sent$
END IF
END SUB DEFINT A-Z
'$TITLE: 'Q-Search User Program'
'$SUBTITLE: 'QSEARCH Module'

CONST FALSE = 0, TRUE = NOT FALSE, ASCEND = 0, DESCEND = 1
CONST MaxShow = 50

'scan code + 200 for not to mix with letters
CONST UP = 272, PgUp = 273, Dn = 280, PgDn = 281, HM = 271, EN = 279
CONST CtrlPgUp = 332, CtrlPgDn = 318, CtrlHM = 319, CtrlEN = 317
CONST F1 = 259, F2 = 260, F3 = 261, F4 = 262, F5 = 263
CONST F6 = 264, F7 = 265, F8 = 266, F9 = 267, F10 = 268

CONST ESC = 27, CR = 13
CONST NewSearch = 1, AddWords = 2, EditSearch = 3, Back = 4, Forward = 5, SWAPS = 6, EX = 7

'$INCLUDE: '\\VADIM\C-DRIVE\user\INCLUDE\TYPES.BI'
'$INCLUDE: '\\VADIM\C-DRIVE\user\include\defcnf.bi'
'$INCLUDE: '\\VADIM\C-DRIVE\user\INCLUDE\QEdiType.BI'
'$INCLUDE: '\\VADIM\C-DRIVE\user\INCLUDE\shared.BI'

'------------------------------------------------- External Declarations
'$INCLUDE: '\\VADIM\C-DRIVE\user\EXTERN.BAS'

DECLARE SUB InitMem (Seg%, Addr%, NumBytes%, Value%)
DECLARE SUB QEdit (Array$(), x$, Action%, Ed AS EditInfo)
DECLARE SUB FindExact (BYVAL Address%, NumEl%, Search1$)
'------------------------------------------------- Internal Declarations
DECLARE SUB AddSearchTerms (Expr AS ExpressionType)
DECLARE SUB AddSentence (Expr AS ExpressionType)
DECLARE SUB BuildCombTable (Mode$)
DECLARE SUB ChangeChar (Txt$, New$, Keep$)
DECLARE SUB ClearBG ()
DECLARE SUB Code2Str (Store$, Location%, Code%)
DECLARE SUB Config ()
DECLARE SUB CPrint (x$)
DECLARE SUB CreateTables ()
DECLARE SUB DeleteWord (Expr AS ExpressionType)
DECLARE SUB CutWord (KWord$)
DECLARE SUB DispMsg (Msg$, R%, c%)
DECLARE SUB DispQSL (LibName$, ScrnName$)
DECLARE SUB DrawBox (ULRow%, ULCol%, LRRow%, LRCol%, Frame%, Col%)
DECLARE SUB EmsAlloc (NumPages%, Handle%, LoadFile$)
DECLARE SUB FindCombKey (WordList$(), NumWord%, CombFound$(), NumCombFound%)
DECLARE SUB FindSingKey (WordList$(), NumWord%, SingFound$(), NumSingFound%)
DECLARE SUB Freehandles ()
DECLARE SUB FullText (First&, Last&, FileNum%, Expr$)
DECLARE SUB HistMessage ()
DECLARE SUB InsertWord (Expr AS ExpressionType)
DECLARE SUB Lib2Scrn (NameInLib$, ScrnLib%(), MonoCode%, Attribute%, ErrorCode%)
```

```
DECLARE SUB LoadData ()
DECLARE SUB LoadPrefixes (Prefixes$(), MeanPrefixes$(), Lang$)
DECLARE SUB OtherWords (Expr AS ExpressionType, WordPtr)
DECLARE SUB PickChoice (m() AS ANY, NumM%, Label$, Pick%(), NumPick%, ExactFlag%, Expr AS ExpressionType)
DECLARE SUB PrintAbstr (First&, Last&, FileNum, RecNum&)
DECLARE SUB RankRecords (Recs() AS RecInfoType, NumFound%, E AS ExpressionType)
DECLARE SUB ReadEnglishText (Txt$)
DECLARE SUB ReadGermanText (Txt$)
DECLARE SUB References (Text$)
DECLARE SUB ReWriteHist (Curr%)
DECLARE SUB Sections (Txt$)
DECLARE SUB SelectMenu (Ch$, Expression AS ANY, HotStr$, GlobalStatus%)
DECLARE SUB ScrollHist (Curr%, Direction$, MaxNum)
DECLARE SUB ScrSR (SRS)
DECLARE SUB ShowAbstr (RecNum&)
DECLARE SUB ShowDoc (Show() AS RecInfoType, NumShow, Expr AS ExpressionType, RecNum)
DECLARE SUB ShowExpr (Expr AS ExpressionType)
DECLARE SUB ShowHist (NumShow, RecNum%, Expr AS ExpressionType)
DECLARE SUB ShowKeywords (RecNum&)
DECLARE SUB ShowQuery ()
DECLARE SUB TermMatch (Term$, Expr AS ExpressionType, m() AS CollectType, NumM%, Repeate, ExactFlag)
DECLARE SUB VertMenu (Item$(), Choice%, MaxLen%, BoxBot%, Ky$, Action%, Cnf AS Config, Mode$, HK, EK, PgUK, PgDK, UK, DK, TermTypeMode
DECLARE SUB WaitSpace ()
DECLARE SUB WindMgr (ULRow%, ULCol%, LRRow%, LRCol%, Frame%, BoxColr%, TextColr%, Text$)
DECLARE SUB WordParse (Txt$, WordList$(), NumWords%)

DECLARE FUNCTION BoxInput$ (Edit$, Title$, Prompt$, Row%, Col%, Scan)
DECLARE FUNCTION ComboSum& (Bit$, Value&, Mode$, Poly!())
DECLARE FUNCTION Dict$ (Code%)
DECLARE FUNCTION DictSrch% (w AS DictType)
DECLARE FUNCTION FirstLast% (Word$, First%, Last%, KeyType%)
DECLARE FUNCTION KeyInstr% (KeyStr$, Srch$)
DECLARE FUNCTION KeyHic% (KeyStr$, Start%)
DECLARE FUNCTION Question$ (Prompt$, Choice$, Label$)
DECLARE FUNCTION Num$ (x%)
DECLARE FUNCTION SpaceNum$ (x%, Space%)
DECLARE FUNCTION Str2Code% (S$, k%)
DECLARE FUNCTION ZeroNum$ (x%, Zero%)

'_____

ON ERROR GOTO Again

STACK 6000
ReStart:
REDIM Menu$(1)
REDIM GermanMenu$(1)
LoadedFlag = FALSE
CALL Config
DIM Expression AS ExpressionType
Exclude$ = ""

MenuData:
DATA "Menu Selections:"
DATA "Related Topics         | T"
DATA "Add Search Words       | A"
DATA "Delete a Word.         | D"
DATA "Restore Deleted word   | R"
DATA "----------------------- "
DATA "View Documents         | V"
DATA "----------------------- "
DATA "New Search             | N"
DATA "----------------------- "
DATA "Exit Program           | X"
DATA "END"

MenuGermanData:
DATA "MENUE:"
DATA "Verwandte Themen       | T"
DATA "Fuege Wort Hinzu       | F"
DATA "Loesche Wort           | L"
DATA "Hol Wort Zurueck       | H"
DATA "----------------------- "
DATA "Suche Fundstelle       | S"
DATA "----------------------- "
DATA "Neue Sucheingabe       | N"
DATA "----------------------- "
DATA "Exit System            | X"
DATA "END"

NLGData:
DATA "mr","mrs","messrs","sen","rep","ms","dr","drs"
SectionData:
DATA "Section","Sec","Sec."
ArticleData:
DATA "Article","Art.","Art"
ParagraphData:
DATA "Paragraph","Par","Par."
ArtikelData:
DATA "Artikel","Art","Art."
NumData:
DATA "I","II","III","IV","V","VI","VII","VIII","IX","X"
DATA "XI","XII","XIII","XIV","XV","XVI","XVII","XVIII","XIX","XX"
DATA "XXI","XXII","XXIII","XXIV","XXV","XXVI","XXVII","XXVIII","XXIX","XXX"

EnglishStr$ = "TADRVNX"
GermanStr$ = "TFLHSNX"
IF Lang$ = "GERMAN" THEN
        HotStr$ = GermanStr$
```

```
ELSE
        HotStr$ = EnglishStr$
END IF

'$Page
'_____
'                       START OF PROGRAM FLOW
'_____

NewSearch:

ClearBG
        QPrintRC "| Q-Search |", 1, 36, RevAttr%
        GlobalStatus = NewSearch
        Expression.Num = 0         ' Number of subexpressions entered (none yet!)
        Expression.Match = -1      ' No full search yet
        Expression.SubExpr(1).Match = -1     ' No search yet
        Expression.SubExpr(1).Num = 0        ' No matches either
        Expression.SubExpr(1).Phrase = ""

CurrentSub = 1  ' current subexpr (1 to 3) that's being 'edited'
        MaxWordLen = 0  ' reset max word length global variable for ShowExpr
        WordPtr = 0     ' clear the WordPtr for FindRelatives()
        LIFO$ = ""
        OriginalExpr$ = ""

'---- Get the sentence input and place words directly into Expression

AddSentence Expression
ShowExpr Expression

'_____ SEARCH MENU _____

Menu:

IF Lang$ <> "GERMAN" THEN
        CALL References("PRESS LETTER OR USE " + CHR$(24) + CHR$(25) + " TO HIGHLIGHT CHOICE AND THEN PRESS ENTER")
ELSE
        CALL References("SHOULD BE MESSAGE IN GERMAN")
END IF Action = 1' set initial action to just display menu
Ky$ = "Search MENU"
Choice = 0

LOCATE 2, 51
IF Lang$ = "GERMAN" THEN
        VertMenu GermanMenu$(), Choice, LEN(GermanMenu$(1)), 18, Ky$, Action, Cnf, "M", 0, 0, 0, 0, 0, 0, TermTypeMode$, TermTypeFlag
ELSE
        VertMenu Menu$(), Choice, LEN(Menu$(1)), 18, Ky$, Action, Cnf, "M", 0, 0, 0, 0, 0, 0, TermTypeMode$, TermTypeFlag
END IF '---- Action is automatically set to 3 for polling after call to VertMenu Choice = 1
DO
        IF Lang$ = "GERMAN" THEN
                VertMenu GermanMenu$(), Choice, LEN(Menu$(1)), 18, Ky$, Action, Cnf, "M", 0, 0, 0, 0, 0, 0, TermTypeMode$, TermTypeFla
        ELSE
                VertMenu Menu$(), Choice, LEN(Menu$(1)), 18, Ky$, Action, Cnf, "M", 0, 0, 0, 0, 0, 0, TermTypeMode$, TermTypeFlag
        END IF IF Action = 3 THEN 'user exited without making a choice or ESCaping IF LEN(Ky$) = 1 THEN ' check for direct access (single letter) Choice IF Choice THEN EXIT DO
                        LETTER = INSTR(MenuChoice$, Ky$)
                        IF LETTER THEN
                                Choice = LETTER
                                EXIT DO
                        END IF
                END IF
                IF LEN(Ky$) = 1 THEN
                        AscKy = ASC(Ky$)
                ELSEIF LEN(Ky$) = 2 THEN
                        AscKy = ASC(RIGHT$(Ky$, 1)) + 200
                END IF
                        SELECT CASE AscKy CASE F10, NewSearchKey' new search
                                        IF Lang$ = "GERMAN" THEN
                                                i$ = Question$("NEUE SUCHE ? [J/N]  ", "JN", "ACHTUNG !")
                                                IF i$ = "J" THEN
                                                        GOTO NewSearch
                                                END IF
                                        ELSE
                                                i$ = Question$("New Search? [Y/N]", "YN", "WARNING!")
                                                IF i$ = "Y" THEN
                                                        GOTO NewSearch
                                                END IF
                                        END IF CASE F1' help
                                        CALL DispMsg("Sorry, there is currently no help available.  Press the Space Bar to Return to M
                                        CALL WaitSpace
                                        CALL DispMsg("", 0, 0)

CASE F2, ShowExprKey 'Show query
                                        CALL ShowQuery

CASE ELSE
```

```
                END SELECT
            END IF

ELSEIF Action = 4 THEN ' user exited with a choice, but check for ESCape

IF Ky$ = CHR$(ESC) THEN
                    GOTO ExitSearch
            ELSE
                    EXIT DO
            END IF ELSE
            LOCATE 1, 25
            Chime 2
            PRINT " -- Invalid ACTION value "; Action; " returned -- "
            Freehandles
            WaitSpace
            END
        END IF
LOOP Action = 5' restore screen
VertMenu Menu$(), Choice, LEN(Menu$(1)), 18, Ky$, Action, Cnf, "M", 0, 0, 0, 0, 0, 0, TermTypeMode$, TermTypeFlag
LOCATE , , 0

ScrSR "S"
IF Choice = 0 OR (Expression.Num = 0 AND Choice <> 8 AND Choice <> 10) GOTO Menu
CALL SelectMenu(MID$(MenuChoice$, Choice, 1), Expression, HotStr$, GlobalStatus)
'===============================
IF GlobalStatus <> EX THEN 'not exit
        ScrSR "R"
        ShowExpr Expression
        IF GlobalStatus = NewSearch GOTO NewSearch
        GOTO Menu
        '===============================
ELSE 'exit
ExitSearch:
        IF Lang$ = "GERMAN" THEN
                i$ = Question$("Exit Program? [J/N]", "NJ", "ACHTUNG!")
        ELSE
                i$ = Question$("Exit Program? [Y/N]", "NY", "WARNING!")
        END IF
        IF i$ = "N" THEN
                ShowExpr Expression
                GOTO Menu
        END IF
ExitProgram:
        CLS
        Freehandles
        END
        DATA "Copyright 1990, 1991 by Ted M. Young. All Rights Reserved."
END IF
'$Page
Again:
NormAttr = OneColor%(Fg, BG)
'PRINT ERR
CALL ClearBG
DispMsg "Sorry, cannot continue with this action.  Please try another.", 0, 0
DO: LOOP UNTIL LEN(INKEY$)
IF LoadedFlag THEN
        RESUME NewSearch
END IF
END SUB AddSentence (Expr AS ExpressionType) STATIC '-- let's the user type in a full sentence, parses the sentence and
'   places the keywords found into the current expression DIM Ed AS EditInfo NumExprWords = 0

GetSentence:

Ed.Rows = 3
Ed.Wide = 76
Ed.Wrap = Ed.Wide
Ed.AColor = NormAttr
Ed.Frame = 0
Ed.CurCol = 1: Ed.LC = 1
Ed.CurLine = 1: Ed.TL = 1

REDIM Sentence$(1 TO 3) '-- up to 3 lines of text

ULRow = 5: ULCol = 2
LRRow = ULRow + Ed.Rows + 1: LRCol = ULCol + Ed.Wide + 1

ScrSR "S"
ClearScr0 ULRow, ULCol, LRRow, LRCol, NormAttr
CALL DrawBox(ULRow, ULCol, LRRow, LRCol, 1, NormAttr)
IF TermTypeFlag THEN
        LMChar$ = "|"
        RMChar$ = "|"
ELSE
        LMChar$ = "["
        RMChar$ = "]"
END IF
IF Lang$ = "GERMAN" THEN
        Title$ = "Stellen Sie Ihre Frage"
```

```
        ELSE
                Title$ = "Enter Your Search Request"
        END IF
        CALL QPrintRC(LMChar$ + Title$ + RMChar$, ULRow, (ULCol + LRCol - LEN(Title$) - 2) \ 2, NormAttr)

IF Lang$ = "GERMAN" THEN
                Title$ = "danach ENTER Taste"
        ELSE
                Title$ = "Press ENTER when done"
        END IF
        CALL QPrintRC(LMChar$ + Title$ + RMChar$, LRRow, (ULCol + LRCol - LEN(Title$) - 2) \ 2, NormAttr)

LOCATE ULRow + 1, ULCol + 1 x$ = ""
        QEdit Sentence$(), x$, 0, Ed

IF ASC(x$) = ESC THEN EXIT SUB

ScrSR "R"

'— put the sentence into a single string
        SearchReq$ = ""
        FOR i = 1 TO 3
                IF LEN(Sentence$(i)) THEN SearchReq$ = SearchReq$ + " " + Sentence$(i)
        NEXT
        SearchReq$ = LTRIM$(SearchReq$)

IF LEN(SearchReq$) = 0 GOTO GetSentence

IF Lang$ = "GERMAN" THEN
                DispMsg "Computer liest Sucheingabe", R, c
        ELSE
                DispMsg "Parsing sentence...", R, c
        END IF
        IF Lang$ = "ENGLISH" THEN
                ReadEnglishText SearchReq$
        ELSEIF Lang$ = "GERMAN" THEN
                ReadGermanText SearchReq$
        END IF
        REDIM WordList$(1 TO 1)
        WordParse SearchReq$, WordList$(), NumWords REDIM Comb$(1 TO 1)
        FindCombKey WordList$(), NumWords, Comb$(), NumComb REDIM Sing$(1 TO 1)
        FindSingKey WordList$(), NumWords, Sing$(), NumSing '——— Now use DictSrch% to convert the synonyms found to their Code Numbers
        DIM DictTemp AS DictType
        REDIM ExprCodes(1 TO 1) AS CodePolyType FOR i = 1 TO NumComb
                DictTemp.Str = Comb$(i)
                GOSUB AddWord
        NEXT FOR i = 1 TO NumSing
                DictTemp.Str = Sing$(i)
                GOSUB AddWord
        NEXT
        IF NumSing + NumComb = 0 OR Expr.Num = 0 THEN
                DispMsg "", 0, 0
                IF NumSing + NumComb = 0 THEN
                        IF Lang$ = "GERMAN" THEN
                                DispMsg "Sucheingabe enthaelt kein bekanntes Wort. LEERTASTE um weiterzumachen!", R, c
                        ELSE
                                DispMsg "There were no keywords found in your sentence.  Press the Space Bar now to continue.", R, c
                        END IF
                ELSE
                        IF Lang$ = "GERMAN" THEN
                                DispMsg "Kein Dokument enthaelt diesen Begriff.", R, c
                        ELSE
                                DispMsg "That word/phrase is not an indexed word in this database.  Press the Space Bar now to continue.", R,
                        END IF
                END IF
                WaitSpace
                DispMsg "", 0, 0
                GOTO GetSentence
        END IF SortT ExprCodes(1), NumExprWords, DESCEND, LEN(ExprCodes(1)), 2, -3

Expr.Num = 1
        Expr.SubExpr(1).Num = NumExprWords

FOR k = 1 TO NumExprWords
                Code2Str Expr.SubExpr(1).Phrase, k, ExprCodes(k).Code
                OriginalExpr$ = OriginalExpr$ + MKI$(ExprCodes(k).Code)
        NEXT DispMsg "", 0, 0
        EXIT SUB

'-----------------------------------------------

AddWord:

LETTER$ = LEFT$(DictTemp.Str, 2)
```

```
IF LETTER$ = "zs" OR LETTER$ = "za" THEN
        SecNum = VAL(MID$(DictTemp.Str, 3))
        IF SecNum > 0 AND SecNum <= 3000 THEN
                IF LETTER$ = "zs" THEN
                        Code = SecNum + SecCode
                ELSE
                        IF SecNum <= 30 THEN Code = SecNum + ArtCode
                END IF
        END IF
ELSE
        Code = DictSrch%(DictTemp)
END IF IF Code THEN    '-- then it's a valid code Found = FALSE
        FOR j = 1 TO NumExprWords
                IF Code = ExprCodes(j).Code THEN '-- this code was already entered
                        Found = TRUE
                        EXIT FOR
                END IF
        NEXT IF NOT Found THEN '-- add it to the expression
                IF NumExprWords < 15 AND KYIndx(Code).Num > 0 THEN
                        .Expr.Num = 1
                        NumExprWords = NumExprWords + 1
                        REDIM PRESERVE ExprCodes(1 TO NumExprWords) AS CodePolyType
                        ExprCodes(NumExprWords).Code = Code
                        EmsGet1El ExprCodes(NumExprWords).Poly, LEN(ExprCodes(1).Poly), Code, PolySemyEMS

END IF

END IF

ELSE            '-- it's not a valid code, so indicate an error

Chime 2
        DispMsg "The word " + RTRIM$(DictTemp.Str) + " was not found in the dictionary.", R, c
        WaitSpace
        DispMsg "", 0, 0
        Freehandles
        END

END IF

RETURN

END SUB

SUB ChangeChar (Txt$, New$, Keep$)

'***************************************************************
'can be deleted after change abstract program
Start = 1
DO
ApostrLoc = INSTR(Start, Txt$, " '")
IF ApostrLoc THEN
        Start = ApostrLoc + 1
        SpaceLoc = INSTR(Start, Txt$, " ")
        IF SpaceLoc > 0 THEN
                MID$(Txt$, ApostrLoc, SpaceLoc - ApostrLoc + 1) = STRING$(SpaceLoc - ApostrLoc + 1, 32)
                Start = ApostrLoc
        ELSE
                EXIT DO
        END IF
END IF
LOOP UNTIL NOT ApostrLoc 'the same for the first word
ApostrLoc = INSTR(Start, Txt$, "'")
IF ApostrLoc = 1 THEN
        SpaceLoc = INSTR(Start, Txt$, " ")
        IF SpaceLoc > 0 THEN
                MID$(Txt$, ApostrLoc, SpaceLoc - ApostrLoc + 1) = STRING$(SpaceLoc - ApostrLoc + 1, 32)
                Start = ApostrLoc
        END IF
END IF
'delete "' "
Start = 1
DO
ApostrLoc = INSTR(Start, Txt$, "' ")
IF ApostrLoc THEN
        Start = ApostrLoc + 1
        MID$(Txt$, ApostrLoc, 1) = " "
END IF
LOOP UNTIL NOT ApostrLoc

''**************************************************************

'-- replace all chars except contained in Keep$
LENTxt = LEN(Txt$)
FOR i = 1 TO LENTxt
        IF INSTR(Keep$, MID$(Txt$, i, 1)) = 0 THEN
                MID$(Txt$, i, 1) = New$
        END IF
NEXT Start = InstrTbl(1, Txt$, Keep$)
IF Start > 0 THEN
```

```
            MID$(Txt$, 1, Start - 1) = STRING$(Start - 1, 1)
         DO
                 SpaceLoc = INSTR(Start, Txt$, " ")
                 IF SpaceLoc THEN
                         DO WHILE MidChar(Txt$, SpaceLoc + 1) = 32
                                 MID$(Txt$, SpaceLoc, 1) = CHR$(0)
                                 SpaceLoc = SpaceLoc + 1
                         LOOP
                         Start = SpaceLoc
                 ELSE
                         EXIT DO
                 END IF
         LOOP UNTIL SpaceLoc = 0
   END IF

END SUB

SUB ClearBG STATIC

STATIC Array%, BG%()  '— FALSE if this is the first call, so we need to save
                                              '    the screen in an array after we fill the background
                                              '    TRUE if we've already stored the bg in the array
   IF TermTypeFlag THEN
         IF Array% THEN ScrnRest0 1, 1, 25, 80, BG%(1)

ELSE

CLS
                 Ruler1$ = STRING$(1, 178) + STRING$(78, 178) + STRING$(1, 178)
                 Ruler2$ = STRING$(1, 178) + STRING$(78, 176) + STRING$(1, 178)
                 Ruler3$ = STRING$(1, 178) + STRING$(78, 178) + STRING$(1, 178)

QPrintRC Ruler1$, 1, 1, NormAttr%
                 FOR i = 2 TO 24
                         QPrintRC Ruler2$, i, 1, NormAttr%
                 NEXT
                 QPrintRC Ruler3$, 25, 1, NormAttr%

REDIM BG%(1 TO 2000)
                 ScrnSave0 1, 1, 25, 80, BG%(1)

Array = TRUE

END IF
   ELSE
         CLS
   END IF
   END SUB

SUB Code2Str (Store$, Location%, Code%) STATIC

MID$(Store$, Location% * 2 - 1, 2) = MKI$(Code%)

END SUB

SUB Config STATIC

SHARED NLG$(), LENNLG(), Menu$(), MenuChoice$, GermanMenu$(), GermanMenuChoice$
   CLS
   IF COMMAND$ <> "" AND COMMAND$ <> "/B" THEN
         IF INSTR(COMMAND$, " ") THEN
                 DBName$ = LEFT$(COMMAND$, INSTR(COMMAND$, " ") - 1)
         ELSE
                 DBName$ = COMMAND$
         END IF
   ELSE
         PRINT "No Database Specified.  Please type: USER [database name]"
         Chime 10
         END
   END IF OPEN DBName$ + ".CFG" FOR INPUT AS #1
      INPUT #1, Fg, BG, Brdr, LstDir$, DocDir$, NdxDir$, AbstrDir$, Lang$, TermTypeMode$
   CLOSE #1

Cnf.MonTyp = Monitor%
   IF INSTR(COMMAND$, "/E") OR TermTypeMode$ <> "LOCAL" THEN Cnf.MonTyp = 2

SELECT CASE Cnf.MonTyp
         CASE 3, 5, 7                    'CGA, EGA/Color or VGA/Color monitors
                 Cnf.PulBar = 48
                 Cnf.MenBox = 49
                 Cnf.ActivCh = 48
                 Cnf.InActCh = 52'6
                 Cnf.HiLite = 31'79
                 Cnf.InActHiLt = 64
                 Cnf.NorMen = 30
                 Cnf.CurSize = 13
                 IF Cnf.MonTyp = 5 THEN Cnf.CurSize = 7
         CASE ELSE
                 Cnf.PulBar = 112
                 Cnf.MenBox = 112'2
                 Cnf.ActivCh = 112'10
                 Cnf.InActCh = 112'4
                 Cnf.HiLite = 15'112
                 Cnf.InActHiLt = 80
                 Cnf.NorMen = 7
                 Cnf.CurSize = 13
```

```
        END SELECT

FileS = NdxDirS + "AVGDOCFQ.DAT"
        IF NOT Exist%(FileS) THEN
                CLS
                PRINT FileS; " was not found."
                CALL Freehandles
                END
        END IF OPEN FileS FOR INPUT AS #1
                INPUT #1, RootofAvgDocFreq!
        CLOSE #1

FileS = NdxDirS + "PolyAvg.Dat"
        IF NOT Exist%(FileS) THEN
                CLS
                PRINT FileS; " was not found."
                CALL Freehandles
                END
        END IF OPEN FileS FOR INPUT AS #1
                INPUT #1, PolyAvg!
        CLOSE #1

FileS = LstDirS + "a" + LangS + ".LST"
        IF NOT Exist%(FileS) THEN
                CLS
                PRINT FileS; " was not found."
                CALL Freehandles
                END
        END IF OPEN FileS FOR INPUT AS #1
                LINE INPUT #1, AtListS
        CLOSE #1

'COLOR Fg, BG, Brdr

'vvvvvvvvvvvvvvvvvvvvvvvvv
        'which terminal time
        IF TermTypeModeS = "LOCAL" OR TermTypeModeS = "PC" THEN
                TermTypeFlag = TRUE
        ELSE
                TermTypeFlag = FALSE
        END IF
        IF TermTypeFlag THEN
                HistCharS = CHRS(178)
                HighCharS = CHRS(219)
                LMargS = "¦ "
                RMargS = " ¦"
        ELSE
                HistCharS = "X"
                HighCharS = "*"
                LMargS = "["
                RMargS = "]"
        END IF
        '----------------------------
        NormAttr = OneColor%(Fg, BG)
        IF Cnf.MonTyp = 2 THEN
                IF BG > 0 THEN
                        RevAttr = OneColor%(14, 4)
                ELSE
                        RevAttr = OneColor%(BG, Fg AND 7)
                END IF
        ELSE
                IF BG > 0 THEN
                        RevAttr = OneColor%(14, 4)
                        HiAttr = OneColor(0, 3)
                ELSE
                        RevAttr = OneColor%(BG, Fg AND 7)
                        HiAttr = RevAttr
                END IF
        END IF

CLS

IF NOT EmsLoaded THEN
                PRINT "The EMS Driver has not been loaded."
                Chime 2
                END
        END IF HomeKey = ASC("H")
        EndKey = ASC("E")
        PgUpKey = ASC("P")
        PgDnKey = ASC("G")
        RightArrowKey = ASC("R")
        LeftArrowKey = ASC("L")
        UpArrowKey = ASC("U")
        DownArrowKey = ASC("D")
        ShowExprKey = ASC("S")
        DirNumKey = ASC("I")
        NewSearchKey = ASC("N")

SixtyFour = 64
        SixteenK = 16384
        ThirtyTwoK& = 32768
        Sing = 0: Comb = 1
```

```
AscA = ASC("a")
AscZ = ASC("z")
AscUpperA = ASC("A")
AscUpperZ = ASC("Z")
ASC0 = ASC("0")
ASC9 = ASC("9")
Boost! = 2!
AbstrMode = 8
New$ = " "        ' replacement string for punctuation
Keep$ = ""
FOR j = 65 TO 90: Keep$ = Keep$ + CHR$(j): NEXT
FOR j = 97 TO 122: Keep$ = Keep$ + CHR$(j): NEXT
Keep$ = Keep$ + "'&"                            '+"([-" + CHR$(34)

NdxLEN = LEN(Ndx)
FCInfoLEN = LEN(FCInfo)
KYInfoLEN = LEN(KYInfo)
WeightLEN = LEN(Weight)
PolyLEN = LEN(PolyValue)

CLS

' Display the opening title screen -- it's in a separate QSCR library
IF TermTypeFlag THEN
        DispQSL "USER.QSL", "OPENING"
ELSE
   DispQSL "USER.QSL", "CPENTERM"
END IF
CreateTables
IF Lang$ = "GERMAN" THEN
        QPrintRC " [ EINLADEN DER DATEN ] ", 24, 29, NormAttr
ELSE
        QPrintRC " [ LOADING DATA FILES ] ", 24, 29, NormAttr
END IF
LoadData Chime 6

NumFilesLoaded = NumFilesLoaded + 1

IF Lang$ = "GERMAN" THEN
        QPrintRC " [ EINLADEN DER DATEN " + STR$(NumFilesLoaded) + " ] ", 24, 29, NormAttr
ELSE
        QPrintRC " [ LOADING DATA FILES " + STR$(NumFilesLoaded) + " ] ", 24, 29, NormAttr
END IF IF Lang$ <> "GERMAN" THEN
        REDIM Menu$(0 TO 0)
        RESTORE MenuData
        m = 0
        DO
                READ x$
                IF x$ = "END" THEN EXIT DO
                REDIM PRESERVE Menu$(0 TO m)
                IF NOT TermTypeFlag THEN
                        a = INSTR(x$, "|")
                        IF a THEN MID$(x$, a, 1) = "|"
                        IF LEFT$(x$, 1) = "-" THEN x$ = STRING$(24, "-")
                END IF
                Menu$(m) = x$
                m = m + 1
        LOOP
ELSE
        REDIM GermanMenu$(0 TO 0)
        RESTORE MenuGermanData
        m = 0
        DO
                READ x$
                IF x$ = "END" THEN EXIT DO
                REDIM PRESERVE GermanMenu$(0 TO m)
                IF NOT TermTypeFlag THEN
                        a = INSTR(x$, "|")
                        IF a THEN MID$(x$, a, 1) = "|"
                        IF LEFT$(x$, 1) = "-" THEN x$ = STRING$(24, "-")
                END IF
                GermanMenu$(m) = x$
                m = m + 1
        LOOP
END IF 'create menuchoice$ (a list of valid keys to pick from menu)
'extract the characters from the menu display itself since the keys
'are always listed as the last character on the line MenuChoice$ = SPACE$(m - 1)
IF Lang$ = "GERMAN" THEN
        FOR i = 1 TO m - 1
                x$ = RIGHT$(GermanMenu$(i), 1)
                '-- make the "-" choices into chr(0) so they can't be picked
                IF x$ = "-" THEN x$ = CHR$(0)
                MID$(MenuChoice$, i, 1) = x$
        NEXT
ELSE
        FOR i = 1 TO m - 1
                x$ = RIGHT$(Menu$(i), 1)
                '-- make the "-" choices into chr(0) so they can't be picked
                IF x$ = "-" THEN x$ = CHR$(0)
                MID$(MenuChoice$, i, 1) = x$
        NEXT
END IF
```

```
IF Lang$ <> "GERMAN" THEN

REDIM NLG$(1 TO 8), LENNLG(1 TO 8)
        RESTORE NLGData
        FOR i = 1 TO 8
                READ NLG$(i)
                LENNLG(i) = LEN(NLG$(i))
        NEXT REDIM Section$(1 TO 3)
        RESTORE SectionData
        FOR i = 1 TO 3
                READ Section$(i)
        NEXT
        REDIM Article$(1 TO 3)
        RESTORE ArticleData
        FOR i = 1 TO 3
                READ Article$(i)
        NEXT

ELSE

REDIM Paragraph$(1 TO 3)
        RESTORE ParagraphData
        FOR i = 1 TO 3
                READ Paragraph$(i)
        NEXT
        REDIM Artikel$(1 TO 3)
        RESTORE ArtikelData
        FOR i = 1 TO 3
                READ Artikel$(i)
        NEXT

END IF

REDIM Numbers$(1 TO 30)
RESTORE NumData
FOR i = 1 TO 30
        READ Numbers$(i)
NEXT CALL LoadPrefixes(Prefixes$(), MeanPrefixes$(), Lang$)

END SUB

SUB CPrint (x$) STATIC

END SUB

SUB CreateTables STATIC

'-- load in the 3-letter index tables from disk into EMS

Symb = 28
First = 1: Last = 2
REDIM XLateTable%(38 TO 122)
NumEl = Symb ^ 3

XLateTable%(47) = 1' / char, as used in non-wildcard words
XLateTable%(38) = 2' & char, as used in S&P, A&P, etc.
FOR i = ASC("a") TO ASC("z")
        XLateTable%(i) = i - 94' so that a=3, b=4,...,z=28
NEXT REDIM SingTableFir%(1 TO NumEl)
FGetAH LstDir$ + "KEYWORD.FIR", SEG SingTableFir%(1), 2, NumEl
Array2EMS SingTableFir%(1), 2, NumEl, SingTblFirEMS
ERASE SingTableFir%

REDIM SingTableLas%(1 TO NumEl)
FGetAH LstDir$ + "KEYWORD.LAS", SEG SingTableLas%(1), 2, NumEl
Array2EMS SingTableLas%(1), 2, NumEl, SingTblLasEMS
ERASE SingTableLas%

REDIM CombTableFir%(1 TO NumEl)
FGetAH LstDir$ + "KEYCOMB.FIR", SEG CombTableFir%(1), 2, NumEl
Array2EMS CombTableFir%(1), 2, NumEl, CombTblFirEMS
ERASE CombTableFir%

REDIM CombTableLas%(1 TO NumEl)
FGetAH LstDir$ + "KEYCOMB.LAS", SEG CombTableLas%(1), 2, NumEl
Array2EMS CombTableLas%(1), 2, NumEl, CombTblLasEMS
ERASE CombTableLas%

END SUB

SUB CutWord (KWord$)

'-- cut KWord$ by "-" or by " " or just truncates more than 24 letters

IF LEN(KWord$) > 24 THEN
        KWord$ = LEFT$(KWord$, 21) + ".."
        '-- we'd prefer to cut off the word at a "-"
END IF

END SUB

SUB Define (Word$) STATIC

REDIM Scr%(800)' 5 rows of 80 columns, including window
```

```
MScrnSave 21, 1, 25, 80, Scr%(1)
ClearScr0 21, 1, 25, 80, RevAttr
CALL DrawBox(21, 1, 25, 80, 1, RevAttr)

IF Lang$ = "GERMAN" THEN
        QPrintRC "Definition von '" + Word$ + "':", 23, 4, -1
ELSE
        QPrintRC "Definition of '" + Word$ + "':", 23, 4, -1
END IF WaitSpace MScrnRest 21, 1, 25, 80, SEG Scr%(1)
ERASE Scr%

END SUB

FUNCTION Dict$ (Code%) STATIC

'== This function translates a code# to the actual word/phrase

IF Code < 0 THEN ' ---- highlight this word because it's a SWAPS relative
        Code = ABS(Code)
        Flag$ = CHR$(250)
ELSE
        Flag$ = " "
END IF '---- get the "head" word for this code
DIM DictTemp AS DictType
CALL EmsGet1El(SEG DictTemp, LEN(DictTemp), Code%, DictWordH%)

IF Code > 0 THEN

'---- return the frequency of the word prefixed to the word itself

'Dict$ = SpaceNum$(Code, 4) + " " + SpaceNum$(KYIndx(Code).Num, 4) + Flag$ + RTRIM$(DictTemp.Str)

EmsGet PolyValue, PolyLEN, CLNG(Code), PolySemyEMS
'     Dict$ = SpaceNum$(KYIndx(Code).Num, 5) + " " + RTRIM$(DictTemp.Str)

'* use the following line instead to display poly value
    Dict$ = LEFT$(LTRIM$(STR$(PolyValue.Value)) + "    ", 5) + " " + SpaceNum$(KYIndx(Code).Num, 5) + Flag$ + RTRIM$(DictTemp.Str)

ELSE ' this word wasn't found?

Dict$ = " {blank} "

END IF

END FUNCTION

FUNCTION DictSrch% (Word AS DictType) STATIC

'== Binary searches thru an array of DictType (word & code#) for a
'== word and returns the code #. The EMS Handle and the number of
'== DictCode entries are Common Shared.

DIM DictTemp AS DictType, DictTemp2 AS DictType
LENDict = LEN(DictTemp)

L = 1: R = DictCodeNum ' total number of code entries

DO x = (CLNG(L) + R) \ 2
        EmsGet1El DictTemp, LENDict, x, DictCodeH%

IF LCASE$(Word.Str) < LCASE$(DictTemp.Str) THEN
                R = x - 1
        ELSE
                IF LCASE$(Word.Str) <> LCASE$(DictTemp.Str) OR Lang$ <> "ENGLISH" THEN
                        L = x + 1
                ELSE '-- save it temporarily in case we need to restore it
                        '   if the forward/backward look doesn't bring any
                        '   positive results (i.e., we didn't get a match, and we
                        '   need the original DictTemp for the LOOP test)

SWAP DictTemp2, DictTemp
                        EmsGet1El DictTemp, LENDict, x + 1, DictCodeH%
                        IF Word.Str = DictTemp.Str THEN
                                x = x + 1
                                EXIT DO
                        ELSE
                                EmsGet1El DictTemp, LENDict, x - 1, DictCodeH%
                                IF Word.Str = DictTemp.Str THEN
                                        x = x + 1

EXIT DO
                                END IF
                        END IF
                        SWAP DictTemp, DictTemp2
                        L = L + 1
                END IF
        END IF
LOOP UNTIL Word.Str = DictTemp.Str OR L > R
```

```
IF Word.Str = DictTemp.Str THEN '-- it was found, so return where

DictSrch% = DictTemp.Code
        Word.Code = DictTemp.Code

ELSE '-- wasn't found, return 0

DictSrch% = 0
        Word.Code = 0

END IF

END FUNCTION

SUB DispMsg (Msg$, R%, c%) STATIC

STATIC WindOpen, Scr%() ' is there already a message displayed?

LOCATE , , 0 ' turn the cursor off

'---- if the window is open, see if this is a "close window" Message
IF WindOpen THEN
        IF Msg$ = "" THEN
                '---- Msg$ is null, so close the window and exit this sub
                GOSUB MsgClose
                EXIT SUB
        ELSE
                '---- Msg$ wasn't null, but the window is open, so it's an error
                CALL Chime(9)
                GOSUB MsgClose
        END IF
END IF Wid = LEN(Msg$)
IF Wid > 60 THEN Wid = 60

Msg$ = Msg$ + " " ' make sure there's a space to find at the end (see below)

MaxLin = LEN(Msg$) \ Wid + 3
IF MaxLin > 23 THEN MaxLin = 23
REDIM Text$(MaxLin)
Lin = 0

DO

'-- increment line counter for number of lines of text
        Lin = Lin + 1

'-- look for the last space so we can word wrap at that point
        LastSpc = QInstrEx(Wid + 1, Msg$, " ")
        Text$(Lin) = RTRIM$(LEFT$(Msg$, LastSpc))

'-- remove portion of string that's been moved to the Text$() array
        Msg$ = MID$(Msg$, LastSpc + 1)

LOOP WHILE LEN(Msg$) > Wid

Msg$ = RTRIM$(Msg$)
IF LEN(Msg$) THEN
        Lin = Lin + 1
        Text$(Lin) = Msg$
END IF '---- recompute width based on word-wrapped text
Wid = 0
FOR i = 1 TO Lin
        IF LEN(Text$(i)) > Wid THEN Wid = LEN(Text$(i))
NEXT IF R <> 0 AND c = 0 THEN
        ULr = R
ELSE
        ULr = 11
END IF
  DULr = ULr - 1
  LRr = ULr + Lin + 1
  DLRr = LRr + 2 horizmargin = (80 - Wid) \ 2
  ULc = horizmargin
  DULc = ULc - 3
  LRc = 80 - INT(horizmargin)
  IF Wid / 2 = Wid \ 2 THEN LRc = LRc + 1
  DLRc = LRc + 1

REDIM Scr%(ArraySize%(DULr, DULc, DLRr, DLRc))
ScrnSave0 DULr, DULc, DLRr, DLRc, SEG Scr%(0)
WindMgr ULr, ULc, LRr, LRc, 4, NormAttr, NormAttr, ""
FOR i = 1 TO Lin
        QPrintRC Text$(i), ULr + i, ULc + 1, -1
NEXT R = ULr + Lin
c = ULc + 1 + LEN(Text$(Lin))
IF LEN(Text$(Lin)) + 2 = Wid THEN c = ULc + 1: R = R + 1

ERASE Text$
WindOpen = TRUE

EXIT SUB

'------------------------------------------------------- close window
```

```
MsgClose:

ScrnRest0 DULr, DULc, DLRr, DLRc, SEG Scr%(0)
     ERASE Scr%
     WindOpen = FALSE
     RETURN

END SUB

SUB EmsAlloc (NumPages%, Handle%, LoadFile$) STATIC

CALL EmsAllocMem(NumPages%, Handle%)
IF EmsError% THEN
        PRINT "Couldn't allocate"; CLNG(NumPages) * SixteenK / 1024; "Kbytes of EMS for "; LoadFile$
        CALL Freehandles
        CALL Chime(2)
        END
END IF

END SUB

SUB FindCombKey (WordList$(), NumWord%, CombFound$(), NumCombFound%) STATIC

'ARRAY NAME    LEN DESCRIPTION                DIRECTION  MODIFIED?
'----------    --- ----------------------     ---------  ----------
'CombKeyFILE    64 Combined Keyword List      (Shared)   (Unchanged)
'CombFound$()  VAR Combined Keywords Found    (Returned) (Changed)
'WordList$()   VAR Document Words             (Passed)   (Unchanged)

DIM KeyTemp AS CombKeyType' for interface to EmsGet1El
LENKeyTemp = LEN(KeyTemp)

NumCombFound = 0

FOR i = 1 TO NumWord - 1' number of words to process
        AtFlag = FALSE
        NotFlag = FALSE
        '---- make lower case since combined keywords ignore case
        Word$ = LCASE$(WordList$(i))

IF Word$ = "" GOTO SkipCombKey

'---- if it's a valid range, then do comparisons for words in the range
        IF FirstLast%(Word$, First, Last, Comb) THEN FOR j = Last TO First STEP -1

FGetRT CombKeyFILE, KeyTemp, CLNG(j), LENKeyTemp
Words = InCount(RTRIM$(KeyTemp.Str), " ") + 1'count number of words '---- if the keyword has more words than are left in the word list
'      skip it, because there's no possibility of a match.
IF Words > NumWord - i + 1 THEN
        IF Lang$ = "GERMAN" THEN         'AtFlag should work only for German
                IF INSTR(KeyTemp.Str, "@") = 0 GOTO SkipCombKey
        ELSE
                GOTO SkipCombKey
        END IF
END IF
CALL Extract(KeyTemp.Str, " ", 1, Strt, Slen)'extract first word
CurrKey$ = MID$(KeyTemp.Str, Strt, Slen)'     of combined keyword IF RIGHT$(CurrKey$, 1) = "/" THEN
        Exact = TRUE
        CurrKey$ = LEFT$(CurrKey$, Slen - 1)
        Slen = Slen - 1
ELSE
        Exact = FALSE
END IF '---- compare first word of combined key [CurrKey$]
'     against the current document word [Word$]

IF RIGHT$(Word$, 1) = "/" THEN Word$ = LEFT$(Word$, LEN(Word$) - 1)

IF Exact THEN ' check for *exact* match
        Match = (LCASE$(CurrKey$) = LCASE$(Word$))
ELSE
        Match = (LCASE$(CurrKey$) = LCASE$(LEFT$(Word$, Slen)))
END IF ' no match, skip to next combined key in the First-Last range
IF NOT Match GOTO SkipCombKey ' continue matching the rest of the words in the combined key
' exiting out as soon as there's a non-match FOR k = 1 TO Words - 1' number of words left in combined key ' extract the next word from the current combined keyword (j)
        CALL Extract(KeyTemp.Str, " ", k + 1, Strt, Slen)
        CurrKey$ = MID$(KeyTemp.Str, Strt, Slen)

IF RIGHT$(CurrKey$, 1) = "/" THEN
                Exact = TRUE
                CurrKey$ = LEFT$(CurrKey$, Slen - 1)
                Slen = Slen - 1
        ELSE
                Exact = FALSE
        END IF '---- Find AB(German only) A@B, & A@notB in Doc if A@B is in Dict
```

```
                    IF AtFlag = FALSE AND NotFlag = FALSE AND i + k <= NumWord THEN
                            DocWord$ = WordList$(i + k)
                    ELSE
                            IF AtFlag = FALSE AND NotFlag = TRUE AND i + k < NumWord THEN
                                    DocWord$ = WordList$(i + k + 1)
                            ELSE
                                    IF AtFlag = TRUE AND NotFlag = FALSE AND k > 1 THEN
                                            DocWord$ = WordList$(i + k - 1)
                                    ELSE
                                            DocWord$ = WordList$(i + k)
                                    END IF
                            END IF
                    END IF IF RIGHT$(DocWord$, 1) = "/" THEN DocWord$ = LEFT$(DocWord$, LEN(DocWord$) - 1)

IF CurrKey$ = "@" THEN ' special processing for @ wildcard
                            IF INSTR(AtList$, "/" + DocWord$ + "/") THEN
                                    Match = TRUE' the word was in the @ list, so continue
                            ELSE
                                    IF Lang$ = "ENGLISH" THEN
                                            Match = FALSE
                                    ELSE
                                            Match = TRUE
                                            AtFlag = TRUE END IF
                            END IF
                    ELSE
                            IF Exact THEN ' check for *exact* match
                                    Match = (LCASE$(CurrKey$) = LCASE$(DocWord$))
                            ELSE ' wildcard match, only compare # of chars in CurrKey$
                                    Match = (LCASE$(CurrKey$) = LCASE$(LEFT$(DocWord$, Slen)))
                            END IF
                    END IF*
                            IF Match AND i + k < NumWord THEN
                                    DocWord$ = WordList$(i + k + 1)
                                    IF DocWord$ = "not" OR DocWord$ = "be" OR DocWord$ = "nicht" THEN NotFlag = TRUE
                            END IF IF NOT Match THEN EXIT FOR NEXT' word in current combined keyword IF Match THEN ' this is a combined keyword, so add it to the list
                            NumCombFound = NumCombFound + 1
                            REDIM PRESERVE CombFound$(1 TO NumCombFound)
                            CombFound$(NumCombFound) = RTRIM$(KeyTemp.Str)

'-- mark combined word so that single keys
                            '   are not generated from parts of combined keys found
                            IF NotFlag AND NOT AtFlag THEN          'if A @ not @ as A @ B
                                    FOR k = i TO i + Words
                                            WordList$(k) = WordList$(k) + CHR$(255)
                                    NEXT
                            ELSE
                                    IF NOT NotFlag AND AtFlag THEN          'if A@ as A @ B
                                            FOR k = i TO i + Words - 2
                                                    WordList$(k) = WordList$(k) - CHR$(255)
                                            NEXT
                                    ELSE                                    'normal procedure
                                            FOR k = i TO i + Words - 1
                                                    WordList$(k) = WordList$(k) - CHR$(255)
                                            NEXT
                                    END IF
                            END IF
                            EXIT FOR
                    END IF SkipCombKey:
                NEXT
        END IF' Table range was valid NEXT' key in list

END SUB

SUB FindSingKey (WordList$(), NumWord%, SingFound$(), NumSingFound%) STATIC

DIM KeyTemp AS SingKeyType' for interface to EmsGet1El
DIM ExclTemp AS DictType
LENKeyTemp = LEN(KeyTemp)
NumSingFound = 0
ExcludeAdd$ = ""
FOR i = 1 TO NumWord' number of words in document
        MeanPrefixFlag = FALSE: PrefixFlag = FALSE: CombineFlag = FALSE
        Word$ = WordList$(i)
        IF Word$ <> "" THEN
                IF RIGHT$(Word$, 1) = CHR$(255) THEN
                        Word$ = LEFT$(Word$, LEN(Word$) - 1)
                        CombineFlag = TRUE
                END IF
                IF Lang$ <> "GERMAN" THEN
                        SELECT CASE ASC(Word$)
                                CASE AscA TO AscZ: SearchStep = 1
                                CASE AscUpperA TO ASCUpperZ:
                                        IF ASC(MID$(Word$, 2, 1)) < AscUpperA OR ASC(MID$(Word$, 2, 1)) > ASCUpperZ T
                                                SearchStep = 2
                                        END IF
                                CASE ELSE: SearchStep = 3
```

```
                           END SELECT
                    END IF
                    ' check if the first 3 letters of the word return
                    ' a valid range from the 3-dimensional table array
        TryAgain:

IF FirstLast%(LCASE$(Word$), First, Last, Sing) THEN ' yes, so search thru range
                FOR j = Last TO First STEP -1
                        FGetRT SingKeyFILE, KeyTemp, CLNG(j), LENKeyTemp
                        CurrKey$ = RTRIM$(KeyTemp.Str)
                        Slen = LEN(CurrKey$)

IF RIGHT$(CurrKey$, 1) = "/" THEN
                                Exact = TRUE
                                CurrKey$ = LEFT$(CurrKey$, Slen - 1)
                                Slen = Slen - 1
                        ELSE
                                Exact = FALSE
                        END IF 'compare the single keyword [CurrKey$/KeyTemp.Str]
                        'against the document word [Word$]
                        IF Exact THEN ' check for *exact* match
                                Match = (CurrKey$ = Word$)
                        ELSE ' check for wildcard match
                                Match = (CurrKey$ = LEFT$(Word$, Slen))
                        END IF
                        IF Match THEN
                                IF NOT CombineFlag THEN  'for both languages
                                        ' add the single keyword to the list
                                        NumSingFound = NumSingFound + 1
                                        REDIM PRESERVE SingFound$(1 TO NumSingFound)
                                        SingFound$(NumSingFound) = RTRIM$(KeyTemp.Str)
                                        EXIT FOR
                                ELSE
                                        'it is part of combkw, so don't store it but add to the exclude list
                                        ExclTemp.Str = RTRIM$(KeyTemp.Str)
                                        Code = DictSrch(ExclTemp)
                                        IF Code > 0 THEN ExcludeAdd$ = ExcludeAdd$ + MKI$(Code)
                                        EXIT FOR
                                END IF
                        END IF NEXT' key in range
                IF NOT Match AND Lang$ <> "GERMAN" THEN
                        SELECT CASE SearchStep
                                CASE 1: Word$ = UCASE$(LEFT$(Word$, 1)) + LCASE$(RIGHT$(Word$, LEN(Word$) - 1))
                                                SearchStep = SearchStep + 1
                                                GOTO TryAgain
                                CASE 2: Word$ = UCASE$(Word$)
                                                SearchStep = SearchStep + 1
                                                GOTO TryAgain
                                CASE ELSE:
                                                IF i = 1 THEN
                                                        FirstLetter = ASC(LEFT$(LTRIM$(Word$), 1))
                                                        IF FirstLetter >= 65 AND FirstLetter <= 90 THEN
                                                                Word$ = LCASE$(Word$)
                                                                GOTO TryAgain
                                                        END IF
                                                END IF
                        END SELECT
                END IF   'not match
        ELSE    'range was not valid
                LETTERS = LEFT$(Word$, 2)
                IF LETTERS = "zs" OR LETTERS = "za" THEN
                        'add the single keyword to the list
                        NumSingFound = NumSingFound + 1
                        REDIM PRESERVE SingFound$(1 TO NumSingFound)
                        SingFound$(NumSingFound) = RTRIM$(Word$)
                END IF
        END IF' the range was valid ' check for prefixes
IF NOT MeanPrefixFlag THEN
        'check for meaningful prefixes. If found, divide word in two parts
                Word$ = LCASE$(Word$)
                LenW = LEN(Word$)
                FOR NumLet = 14 TO 3 STEP -1
                        IF LenW >= NumLet + 3 THEN 'should leave at least 3 letters
                                IF INSTR(MeanPrefixes$(NumLet), "\" + LEFT$(Word$, NumLet) + "\") THEN
                                        WordTemp$ = MID$(Word$, NumLet + 1)
                                        Word$ = LEFT$(Word$, NumLet)
                                        MeanPrefixFlag = TRUE
                                        EXIT FOR
                                END IF
                        END IF
                NEXT
                IF MeanPrefixFlag THEN
                        IF Match THEN CombineFlag = TRUE
                        GOTO TryAgain 'check again
                END IF
        ELSE    'if MeanPrefixFlag
                IF WordTemp$ <> "" THEN 'CombineFlag still TRUE
                        Word$ = WordTemp$
                        WordTemp$ = ""
                        GOTO TryAgain
                END IF
        END IF 'MeanPrefixFlag
        'check for meaningless prefixes and delete it
        IF NOT PrefixFlag THEN 'only one time
```

```
                    Word$ = LCASE$(Word$)
                    LenW = LEN(Word$)
                    FOR NumLet = 9 TO 2 STEP -1
                        IF LenW >= NumLet + 3 THEN  'should leave at least 3 letters
                            IF INSTR(Prefixes$(NumLet), "\" + LEFT$(Word$, NumLet) + "\") THEN
                                Word$ = MID$(Word$, NumLet + 1)
                                PrefixFlag = TRUE
                                EXIT FOR
                            END IF
                        END IF
                    NEXT
                    IF PrefixFlag THEN
                        IF Match THEN CombineFlag = TRUE
                        GOTO TryAgain 'check again
                    END IF
                END IF     'PrefixFlag
            END IF      'Word$ > " "
NEXT' word in document

END SUB

FUNCTION FirstLast% (Wordx$, First%, Last%, SingOrComb%) STATIC

' returns the starting (First) and ending (Last) range for the word
' by looking it up in the Table%() array Word$ = RTRIM$(Wordx$)

IF LEN(Word$) < 3 THEN Word$ = Word$ + STRING$(3 - LEN(Word$), "/")

SpaceLoc = INSTR(Word$, " ")
IF SpaceLoc > 1 AND SpaceLoc < 4 THEN
    Word$ = LEFT$(Word$, SpaceLoc - 1) + STRING$(4 - SpaceLoc, "/")
END IF a = XLateTable%(ASCII%(Word$))
b = XLateTable%(MidChar(Word$, 2))
c = XLateTable%(MidChar(Word$, 3))
IF a = 0 OR b = 0 OR c = 0 THEN FirstLast = 0: EXIT FUNCTION
Index& = (a - 1) * 784 + (b - 1) * 28 + c IF SingOrComb% = Sing THEN
    TableFirEMS = SingTblFirEMS
    TableLasEMS = SingTblLasEMS
ELSE
    TableFirEMS = CombTblFirEMS
    TableLasEMS = CombTblLasEMS
END IF EmsGet First%, 2, Index&, TableFirEMS
EmsGet Last%, 2, Index&, TableLasEMS 'Return FALSE if there was no valid range (i.e., First%=0)
FirstLast% = (First% <> 0)

END FUNCTION

SUB Freehandles STATIC

'---- Release EMS memory

IF DictCodeH% THEN EmsRelMem DictCodeH%
IF DictWordH% THEN EmsRelMem DictWordH%
IF SingTblFirEMS THEN EmsRelMem SingTblFirEMS
IF SingTblLasEMS THEN EmsRelMem SingTblLasEMS
IF CombTblFirEMS THEN EmsRelMem CombTblFirEMS
IF CombTblLasEMS THEN EmsRelMem CombTblLasEMS
IF Array1EMS THEN EmsRelMem Array1EMS
IF PolySemyEMS THEN EmsRelMem PolySemyEMS '---- Close Files IF KeyNdxFile THEN FClose KeyNdxFile
IF KYInvertDatFILE THEN FClose KYInvertDatFILE
IF FCInvertDatFILE THEN FClose FCInvertDatFILE
IF HeaderFILE THEN FClose HeaderFILE
IF SingKeyFILE THEN FClose SingKeyFILE
IF CombKeyFILE THEN FClose CombKeyFILE '---- close com port if opened CPrint "CLOSE"

END SUB

SUB HistMessage STATIC

'WindMgr 9, 66, 10, 79, 4, RevAttr, RevAttr, ""

QPrintRC " Press ENTER   ", 9, 65, RevAttr
QPrintRC " for HIGHLIGHTS ", 10, 65, RevAttr

END SUB

SUB InsertWord (Expr AS ExpressionType) STATIC

'-- insert the last word deleted from a LIFO stack
'-- and then do a ShowExpr
```

```
'-- get the number of words in the deleted word stack (LIFO$)

x = LEN(LIFO$)

IF x THEN

Code = CVI(RIGHT$(LIFO$, 2))
        Expr.SubExpr(1).Num = Expr.SubExpr(1).Num + 1
        NumExprWords = NumExprWords + 1
        EmsGet1EL ExprCodes(NumExprWords).Poly, LEN(ExprCodes(1).Poly), Code, PolySemyEMS
        ExprCodes(NumExprWords).Code = Code
        SortT ExprCodes(1), NumExprWords, DESCEND, LEN(ExprCodes(1)), 2, -3
        Expr.Num = 1
        Expr.SubExpr(1).Num = NumExprWords
        FOR k = 1 TO NumExprWords
                Code2Str Expr.SubExpr(1).Phrase, k, ExprCodes(k).Code
        NEXT IF x = 2 THEN
                LIFO$ = ""
        ELSE
                LIFO$ = LEFT$(LIFO$, x - 2)
        END IF

ELSE

'-- no words to undelete (insert)
        Chime 1

END IF

END SUB

FUNCTION KeyInstr% (KeyStr$, Srch$) STATIC

' returns TRUE if Srch$ is in KeyStr$ at an odd offset
' otherwise FALSE (i.e. it wasn't found, or was found at an even offset)

k = INSTR(KeyStr$, Srch$)

' continue searching if it was found at an even offset
' but stop if it's 0 (not found anymore) or odd (found correctly)

DO WHILE k / 2 = k \ 2 AND k <> 0' even
        k = INSTR(k + 1, KeyStr$, Srch$)
LOOP
IF k = 0 THEN ' it wasn't found in the right place
        KeyInstr% = FALSE
ELSE
        'NOTE: Since this routine does not return a TRUE value, but simply a
        '      non-zero value, the NOT operator can't be used with this function
        '      When using KeyInstr% in an IF..THEN statement, it must test for
        '      KeyInstr% = FALSE.
        KeyInstr% = (k + 1) \ 2' return actual location
END IF

END FUNCTION

FUNCTION KeyMid$ (KeyStr$, Start) STATIC

KeyMid$ = MID$(KeyStr$, Start * 2 - 1, 2)

END FUNCTION

SUB LoadData STATIC

'_____ D I C T I O N A R Y ___

' Load in Word Sorted Dictionary directly into EMS (translate Code# to Word$)

EmsPg = .EmsGetPFSeg%
File$ = LstDir$ + "DICT.COD"

GOSUB UpdateStatusLine

DIM DictCodeTemp AS DictType
IF NOT Exist%(File$) THEN CLS : PRINT File$; " not found.": END SizeofFile& = FileSize&(File$)
DictCodeNum = SizeofFile& \ LEN(DictCodeTemp)

' "Loading " + Num$(DictCodeNum) + " Dictionary Synonym Entries:  .", r, c

NumPages = SizeofFile& \ SixteenK + 2' round off to nearest 2 pages
EmsAlloc NumPages, DictCodeH%, File$ IF EmsError% GOTO EMSErrHandler Num32kBlocks = SizeofFile& \ ThirtyTwoK&
LeftOver& = SizeofFile& - (Num32kBlocks * ThirtyTwoK&)

FOpenALL File$, 0, 4, DictCodeFILE
FOR i = 1 TO Num32kBlocks + 1

QPrintRC STR$(i), R, c - 3, -1

'-- map pages of the DictCodeH% memory to the EMS upper mem page frame
        FOR j = 1 TO 2
```

```
                    EmsMapMem DictCodeH%, j, (i - 1) * 2 + j
                    IF EmsError% GOTO EMSErrHandler
            NEXT '— seek to beginning of current block
            FSeek DictCodeFILE, (i - 1) * ThirtyTwoK&
            IF DosError% GOTO DOSErrHandler IF i < Num32kBlocks + 1 THEN
                    '— get the 32k block and put it directly into the EMS page frame
                    FGetA DictCodeFILE, BYVAL EmsPg, BYVAL 0, ThirtyTwoK&
                    IF DosError% GOTO DOSErrHandler
            ELSE
                    '— load the left over (<32k) bytes
                    FGetA DictCodeFILE, BYVAL EmsPg, BYVAL 0, LeftOver&
                    IF DosError% GOTO DOSErrHandler
            END IF

NEXT

FClose DictCodeFILE

'——— contains pointers to DICT.COD in EMS for use in FullText
REDIM Array1(1 TO DictCodeNum) AS Array1Type
DictLEN = LEN(DictCodeTemp)

GOSUB UpdateStatusLine

FOR i = 1 TO DictCodeNum
        Array1(i).RecNum = i
        EmsGet1EL DictCodeTemp, DictLEN, i, DictCodeH%
        Array1(i).CodeNum = DictCodeTemp.Code
NEXT
SortT Array1(1), DictCodeNum, ASCEND, LEN(Array1(1)), 2, -1
Array2EMS Array1(1), LEN(Array1(1)), DictCodeNum, Array1EMS
ERASE Array1

' Load in Code Sorted Dictionary directly into EMS (translate Code to Word$ )

File$ = LstDir$ + "DICT.WRD"
DIM DictWordTemp AS DictType
SizeofFile& = FileSize&(File$)
DictWordNum = SizeofFile& \ LEN(DictWordTemp)
SecCode = DictWordNum - 3030
ArtCode = DictWordNum - 30

GOSUB UpdateStatusLine

NumPages = SizeofFile& \ SixteenK + 2' round off to nearest 2 pages
EmsAlloc NumPages, DictWordH%, File$
IF EmsError% GOTO EMSErrHandler Num32kBlocks = SizeofFile& \ ThirtyTwoK&
LeftOver& = SizeofFile& - (Num32kBlocks * ThirtyTwoK&)

FOpenAll File$, 0, 4, DictWordFILE
FOR i = 1 TO Num32kBlocks + 1

QPrintRC STR$(i), R, c - 3, -1

'— map pages of the DictWordH% memory to the EMS upper mem page frame
        FOR j = 1 TO 2
                EmsMapMem DictWordH%, j, (i - 1) * 2 + j
                IF EmsError% GOTO EMSErrHandler
        NEXT '— seek to beginning of current block
        FSeek DictWordFILE, (i - 1) * ThirtyTwoK&
        IF DosError% GOTO DOSErrHandler IF i < Num32kBlocks + 1 THEN
                '— get the 32k block and put it directly into the EMS page frame
                FGetA DictWordFILE, BYVAL EmsPg, BYVAL 0, ThirtyTwoK&
        ELSE
                '— load the left over (<32k) bytes
                FGetA DictWordFILE, BYVAL EmsPg, BYVAL 0, LeftOver&
        END IF
        IF DosError% GOTO DOSErrHandler

NEXT

FClose DictWordFILE
'——————————————————— I N V E R T E D   R E L A T I V E S ———

' Load/open the Relative Inverted Files for the SWAPS routine

File$ = NdxDir$ + "REL-INVs.NDX"
IF NOT Exist%(File$) THEN
        CLS
        PRINT File$; " was not found."
        CALL Freehandles
        END
END IF
NdxLEN = 6
FreqCompNum = FileSize&(File$) \ NdxLEN
REDIM FCIndx(1 TO DictWordNum) AS SmallNdxType GOSUB UpdateStatusLine FGetAH File$, FCIndx(1), NdxLEN, FreqCompNum
```

```
File$ = NdxDir$ + "RELATIVE.63"
FOpenAll File$, 0, 4, Freq63FILE

'_____ I N V E R T E D ____

' Load the Inverted Data Files

File$ = NdxDir$ + "KYINVRTs.NDX"
IF NOT Exist%(File$) THEN
        CLS
        PRINT File$; " was not found."
        CALL Freehandles
        END
END IF NumKeys = FileSize&(File$) \ NdxLEN REDIM KYIndx(1 TO DictWordNum) AS SmallNdxType GOSUB UpdateStatusLine FGetAH File$, SEG KYIndx(1), NdxLEN, NumKeys File$ = NdxDir$ + "KYINVERT.DAT"
IF NOT Exist%(File$) THEN
        CLS
        PRINT File$; " was not found."
        CALL Freehandles
        END
END IF GOSUB UpdateStatusLine FOpenAll File$, 0, 4, KYInvertDatFILE '---- Open the NEWKEY.NDX file,sorted by weight*poly^0.25 for use when
'                              showing keywords in current document
File$ = NdxDir$ + "NEWKEY.NDX"
NumRecords& = FileSize&(File$) \ 256
IF NOT Exist%(File$) THEN
        CLS
        PRINT File$; " was not found."
        CALL Freehandles
        END
END IF GOSUB UpdateStatusLine FOpenAll File$, 0, 4, KeyNdxFile

'_____ B I T C O U N T ___*

DIM BitCount%(0 TO 255)
FOR i = 0 TO 255
        x$ = CHR$(i)
        x = 0
        FOR j = 0 TO 7
                x = x - GetBit%(x$, j)
        NEXT
        BitCount%(i) = x
NEXT

'_____ S I N G K E Y / C O M B K E Y ___

File$ = LstDir$ + "SINGKEY.STR"
NumSingKey = FileSize&(File$) \ 32

GOSUB UpdateStatusLine

FOpenAll File$, 0, 4, SingKeyFILE
IF DosError% GOTO DOSErrHandler

File$ = LstDir$ + "COMBKEY.STR"
NumCombKey = FileSize&(File$) \ 64
FOpenAll File$, 0, 4, CombKeyFILE GOSUB UpdateStatusLine IF DosError% GOTO DOSErrHandler

'_____ P O L Y S E M Y ____

NumPages = CLNG(FreqCompNum) * PolyLEN \ SixteenK + 2
EmsAlloc NumPages, PolySemyEMS, "Polysemy Storage"
File$ = NdxDir$ + "POLYSEMY.dat"
GOSUB UpdateStatusLine FOpenAll File$, 0, 4, PolysemyFILE '--- to fit in smaller memory load only as many poly values as there are
'FOR i = 1 TO FreqCompNum
'    FGetRT PolysemyFILE, PolyValue, CLNG(i), PolyLEN
'    EmsSet PolyValue, PolyLEN, CLNG(i), PolySemyEMS
'NEXT SizeofFile& = FileSize&(File$)
Num32kBlocks = SizeofFile& \ ThirtyTwoK&
LeftOver& = SizeofFile& - (Num32kBlocks * ThirtyTwoK&)
```

```
FOR i = 1 TO Num32kBlocks + 1

QPrintRC STR$(i), R, c - 3, -1

'-- map pages of the PolySemyEms memory to the EMS upper mem page frame
        FOR j = 1 TO 2
                EmsMapMem PolySemyEMS, j, (i - 1) * 2 + j
                IF EmsError% GOTO EMSErrHandler
        NEXT '-- seek to beginning of current block
        FSeek PolysemyFILE, (i - 1) * ThirtyTwoK&
        IF DosError% GOTO DOSErrHandler IF i < Num32kBlocks + 1 THEN
                '-- get the 32k block and put it directly into the EMS page frame
                FGetA PolysemyFILE, BYVAL EmsPg, BYVAL 0, ThirtyTwoK&
        ELSE
                '-- load the left over (<32k) bytes
                FGetA PolysemyFILE, BYVAL EmsPg, BYVAL 0, LeftOver&
        END IF
        IF DosError% GOTO DOSErrHandler NEXT
FClose PolysemyFILE File$ = DocDir$ + ".NDX"
DocumNum& = (FileSize&(File$) \ 8)
Limit = SQR(DocumNum& / 300)
IF Limit < 1 THEN Limit = 1

'--------------------------------------------------------------------

LoadedFlag = TRUE

EXIT SUB

'--------------------------------------------------------------------

DOSErrHandler:

Chime 4
        CLS
        PRINT "Dos Error:"; WhichError%
        Freehandles
        STOP

'--------------------------------------------------------------------

EMSErrHandler:

Chime 4
        CLS
        PRINT "Ems error:"; EmsError%
        Freehandles
        STOP

'--------------------------------------------------------------------

UpdateStatusLine:

NumFilesLoaded = NumFilesLoaded + 1
        IF Lang$ = "GERMAN" THEN
          QPrintRC " [ EINLADEN DER DATEN" + STR$(NumFilesLoaded) + " ] ", 24, 29, NormAttr
        ELSE
          QPrintRC " [ LOADING DATA FILES" + STR$(NumFilesLoaded) + " ] ", 24, 29, NormAttr
        END IF

RETURN

END SUB

FUNCTION Num$ (x) STATIC

Num$ = LTRIM$(RTRIM$(STR$(x)))

END FUNCTION

SUB PrintAbstr (First&, Last&, FileNum, RecNum&) STATIC

'--------------------------------------------------------------------
'show author name
'FOpenAll DocDir$ + ".NAM", 0, 4, NameFile
'IF NameFile <> -1 THEN
'   DIM Author AS str40
'   FGetRT NameFile, Author, CLNG(RecNum&), 40
'   QPrintRC "AUTHOR: " + RTRIM$(Author.Str), 1, 23, NormAttr
'END IF
'FClose NameFile
'--------------------------------------------------------------------
LinCount = Last& - First& + 1

IF LinCount < 1 THEN LinCount = 1

REDIM AbstrText(1 TO LinCount) AS AbstrType
REDIM AbstrClean(1 TO LinCount) AS AbstrType LenAbst = LEN(AbstrText(1))
```

```
            j = 1
            FOR i& = First& TO Last&
                    GET FileNum, i&, AbstrText(j)
                    Start = 1
                    DO
                        a = INSTR(Start, AbstrText(j).Str, CHR$(196))
                        IF a THEN MID$(AbstrText(j).Str, a, 1) = "-": Start = a + 1
                    LOOP UNTIL a = 0 OR Start > LEN(AbstrText(j).Str)
                    AbstrClean(j).Str = AbstrText(j).Str
                    CALL ChangeChar(AbstrClean(j).Str, New$, Keep$)

' vvvvvvvvvvvvvvvvvvvvvvvvvvvvv
        ' blank line between sentences

IF ASC(AbstrText(j).Word(1)) >= 100 THEN
                            AbstrText(j).Word(1) = CHR$(ASC(AbstrText(j).Word(1)) - 100)
                            j = j + 1
                            IF j > LinCount THEN
                                    LinCount = j
                                    REDIM PRESERVE AbstrText(1 TO LinCount) AS AbstrType
                                    REDIM PRESERVE AbstrClean(1 TO LinCount) AS AbstrType
                            END IF
                            AbstrText(j).Str = STRING$(80, 32)
                    END IF
                    '------------------------------------------
                    j = j + 1
                    IF j > LinCount THEN
                            LinCount = j
                            REDIM PRESERVE AbstrText(1 TO LinCount) AS AbstrType
                            REDIM PRESERVE AbstrClean(1 TO LinCount) AS AbstrType
                    END IF
            NEXT LinePtr = 1         ' Set line pointer
            PrevLinePtr = 0
            PrintAgain:
            DO
                    IF LinePtr <> PrevLinePtr THEN
                            PrevLinePtr = LinePtr ' Update the 24 lines of text
                            IF AscInKee <> UP AND AscInKee <> Dn THEN '-- Print information bar at bottom
                            IF TermTypeMode$ = "LOCAL" THEN
                                    LeftChar$ = CHR$(26)
                                    RightChar$ = CHR$(27)

ExpChar$ = "F2"
                    DirDocChar$ = "F5"
            ELSE
                    LeftChar$ = CHR$(LeftArrowKey)
                    RightChar$ = CHR$(RightArrowKey)
                    ExpChar$ = CHR$(ShowExprKey)
                    DirDocChar$ = CHR$(DirNumKey)
            END IF
            IF Lang$ = "GERMAN" THEN
                    InfoLine$ = ExpChar$ + ": Sucheingabe" + LeftChar$ + ": Naesentes Dok " + RightChar$ + ": Vorhergeh Dok " + Di
            ELSE
                    InfoLine$ = ExpChar$ + ": Expr   " + LeftChar$ + ": Next   " + RightChar$ + ": Prev   " + DirDocChar$ + ": DocNum
            END IF CALL References(InfoLine$)
            END IF ULr = 7: ULc = 1: LRr = 23: LRc = 80
            IF TermTypeMode$ = "LOCAL" THEN LRr = 24
            CALL ClearScrO(ULr, ULc, LRr, LRc, NormAttr)' clear bottom portion
            CALL DrawBox(ULr, ULc, LRr, LRc, 2, NormAttr)' box around the bottom portion
            IF Lang$ = "GERMAN" THEN
                QPrintRC LMarg$ + "                                                                                   " + RMarg$, 7, 3, NormA
                QPrintRC " HIGHLIGHTS (ACHTUNG: TEXT KANN IRREFUEHREN DA NICHT IM SINNZUSAMMENHANG)", 7, 5, -1
            ELSE
                QPrintRC LMarg$ + "                                                                           " + RMarg$, 7, 11, NormAttr
                QPrintRC "HIGHLIGHTS (NOTE: DO NOT RELY ON THIS TEXT OUT OF CONTEXT)", 7, 12, RevAttr
            END IF
END IF
IF TermTypeMode$ = "LOCAL" THEN
        R = 15
ELSE
        R = 14
END IF
FOR i = 0 TO R
    ThisLine = i + LinePtr
    IF ThisLine <= LinCount THEN
            ' print line with normal attrib.
            QPrintRC AbstrText(ThisLine).Str, i + 8, 2, NormAttr
            '-- maximum of three words per line to highlight
            FOR j = 1 TO 5
                    Word = ASC(AbstrText(ThisLine).Word(j))
                    IF Word <> 0 THEN
                            '-- .Num() is number of words in the keyword to highlight
                            Lenth = ASC(AbstrText(ThisLine).Lenth(j))
                            QPrintRC QPRTrim$(MID$(AbstrClean(ThisLine).Str, Word, Lenth)), i + 8, Word + 1, RevAttr
                    ELSE
                            EXIT FOR
                    END IF
            NEXT
    END IF
```

```
              NEXT
              ' Wait for a key to be pressed
              QuitFlag = FALSE
              DO
                      Inkee$ = INKEY$
              LOOP UNTIL LEN(Inkee$)

IF LEN(Inkee$) = 1 THEN
                      AscInKee = ASC(UCASE$(Inkee$))
              ELSEIF LEN(Inkee$) = 2 THEN
                      AscInKee = ASC(RIGHT$(Inkee$, 1)) + 200
              END IF
              SELECT CASE AscInKee
                      CASE UpArrowKey, UP
                              IF LinePtr > 1 THEN
                                      LinePtr = LinePtr - 1
                              END IF
                      CASE DownArrowKey, Dn
                              IF LinePtr < LinCount - R - 1 THEN
                                      LinePtr = LinePtr + 1
                              END IF
                      CASE PgUpKey, PgUp
                              IF LinePtr > 1 THEN
                                      LinePtr = LinePtr - R
                                      IF LinePtr < 1 THEN
                                              LinePtr = 1
                                      END IF
                              END IF
                      CASE PgDnKey, PgDn
                              IF LinePtr <= LinCount - R - 1 THEN
                                      LinePtr = LinePtr + R
                                      IF LinePtr > LinCount THEN
                                              LinePtr = LinCount
                                      END IF
                              END IF
                      CASE HomeKey, HM
                              IF LinePtr > 1 THEN
                                      LinePtr = 1
                              END IF
                      CASE EndKey, EN
                              IF LinePtr < LinCount - R THEN
                                      LinePtr = LinCount - R
                              END IF
                      CASE ESC, RightArrowKey, LeftArrowKey, DirNumKey, ShowExprKey, F2, F3, F4, F5, 275, 277
                              ExitFlag = AscInKee
                              QuitFlag = TRUE CASE CR        'to show full text for english just comment if-then out
              IF Lang$ = "GERMAN" THEN
                              ExitFlag = AscInKee
                              QuitFlag = TRUE
              END IF CASE NewSearchKey, F10
                              IF Lang$ = "GERMAN" THEN
                                      i$ = Question$("NEUE SUCHE ? [J/N] ", "JN", "ACHTUNG !")
                                      IF i$ = "J" THEN
                                              ExitFlag = AscInKee
                                              QuitFlag = TRUE
                                      ELSE
                                              GOTO PrintAgain
                                      END IF
                              ELSE
                                      i$ = Question$("New Search? [Y/N]", "YN", "WARNING!")
                                      IF i$ = "Y" THEN
                                              ExitFlag = AscInKee
                                              QuitFlag = TRUE
                                      ELSE
                                              GOTO PrintAgain
                                      END IF
                              END IF
                      CASE ELSE
              END SELECT LOOP UNTIL QuitFlag

END SUB

FUNCTION Question$ (Prompt$, Choice$, Label$) STATIC

ULr = 12: LRr = ULr
PromptLen = LEN(Prompt$) + 6' 6 leaves space for the brackets [] and space
Wid = 50 - PromptLen
ULc = Wid - 2: LRc = ULc + PromptLen - 1
DULr = ULr - 2: DLRr = LRr + 2: DULc = ULc - 3: DLRc = LRc + 2

REDIM Scr%(1 TO ArraySize%(DULr, DULc, DLRr, DLRc))

MScrnSave DULr, DULc, DLRr, DLRc, Scr%(1)
WindMgr ULr, ULc, LRr, LRc, 4, NormAttr%, NormAttr%, ""
Chime 6
QPrintRC "[ " + Label$ + " ]", ULr - 1, ULc, RevAttr%
QPrintRC Prompt$, ULr, ULc + 1, -1
QPrintRC "[ ]", ULr, ULc + LEN(Prompt$) + 2, RevAttr%

Edit$ = LEFT$(Choice$, 1)' default choice

DO
```

```
            CALL Editor(Edit$, EdLen, Scan, 0, 1, NormAttr, RevAttr, ULr, ULc + LEN(Prompt$) + 3)

IF Scan = ESC AND Label$ <> "WARNING!" THEN
                    Edit$ = ""
                    EXIT DO
            ELSEIF -Scan = F10 THEN   'new search requested
                            IF Lang$ = "GERMAN" THEN
                                    i$ = Question$("NEUE SUCHE ? [J/N]  ", "JN", "ACHTUNG !")
                                    IF i$ = "J" THEN
                                            GlobalStatus = NewSearch EXIT DO
                                    END IF
                            ELSE
                                    i$ = Question$("New Search? [Y/N]", "YN", "WARNING!")
                                    IF i$ = "Y" THEN
                                            GlobalStatus = NewSearch
                                            EXIT DO
                                    END IF
                            END IF
            END IF IF INSTR(Choice$, Edit$) = 0 THEN
                    CALL Chime(2)' not a valid choice
                    Edit$ = LEFT$(Choice$, 1)' default choice
            END IF ' note: we can test for scan=-1 (function key 1) & pop up a help window LOOP UNTIL INSTR(Choice$, Edit$) AND Scan = CR Question$ = Edit$ MScrnRest DULr, DULc, DLRr, DLRc, Scr%(1)
    ERASE Scr%

END FUNCTION

SUB ReadEnglishText (Txt$) STATIC

IF LEN(Txt$) = 0 THEN EXIT SUB

EndOfSentence$ = ".!?"

'-- replace all quotes with spaces so as not to complicate the
    '   lower casing of the first words of sentences CALL ReplaceChar(Txt$, CHR$(34), " ")
    CALL Sections(Txt$)
    '---- Process text, first making all initial letters
    '     of each sentence lower case Start = 1
    p = 1
    LENTxt = LEN(Txt$)

DO
            DO

IF Start > LENTxt GOTO DoneLowerCase p = InstrTbl2(Start, Txt$, EndOfSentence$)

IF p = 0 THEN ' no end-of-sentence punctuation was found, so exit

GOTO DoneLowerCase

ELSE   '-- check for a NLG (honorific/title)

Start = p + 2

FOR i = 1 TO UBOUND(NLG$)

IF p > LENNLG(i) THEN

IF LCASE$(MID$(Txt$, p - LENNLG(i), LENNLG(i))) = NLG$(i) THEN p = 0
                                                EXIT FOR

END IF
                                END IF
                            NEXT

END IF

LOOP UNTIL p p = p + 2
            IF p > LENTxt GOTO DoneLowerCase
            CurrChar = MidChar%(Txt$, p)

DO WHILE CurrChar < AscUpperA OR CurrChar > ASCUpperZ
                    p = p + 1
                    IF p > LENTxt GOTO DoneLowerCase
                    CurrChar = MidChar%(Txt$, p)
            LOOP
            MID$(Txt$, p, 1) = CHR$(CurrChar + 32)
            Start = p + 1
    LOOP
```

```
DoneLowerCase:
'FirstLetter = ASC(LEFT$(LTRIM$(Txt$), 1))
'IF FirstLetter > 65 AND FirstLetter < 90 THEN
'   MID$(Txt$, 1, 1) = CHR$(FirstLetter + 32)
'END IF
New$ = " "      ' replacement string for punctuation
Old$ = ":/.-()<>"
FOR j = 91 TO 96: Old$ = Old$ + CHR$(j): NEXT
LENOld = LEN(Old$)

CALL RemCtrl(Txt$, "")'      replace all ctrl chars with blanks

' replace only SOME punctuation with spaces
FOR j = 1 TO LENOld
        CALL ReplaceChar(Txt$, MID$(Old$, j, 1), New$)
NEXT CALL StripRange(Txt$, 33, 37, TLen)    '-- strip Punctutation ! to %
Txt$ = LEFT$(Txt$, TLen)
CALL StripRange(Txt$, 39, 47, TLen)    '-- strip ' to @
Txt$ = LEFT$(Txt$, TLen)
CALL StripRange(Txt$, 58, 64, TLen)    '-- strip ' to @
Txt$ = LEFT$(Txt$, TLen)
CALL StripRange(Txt$, 123, 255, TLen)  '-- strip High chars
Txt$ = LEFT$(Txt$, TLen)

CALL Crunch(Txt$, " ", TLen)'   crunch all multiple spaces to 1
Txt$ = LEFT$(Txt$, TLen)
Txt$ = LTRIM$(RTRIM$(Txt$))'    remove spaces from left & right

END SUB

SUB ReadGermanText (Txt$) STATIC

CALL Sections(Txt$)
CALL Lower(Txt$)'           convert all chars to lower case
CALL RemCtrl(Txt$, "")'     replace all ctrl chars with blanks ' replace only SOME punctuation with spaces
New$ = " "
Old$ = ":/.-()[]<>"
FOR j = 1 TO LEN(Old$)
        CALL ReplaceChar(Txt$, MID$(Old$, j, 1), New$)
NEXT CALL StripRange(Txt$, 33, 37, TLen)' strip Punctutation ! to %
Txt$ = LEFT$(Txt$, TLen)

' Note: the range is thru chr$(96) because all the letters are lower case
' and all numbers are being stripped out too. We've skipped over 38
' because it's the & char which is allowed CALL StripRange(Txt$, 39, 47, TLen)
Txt$ = LEFT$(Txt$, TLen)
CALL StripRange(Txt$, 58, 96, TLen)
Txt$ = LEFT$(Txt$, TLen)

CALL StripRange(Txt$, 123, 255, TLen)' strip High chars
Txt$ = LEFT$(Txt$, TLen)

CALL Crunch(Txt$, " ", TLen)'   crunch all multiple spaces to 1
Txt$ = LEFT$(Txt$, TLen)
Txt$ = LTRIM$(RTRIM$(Txt$))'    remove spaces from left & right

END SUB

SUB References (Text$) STATIC
'-- prints a centered status line on the bottom row (25th line) of the screen
Text$ = STRING$((80 - LEN(Text$)) \ 2, 32) + Text$ + STRING$((80 - LEN(Text$)) \ 2, 32)
IF LEN(Text$) < 80 THEN Text$ = Text$ + " "
IF TermTypeMode$ = "LOCAL" THEN
        R = 25
ELSE
        R = 24
END IF
IF Cnf.MonTyp = 2 THEN
        QPrintRC Text$, R, 1, RevAttr
ELSE
        QPrintRC Text$, R, 1, OneColor(1, 7)            'RevAttr
END IF

END SUB

SUB ScrSR (SR$) STATIC

STATIC WindowOpen

IF SR$ = "S" THEN

REDIM Scr%(1 TO 2000)
        MScrnSave 1, 1, 25, 80, SEG Scr%(1)
        WindowOpen = TRUE

ELSE

IF WindowOpen THEN
                MScrnRest 1, 1, 25, 80, SEG Scr%(1)
                ERASE Scr%
                WindowOpen = FALSE
```

```
                END IF

END IF

END SUB

SUB Sections (Txt$)

'---Look for "sections" or "articles"
        IF Lang$ = "GERMAN" THEN
                SearchStr$ = "Par"
        ELSE
                SearchStr$ = "Sec"
        END IF
        LETTERS$ = "zs"
        FOR LookStep = 1 TO 2
         Start = 1
         DO
                m = INSTR(Start, Txt$, SearchStr$)
                IF m THEN
                        c$ = "0123456789XVI "
                        j = InstrTbl(m, Txt$, c$)
                        IF j THEN  'if this is not a last word
                                Word$ = MID$(Txt$, m, j - m)
                        ELSE
                                EXIT DO
                        END IF
                NumFound = 3
                IF LookStep = 1 THEN
                    IF Lang$ = "GERMAN" THEN
                        CALL FindExact(VARPTR(Paragraph$(1)), NumFound, Word$)
                    ELSE
                        CALL FindExact(VARPTR(Section$(1)), NumFound, Word$)
                    END IF
                ELSE
                    IF Lang$ = "GERMAN" THEN
                        CALL FindExact(VARPTR(Artikel$(1)), NumFound, Word$)
                    ELSE
                        CALL FindExact(VARPTR(Article$(1)), NumFound, Word$)
                    END IF
                END IF
                IF NumFound <> -1 THEN
                        k = j
                        IF MidChar(Txt$, k) = 32 THEN k = k + 1
                        DO
                          Ch$ = MID$(Txt$, k, 1)
                          k = k + 1
                        LOOP UNTIL Ch$ <> " "
        m1 = 0
            DO
                Ch$ = MID$(Txt$, k + m1 - 1, 1)
                m1 = m1 + 1
            LOOP UNTIL Ch$ < "0" OR Ch$ > "9"
            IF m1 > 1 THEN  'there is a number
                Numb$ = MID$(Txt$, k - 1, m1 - 1)
        IF VAL(Numb$) <= 3000 THEN
                        IF LookStep = 2 AND VAL(Numb$) > 30 GOTO NextStep
                        NewWord$ = LETTERS + Numb$
                        m1 = INSTR(k, Txt$, " ")
                        IF m1 = 0 THEN
                          Txt$ = LEFT$(Txt$, m - 1) + NewWord$
                        ELSE
                          Txt$ = LEFT$(Txt$, m - 1) + NewWord$ + RIGHT$(Txt$, LEN(Txt$) - m1 + 1)
                        END IF
        END IF
            ELSE
                    IF SearchStr$ = "Art" THEN
                m1 = 0
                DO
                        Ch$ = MID$(Txt$, k + m1 - 1, 1)
                        m1 = m1 + 1
                LOOP UNTIL Ch$ = "" OR Ch$ = " " OR m1 > LEN(Txt$)
                Numb$ = MID$(Txt$, k - 1, m1 - 1)
                NumFound = 30
                CALL FindExact(VARPTR(Numbers$(1)), NumFound, Numb$)
                IF NumFound <> -1 THEN
                        NewWord$ = "za" + LTRIM$(STR$(NumFound + 1))
                        m1 = INSTR(k, Txt$, " ")
                        IF m1 = 0 THEN
                        Txt$ = LEFT$(Txt$, m - 1) + NewWord$
                        ELSE
                        Txt$ = LEFT$(Txt$, m - 1) + NewWord$ + RIGHT$(Txt$, LEN(Txt$) - m1 + 1)
                        END IF
                        END IF
                    END IF
                END IF
            END IF
          END IF
NextStep:
                Start = m + 1
                LOOP UNTIL m = 0
 SearchStr$ = "Art"
 LETTERS$ = "za"
 NEXT
DO
  m = INSTR(Start, Txt$, CHR$(21))
  IF m THEN
                k = m + 1
                DO
                  Ch$ = MID$(Txt$, k, 1)
```

```
                        k = k + 1
                   LOOP UNTIL Ch$ <> " "
                   m1 = 0
                   DO
                      Ch$ = MID$(Txt$, k + m1 - 1, 1)
                      m1 = m1 + 1
                   LOOP UNTIL Ch$ < "0" OR Ch$ > "9"
                   Numb$ = MID$(Txt$, k - 1, m1 - 1)
                         IF VAL(Numb$) < 3000 THEN
                    NewWord$ = "zs" + Numb$
                   m1 = INSTR(k, Txt$, " ")
                   IF m1 = 0 THEN
                         Txt$ = LEFT$(Txt$, m - 1) + NewWord$
                   ELSE
                         Txt$ = LEFT$(Txt$, m - 1) + NewWord$ + RIGHT$(Txt$, LEN(Txt$) - m1 + 1)
                   END IF
                         END IF
       END IF
   LOOP UNTIL m = 0
   END SUB SUB SelectMenu (Ch$, Expression AS ExpressionType, HotStr$, GlobalStatus) STATIC SELECT CASE Ch$
           CASE MID$(HotStr$, 1, 1)'Other Suggested Words: SWAPS/Relatives
                   OtherWords Expression, WordPtr
           CASE MID$(HotStr$, 3, 1)' Delete a Word
                   DeleteWord Expression
           CASE MID$(HotStr$, 4, 1)' Insert Last Deleted Word
                   InsertWord Expression
           CASE MID$(HotStr$, 2, 1)' Add New Words
                   AddSearchTerms Expression
           CASE MID$(HotStr$, 6, 1)' New Search
                   IF Lang$ = "GERMAN" THEN
                           i$ = Question$("NEUE SUCHE ? [J/N]  ", "JN", "ACHTUNG !")
                           IF i$ = "J" THEN
                                   GlobalStatus = NewSearch
                           ELSE
                                   GlobalStatus = 3
                           END IF
                   ELSE
                           i$ = Question$("New Search? [Y/N]", "YN", "WARNING!")
                           IF i$ = "Y" THEN
                                   GlobalStatus = NewSearch
                           ELSE
                                   GlobalStatus = 3
                           END IF
                   END IF
           CASE MID$(HotStr$, 5, 1)' View records
                   GlobalStatus = EditSearch
                   REDIM MatchRecords(1 TO 1) AS RecInfoType
                   RankRecords MatchRecords(), NumFound, Expression
                   IF NumFound > 0 THEN
                           ShowDoc MatchRecords(), NumFound, Expression, RecNum
                   END IF
           CASE MID$(HotStr$, 7, 1)' Exit program
                   ScrSR "R"
                   GlobalStatus = EX
           CASE ELSE
   END SELECT

END SUB

SUB ShowAbstr (RecNum&) STATIC

DIM FileNdx AS ISAMtype

FilNum = FREEFILE
   OPEN AbstrDir$ + ".NDX" FOR RANDOM ACCESS READ SHARED AS FilNum LEN = 8
           GET FilNum, RecNum&, FileNdx
   CLOSE FilNum FilNum = FREEFILE
   OPEN AbstrDir$ + ".TXT" FOR RANDOM ACCESS READ SHARED AS FilNum LEN = 88
           CALL PrintAbstr(FileNdx.First, FileNdx.Last, FilNum, RecNum&)
   CLOSE FilNum

END SUB

SUB ShowDoc (Show() AS RecInfoType, NumShow, Expr AS ExpressionType, RecNum) STATIC REDIM ShowHeaders(1 TO NumShow) AS HeaderType
   DIM KeyNdxTemp AS KeyNdxType127

PrevGlobalStatus = GlobalStatus
   Curr = 1
   LastFlag = FALSE
   GOSUB File
   DO
           SELECT CASE ExitFlag CASE F2, ShowExprKey ' Show the current expression
                           REDIM Scr%(1 TO 2000)
                           CALL MScrnSave(1, 1, 25, 80, SEG Scr%(1))
                           CALL ShowExpr(Expr)
                           CALL ShowQuery
                           CALL MScrnRest(1, 1, 25, 80, SEG Scr%(1))
                           ERASE Scr%
                           GOSUB File
```

```
                CASE F4, 275, LeftArrowKey                         'Previous Document
                        IF Curr > 1 THEN Curr = Curr - 1
                        GOSUB File CASE F3, 277, RightArrowKey                        'Next Document
                        IF Curr < NumShow THEN Curr = Curr + 1
                        GOSUB File
                CASE F5, DirNumKey                                 'Direct type a number
                        Chime 5
                        SaveCurr = Curr
                        DO
                                CLS
                                InfoLine$ = "Esc:Previous Screen   Enter:To Go Directly to Entered Document Number"
                                CALL References(InfoLine$)
                                IF Cnf.MonTyp = 2 THEN
                                        Col = RevAttr
                                ELSE
                                        Col = OneColor(14, 4)
                                END IF
                                ClearScr0 2, 20, 4, 65, Col
                                CALL DrawBox(2, 20, 4, 65, 2, Col)
                                QPrintRC " ENTER DOCUMENT NUMBER [1 -" + STR$(UBOUND(Show)) + "] :", 3, 26, OneColor(14, 4)
TooBig:
                                Cur$ = "    "
                                CurLen = 4
                                CALL Editor(Cur$, CurLen, Scan, 1, 0, RevAttr, RevAttr, 3, 60)
                                IF Scan = 13 THEN
                                        Curr = VAL(Cur$)
                                        IF Curr > UBOUND(Show) OR Curr = 0 THEN
                                                Chime 6
                                                ClearScr0 5, 25, 8, 61, Col
                                                CALL DrawBox(5, 25, 8, 61, 2, Col)
                                                QPrintRC "Number is too big or not valid.", 6, 29, Col
                                                QPrintRC "Press space bar to continue.", 7, 30, Col
                                                WaitSpace
                                                QPrintRC "    ", 3, 60, -1
                                                COLOR Fg, BG
                                        ELSE
                                                COLOR Fg, BG
                                                GOSUB File
                                        END IF
                                ELSE
                                        IF Scan = 27 THEN
                                                Curr = SaveCurr
                                        GOSUB File
                                        ELSE
                                                QPrintRC "    ", 3, 60, -1
                                                GOTO TooBig
                                        END IF
                                END IF
                        LOOP UNTIL (Curr <= UBOUND(Show) AND Curr > 0)

CASE F10, NewSearchKey                             'NewSearch
                        GlobalStatus = NewSearch
                        HistFlag = FALSE
                        EXIT SUB CASE CR:
                        DIM FileNdx AS ISAMtype
                        PrevGlobalStatus = GlobalStatus
                        REDIM Scr2%(1 TO 2000)
                        CALL MScrnSave(1, 1, 6, 80, SEG Scr2%(1))

CLS
                        RecNum& = Show(Curr).Rec
                        FilNum = FREEFILE
                        OPEN DocDir$ + ".NDX" FOR RANDOM ACCESS READ SHARED AS FilNum LEN = 8
                                GET FilNum, RecNum&, FileNdx
                        CLOSE FilNum FilNum = FREEFILE
                        OPEN DocDir$ + ".TXT" FOR RANDOM ACCESS READ SHARED AS FilNum LEN = 80
                                CALL FullText(FileNdx.First, FileNdx.Last, FilNum, ExprKeys$)
                        CLOSE FilNum SELECT CASE ExitFlag CASE ESC:
                                        CLS
                                        CALL MScrnRest(1, 1, 6, 80, SEG Scr2%(1))
                                        CALL ShowAbstr(RecNum&)
                                        IF ExitFlag = ESC THEN HistFlag = FALSE: GOSUB File CASE 277, F3, RightArrowKey
                                        IF Curr < NumShow THEN Curr = Curr + 1
                                        GOSUB File
                                CASE 275, F4, LeftArrowKey
                                        IF Curr > 1 THEN Curr = Curr - 1
                                        GOSUB File END SELECT
                        ERASE Scr2%

END SELECT

LOOP UNTIL ExitFlag = ESC

EXIT SUB

'-------------------------------------------------------------------
```

```
File:
        CurrRec& = Show(Curr).Rec
        CurrRecDebug = Curr    '***rs debug
        CALL ShowKeywords(CurrRec&)
        QPrintRC "[" + LTRIM$(STR$(Curr)) + "]", 1, 75, RevAttr
'       FilNum = FREEFILE
'       OPEN DocDir$ + ".NDX" FOR RANDOM ACCESS READ SHARED AS FilNum LEN = 8
'       GET FilNum, CurrRec&, FileNdx
'       CLOSE FilNum
'       NumPg = (FileNdx.Last - FileNdx.First) / 60
'       IF NumPg = 1 THEN
'          QPrintRC "Doc" + STR$(CurrRec&) + " " + " 1 page", 1, 3, NormAttr
'       ELSE
'          QPrintRC "Doc" + STR$(CurrRec&) + " " + STR$(NumPg) + " pages", 1, 3, NormAttr
'       END IF
QPrintRC "[Doc" + STR$(CurrRec&) + "]", 1, 3, RevAttr
        IF Curr = 1 THEN CALL ShowHist(NumShow, Curr, Expr)
        IF Curr <= NumShow THEN
            IF (HistFlag <> CR) AND Curr <> 1 THEN
                    CALL ShowHist(NumShow, Curr, Expr)
            ELSE
                IF Curr > 2 THEN
                    IF (MatchRecVals(Curr).Value < .6 * MatchRecVals(Curr - 1).Value OR MatchRecVals(Curr).Value <
                END IF
            END IF
        END IF
'CurrRec& = CurrRec& MOD 600
        DO WHILE (HistFlag <> ESC AND HistFlag <> CR) AND (Curr >= 1)
            SELECT CASE HistFlag
                CASE 275, F4, LeftArrowKey '-- previous
                    IF Curr > 1 THEN Curr = Curr - 1
                    CurrRec& = Show(Curr).Rec
                    CurrRecDebug = Curr    '***rs debug
                    CALL ShowKeywords(CurrRec&)
                    QPrintRC "[" + LTRIM$(STR$(Curr)) + "]", 1, 75, RevAttr '       FilNum = FREEFILE
'       OPEN DocDir$ + ".NDX" FOR RANDOM ACCESS READ SHARED AS FilNum LEN = 8
'       GET FilNum, CurrRec&, FileNdx
'       CLOSE FilNum
'       NumPg = (FileNdx.Last - FileNdx.First) / 60
'       IF NumPg = 1 THEN
'          QPrintRC "Doc" + STR$(CurrRec&) + " " + " 1 page", 1, 3, NormAttr
'       ELSE
'          QPrintRC "Doc" + STR$(CurrRec&) + " " + STR$(NumPg) + " pages", 1, 3, NormAttr
'       END IF QPrintRC "[Doc" + STR$(CurrRec&) + "]", 1, 3, RevAttr
                    IF Curr > 24 OR FullFlag THEN
                        IF FullFlag THEN
                            CALL ShowHist(NumShow, Curr, Expr)
                        ELSE
                            CALL ScrollHist(Curr, "R", NumShow)
                        END IF
                    ELSE
                        CALL ReWriteHist(Curr)
                    END IF CASE 277, F3, RightArrowKey '-- next
                    IF Curr < NumShow THEN Curr = Curr + 1
                    CurrRec& = Show(Curr).Rec
                    CurrRecDebug = Curr    '***rs debug
                    IF NOT LastFlag THEN CALL ShowKeywords(CurrRec&)
                    QPrintRC "[" + LTRIM$(STR$(Curr)) + "]", 1, 75, RevAttr
QPrintRC "[Doc" + STR$(CurrRec&) + "]", 1, 3, RevAttr
'       FilNum = FREEFILE
'       OPEN DocDir$ + ".NDX" FOR RANDOM ACCESS READ SHARED AS FilNum LEN = 8
'       GET FilNum, CurrRec&, FileNdx
'       CLOSE FilNum
'       NumPg = (FileNdx.Last - FileNdx.First) / 60
'       IF NumPg = 1 THEN
'          QPrintRC "Doc" + STR$(CurrRec&) + " " + " 1 page", 1, 3, NormAttr
'       ELSE
'          QPrintRC "Doc" + STR$(CurrRec&) + " " + STR$(NumPg) + " pages", 1, 3, NormAttr
'       END IF IF Curr > 25 OR FullFlag THEN
                        IF FullFlag THEN
                            CALL ShowHist(NumShow, Curr, Expr)
                        ELSE
                            CALL ScrollHist(Curr, "L", NumShow)
                        END IF
                    ELSE
                        CALL ReWriteHist(Curr)
                    END IF
                CASE =H, HomeKey
                    IF Curr <> 1 THEN Curr = 1
                        CurrRec& = Show(Curr).Rec
                        CurrRecDebug = Curr    '***rs debug
                        CALL ShowKeywords(CurrRec&)
                        QPrintRC "[" + LTRIM$(STR$(Curr)) + "]", 1, 75, RevAttr
                        QPrintRC "[Doc" + STR$(CurrRec&) + "]", 1, 3, RevAttr
                        CALL ShowHist(NumShow, Curr, Expr)
                CASE EN, EndKey
                    IF Curr <> NumShow THEN Curr = NumShow
                        CurrRec& = Show(Curr).Rec
                        CurrRecDebug = Curr    '***rs debug
                        CALL ShowKeywords(CurrRec&)
                        QPrintRC "[" + LTRIM$(STR$(Curr)) + "]", 1, 75, RevAttr
                        QPrintRC "[Doc" + STR$(CurrRec&) + "]", 1, 3, RevAttr
```

```
                                CALL ShowHist(NumShow, Curr, Expr)
                                LastFlag = TRUE
                   CASE ELSE
                           EXIT DO
                   END SELECT LOOP
        IF HistFlag = ESC THEN EXIT SUB
        ExitFlag = HistFlag
        IF GlobalStatus <> NewSearch AND ExitFlag = CR THEN CALL ShowAbstr(CurrRec&)
        IF ExitFlag = ESC THEN HistFlag = FALSE: GOTO File:
        RETURN
END SUB SUB ShowExpr (Expr AS ExpressionType) STATIC CALL ClearBG TotSubExpr = 0
IF Expr.Num THEN FOR i = 1 TO Expr.Num
                TotSubExpr = TotSubExpr + Expr.SubExpr(i).Num
        NEXT ELSE ' no search expression has been entered, so display a note to the user Note$ = "No Search Expression Yet"
        ULr = 2: ULc = 2: Frame = 1: LRr = ULr + 3: LRc = ULc + LEN(Note$) + 4
        CALL WindMgr(ULr + 1, ULc + 1, LRr + 1, LRc + 1, Frame, NormAttr, RevAttr, "")
        CALL QPrintRC(Note$, ULr + 2, ULc + 2, -1)
        EXIT SUB

END IF

IF TotSubExpr > 17 THEN ' can't display more than 17 on the screen
        IF Lang$ = "GERMAN" THEN
          DispMsg "Zuviele Worte! System verarbeitet maximal 20 Suchbegriffe", 0, 0
        ELSE
          DispMsg "Cannot process: You have too many words in your search expression.", 0, 0
        END IF
        CALL WaitSpace
        CALL Chime(3)
        EXIT SUB
END IF
Old = Expr.SubExpr(1).Num
REDIM p$(1 TO Expr.Num, 1 TO Old)
MaxWordLen = 34: LRr = 2
'-- find maximum word length
FOR S = 1 TO Expr.Num
        IF Expr.SubExpr(S).Num > Old THEN REDIM PRESERVE p$(1 TO Expr.Num, 1 TO Expr.SubExpr(S).Num)
        FOR i = 1 TO Expr.SubExpr(S).Num LRr = LRr + 1
          c = Str2Code%(Expr.SubExpr(S).Phrase, i)
          p$(S, i) = Dict$(c)
          IF LEN(p$(S, i)) > MaxWordLen THEN MaxWordLen = LEN(p$(S, i))
        NEXT
NEXT ' draw the Expression box only if FindExpr was called
' (i.e. searched on the whole expression)
IF Expr.Match >= 0 THEN ' it wasn't -1 so FindExpr was called ULr = 2: ULc = 2: Frame = 219
        LRc = ULc + MaxWordLen + 2

END IF

ULr = 3
ULc = 3
Frame = 1
LRc = ULc + MaxWordLen ' -1
n$ = "#Docs"
CALL WindMgr(ULr + 1, ULc + 1, LRr + 1, LRc + 1, Frame, NormAttr%, NormAttr%, n$)
FOR S = 1 TO Expr.Num
        FOR i = 1 TO Expr.SubExpr(S).Num
                IF p$(S, i) > "" THEN QPrintRC p$(S, i), ULr + i, ULc + 1, -1
        NEXT
NEXT

END SUB

SUB ShowKeywords (RecNum&) STATIC
'---- 4 rows of 80 columns, including window
ULr = 1: ULc = 1: LRr = 6: LRc = 80: LenCol = LRr - ULr - 1: n = 0
'CLS
CALL ClearScr0(ULr, ULc, LRr, LRc, RevAttr)' clear bottom portion
CALL DrawBox(ULr, ULc, LRr, LRc, 2, RevAttr)

'---- now display keywords

DIM KeyNdxTemp AS KeyNdxType127

'-- get 63-word list from "newkey.ndx"
FGetRT KeyNdxFile, KeyNdxTemp, RecNum&, LEN(KeyNdxTemp)
IF Lang$ = "GERMAN" THEN
  CALL QPrintRC(LMarg$ + " WICHTIGSTE BEGRIFFE: " + RMarg$, ULr, 28, -1)
ELSE
```

```
            CALL QPrintRC(LMarg$ - " KEY WORDS: " + RMarg$, ULr, 32, -1)
        END IF
    KeepExpr$ = ""
    '----- debug
    'QPrintRC STR$(RecNum&) + STR$(KeyNdxTemp.Num), 1, 1, -1
    'IF KeyNdxTemp.Num > 32767 OR KeyNdxTemp.Num < 1 THEN LOCATE 18, 1: BEEP: STOP
    '----- debug
        REDIM PRESERVE KeyWords(1 TO KeyNdxTemp.Num) AS WordShowType
        FOR i = 1 TO KeyNdxTemp.Num
                'mark with '*' words that match the query
                ks = KeyInstr%(ExprKeys$, KeyMid$(KeyNdxTemp.Str, i))
                IF ks > 0 THEN
                        KeyWords(i).Flag = "*"
                ELSE
                        KeyWords(i).Flag = " "
                END IF
                'get word and cut it up to 22 letters + '..'
                x$ = Dict$(Str2Code%(KeyNdxTemp.Str, i))
                x$ = RIGHT$(x$, LEN(x$) - 5)
                CALL CutWord(x$)
                KeyWords(i).Word = x$
                KeyWords(i).Code = Str2Code%(KeyNdxTemp.Str, i)
        NEXT
    IF KeyNdxTemp.Num > 12 THEN
            'sort rest of kw by flag,i.e. push matched words up
        SortT KeyWords(13), KeyNdxTemp.Num - 12, 1, LEN(KeyWords(1)), 0, 1
        'look for how many word we should replace to first-12 part
        SearchT2 KeyWords(13), KeyNdxTemp.Num - 12, " ", Found, 0, 0, LEN(KeyWords(1)), 0, 1
        'if "found" last words are matched shift them deleting last non-matched words before them
        DO
                n = 0
                'look should we shift any word or we have enough room on the bottom
                SearchT2 KeyWords(12), Found, "*", Shift, 1, 0, LEN(KeyWords(1)), 0, 1
                IF Shift > -1 THEN     'We should shift
                        FOR i = 12 - Found TO 1 STEP -1 'look for non-matched word for replacement
                                IF KeyWords(i).Flag = " " THEN
                                        FOR j = 1 TO n. 'shift all words before that which should be shifted
                                                KeyWords(i) = KeyWords(i + 1)
                                                i = i + 1
                                        NEXT
                                        KeyWords(12 - Found) = KeyWords(12 - Shift) 'shift kw
                                        KeyWords(12 - Shift).Flag = " "
                                        EXIT FOR
                                ELSE
                                        n = n + 1. 'how many words should be shifted
                                END IF
                        NEXT
                END IF
        LOOP UNTIL Shift = -1 OR n >= 12 - Found
        'check could we shift everything. If not, shift it and decrease Found
        DO
                SearchT2 KeyWords(12), Found, "*", Shift, 1, 0, LEN(KeyWords(1)), 0, 1
                IF Shift > -1 THEN
                        Found = Found - 1
                        'look for the first word which can be shifted
                        SearchT2 KeyWords(1), 12, " ", FirstSpace, 0, 0, LEN(KeyWords(1)), 0, 1
                        IF FirstSpace > -1 THEN
                                FirstSpace = FirstSpace + 1 'real space
                                IF FirstSpace < 12 - Shift THEN 'if there is where to shift it, do it
                                        KeyWords(FirstSpace) = KeyWords(12 - Shift)
                                        KeyWords(12 - Shift).Flag = " "
                                END IF
                        END IF
                END IF
        LOOP UNTIL Shift = -1
        FOR i = 1 TO Found
                KeyWords(13 - i) = KeyWords(12 + Found - i + 1)'replace matched keywords beyond 12 to 12
        NEXT
    END IF
    CurrCol = ULc - 1
    n = UBOUND(KeyWords)
    IF KeyNdxTemp.Num < 12 THEN
            REDIM PRESERVE KeyWords(1 TO 12) AS WordShowType
            FOR i = KeyNdxTemp.Num + 1 TO 12
                    KeyWords(i).Word = " "
            NEXT
    END IF
    FOR i = 1 TO 4

'-------------***rs debug vvvvvvvvvv
'----- get Salton Value for this word  ***rs
'    Code = KeyWords(i).Code
'    if Code > 0 then
'      FOR Index& = KYIndx(Code).Index TO KYIndx(Code).Index + KYIndx(Code).Num - 1
'        FGetRT KYInvertDatFILE, KYInfo, Index&, KYInfoLEN
'        IF KYInfo.Rec = RecNum& THEN
'           SaltonValue = KYInfo.Value
'           EXIT FOR
'        END IF
'      NEXT Index&
'      QPrintRC LEFT$(Dict$(Code), 15) + " S:" + STR$(SaltonValue), ULr + i, CurrCol + 2, -1'***rs debug
'    end if
'---------***rs debug ----------
            IF KeyWords(i).Flag <> " " THEN
                    QPrintRC KeyWords(i).Word, ULr + i, CurrCol + 2, NorAttr
            ELSE
                    QPrintRC KeyWords(i).Word, ULr + i, CurrCol + 2, -1
            END IF
```

```
'---***rs debug vvvvvvvvvv
'--- get Salton Value for this word ***rs
'    Code = KeyWords(i + 4).Code
'      if Code > 0 then
'         FOR Index& = KYIndx(Code).Index TO KYIndx(Code).Index + KYIndx(Code).Num - 1
'            FGetRT KYInvertDatFILE, KYInfo, Index&, KYInfoLEN
'
'            IF KYInfo.Rec = RecNum&% THEN
'               SaltonValue = KYInfo.Value
'               EXIT FOR
'            END IF
'         NEXT Index&
'         QPrintRC LEFT$(Dict$(Code), 15) + " S:" + STR$(SaltonValue), ULr + i, CurrCol + 25 + 2, -1'***rs debug
'      end if
'------***rs debug ----------
              IF KeyWords(i + 4).Flag <> " " THEN
                    QPrintRC KeyWords(i + 4).Word, ULr + i, CurrCol + 27, NormAttr
              ELSE
                    QPrintRC KeyWords(i + 4).Word, ULr + i, CurrCol + 27, -1
              END IF
'------***rs debug vvvvvvvvvv
'----- get Salton Value for this word ***rs
'    Code = KeyWords(i + 8).Code
'      if Code > 0 then
'         FOR Index& = KYIndx(Code).Index TO KYIndx(Code).Index + KYIndx(Code).Num - 1
'            FGetRT KYInvertDatFILE, KYInfo, Index&, KYInfoLEN
'            IF KYInfo.Rec = RecNum& THEN
'               SaltonValue = KYInfo.Value
'               EXIT FOR
'            END IF
'         NEXT Index&
'         QPrintRC LEFT$(Dict$(Code), 15) + " S:" + STR$(SaltonValue), ULr + i, CurrCol + 50 + 2, -1'***rs debug
'      end if
'--------***rs debug ----------
              IF KeyWords(i + 8).Flag <> " " THEN
                    QPrintRC KeyWords(i + 8).Word, ULr + i, CurrCol + 52, NormAttr
              ELSE
                    QPrintRC KeyWords(i + 8).Word, ULr + i, CurrCol + 52, -1
              END IF
          NEXT
'------***rs debug vvvvvvvvvv
'   QPrintRC "Document Rank:" + STR$(RecsDebug&(CurrRecDebug)), 6, 1, -1'***rs debug
'   CurrRow = CurrRow + 1
'       IF CurrRow = LRr THEN
'          IF CurrCol = OldCurrCol OR CurrCol = OldCurrCol + 25 THEN '-- move over to next column
'             CurrRow = OldCurrRow
'             CurrCol = CurrCol + 25
'          ELSE '-- we're already at the bottom of the 3nd column so we're done
'             EXIT FOR
'          END IF
'       END IF
'--------***rs debug ----------

END SUB

SUB ShowQuery

REDIM Scr%(1 TO 800)
MScrnSave 20, 1, 25, 80, Scr%(1)
ClearScr0 20, 2, 24, 79, NormAttr
CALL DrawBox(20, 2, 24, 79, 1, NormAttr)
FOR i = 1 TO 3
        IF LEN(Sentence$(i)) THEN QPrintRC Sentence$(i), 20 + i, 3, -1
NEXT
CALL References("PRESS ANY KEY TO CONTINUE")
DO
 Ch$ = INKEY$
LOOP UNTIL LEN(Ch$) > 0
MScrnRest 20, 1, 25, 80, Scr%(1)
ERASE Scr%

END SUB

FUNCTION SpaceNum$ (x, Space%) STATIC

SpaceNum$ = RIGHT$(STRING$(Space%, " ") + Num$(x), Space%)

END FUNCTION

FUNCTION Str2Code% (Store$, Location%) STATIC

Str2Code% = CVI(MID$(Store$, Location% * 2 - 1, 2))

END FUNCTION

SUB WaitSpace STATIC
CALL ClearBuf
DO
        Ky$ = INKEY$
        IF Ky$ = " " THEN
                 EXIT SUB
        ELSEIF Ky$ = CHR$(0) + CHR$(F10 - 200) OR Ky$ = CHR$(NewSearchKey) THEN
                IF Lang$ = "GERMAN" THEN
                        i$ = Question$("NEUE SUCHE ? [J/N] ", "JN", "ACHTUNG !")
                        IF i$ = "J" THEN
                           GlobalStatus = NewSearch
                           EXIT SUB
                        END IF
                ELSE
```

```
                                    i$ = Question$("New Search? [Y/N]", "YN", "WARNING!")
                                    IF i$ = "Y" THEN
                                        GlobalStatus = NewSearch
                                        EXIT SUB
                                    END IF
                                END IF
                        END IF
                LOOP

END SUB

SUB WindMgr (ULRow, ULCol, LRRow, LRCol, Frame, BoxColr, TextColr, Text$) STATIC CALL ClearScr0(ULRow, ULCol, LRRow, LRCol, BoxColr)
                CALL DrawBox(ULRow - 1, ULCol - 1, LRRow + 1, LRCol + 1, Frame, BoxColr)
                IF Text$ = "#Docs" THEN
                        CALL QPrintRC(Text$, ULRow - 1, ULCol, TextColr)
                ELSE
                        IF LEN(Text$) THEN CALL QPrintRC("[" + Text$ + "]", ULRow - 1, ULCol + 1, TextColr)
                END IF

END SUB

SUB WordParse (Txt$, WordList$(), NumWords) STATIC

NumWords = 0

TotW = InCount%(Txt$, " ") + 1' number of words in current line

FOR Word = 1 TO TotW

CALL Extract(Txt$, " ", Word, Start, SLen)

IF SLen > 0 THEN

'---- extract word
                                w$ = MID$(Txt$, Start, SLen)

'---- fill out 1 and 2 char words with /'s
                                IF SLen < 3 THEN w$ = w$ + STRING$(3 - SLen, "/")

'---- allow only words that start with alphabetic chars "a"-"z"
                                ASCw = ASC(w$)

IF (ASCw >= AscA AND ASCw <= ASCZ) OR (ASCw >= AscUpperA AND ASCw <= AscUpperZ) THEN NumWords = NumWords + 1

'---- the following doesn't apply to GERMAN
                                        IF Lang$ = "ENGLISH" THEN
                                                IF RIGHT$(w$, 2) = "'s" THEN        '-- remove the 's
                                                        w$ = LEFT$(w$, SLen - 2)
                                                ELSEIF RIGHT$(w$, 1) = "'" THEN     '-- and any final '
                                                        w$ = LEFT$(w$, SLen - 1)
                                                END IF
                                        END IF '---- store the word
                                        REDIM PRESERVE WordList$(1 TO NumWords)
                                        WordList$(NumWords) = w$

END IF
                        END IF

NEXT' word in line

END SUB
FUNCTION ZeroNum$ (x, Zero) STATIC

'-- fill a number with leading zeros

ZeroNum$ = RIGHT$(STRING$(Zero, "0") + Num$(x), Zero)

END FUNCTION

DECLARE SUB SortSwapEMS (Handle%, NumEls%)
DECLARE SUB DrawBox (ULRow%, ULCol%, LRRow%, LRCol%, Frame%, Col%)
DEFINT A-Z TYPE WordType
        Word      AS STRING * 64
        LineNumb  AS INTEGER
END TYPE

DEFINT A-Z

CONST FALSE = 0, TRUE = NOT FALSE, ASCEND = 0, Descend = 1
CONST MaxShow = 50

'scan code + 200 for not to mix with letters
CONST UP = 272, PGUP = 273, Dn = 280, PGDN = 281, HM = 271, EN = 279
CONST CtrlPgUp = 332, CtrlPgDn = 318, CtrlHM = 319, CtrlEN = 317
CONST F1 = 259, F2 = 260, F3 = 261, F4 = 262, F5 = 263
CONST F6 = 264, F7 = 265, F8 = 266, F9 = 267, F10 = 268

CONST ESC = 27, CR = 13

CONST NewSearch = 1, AddWords = 2, EditSearch = 3, Back = 4, Forward = 5, SWAPS = 6
```

```
'$INCLUDE: '\\vadim\c-drive\user\include\defcnf.bi'
'$INCLUDE: '\\vadim\c-drive\user\include\types.bi'
'$INCLUDE: '\\vadim\c-drive\user\INCLUDE\shared.bi'
'$INCLUDE: '\\vadim\c-drive\user\EXTERN.BAS'

DECLARE SUB AddSwaps (Expr AS ExpressionType, Exclude$, Collect() AS CollectType, NumCollect%)
DECLARE SUB BuildCombTable (Mode$)
DECLARE SUB Code2Str (Store$, Location%, Code%)
DECLARE SUB CPrint (x$)
DECLARE SUB DispMsg (Msg$, R%, c%)
DECLARE SUB EmsAlloc (NumPages%, Handle%, LoadFile$)
DECLARE SUB FindRelatives (Expr AS ExpressionType, SubNum%, Ptr%, Rel() AS CollectType, NumRel%, Exclude$)
DECLARE SUB HistMessage ()
DECLARE SUB OtherWords (Expr AS ExpressionType, WordPtr)
DECLARE SUB PickChoice (m() AS CollectType, NumM%, Label$, Pick%(), NumPick%, ExactFlag, Expr AS ExpressionType)
DECLARE SUB PickList (Items$(), Picked%(), NPicked%, Cnf AS ANY, Expression AS ANY, NewSearchKey, ShowExprKey, HK, EK, PgUK, PgDK, UK,
DECLARE SUB RankRecords (Recs() AS RecInfoType, NumFound%, E AS ExpressionType)
DECLARE SUB References (Text$)
DECLARE SUB ScrSR (SR$)
DECLARE SUB ShowExpr (Expr AS ANY)
DECLARE SUB SortEMSRankInfo (Handle%, Num&)
DECLARE SUB TermMatch (Term$, Expr AS ExpressionType, m() AS CollectType, NumM%, Repeate, ExactFlag)
DECLARE SUB VertMenu (Items(), Choice%, MaxLen%, BoxBot%, Ky$, Action%, Cnf AS Config, Mode$, HK, EK, PgUK, PgDK, UK, DK, TermTypeMode
DECLARE SUB WaitSpace ()
DECLARE SUB WindMgr (ULRow%, ULCol%, LRRow%, LRCol%, Frame%, BoxColr%, TextColr%, Text$)
DECLARE FUNCTION BoxInput$ (Edit$, Title$, Prompt$, Row%, Col%, Scan)
DECLARE FUNCTION ComboSum& (Bit$, Value&, Mode$, Poly!())
DECLARE FUNCTION Dict$ (Code%)
DECLARE FUNCTION FirstLast% (Word$, First%, Last%, KeyType%)
DECLARE FUNCTION KeyInstr% (KeyStr$, Srch$)
DECLARE FUNCTION KeyMid$ (KeyStr$, Start)
DECLARE FUNCTION Num$ (x%)
DECLARE FUNCTION Question$ (Prompt$, Choice$, Label$)
DECLARE FUNCTION SelectRelatives% (Expr AS ExpressionType, CurrentSub%, TopKeys() AS CollectType, NumTopKeys%)
DECLARE FUNCTION SpaceNum$ (x%, SPACE%)
DECLARE FUNCTION Str2Code% (s$, k%)

'$INCLUDE: '\\vadim\c-drive\user\include\prefixes.bi'

SUB AddSearchTerms (Expr AS ExpressionType) STATIC

Repeate = FALSE
CurrentSub = 1
GlobalStatus = EditSearch

IF Expr.SubExpr(1).Num = 15 THEN ' can't add any more words
        Chime 4
        IF Lang$ = "GERMAN" THEN
                DispMsg "Fehler:  Maximal 15 Suchbegriffe.  LEERTASTE um weiterzumachen!", R, c
        ELSE
                DispMsg "ERROR: Limit of 15 Search Terms. Press the Space Bar to continue:", R, c
        END IF
        WaitSpace
        DispMsg "", 0, 0
        EXIT SUB
END IF
IF Lang$ <> "GERMAN" THEN
        CALL References("ENTER WORD OR PHRASE AND THEN PRESS ENTER OR PRESS ESC TO CANCEL")
END IF
'---- Get search term(s) from user
GetSearchTerm:

ScrSR "S"
Title$ = "Adding Search Words"
Row = 19
Term$ = BoxInput$(SPACES(40), Title$, "Search Word/Phrase:", Row, 8, Scan)
ScrSR "R"
IF (ABS(Scan) + 200 = F10 AND Scan < 0) OR Scan = NewSearchKey THEN
                        IF Lang$ = "GERMAN" THEN
                                i$ = Question$("NEUE SUCHE ? [J/N]  ", "JN", "ACHTUNG !")
                                IF i$ = "J" THEN
                                        GlobalStatus = NewSearch
                                        EXIT SUB
                                END IF
                        ELSE
                                i$ = Question$("New Search? [Y/N]", "YN", "WARNING!")
                                IF i$ = "Y" THEN
                                        GlobalStatus = NewSearch
                                        EXIT SUB
                                END IF
                        END IF
END IF
IF Term$ = "" THEN EXIT SUB '---- Collect all word-code numbers matching the partial term from
'     the Dictionary (DictWord)

'---- allocate dummy space for the matching codes
REDIM MatchCodes(1 TO 1) AS CollectType '---- collect the matching codes into the array
CALL TermMatch(Term$, Expr, MatchCodes(), NumMatchCodes, Repeate, ExactFlag)

IF NumMatchCodes = 0 THEN ' no matching entries in dictionary
        IF Repeate THEN
                IF Lang$ = "GERMAN" THEN
                        DispMsg "Das Wort '" + Term$ + "' ist bereits eingegeben. LEERTASTE um anderen Suchbegriff einzugeben!", R, c
                ELSE
                        DispMsg "Word '" + Term$ + "' is already chosen. Press the Space Bar to enter a new Search Term.", R, c
                END IF
```

```
            ELSE
                   IF Lang$ = "GERMAN" THEN
                               DispMsg "Kein Begriff gefunden der '" + Term$ + "' enthaelt. LEERTASTE um anderen Suchbegriff einzugeben!", R,
                         ELSE
                               DispMsg "No words or phrases that contain '" + Term$ + "' were found.  Press the Space Bar to enter a new Sear
                         END IF
              END IF
              WaitSpace
              DispMsg "", 0, 0
              ShowExpr Expr
              GOTO GetSearchTerm' get a new word to search for
END IF
IF NumMatchCodes > 1 THEN
'---- Get one or more choices from the list from the substring dict match
' Note: the resulting list of matches is stored in word-code form
'       therefore, the PickChoice routine must convert all the
'       codes to words in a temporary array for the PickList routine Label$ = "Select Search Term(s)"

GlobalStatus = AddWords

REDIM Picked%(15 - Expr.SubExpr(CurrentSub).Num)
CALL PickChoice(MatchCodes(), NumMatchCodes, Label$, Picked%(), NumPicked, ExactFlag, Expr)

ELSE
 NumPicked = 1
 REDIM Picked(1 TO 1)
 Picked(1) = 1 'MatchCodes(1).Code
END IF IF NumPicked = -10 THEN ' F10 was pressed: New Search
                      IF Lang$ = "GERMAN" THEN
                                i$ = Question$("NEUE SUCHE ? [J/N]  ", "JN", "ACHTUNG !")
                                IF i$ = "J" THEN
                                    ' GlobalStatus = NewSearch
                                    EXIT SUB
                               END IF
                      ELSE
                                i$ = Question$("New Search? [Y/N]", "YN", "WARNING!")
                                IF i$ = "Y" THEN
                                     GlobalStatus = NewSearch
                                     EXIT SUB
                                END IF
END IF ELSEIF NumPicked > 0 THEN ' add words to expression '---- store choices into current SubExpr.Phrase NumPhrase = Expr.SubExpr(CurrentSub).Num
       Expr.SubExpr(CurrentSub).Num = NumPhrase + NumPicked
       FOR i = 1 TO NumPicked
             IF KYIncx(MatchCodes(Picked(i)).Code).Num THEN
                    NumExprWords = NumExprWords + 1
                    REDIM PRESERVE ExprCodes(1 TO NumExprWords) AS CodePolyType
                    ExprCodes(NumExprWords).Code = MatchCodes(Picked(i)).Code
                    EmsGet1El ExprCodes(NumExprWords).Poly, LEN(ExprCodes(1).Poly), ExprCodes(NumExprWords).Code, PolySemyEMS
             ELSE
                    IF Lang$ = "GERMAN" THEN
                              DispMsg "Der Begriff '" + Term$ + "' erscheint in keinem Dokument. LEERTASTE um anderen Begriff einzug
                    ELSE
                              DispMsg "No documents that contain '" + Term$ + "' were found.  Press the Space Bar to enter a new Sea
                    END IF
                    WaitSpace
                    DispMsg "", 0, 0
                    GOTO GetSearchTerm       ' get a new word to search for
             END IF
       NEXT
       OriginalExpr$ = ""
       SortT ExprCodes(1), NumExprWords, Descend, LEN(ExprCodes(1)), 2, -3
       FOR k = 1 TO NumExprWords
             Code2Str Expr.SubExpr(CurrentSub).Phrase, k, ExprCodes(k).Code
             OriginalExpr$ = OriginalExpr$ + MKI$(ExprCodes(k).Code)
       NEXT
       Expr.Match = -1' reset search flag in full expression
                                        ' when this flag is -1, the program
                                        ' knows that no valid search has been done ELSE ' none were picked ScrSR "R"
       GOTO GetSearchTerm

END IF

ERASE MatchCodes, Picked

Expr.Num = CurrentSub ' set number of expressions to the current sub

END SUB

SUB AddSwaps (Expr AS ExpressionType, Excludes, Collect() AS CollectType, NumCollect) STATIC GlobalStatus = EditSearch
```

```
IF Expr.SubExpr(1).Num = 15 THEN   ' can't add any more words
        Chime 4
        DispMsg "ERROR: Limit of 15 Search Terms. No more Search Terms can be added. Press the Space Bar to continue:", R, c
        WaitSpace
        DispMsg "", 0, 0
        EXIT SUB
END IF
DIM FC63 AS FreqComp63
FC63LEN = LEN(FC63)
'-- if not enough words to run SWAPS then return 12 relatives
IF Expr.SubExpr(1).Num < 2 THEN Code = Str2Code%(Expr.SubExpr(1).Phrase, 1)
        FGetRT Freq63FILE, FC63, CLNG(Code), FC63LEN
        i = 0: NumCollect = 0

DO
                ExclFlag = FALSE
                i = i + 1
                '-- do not include words from Exclude$
                FOR j = 1 TO LEN(Exclude$) / 2
                        IF Str2Code(Exclude$, j) = FC63.Comp(i) THEN
                                ExclFlag = TRUE
                                EXIT FOR
                        END IF
                NEXT
                IF NOT ExclFlag THEN
                        NumCollect = NumCollect + 1
                        REDIM PRESERVE Collect(1 TO NumCollect) AS CollectType
                        Collect(NumCollect).Code = FC63.Comp(i)
                END IF
        LOOP UNTIL NumCollect = 20 OR NumCollect = FC63.Num

EXIT SUB

END IF

'IdealFreq! = (FileSize&(DocDir$ + ".NDX") \ 8) * .007
DIM SynthTemp AS BitValue
LenSynth = LEN(SynthTemp)
FreeSpace& = FRE(-1)
'if there is enough memory then use low-memory otherways use EMS
MemReq& = CLNG(DictWordNum) * LenSynth
IF MemReq& + 1024 < FreeSpace& THEN     'leave 1K free
        REDIM Synth(1 TO DictWordNum) AS BitValue
        MemFlag = TRUE
ELSE
        NumPages = MemReq& \ SixteenK + 1
        EmsAlloc NumPages, SynthEMS, "Swaps EMS Storage"
'-- clear (to 0) the EMS memory we allocated
        EMSPF = EmsGetPFSeg%
        FOR i = 1 TO NumPages
                CALL EmsMapMem(SynthEMS, 1, i)   ' map logical page i to physical page 0
                CALL InitMem(EMSPF, 0, 8192, 0)  ' clear physical page of memory to 0
        NEXT
        MemFlag = FALSE
END IF
'--------------- S W A P S   R O U T I N E ---------------
IF Lang$ = "GERMAN" THEN
        DispMsg "System analysiert Eingabe auf verwandte Themen", R, c
ELSE
        DispMsg "System is analyzing query for related topics", R, c
END IF 'CPrint CHR$(CR)
'CPrint " Code Freq Word/Phrase     # Relatives" + CHR$(CR)
DIM Freq63 AS FreqComp63
FCLEN = LEN(Freq63)
NumSynth = 0
FOR j = 1 TO Expr.SubExpr(1).Num
        Code = Str2Code(Expr.SubExpr(1).Phrase, j)
        FGetRT Freq63FILE, Freq63, CLNG(Code), FC63LEN
        FOR k = 1 TO Freq63.Num
                '-- sum all percentage values of words in FC List (really Relative list)
                '   which contain words from the expression '**** boost SWAPS 1/21/92 VN
                IF KeyInstr%(OriginalExpr$, MKI$(Code)) = 0 THEN
                        AscFCInfoValue = ASC(Freq63.Value(k)) * Boost!
                ELSE
                        AscFCInfoValue = ASC(Freq63.Value(k))
                END IF
                IF MemFlag THEN
                        Synth(Freq63.Comp(k)).Value = Synth(Freq63.Comp(k)).Value + AscFCInfoValue
                        '-- set bit to indicate that this word now has a value
                        SetBit Synth(Freq63.Comp(k)).Bit, j, 1
                        '-- save the code number
                        Synth(Freq63.Comp(k)).Code = Freq63.Comp(k)
                ELSE
                        EmsGet1El SynthTemp, LenSynth, Freq63.Comp(k), SynthEMS
                        SynthTemp.Value = SynthTemp.Value + AscFCInfoValue
                        '-- set bit to indicate that this word now has a value
                        SetBit SynthTemp.Bit, j, 1
                        '-- save the code number
                        SynthTemp.Code = Freq63.Comp(k)
                        EmsSet1El SynthTemp, LenSynth, Freq63.Comp(k), SynthEMS
                END IF
        NEXT
NEXT
```

```
'---- Generate final values for words
'Debug = TRUE
QueryLen = UBOUND(ExprCodes)
REDIM Poly!(1 TO QueryLen)
FOR i = 1 TO QueryLen
        Poly!(i) = (ExprCodes(i).Poly / PolyAvg!) ^ .25
NEXT FOR i = 1 TO DictWordNum
        'get value
        IF MemFlag THEN
                LSET SynthTemp = Synth(i)
        ELSE
                EmsGet1El SynthTemp, LenSynth, i, SynthEMS
        END IF
        'make final calculation
        IF SynthTemp.Value THEN
                EmsGet PolyValue, PolyLEN, CLNG(SynthTemp.Code), PolySemyEMS
                Temp& = SynthTemp.Value * CLNG(PolyValue.Value)
                Temp& = ComboSum&(SynthTemp.Bit, Temp&, "S", Poly!())
'vvvvvvvvvvvvvvvvvvvvvvvvvvvvvvvvvvvvvvvvvvvvvvvvvvvvvvvvvvvvvvvvv
'boost words with ideal frequency (NumDoc*0.007)
                FreqRatio! = KYIndx(SynthTemp.Code).Num / IdealFreq!
                IF FreqRatio! > 1 THEN FreqRatio! = 1 / FreqRatio!
                Temp& = Temp& * FreqRatio! ^ FreqBoost!
'--------------------------------------------------------------
                IF Temp& > 32767 THEN Temp& = 32767
                SynthTemp.Value = Temp&
                'set value back
                IF MemFlag THEN
                        LSET Synth(i) = SynthTemp
                ELSE
                        EmsSet1El SynthTemp, LenSynth, i, SynthEMS
                END IF
        END IF
NEXT
'CPrint CHR$(CR)

'---- exclude all words in the Exclude$ by settting their values to 0
FOR i = 1 TO LEN(Exclude$) \ 2
        IF MemFlag THEN
                Synth(Str2Code(Exclude$, i)).Value = 0
        ELSE
                EmsGet1El SynthTemp, LenSynth, Str2Code(Exclude$, i), SynthEMS
                SynthTemp.Value = 0
                EmsSet1El SynthTemp, LenSynth, Str2Code(Exclude$, i), SynthEMS
        END IF
NEXT '---- sort the Synth() by Value, in decreasing order
IF MemFlag THEN
        SortT Synth(1), DictWordNum, Descend, LEN(Synth(1)), 0, -1' -1=integer sort
ELSE
        DIM El1 AS BitValue: DIM El2 AS BitValue
        EmsSort SEG El1, SEG El2, LenSynth, CLNG(DictWordNum), 0, 0, 0, SynthEMS
'       SortSwapEMS SynthEMS, DictWordNum
END IF
' add as many synthetic relatives as needed to fill out the box to 8
' but add at least 6 of them no matter how many relatives there are.
' this means there can be at most 11 relatives returned
' (5 regular and 6 syntretic)

SynthAdd = 20

'---- add the synth relatives to the Collect list
FOR i = 1 TO DictWordNum        'SynthAdd
        IF MemFlag THEN
                LSET SynthTemp = Synth(i)
        ELSE
                EmsGet1El SynthTemp, LenSynth, i, SynthEMS
        END IF
        IF SynthTemp.Value > 0 THEN  ' add it
                IF KYIndx(SynthTemp.Code).Num > Limit AND NumCollect < SynthAdd THEN
                        NumCollect = NumCollect + 1
                        REDIM PRESERVE Collect(1 TO NumCollect) AS CollectType
                        Collect(NumCollect).Code = SynthTemp.Code
                        IF NumCollect = SynthAdd THEN EXIT FOR
                END IF
        ELSE ' exit out, because the rest have 0 values
                EXIT FOR
        END IF
NEXT DispMsg "", 0, 0

IF MemFlag THEN
        ERASE Synth
ELSE
        EmsRelMem SynthEMS
END IF

END SUB

FUNCTION BoxInput$ (Edit$, Title$, Prompt$, Row%, Col%, Scan%) STATIC

' Displays a Box for input at upper-left location (Row,Col),
' with the Title (if any) centered at the top of the Box,
' and the Prompt displayed before the text input area.

' CALLS: Editor, Monitor%, BoxO, ClearScrO, QPrintRC
```

```
        EditLen = LEN(Edit$)
        ULRow = Row%: ULCol = Col%
        LRRow = ULRow + 4: LRCol = ULCol + EditLen + 5
        IF LEN(Prompt$) THEN LRCol = LRCol + LEN(Prompt$) + 1

CALL ClearScr0(ULRow, ULCol, LRRow, LRCol, HiAttr)
        CALL DrawBox(ULRow, ULCol, LRRow, LRCol, 2, HiAttr)
        IF Title$ <> "" THEN
                CALL QPrintRC(LMarg$ + Title$ + RMarg$, ULRow, (ULCol + LRCol - LEN(Title$) - 2) \ 2, HiAttr)
        END IF IF LEN(Prompt$) THEN CALL QPrintRC(Prompt$, ULRow + 2, ULCol + 2, HiAttr)
        CALL DrawBox(ULRow + 1, LRCol - EditLen - 3, LRRow - 1, LRCol - 2, 1, HiAttr)

LOCATE LRRow - 2, LRCol - EditLen - 2

' Enlarge the cursor so it's easier to spot
        SELECT CASE Monitor%
                CASE IS < 3'            Mono/Herc
                        LOCATE , , 1, 10, 13
                CASE IS = 3'            CGA
                        LOCATE , , 1, 7, 8
                CASE ELSE'              VGA/EGA/MCGA
                        LOCATE , , 1, 11, 14
        END SELECT CALL Editor(Edit$, EditLen, Scan, 0, 0, HiAttr, NormAttr, LRRow - 2, LRCol - EditLen - 2)

LOCATE , , 0

BoxInput$ = RTRIM$(LEFT$(Edit$, EditLen))

END FUNCTION

SUB BuildCombTable (Mode$) STATIC

REDIM CombTable(12 TO 240) AS SINGLE

DIM DocFreqA AS LONG, DocFreqB AS LONG

IF Mode$ = "S" THEN
        Divisor! = 42!
ELSE
        Divisor! = 28!
END IF

NumKeys = LEN(ExprKeys$) \ 2
REDIM Freq63(1 TO NumKeys) AS FreqComp63
FCLEN = LEN(Freq63(1))
'-- only load the relative lists for the words in the expression FOR i = 1 TO NumKeys
        Code = Str2Code%(ExprKeys$, i)
        FGetRT Freq63FILE, Freq63(i), CLNG(Code), FCLEN
NEXT
R = 0
FOR i = 1 TO NumKeys - 1
        FOR j = i + 1 TO NumKeys
                DocFreqA = KYIndx(Freq63(i).Code).Num
                DocFreqB = KYIndx(Freq63(j).Code).Num
                RootofDocFreq! = SQR((DocFreqA + DocFreqB) / 2)
                Subscript = i * 15 + j
                FOR k = 1 TO Freq63(j).Num
                        '-- check if A was found as a relative in B's list
                        IF Freq63(i).Code = Freq63(j).Comp(k) THEN
                                '-- the relative value for the AB pair is
                                CombTable(Subscript) = ASC(Freq63(j).Value(k))
                                EXIT FOR
                        END IF
                NEXT
                IF CombTable(Subscript) = 0 THEN
                        FOR k = 1 TO Freq63(i).Num
                                '-- check if A was found as a relative in B's list
                                IF Freq63(j).Code = Freq63(i).Comp(k) THEN
                                        CombTable(Subscript) = ASC(Freq63(i).Value(k))
                                        EXIT FOR
                                END IF
                        NEXT
                END IF
                CombTable(Subscript) = CombTable(Subscript) * (RootofDocFreq! / RootofAvgDocFreq!) / Divisor!

NEXT
NEXT

ERASE Freq63

END SUB

FUNCTION ComboSum& (Bits, Value&, Mode$, Poly!()) STATIC

REDIM Words(1 TO 15)
Multiplier! = 0

'---- find words shown by the on bits
NumbWords = 0
PolyWord! = 0
QueryLen = LEN(ExprKeys$) \ 2
FOR BitNumb = 1 TO QueryLen
        IF GetBit%(Bits, BitNumb) THEN
```

```
                    NumbWords = NumbWords + 1
                    PolyWord! = PolyWord! + Poly!(BitNumb)
                    Words(NumbWords) = BitNumb
            END IF
    NEXT '** QueryLen = NumbWords '** TEST: TMY 4/8/91

'---- find all combinations of 2 words
    CombSum! = 0
    FOR i = 1 TO NumbWords - 1
            FOR j = i + 1 TO NumbWords TableNumb = (Words(i) * 15) + Words(j)       ' which combination of 2

'-- get value from table
                    PairValue! = CombTable(TableNumb)

'** 3/20/91: no more sqr root here, see BuildCombTable for changes
                    '-- compute sqr root of value and divide by Divisor
                    '   with appropriate max value
                    'PairValue! = SQR(PairValue!) / Divisor IF Mode$ = "S" THEN
                            SELECT CASE QueryLen
                                    CASE 2: MaxPair! = .3
                                    CASE 3: MaxPair! = 1!
                                    CASE IS >= 4: MaxPair! = .9
                                    CASE ELSE
                            END SELECT
                    ELSE
                            SELECT CASE QueryLen
                                    CASE 2: MaxPair! = .5
                                    CASE 3: MaxPair! = 1.3
                                    CASE 4: MaxPair! = 1.2
                                    CASE IS >= 5: MaxPair! = 1.1
                                    CASE ELSE
                            END SELECT
                    END IF
                    IF PairValue! > MaxPair! THEN PairValue! = MaxPair!
                    CombSum! = CombSum! + PairValue!
            NEXT
    NEXT '-- Summed maximum values
    IF Mode$ = "S" THEN
            SELECT CASE QueryLen
                    CASE 2: MaxComb! = .3
                    CASE 3: MaxComb! = 1.4
                    CASE 4: MaxComb! = 1.8
                    CASE 5: MaxComb! = 2.3
                    CASE IS >= 6: MaxComb! = 2.8
                    CASE ELSE: MaxComb! = 10!
            END SELECT
    ELSE
            SELECT CASE QueryLen
                    CASE 2: MaxComb! = .5
                    CASE 3: MaxComb! = 1.6
                    CASE 4: MaxComb! = 1.9
                    CASE 5: MaxComb! = 2.3
                    CASE IS >= 6: MaxComb! = 2.8
                    CASE ELSE: MaxComb! = 10!
            END SELECT
    END IF
    IF CombSum! > MaxComb! THEN
            CombSum! = MaxComb!
    END IF '---- modify value using formula IF NumbWords > 1 THEN ' new value = old value * formula calculated multiplier
            ' Value = sum of weights * (# of words - sum of calculated values for all pairs)

Power! = PolyWord! - CombSum!

IF Power! > 1 THEN
                    IF Mode$ = "S" THEN
                            Multiplier! = 2 ^ Power!
                    ELSE
                            Multiplier! = 1.8 ^ Power!
                    END IF
            END IF
            cs# = Value& * Multiplier!
            IF cs# > 2147483647 THEN cs# = 2147483647
            ComboSum& = cs#
    ELSE
            cs& = Value&
            ComboSum& = cs&
    END IF

END FUNCTION

SUB DeleteWord (Expr AS ExpressionType) STATIC

GlobalStatus = EditSearch
```

```
IF Expr.SubExpr(1).Num = 0 THEN
        Chime 4
        DispMsg "ERROR: No Words to Delete. Press the Space Bar to continue:", R, c
        WaitSpace
        DispMsg "", 0, 0
        EXIT SUB
END IF GOSUB DispPrompt IF Lang$ <> "GERMAN" THEN
        CALL References("")
END IF DO
        DO
                Kee$ = INKEY$
        LOOP UNTIL LEN(Kee$) > 0
        Kee = ASC(UCASE$(RIGHT$((Kee$), 1)))
        IF Kee = F10 THEN
                        IF Lang$ = "GERMAN" THEN
                                i$ = Question$("NEUE SUCHE ? [J/N]  ", "JN", "ACHTUNG !")
                                IF i$ = "J" THEN
                                        GlobalStatus = NewSearch
                                        EXIT SUB
                                END IF
                        ELSE
                                i$ = Question$("New Search? [Y/N]", "YN", "WARNING:")
                                IF i$ = "Y" THEN
                                        GlobalStatus = NewSearch
                                        EXIT SUB
                                END IF
                        END IF
        ELSEIF Kee = ESC THEN

EXIT DO

ELSEIF (Kee >= ASC0 + 1 AND Kee <= ASC9) OR (Kee >= AscUpperA AND Kee <= AscUpperA + Expr.SubExpr(1).Num - 9) THEN n = VAL(Kee$)

IF n = 0 THEN n = Kee - 55    'so A=10, B=11, etc.

IF n > Expr.SubExpr(1).Num THEN
                        '-- user chose a word that doesn't exist
                        BEEP
                ELSE
                        '-- get code of chosen word
                        Code = Str2Code(Expr.SubExpr(1).Phrase, n)
                        '-- save the deleted word in a last-in-first-out stack
                        '   for use in undeleting
                        LIFO$ = LIFO$ + MKI$(Code)
                        '-- now delete the word by moving the words ahead of it
                        '   up one slot
                        ExprCodes(n).Poly = 0
                        FOR i = n TO Expr.SubExpr(1).Num - 1
                                Code2Str Expr.SubExpr(1).Phrase, i, Str2Code(Expr.SubExpr(1).Phrase, i + 1)
                                Code2Str Expr.SubExpr(1).Phrase, i + 1, 0
                                LSET ExprCodes(i) = ExprCodes(i + 1)
                        NEXT
                        '-- decrement word counter
                        Expr.SubExpr(1).Num = Expr.SubExpr(1).Num - 1
                        NumExprWords = NumExprWords - 1
                        IF Expr.SubExpr(1).Num = 0 THEN Expr.Num = 0
                        Expr.Match = -1              '-- Reset to No full search yet
                        Expr.SubExpr(1).Match = -1   '-- Reset to No search yet
                        EXIT DO
                END IF ELSE
                '-- invalid keypress
                BEEP

END IF
LOOP

DispMsg "", 0, 0

EXIT SUB

'-------------------------------------------------------------

DispPrompt:

FOR i = 1 TO MinInt(9, Expr.SubExpr(1).Num)
        QPrintRC "    ", 3 + i, 4, NormAttr QPrintRC STR$(i), 3 + i, 6, RevAttr
NEXT FOR i = 10 TO Expr.SubExpr(1).Num
        QPrintRC "    ", 3 + i, 4, NormAttr
        QPrintRC " " + CHR$(AscUpperA - 10 + i), 3 + i, 6, RevAttr
NEXT IF Lang$ = "GERMAN" THEN
        DispMsg "Zahl oder Buchstabe um Wort zu loeschen    ", R, c
ELSE
```

```
        DispMsg "Enter a Number or Letter to Delete Word/Phrase or Press ESC to Cancel", R, c
END IF

RETURN

END SUB

SUB DrawBox (ULRow, ULCol, LRRow, LRCol, Frame, Col) STATIC
IF TermTypeFlag THEN
        CALL BoxO(ULRow, ULCol, LRRow, LRCol, Frame, Col)
ELSE
        QPrintRC "+" + STRINGS(LRCol - ULCol - 1, "-") + "+", ULRow, ULCol, Col
        FOR i = ULRow - 1 TO LRRow - 1
                QPrintRC "|", i, ULCol, Col
                QPrintRC "|", i, LRCol, Col
        NEXT
        QPrintRC "+" + STRINGS(LRCol - ULCol - 1, "-") + "+", LRRow, ULCol, Col
END IF
END SUB SUB FindRelatives (Expr AS ExpressionType, SubNum, Ptr, Rel() AS CollectType, NumRel, ExcludeS) STATIC SubNum = 1

DIM RelTemp AS RelativeType ' temporary storage for retrieval from EMS
REDIM Collect(1 TO 1) AS CollectType
NumCollect = 0: Added = 0: NumRel = 0

ExprKeys$ = ""
NumExprKeys = 0
FOR i = 1 TO Expr.Num
        ExprKeys$ = ExprKeys$ + LEFT$(Expr.SubExpr(i).Phrase, Expr.SubExpr(i).Num * 2)
        NumExprKeys = NumExprKeys + Expr.SubExpr(i).Num
NEXT '---- exclude list is all word from query plus parts of combkw plus parts of
'     words with prefixes.
Excludes$ = ExprKeys$ + ExcludeAdd$

END SUB

SUB FullText (First&, Last&, FileNum, Expr$)

'-----------------------------------------------------------
'                                                           '
'   FullText.bas - Nov 5, 1990   CompLex                    '
'                                                           '
' . CREATE ARRAY1 (POINTERS) FROM DICT.COD & SORT BY CODE   '
' . FIND ALL SYN. MATCHING CODES & PUT INTO ARRAY3          '
' . READ TEXT LINES FROM FILE INTO ARRAY2                   '
' . CHECK FOR SYN. MATCHES FOR ALL WORDS IN LINES           '
' . DISPLAY TEXT LINES                                      '
' . HI LITE WORDS MATCHING SYNS. IN ARRAY3                  '
'                                                           '
'-----------------------------------------------------------'

LinCount = Last& - First& + 1
IF LinCount > 1000 THEN LinCount = 1000   ' maximum fitting in 128K
DIM DictTemp AS DictType                  ' var. to read ems rec. into
DictLEN = LEN(DictTemp)
DIM Array3$(1 TO 1)                       '' contains all syns.

REDIM Array1(1 TO DictCodeNum) AS Array1Type
Ems2Array Array1(1), LEN(Array1(1)), DictCodeNum, Array1EMS '------[ find all synon. for all search words & place into array3 ]------

FOR Counter = 1 TO (LEN(Expr$) \ 2)
        ThisCode = Str2Code%(Expr$, Counter)

' binary search array1...
        L = 1
        R = DictCodeNum

DO
                ThisElement = (CLNG(L) + R) \ 2
                IF ThisCode < Array1(ThisElement).CodeNum THEN
                        R = ThisElement - 1
                ELSE
                        L = ThisElement + 1
                END IF
        LOOP UNTIL ThisCode = Array1(ThisElement).CodeNum OR L > R ' if found...
        IF ThisCode = Array1(ThisElement).CodeNum THEN '-- backup until first match DO UNTIL Array1(ThisElement - 1).CodeNum <> ThisCode
                        ThisElement = ThisElement - 1
                LOOP '-- copy all syns. into array3$
                DO UNTIL ThisCode <> Array1(ThisElement).CodeNum
                        EmsGet1El DictTemp, LEN(DictTemp), Array1(ThisElement).RecNum, DictCodeH
                        NumOfSyns = NumOfSyns + 1
                        REDIM PRESERVE Array3$(1 TO NumOfSyns)
                        Array3$(NumOfSyns) = RTRIM$(DictTemp.Str)
```

```
                        ThisElement = ThisElement + 1
                        IF ThisElement > DictCodeNum THEN EXIT DO
                LOOP
        END IF
NEXT ERASE Array1    ' don't need it anymore, and it's still in EMS REDIM Text(1 TO LinCount) AS STRING * 80  ' contains text lines
REDIM Array4(1 TO LinCount, 1 TO 30)  ' contains hi-lite words info 'IF NumOfSyns = 0 THEN
'   Chime 10
'     IF Lang$ = "GERMAN" THEN
'        QPrintRC "Number of syns = 0", 1, 1, -1
'     ELSE
'        QPrintRC "Number of syns = 0", 1, 1, -1
'     END IF
'   STOP
'END IF REDIM Array5$(1 TO NumOfSyns, 5) ' contains all syns (parsed)
REDIM Array6(1 TO NumOfSyns)     ' parallel to Array5: # of words in row FOR Counter = 1 TO NumOfSyns '---- NumSynWords
        Array5$(Counter, 0) = STR$(InCount(RTRIM$(Array3$(Counter)), " ") + 1)
        Array6(Counter) = InCount(RTRIM$(Array3$(Counter)), " ") + 1

FOR Counter1 = 1 TO VAL(Array5$(Counter, 0))
                CALL Extract(Array3$(Counter), " ", Counter1, StrtSyn, SlenSyn)
                Array5$(Counter, Counter1) = MID$(Array3$(Counter), StrtSyn, SlenSyn)
        NEXT 'counter1

NEXT 'counter

'-------------[ read text lines from file into array2 ]-----------------

ThisLine = 0

FOR Counter& = First& TO Last&

ThisLine = ThisLine + 1

IF ThisLine > LinCount THEN EXIT FOR

GET FileNum, Counter&, Text(ThisLine)

Array4(ThisLine, 1) = -1      ' indicates this line was not checked

NEXT
'-----------[ display text lines & poll for avail. keys ]--------------

LinePtr = 1      ' Set line pointer
PrevLinePtr = 0
NotNewSearch:
DO

IF LinePtr <> PrevLinePtr THEN
                PrevLinePtr = LinePtr

' Update the 24 lines of text
                IF AscInkee <> UP AND AscInkee <> Dn THEN ' Print information bar at bottom
                        IF TermTypeMode$ = "LOCAL" THEN
                                LeftChar$ = CHR$(26)
                                RightChar$ = CHR$(27)
                                ExpChar$ = "F2"
                                DirDocChar$ = "F5"
                                UpChar$ = CHR$(24)
                                DnChar$ = CHR$(25)
                                PgUPChar$ = "PgUp, "
                                PgDnChar$ = "PgDn, "
                                HomeChar$ = "HOME"
                                EndChar$ = "END"
                        ELSE
                                LeftChar$ = CHR$(LeftArrowKey)
                                RightChar$ = CHR$(RightArrowKey)
                                ExpChar$ = CHR$(ShowExprKey)
                                DirDocChar$ = CHR$(DirNumKey)
                                UpChar$ = CHR$(UpArrowKey)
                                DnChar$ = CHR$(DownArrowkey)
                                PgUPChar$ = CHR$(PgUpKey) + ": PgUp, "
                                PgDnChar$ = CHR$(PgDnKey) + ": PgDn, "
                                HomeChar$ = CHR$(HomeKey)
                                EndChar$ = CHR$(EndKey)
                        END IF
                        IF Lang$ = "GERMAN" THEN
                                InfoLine$ = ExpChar$ + ": Sucheingabe" + LeftChar$ + ": Naeschtes Dok " + RightChar$ + ": Vorhergeh Dok " + Di
                        ELSE
                                InfoLine$ = UpChar$ + ": Up, " + DnChar$ + ": Down, " + PgUPChar$ + PgDnChar$ + HomeChar$ + ": Top, " + EndCha
                        END IF
                                CALL References(InfoLine$)
                        END IF
                        IF TermTypeMode$ = "LOCAL" THEN
                                R = 23
                        ELSE
                                R = 22
```

```
END IF
FOR i = 0 TO R
        ThisLine = i + LinePtr

IF ThisLine <= LinCount THEN
                ' print line with normal attrib.
                QPrintRC Text(ThisLine), i + 1, 1, NormAttr ' if this line not searched yet
                IF Array4(ThisLine, 1) < 0 THEN IF Array4(ThisLine, 1) = -1 THEN
                                Array4(ThisLine, 1) = 0          ' indicates this line was checked
                                ThisWordNum = 1
                        ELSE    ' if less then -1
                                ThisWordNum = Array4(ThisLine, 1) \ -2   ' # of words already checked
                                Array4(ThisLine, 1) = 1
                        END IF NumWords = InCount%(RTRIM$(Text(ThisLine)), " ") + 1

LineTmp$ = LCASE$(Text(ThisLine))

GOSUB FilterLine

Counter2 = ThisWordNum - 1
                        DO
                                Counter2 = Counter2 + 1

CALL Extract(LineTmp$, " ", Counter2, Strt, Slen)
                                CurrWord$ = MID$(LineTmp$, Strt, Slen)
' not a valid word so goto next word & inc. word count
IF LEN(CurrWord$) = 0 THEN
        IF NumWords < 80 THEN
                NumWords = NumWords + 1
        END IF
        GOTO LoopCounter2
END IF FOR Counter3 = 1 TO NumOfSyns ' NumSynWords = VAL(array5$(counter3, 0))     ' test new array *** rem for spe
        CurrSynWord$ = Array5$(Counter3, 1)     ' test new array ***
        SlenSyn = LEN(CurrSynWord$)

IF Array6(Counter3) = 1 THEN     ' if single syn. word
                IF RIGHT$(CurrSynWord$, 2) = "//" THEN
                        SlenSyn = SlenSyn - 2
                        CurrSynWord$ = LEFT$(CurrSynWord$, SlenSyn)

Match = (CurrSynWord$ = CurrWord$)
                ELSEIF RIGHT$(CurrSynWord$, 1) = "/" THEN
                        SlenSyn = SlenSyn - 1
                        CurrSynWord$ = LEFT$(CurrSynWord$, SlenSyn)

Match = (CurrWord$ = CurrSynWord$)
                ELSE
                        Match = (CurrSynWord$ = LEFT$(CurrWord$, SlenSyn))
                END IF IF Match THEN     ' add to array4
                        Array4(ThisLine, 1) = Array4(ThisLine, 1) + 1
                        Array4(ThisLine, (Array4(ThisLine, 1) * 2)) = Strt
                        Array4(ThisLine, (Array4(ThisLine, 1) * 2) + 1) = Slen
                END IF
        ELSE    ' if combo syn.
                FirstStrt = Strt    ' indicates where to start hi-lite word group FOR Counter4 = 1 TO Array6(Counter3)
                        IF Counter4 > 1 THEN
                                ' get next word in line
                                ThisWordNum = Counter2 + Counter4 - 1
                                ThisLineTmp = ThisLine
                                IF ThisWordNum > NumWords THEN
                                        ThisWordNum = ThisWordNum - NumWords
                                        ThisLineTmp = ThisLine + 1
                                        IF ThisLine >= LinCount THEN
                                                Match = FALSE
                                                EXIT FOR 'counter4
                                        END IF LineTmp$ = LCASE$(Text(ThisLineTmp))
                                        GOSUB FilterLine
                                END IF CALL Extract(LineTmp$, " ", ThisWordNum, Strt, Slen)
                                CurrWord$ = LCASE$(MID$(LineTmp$, Strt, Slen))
                                ' get next syn.
                                CurrSynWord$ = Array5$(Counter3, Counter4)     ' test ne
                                SlenSyn = LEN(CurrSynWord$)
                        END IF IF RIGHT$(CurrSynWord$, 2) = "//" THEN
                                SlenSyn = SlenSyn - 2
                                CurrSynWord$ = LEFT$(CurrSynWord$, SlenSyn)

Match = (CurrWord$ = CurrSynWord$)
                        ELSEIF RIGHT$(CurrSynWord$, 1) = "/" THEN
                                SlenSyn = SlenSyn - 1
                                CurrSynWord$ = LEFT$(CurrSynWord$, SlenSyn)
```

```
                                        Match = (CurrWord$ = CurrSynWord$)
                            ELSE
                                        Match = (CurrSynWord$ = LEFT$(CurrWord$, SlenSyn))
                            END IF IF CurrSynWord$ = "@" THEN
                                        IF INSTR(AtList$, "/" + CurrWord$ + "/") THEN
                                                    Match = TRUE
                                        ELSE Match = FALSE
                                        END IF
                            END IF
                            IF Match = FALSE THEN EXIT FOR
                NEXT 'counter4

IF Match THEN        ' add to array4
                            IF ThisLineTmp > ThisLine THEN        ' combo on 2 lines
                                        ' 1st line
                                        SlenL1 = 80 - FirstStrt
                                        StrtL1 = FirstStrt Array4(ThisLine, 1) = Array4(ThisLine, 1) + 1
                                        Array4(ThisLine, (Array4(ThisLine, 1) * 2)) = StrtL1
                                        Array4(ThisLine, (Array4(ThisLine, 1) * 2) + 1) = Slen ' 2nd line
                                        SlenL2 = (Strt + Slen) - 1
                                        StrtL2 = 1

Array4(ThisLineTmp, 1) = ThisWordNum * -2 ' # of words
                                        Array4(ThisLineTmp, 2) = StrtL2
                                        Array4(ThisLineTmp, 3) = SlenL2
                            ELSE
                                        Slen = (Strt + Slen) - FirstStrt
                                        Strt = FirstStrt Array4(ThisLine, 1) = Array4(ThisLine, 1) + 1
                                        Array4(ThisLine, (Array4(ThisLine, 1) * 2)) = Strt
                                        Array4(ThisLine, (Array4(ThisLine, 1) * 2) + 1) = Slen
                            END IF
                END IF CALL Extract(LineTmp$, " ", Counter2, Strt, Slen)
                CurrWord$ = MID$(LineTmp$, Strt, Slen)

END IF' was it a comb or sing keyword?

NEXT 'counter3
LoopCounter2:
                        LOOP UNTIL Counter2 = NumWords

END IF

' hi - lite words in line
              IF Array4(ThisLine, 1) > 0 THEN
                        FOR Counter2 = 2 TO (Array4(ThisLine, 1) * 2) STEP 2
                                  HLWord$ = MID$(Text(ThisLine), Array4(ThisLine, Counter2), Array4(ThisLine, Counter2 +
                                  QPrintRC HLWord$, i + 1, Array4(ThisLine, Counter2), RevAttr
                        NEXT 'counter2
              END IF
    ELSE
              QPrintRC SPACE$(80), i + 1, 1, NormAttr
    END IF
    NEXT i
END IF ' Wait for a key to be pressed
DO
        Inkee$ = INKEY$
LOOP UNTIL LEN(Inkee$)
IF LEN(Inkee$) = 1 THEN
        AscInkee = ASC(UCASE$(Inkee$))
ELSEIF LEN(Inkee$) = 2 THEN
        AscInkee = ASC(RIGHT$(Inkee$, 1)) + 200
END IF
        SELECT CASE AscInkee
                CASE UpArrowKey, UP
                        IF LinePtr > 1 THEN
                                LinePtr = LinePtr - 1
                        END IF
                CASE DownArrowkey, Dn
                        IF LinePtr < LinCount THEN
                                LinePtr = LinePtr + 1
                        END IF
                CASE PgUpKey, PGUP
                        IF LinePtr > 1 THEN
                                LinePtr = LinePtr - R
                                IF LinePtr < 1 THEN
                                        LinePtr = 1
                                END IF
                        END IF
                CASE PgDnKey, PGDN
                        IF LinePtr <= LinCount - R - 1 THEN
                                LinePtr = LinePtr + R
                                IF LinePtr > LinCount THEN
                                        LinePtr = LinCount
                                END IF
```

```
                        END IF
                CASE HomeKey, HM
                        IF LinePtr > 1 THEN
                                LinePtr = 1
                        END IF
                CASE EndKey, EN
                        IF LinePtr < LinCount - R THEN
                                LinePtr = LinCount - R
                        END IF
                CASE ESC, RightArrowKey, LeftArrowKey, DirNumKey, ShowExprKey, F2, F3, F4, F5
                        ExitFlag = AscInkee
                        QuitFlag = TRUE
                CASE NewSearchKey, F10
                        IF Lang$ = "GERMAN" THEN
                                i$ = Question$("NEUE SUCHE ? [J/N] ", "JN", "ACHTUNG !")
                                IF i$ = "J" THEN
                                        ExitFlag = AscInkee
                                        QuitFlag = TRUE
                                ELSE
                                        GOTO NotNewSearch
                                END IF
                        ELSE
                                i$ = Question$("New Search? [Y/N]", "YN", "WARNING!")
                                IF i$ = "Y" THEN
                                        ExitFlag = AscInkee
                                        QuitFlag = TRUE
                                ELSE
                                        GOTO NotNewSearch
                                END IF
                        END IF
                CASE ELSE
        END SELECT
LOOP UNTIL QuitFlag '---------------------------[ free up memory ]---------------------------

ERASE Text       ' held the document text (fixed.len string)
ERASE Array3$
ERASE Array4
ERASE Array5$
ERASE Array6

EXIT SUB

'-----------------------------------------------------------------------
FilterLine:

'---- replace all 's with spaces
PuncPos = 1
DO
        PuncPos = INSTR(PuncPos, LineTmp$, "'s")

IF PuncPos > 0 THEN
                MID$(LineTmp$, PuncPos, 2) = "  "
                PuncPos = PuncPos + 2
        END IF LOOP UNTIL PuncPos = 0

'---- replace all punctuations with spaces
FOR Fcounter = 33 TO 37
        CALL ReplaceChar(LineTmp$, CHR$(Fcounter), " ")
NEXT 'Fcounter FOR Fcounter = 39 TO 46
        CALL ReplaceChar(LineTmp$, CHR$(Fcounter), " ")
NEXT 'Fcounter FOR Fcounter = 58 TO 64
        CALL ReplaceChar(LineTmp$, CHR$(Fcounter), " ")
NEXT 'Fcounter

RETURN

END SUB

SUB LoadPrefixes (Prefixes$(), MeanPrefixes$(), Lang$) STATIC

IF Lang$ = "GERMAN" THEN
        RESTORE GermanPrefixes
ELSE
        RESTORE EnglishPrefixes
END IF
REDIM Prefixes$(2 TO 9)
IF Lang$ = "GERMAN" THEN
        FOR i = 2 TO 9
                READ FirstHalf$, SecondHalf$
                Prefixes$(i) = FirstHalf$ + SecondHalf$
        NEXT
ELSE
        FOR i = 2 TO 9
                READ Prefixes$(i)
        NEXT
END IF
REDIM MeanPrefixes$(3 TO 14)
IF Lang$ = "GERMAN" THEN
        FOR i = 3 TO 14
                READ FirstHalf$, SecondHalf$, ThirdHalf$
                MeanPrefixes$(i) = FirstHalf$ + SecondHalf$ + ThirdHalf$
        NEXT
```

```
        ELSE
                FOR i = 3 TO 14
                        READ MeanPrefixes$(i)
                NEXT
        END IF
        END SUB SUB OtherWords (Expr AS ExpressionType, WordPtr) STATIC '---- Continue finding and selecting Relatives/SWAPs until none are selected REDIM Relatives(1 TO 1) AS CollectType FindRelatives Expr, CurrentSub, WordPtr, Relatives(), NumRelatives, Excludes ShowExpr Expr IF Expr.SubExpr(1).Num > 1 THEN
                BuildCombTable ("S") '-- indicate SWAPS is the caller
        END IF AddSwaps Expr, ExcludeS, Relatives(), NumRelatives NumSelected = SelectRelatives%(Expr, CurrentSub, Relatives(), NumRelatives)

IF GlobalStatus = NewSearch THEN EXIT SUB

'---- Display information using ShowExpr
        ShowExpr Expr

END SUB

SUB PickChoice (m() AS CollectType, NumM, Label$, Pick%(), NumPick, ExactFlag, Expr AS ExpressionType) STATIC SHARED Cnf AS Config 'PickChoice allows the user to choose one or more of the keywords from
        '   the list of keywords passed in M() as code#'s. It places the choices
        '   directly into the SubExpr.Phrase.

'NOTE: if there is only 1 choice passed to this routine, then it will
        '       automatically return that choice as the one chosen, without
        '       interacting with the user ' first set up the array of keywords from the list of code #'s
        NewSearchFlag = FALSE
        DO
                REDIM Word$(0 TO NumM)
                Word$(0) = Label$
                MaxWordLen = LEN(Word$(0)) + 2
                FOR i = 1 TO NumM
                        Word$(i) = Dict$(m(i).Code)

IF LEN(Word$(i)) > MaxWordLen THEN
                                MaxWordLen = LEN(Word$(i))
                        END IF
        NEXT
        FOR i = 1 TO NumM
                SpaceLen = MaxInt%(MaxWordLen, LEN(Label$) + 2) - LEN(Word$(i)) + 2
                Word$(i) = Word$(i) + SPACE$(SpaceLen)
        NEXT
        IF NumM = 1 AND (GlobalStatus = NewSearch OR GlobalStatus = AddWords) AND ExactFlag = TRUE THEN
        ' only one choice (during a Term Search or a Narrow Search)
        ' so return it automatically without a menu or a keypress
                NumPick = 1
                Pick%(1) = 1
                CALL Chime(6)
        ELSE
                ' push the window location to the lower right
                IF TermTypeMode$ = "LOCAL" THEN
                        LOCATE 24 - MinInt%(NumM, 12) - 3, 80 - MaxWordLen - 7, 0
                ELSE
                        LOCATE 24 - MinInt%(NumM, 12) - 4, 80 - MaxWordLen - 7, 0
                END IF
                ' call P  <List to get choices (total maximum of 15 allowed in SubExpression)
                IF TermTypeMode$ = "LOCAL" THEN
                        IF Lang$ = "GERMAN" THEN
                                CALL References("DANACH ENTER TASTE    " + CHR$(24) + CHR$(25) + " PGUP,PGDN")
                        ELSE
                                CALL References(CHR$(24) + ": UP, " + CHR$(25) + ": DOWN, PGUP, PGDN, SPACE BAR: SELECT, ENTER: DONE,
                        END IF
                ELSE
                        IF Lang$ = "GERMAN" THEN
                                CALL References("DANACH ENTER TASTE    " + CHR$(24) + CHR$(25) + " PGUP,PGDN")
                        ELSE
                                CALL References("W: UP, X: DOWN, E: PGUP, C: PGDN, SPACE BAR: SELECT, ENTER: DONE, ESC: CANCEL")
                        END IF
                END IF
                CALL PickList(Word$(), Pick%(), NumPick, Cnf, Expr, NewSearchKey, ShowExprKey, HomeKey, EndKey, PgUpKey, PgDnKey, UpAr
                IF NumPick = -10 THEN 'NewSearch
                        IF Lang$ = "GERMAN" THEN
                                i$ = Question$("NEUE SUCHE ? [J/N]  ", "JN", "ACHTUNG !")
                                IF i$ = "J" THEN NewSearchFlag = TRUE
                        ELSE
                                i$ = Question$("New Search? [Y/N]", "YN", "WARNING!")
                                IF i$ = "Y" THEN NewSearchFlag = TRUE
                        END IF
                END IF
        END IF
LOOP UNTIL NumPick <> -10 OR NewSearchFlag
```

```
ERASE Word$

LOCATE , , 0

END SUB

SUB RankRecords (Recs() AS RecInfoType, NumFound%, Expr AS ExpressionType) STATIC DIM AvgRankTot AS AvgRankType
DIM KYInfo AS KeyInfoLONG
KYInfoLen = LEN(KYInfo)
MaxWidth = INT(SQR(NumRecords&)) + 1
REDIM Record(1 TO MaxWidth, 1 TO MaxWidth) AS STRING * 1
'-- allocate an EMS array for the document ranking
DIM RankTot AS RankInfo, El1 AS RankInfo, El2 AS RankInfo
DIM BlankRankTot AS RankInfo
RankTotLEN = LEN(RankTot)
NumPages = NumRecords& * RankTotLEN \ SixteenK + 1
EmsAlloc NumPages, RankTotEMS, "Ranking Totals EMS Storage"

'---- allocate an EMS array for the summed values
DIM Value AS BitValueLong
DIM BlankValue AS BitValueLong
ValueLEN = LEN(Value)
NumPages = NumRecords& * ValueLEN \ SixteenK + 1
EmsAlloc NumPages, RankEMS, "Ranking EMS Storage"

'-- clear (to 0) the EMS memory we allocated
EMSPF = EmsGetPFSeg%
FOR i = 1 TO NumPages
        CALL EmsMapMem(RankEMS, 1, i)    ' map logical page i to physical page 0

CALL InitMem(EMSPF, 0, 8192, 0)  ' clear physical page of memory to 0
NEXT

IF Lang$ = "GERMAN" THEN
        DispMsg "GEWICHTUNG DER GEFUNDENEN DOKUMENTE .....", 0, 0
ELSE
        DispMsg "Ranking Documents .....", 0, 0
END IF ExprKeys$ = ""
QueryNum = 0
FOR i = 1 TO Expr.Num
        ExprKeys$ = ExprKeys$ + LEFT$(Expr.SubExpr(i).Phrase, Expr.SubExpr(i).Num * 2)
        QueryNum = QueryNum + Expr.SubExpr(i).Num
NEXT BuildCombTable ("R") '-- indicate RANKing is the caller QueryLen = LEN(ExprKeys$) \ 2
REDIM Poly!(1 TO QueryLen)
FOR i = 1 TO QueryLen
        Poly!(i) = (ExprCodes(i).Poly / PolyAvg!) ^ .25
NEXT NumRank& = 0: EmptyFlag = FALSE FullSearch:

FOR i = 1 TO Expr.Num

FOR j = 1 TO Expr.SubExpr(i).Num
                MemFlag = FALSE
                Code = Str2Code(Expr.SubExpr(i).Phrase, j)
                EmsGet PolyValue, PolyLEN, CLNG(Code), PolySemyEMS '** THY 5/13/91
                FreeSpace& = FRE(-1)
                'if there is enough memory then read the whole block
                MemReq& = CLNG(KYIndx(Code).Num) * KYInfoLen
                IF FreeSpace& > MemReq& + 1024 THEN   'leave 1K free
                        REDIM KYInfoArray(1 TO KYIndx(Code).Num) AS KeyInfoLONG
                        'FGetA can read only 64K, so if we have more, read it in two steps
                        IF MemReq& < ThirtyTwoK& * 2 THEN
                                FSeek KYInvertDatFILE, (KYIndx(Code).Index - 1) * KYInfoLen
                                FGetA2 KYInvertDatFILE, SEG KYInfoArray(1), CLNG(KYIndx(Code).Num) * KYInfoLen
                        ELSE
                                FSeek KYInvertDatFILE, (KYIndx(Code).Index - 1) * KYInfoLen
                                FGetA2 KYInvertDatFILE, SEG KYInfoArray(1), CLNG(KYIndx(Code).Num \ 2) * KYInfoLen
                                FSeek KYInvertDatFILE, (KYIndx(Code).Index - 1) * KYInfoLen + CLNG(KYIndx(Code).Num \ 2) * KYInfoLen
                                FGetA2 KYInvertDatFILE, SEG KYInfoArray(KYIndx(Code).Num \ 2 + 1), CLNG(KYIndx(Code).Num \ 2 + KYIndx(
                        END IF
                        MemFlag = TRUE
                END IF
                FOR Index& = 1 TO KYIndx(Code).Num
                        IF MemFlag THEN
                                LSET KYInfo = KYInfoArray(Index&)
                        ELSE
                                FGetRT KYInvertDatFILE, KYInfo, KYIndx(Code).Index - Index& - 1, KYInfoLen
                        END IF
                        Horiz = KYInfo.Rec MOD MaxWidth
                        Vert = INT(KYInfo.Rec / MaxWidth) + 1
                        IF Horiz = 0 THEN Horiz = MaxWidth: Vert = Vert - 1

'---- give a boost to the original words in expression
                        IF KeyInstr%(OriginalExpr$, MKI$(Code)) THEN
                                KYInfo.Value = KYInfo.Value * Boost!
                        END IF '-- clear Value variable
                        Value = BlankValue
```

```
                        '-- check against first appearing only for non rare words
                        IF QueryNum > 3 AND KYIndx(Code).Num > Limit * 5 AND NOT EmptyFlag THEN
                                'to pick up documents even there is only one keyword(for small set of documents)
                                'change this block to GOSUB KeepRec
'vvvvvvvvvvvvvvvvvvvvvvvvvvvvvvvvvvvvvvvvvvvvvvvvvvvvvvvvvvvvvvvvvvvvvvvvvvv
                                '----check if this is first appearance
                                IF ASC(Record(Horiz, Vert)) = 0 THEN
                                        Record(Horiz, Vert) = "1"
                                        Value.Value = KYInfo.Value * PolyValue.Value
                                        SetBit Value.Bit, j, 1
                                        EmsSet Value, ValueLEN, KYInfo.Rec, RankEMS
                                ELSE
                                        GOSUB KeepRec
                                END IF
'-----------------------------------------------------------------------
                        ELSE
                                GOSUB KeepRec
                        END IF
                NEXT '-- next document *

IF Lang$ = "GERMAN" THEN
                                QPrintRC "      ", 12, 55, -1
                ELSE
                                QPrintRC "      ", 12, 47, -1
                END IF
        IF MemFlag THEN ERASE KYInfoArray
        NEXT'-- next keyword in expression
NEXT'-- next expression (always 1)

'---if there is no documents which contain more then one word (very rare case)
IF NumRank& = 0 AND NOT EmptyFlag THEN
        EmptyFlag = TRUE
        GOTO FullSearch
END IF IF NumRank& = 0 THEN  'no documents matched at all
        Chime 6
        NumFound = 0
        DispMsg "", 0, 0
        DispMsg " Sorry, there are no documents matching your query.    Please modify your search query.  Press Space bar to continu
        WaitSpace
        DispMsg "", 0, 0
        EXIT SUB
END IF FOR i& = 1 TO NumRank&
        IF Lang$ = "GERMAN" THEN
                QPrintRC STR$(i&), 12, 55, -1
        ELSE
                QPrintRC STR$(i&), 12, 47, -1
        END IF EmsGet RankTot, RankTotLEN, i&, RankTotEMS
        EmsGet Value, ValueLEN, RankTot.Rec, RankEMS RankTot.Bit = Value.Bit
        RankTot.Value = ComboSum&(Value.Bit, Value.Value, "R", Poly!())

EmsSet RankTot, RankTotLEN, i&, RankTotEMS

NEXT

IF Lang$ = "GERMAN" THEN
        QPrintRC "      ", 12, 55, -1
ELSE
        QPrintRC "      ", 12, 47, -1
END IF '-- sort in descending order by RankTot.Value
SortEMSRankInfo RankTotEMS, NumRank&

IF NumRank& > MaxShow THEN
        NumFound = MaxShow
ELSE
        NumFound = NumRank&
END IF REDIM Recs(1 TO NumFound) AS RecInfoType
REDIM RecsDebug&(1 TO NumFound)   '***rs debug FOR i = 1 TO NumFound
        EmsGet RankTot, RankTotLEN, CLNG(i), RankTotEMS
        Recs(i).Rec = RankTot.Rec
        RecsDebug&(i) = RankTot.Value    '***rs debug
NEXT EmsRelMem RankEMS '---- Histogram information
'HistBars = MinInt%(NumFound, 25)
REDIM MatchRecVals(1 TO NumFound) AS RankInfo
FOR i = 1 TO NumFound
        EmsGet RankTot, RankTotLEN, CLNG(i), RankTotEMS
        MatchRecVals(i).Rec = RankTot.Rec
        MatchRecVals(i).Value = RankTot.Value  '**epg* .75
NEXT FOpenAll "AvgRank", 2, 4, AvgRankFILE  *
```

```
IF AvgRankFILE < 0 THEN
        CALL FCreate("AvgRank")
        FOpenAll "AvgRank", 2, 4, AvgRankFILE
        AvgRankTot.Num = 0
        AvgRankTot.Value = 0
        FOR i& = 1 TO 17
                CALL FPutRT(AvgRankFILE, AvgRankTot, i&, LEN(AvgRankTot))
        NEXT i&
END IF FGetRT AvgRankFILE, AvgRankTot, CLNG(Expr.SubExpr(1).Num), LEN(AvgRankTot)

IF AvgRankTot.Num = 0 THEN
        AvgRankTot.Value = MatchRecVals(1).Value
        NewAvgFirstVal! = MatchRecVals(1).Value
ELSE
        IF AvgRankTot.Num = 1 THEN
                NewAvgFirstVal! = (AvgRankTot.Value * .5) + (MatchRecVals(1).Value * .5)
        ELSE
                NumDivNumPlus1! = AvgRankTot.Num / (AvgRankTot.Num + 1)
                NewAvgFirstVal! = (AvgRankTot.Value * NumDivNumPlus1!) + (MatchRecVals(1).Value / (AvgRankTot.Num + 1))
        END IF
END IF AvgFirstVal! = AvgRankTot.Value
AvgRankTot.Value = NewAvgFirstVal!
AvgRankTot.Num = AvgRankTot.Num + 1

FPutRT AvgRankFILE, AvgRankTot, CLNG(Expr.SubExpr(1).Num), LEN(AvgRankTot)

FClose AvgRankFILE

EmsRelMem RankTotEMS
ERASE Record

DispMsg "", 0, 0

EXIT SUB

'===========================================================

KeepRec:

IF Record(Horiz, Vert) < "2" THEN
        '-- this is the second time we've seen this document, so add it to
        '   our list of found documents to be ranked
        NumRank& = NumRank& + 1
        RankTot = BlankRankTot    '-- clear the variable
        RankTot.Rec = KYInfo.Rec
        EmsSet RankTot, RankTotLEN, NumRank&, RankTotEMS
END IF EmsGet Value, ValueLEN, KYInfo.Rec, RankEMS
Value.Value = Value.Value + KYInfo.Value * PolyValue.Value
SetBit Value.Bit, j, 1
EmsSet Value, ValueLEN, KYInfo.Rec, RankEMS
Record(Horiz, Vert) = "2"

RETURN

END SUB

SUB ReWriteHist (Curr)

'-- move the solid bar
IF TermTypeMode$ = "LOCAL" THEN
        HistStart = 25
ELSE
        HistStart = 24
END IF FullFlag = FALSE Ratio! = (MatchRecVals(1).Value ^ .5) / (AvgFirstVal! ^ .5)

HistFlag = FALSE
Start = 1
IF Curr = 1 THEN
        St = 1
ELSE
        St = Curr - 1
END IF
IF Curr = 25 THEN
        Fin = 25
ELSE
        Fin = Curr + 1
END IF
IF Fin > UBOUND(MatchRecVals) THEN Fin = UBOUND(MatchRecVals)
FOR i = St TO Fin 'NumBars
        FOR j = 1 TO 16
                IF (MatchRecVals(i).Value ^ .5 >= (.0625 * j * MatchRecVals(1).Value ^ .5)) THEN
                        QPrintRC HistChar$, HistStart - j, 3 * (i - Start + 1), NormAttr
                        QPrintRC HistChar$, HistStart - j, 3 * (i - Start + 1) - 1, NormAttr
                        IF i <> 1 THEN QPrintRC HistChar$, HistStart - j, 3 * (i - Start + 1) - 2, 0

IF j = 1 AND i <> Curr THEN
                                QPrintRC "   ", HistStart - 1, 3 * (i - Start + 1) - 2, RevAttr
                                QPrintRC STR$(i), HistStart - 1, 3 * (i - Start + 1) - 2, RevAttr
                                IF i <> 1 THEN
                                        QPrintRC HighChar$, HistStart - 1, 3 * (i - Start + 1) - 2, 0
                                ELSE
```

```
                                QPrintRC HighChar$, HistStart - 1, 3 * (i - Start + 1) - 2, (BG AND 1)
                            END IF
                            QPrintRC HistChar$, HistStart - 2, 3 * (i - Start + 1), NormAttr
                            QPrintRC HistChar$, HistStart - 2, 3 * (i - Start + 1) - 1, NormAttr
                            IF i <> 1 THEN QPrintRC HistChar$, HistStart - 2, 3 * (i - Start + 1) - 2, 0
                        END IF IF i = Curr THEN
                            QPrintRC HighChar$, HistStart - j, 3 * (i - Start + 1), NormAttr
                            QPrintRC HighChar$, HistStart - j, 3 * (i - Start + 1) - 1, NormAttr
                            IF i <> 1 THEN QPrintRC HighChar$, HistStart - j, 3 * (i - Start + 1) - 2, 0
                            IF j = 1 THEN
                                    QPrintRC HighChar$, HistStart - 2, 3 * (i - Start + 1), NormAttr
                                    QPrintRC HighChar$, HistStart - 2, 3 * (i - Start + 1) - 1, NormAttr
                                    IF i <> 1 THEN QPrintRC HighChar$, HistStart - 2, 3 * (i - Start + 1) - 2, 0
                            END IF
                        END IF
                    END IF
                    'if no bar, print number
                    IF (SQR(MatchRecVals(i).Value) < (.0625 * SQR(MatchRecVals(1).Value))) THEN
                        IF i = Curr THEN
                                QPrintRC HighChar$, HistStart - 1, 3 * (i - Start + 1), NormAttr
                                QPrintRC HighChar$, HistStart - 1, 3 * (i - Start + 1) - 1, NormAttr
                                IF i <> 1 THEN
                                        QPrintRC HighChar$, HistStart - 1, 3 * (i - Start + 1) - 2, 0
                                ELSE
                                        QPrintRC HighChar$, HistStart - 1, 3 * (i - Start + 1) - 2, NormAttr
                                END IF
                                QPrintRC HighChar$, HistStart - 2, 3 * (i - Start + 1), NormAttr
                                QPrintRC HighChar$, HistStart - 2, 3 * (i - Start + 1) - 1, NormAttr
                                IF i <> 1 THEN
                                        QPrintRC HighChar$, HistStart - 1, 3 * (i - Start + 1) - 2, 0
                                ELSE
                                        QPrintRC HighChar$, HistStart - 1, 3 * (i - Start + 1) - 2, NormAttr
                                END IF ELSE
                                QPrintRC "  ", HistStart - 1, 0 + 3 * (i - Start + 1) - 2, RevAttr
                                QPrintRC STR$(i), HistStart - 1, 0 + 3 * (i - Start + 1) - 2, RevAttr
                                IF i <> 1 THEN
                                        QPrintRC HighChar$, HistStart - 1, 0 - 3 * (i - Start + 1) - 2, 0
                                ELSE
                                        QPrintRC HighChar$, HistStart - 1, 0 + 3 * (i - Start + 1) - 2, NormAttr
                                END IF
                                QPrintRC HistChar$, HistStart - 2, 3 * (i - Start + 1), NormAttr
                                QPrintRC HistChar$, HistStart - 2, 3 * (i - Start + 1) - 1, NormAttr
                                IF i <> 1 THEN QPrintRC HistChar$, HistStart - 2, 3 * (i - Start + 1) - 2, 0
                        END IF
                END IF
            NEXT j
NEXT i
IF Ratio! < 1! THEN
        FMsgRow = 24 - 16
ELSE
        FMsgRow = 24 - 16! / Ratio!
END IF
FMsgCol = 1

IF TermTypeFlag THEN
        ch = 196 '-
ELSE
        ch = ASC("-")
END IF

IF Lang$ = "GERMAN" THEN
        QPrintRC STRING$(11, ch) + "HISTORISCHER DURCHSCHNITTSWERT FUER ERSTE DOKUMENTE" + STRING$(14, ch), FMsgRow, FMsgCol, NormAttr
ELSE
        QPrintRC STRING$(11, ch) + " AVERAGE RELEVANCE OF FIRST DOCUMENT FOR SIMILAR QUERIES" + STRING$(10, ch), FMsgRow, FMsgCol, Nor
END IF IF Curr > 1 THEN IF MatchRecVals(Curr).Value < .6 * MatchRecVals(Curr - 1).Value THEN
            IF Lang$ = "GERMAN" THEN
                    QPrintRC "Dokument" + STR$(Curr) + " vermutlich weniger relevant als vorhergehendes", 7, 14, -1
            ELSE
                    QPrintRC "Document" + STR$(Curr) + " may be less relevant than previous document ", 7, 15, -1
        END IF
        FullFlag = TRUE
        END IF
END IF
IF Curr > 2 THEN
        IF MatchRecVals(Curr).Value < .4 * MatchRecVals(Curr - 2).Value THEN
            IF Lang$ = "GERMAN" THEN
                    QPrintRC "Dokument" + STR$(Curr) + " vermutlich weniger relevant als vorhergehendes ", 7, 14, -1
            ELSE
                    QPrintRC "Document" + STR$(Curr) + " may be less relevant than previous documents", 7, 15, -1
            END IF
            FullFlag = TRUE
            END IF
END IF CALL HistMessage DO
        DO
            ch$ = INKEY$
        LOOP UNTIL ch$ <> ""
        IF LEN(ch$) = 1 THEN
                c = ASC(UCASE$(ch$))
```

```
            ELSEIF LEN(ch$) = 2 THEN
                    c = ASC(RIGHT$(ch$, 1)) + 200
            END IF
            SELECT CASE c
            CASE ESC, CR, RightArrowKey, LeftArrowKey, DirNumKey, ShowExprKey, HomeKey, EndKey, 275, 277, F3, F4, F5, F2, HM, EN
                    HistFlag = c
            CASE NewSearchKey, F10
            IF Lang$ = "GERMAN" THEN
                    i$ = Question$("NEUE SUCHE ? [J/N]  ", "JN", "ACHTUNG !")
                    IF i$ = "J" THEN
                            HistFlag = c
                    END IF
            ELSE
                    i$ = Question$("New Search? [Y/N]", "YN", "WARNING!")
                    IF i$ = "Y" THEN
                        HistFlag = c
                    END IF
            END IF
            END SELECT
   LOOP UNTIL HistFlag

END SUB

SUB ScrollHist (Curr, Direction$, MaxNum)
   IF TermTypeMode$ = "LOCAL" THEN
           HistStart = 25
   ELSE
           HistStart = 24
   END IF
   IF (Curr <= MaxNum AND NOT LastFlag) OR (Direction$ = "R") THEN
      IF Direction$ = "L" THEN
           ScrollL 7, 2, HistStart - 1, 80, 3, -1
   QPrintRC "  ", 9, 62, NormAttr
   QPrintRC "  ", 10, 62, NormAttr
   FOR j = 1 TO 16
           ' QPrintRC " ", 24 - j, 1, 21
                   IF (MatchRecVals(Curr - 1).Value ^ .5 >= (.0625 * j * MatchRecVals(1).Value ^ .5)) THEN
                           QPrintRC HistChar$, HistStart - j, 72, NormAttr
                           QPrintRC HistChar$, HistStart - j, 71, NormAttr
                           QPrintRC HistChar$, HistStart - j, 70, 0
                   END IF
           NEXT
           FOR j = 1 TO 16
                           IF (MatchRecVals(Curr).Value ^ .5 >= (.0625 * j * MatchRecVals(1).Value ^ .5)) THEN
                               QPrintRC HighChar$, HistStart - j, 75, NormAttr
                               QPrintRC HighChar$, HistStart - j, 74, NormAttr
                               QPrintRC HighChar$, HistStart - j, 73, 0
                           END IF
           NEXT
           'if no bar then print just number
           IF (MatchRecVals(Curr).Value ^ .5 < (.0625 * MatchRecVals(1).Value ^ .5)) THEN
                           QPrintRC HighChar$, HistStart - 1, 75, NormAttr
                           QPrintRC HighChar$, HistStart - 1, 74, NormAttr
                           QPrintRC HighChar$, HistStart - 1, 73, 0
                           QPrintRC HighChar$, HistStart - 2, 75, NormAttr
                           QPrintRC HighChar$, HistStart - 2, 74, NormAttr
                           QPrintRC HighChar$, HistStart - 2, 73, 0
           END IF
           IF (MatchRecVals(Curr).Value ^ .5 < (.0625 * MatchRecVals(1).Value ^ .5)) THEN
                           QPrintRC HistChar$, HistStart - 1, 72, NormAttr
                           QPrintRC HistChar$, HistStart - 1, 71, NormAttr
                           QPrintRC HistChar$, HistStart - 1, 70, 0
                           QPrintRC HistChar$, HistStart - 2, 72, NormAttr
                           QPrintRC HistChar$, HistStart - 2, 71, NormAttr
                           QPrintRC HistChar$, HistStart - 2, 70, 0
           END IF
           QPrintRC STR$(Curr - 1), HistStart - 1, 70, RevAttr
           QPrintRC " ", HistStart - 1, 70, 0       'NormAttr
           IF Curr = MaxNum THEN
                   LastFlag = TRUE
           ELSE
                   LastFlag = FALSE
           END IF
   ELSE 'Direction$="R"
           LastFlag = FALSE
           ScrollR 7, 2, HistStart - 1, 80, 3, -1
           CALL ClearScr0(7, 76, HistStart - 1, 80, NormAttr)' clear right portion
           FOR j = 1 TO 16
                   'QPrintRC " ", HistStart - j, 1, 21
                   IF (MatchRecVals(Curr - HistStart).Value ^ .5 >= (.0625 * j * MatchRecVals(1).Value ^ .5)) THEN
                           QPrintRC HistChar$, HistStart - j, 3, NormAttr
                           QPrintRC HistChar$, HistStart - j, 2, NormAttr
           QPrintRC HistChar$, HistStart - j, 1, 0
                   END IF
           NEXT
           FOR j = 1 TO 16
                   IF (MatchRecVals(Curr - 23).Value ^ .5 >= (.0625 * j * MatchRecVals(1).Value ^ .5)) THEN
                           QPrintRC HistChar$, HistStart - j, 4, 0
                   END IF
           NEXT FOR j = 1 TO 16
                           IF (MatchRecVals(Curr).Value ^ .5 >= (.0625 * j * MatchRecVals(1).Value ^ .5)) THEN
                               QPrintRC HighChar$, HistStart - j, 75, NormAttr
                               QPrintRC HighChar$, HistStart - j, 74, NormAttr
                               QPrintRC HighChar$, HistStart - j, 73, 0
                           END IF
           NEXT
                               QPrintRC " ", HistStart - 1, 2, RevAttr
                               QPrintRC LTRIM$(STR$(Curr - HistStart)), HistStart - 1, 2, RevAttr
```

```
QPrintRC " ", HistStart-1, 1, 0        'RevAttr
  IF (MatchRecVals(Curr).Value ^ .5 < (.0625 * MatchRecVals(1).Value ^ .5)) THEN
                QPrintRC HighChar$, HistStart - 1, 75, NormAttr
                QPrintRC HighChar$, HistStart - 1, 74, NormAttr
                QPrintRC HighChar$, HistStart - 1, 73, 0
                QPrintRC HighChar$, HistStart - 2, 75, NormAttr
                QPrintRC HighChar$, HistStart - 2, 74, NormAttr
                QPrintRC HighChar$, HistStart - 2, 73, 0
END IF
  IF (MatchRecVals(Curr - HistStart).Value ^ .5 < (.0625 * MatchRecVals(1).Value ^ .5)) THEN
                QPrintRC HistChar$, HistStart - 2, 3, NormAttr
                QPrintRC HistChar$, HistStart - 2, 2, NormAttr
                            QPrintRC HistChar$, HistStart - 2, 1, 0
                            QPrintRC STR$(Curr - HistStart), HistStart - 1, 1, RevAttr
                            QPrintRC " ", HistStart, 1, 0        'RevAttr
                END IF

END IF

'    IF Lang$ = "GERMAN" THEN
'       QPrintRC STRING$(10, 32) + " RELEVANZ GRAPHIK (WEISSER BALKEN IST GEGENWAERTIGES DOKUMENT)" + STRING$(10, 32), 7, 1, -1
'    ELSE
'       QPrintRC STRING$(10, 32) + "  RELATIVE DOCUMENT RELEVANCE (SOLID BAR IS CURRENT DOCUMENT)" + STRING$(10, 32), 7, 1, -1
'    END IF
        IF Ratio! < 1! THEN
                FMsgRow = 24 - 16
        ELSE
                FMsgRow = 24 - 16! / Ratio!
        END IF
        FMsgCol = 1
        IF TermTypeFlag THEN
                ch = 196
        ELSE
                ch = ASC("-")
  END IF
        IF Lang$ = "GERMAN" THEN
                QPrintRC STRING$(12, ch) + " HISTORISCHER DURCHSCHNITTSWERT FUER ERSTE DOKUMENTE " + STRING$(12, ch), FMsgRow, FMsgCol
        ELSE
                QPrintRC STRING$(10, ch) + " AVERAGE RELEVANCE OF FIRST DOCUMENT FOR SIMILAR QUERIES " + STRING$(10, ch), FMsgRow, FMs
        END IF
END IF
CALL HistMessage
DO
        DO
            ch$ = INKEY$
        LOOP UNTIL ch$ <> ""
        IF LEN(ch$) = 1 THEN
                c = ASC(UCASE$(ch$))
        ELSEIF LEN(ch$) = 2 THEN
                c = ASC(RIGHT$(ch$, 1)) + 200
        END IF
        SELECT CASE c
        CASE ESC, CR, RightArrowKey, LeftArrowKey, DirNumKey, ShowExprKey, HomeKey, EndKey, 275, 277, F3, F4, F5, F2, HM, EN
                HistFlag = c
        CASE NewSearchKey, F10
        IF Lang$ = "GERMAN" THEN
                i$ = Question$("NEUE SUCHE ? [J/N]  ", "JN", "ACHTUNG !")
                IF i$ = "J" THEN
                        HistFlag = c
                END IF
        ELSE
                i$ = Question$("New Search? [Y/N]", "YN", "WARNING!")
                IF i$ = "Y" THEN
                        HistFlag = c
                END IF
        END IF
        END SELECT
LOOP UNTIL HistFlag

END SUB

FUNCTION SelectRelatives% (Expr AS ExpressionType, CurrentSub, TopKeys() AS CollectType, NumTopKeys) STATIC '-- current subexpression is always 1
CurrentSub = 1

'---- we're now editing the current SubExpression
Expr.Num = CurrentSub

'---- no full search has been done yet for this modified expression
Expr.Match = -1
CALL ShowExpr(Expr)

LOCATE 2, 30
IF Lang$ = "GERMAN" THEN
  Label$ = "LEERTASTE fuer ein oder mehrere Worte"
ELSE
  Label$ = "Select One or More Words"
END IF IF Expr.SubExpr(1).Num = 15 THEN EXIT FUNCTION
REDIM Picked%(1 TO 15 - Expr.SubExpr(1).Num)

CALL PickChoice(TopKeys(), NumTopKeys, Label$, Picked(), NumPicked, ExactFlag, Expr)

IF NumPicked = -10 THEN ' F10 pressed

GlobalStatus = NewSearch
```

```
ELSEIF NumPicked > 0 THEN

'---- store the selected words directly in the current subexpression

'-- add number of words selected to number of words in expression
        NumExprWords = NumExprWords + NumPicked REDIM PRESERVE ExprCodes(1 TO NumExprWords) AS CodePolyType FOR i = NumExprWords - NumPicked + 1 TO NumExprWords
                ExprCodes(i).Code = TopKeys(Picked(i - NumExprWords + NumPicked)).Code
                EmsGet1El ExprCodes(1).Poly, LEN(ExprCodes(1).Poly), ExprCodes(i).Code, PolySemyEMS
'?      IF INSTR((RIGHTS(x$, LEN(x$) - 5)), " ") <> 0 THEN
'?          ExprCodes(NumExprWords).Poly = ExprCodes(NumExprWords).Poly * 1.4
'?      END IF
        NEXT SortT ExprCodes(1), NumExprWords, Descend, LEN(ExprCodes(1)), 2, -3

Expr.SubExpr(CurrentSub).Num = NumExprWords

FOR k = 1 TO NumExprWords
                Code2Str Expr.SubExpr(CurrentSub).Phrase, k, ExprCodes(k).Code
        NEXT '-- set the status to adding Swaps
        GlobalStatus = SWAPS

END IF

'-- return TRUE if words were selected
SelectRelatives% = NumPicked > 0

END FUNCTION

SUB ShowHist (NumShow, Curr, Expr AS ExpressionType) STATIC

'-- Shows the histogram
FullFlag = FALSE
IF TermTypeMode$ = "LOCAL" THEN
        IF Lang$ = "GERMAN" THEN
                Infolines = CHR$(26) + ":Naesch Dok    " + CHR$(27) + ":Vorher Dok    ESC:Menue ENTER:Kurzfassung "
        ELSE
                Infolines = CHR$(27) + ": Prev, " + CHR$(26) + ": Next, HOME: First, END: Last, ENTER: Highlights, ESC: Go Back"
        END IF
        HistStart = 25
ELSE
        IF Lang$ = "GERMAN" THEN
                Infolines = CHR$(LeftKey) + ": Prev, " + CHR$(RightKey) + ": Next, " + CHR$(HomeKey) + ": First, " + CHR$(EndKey) + "
        ELSE
                Infolines = CHR$(LeftArrowKey) + ": Prev, " + CHR$(RightArrowKey) + ": Next, " + CHR$(HomeKey) + ": First, " + CHR$(En
        END IF
        HistStart = 24
END IF
CALL References(Infolines)
Ratio! = SQR(MatchRecVals(1).Value) / SQR(AvgFirstVal!)

HistFlag = FALSE

REDIM AScr2%(1 TO 2000)
CALL ClearScr0(7, 1, HistStart - 1, 80, NormAttr)' clear bottom portion 'IF Lang$ = "GERMAN" THEN
'   RelevanceStr$ = "RELEVANZ GRAPHIK (WEISSER BALKEN IST GEGENWAERTIGES DOKUMENT)"
'ELSE
'   RelevanceStr$ = "RELATIVE DOCUMENT RELEVANCE (SOLID BAR IS CURRENT DOCUMENT)"
'END IF
'RelStrLen = LEN(RelevanceStr$)
'SpcLeft = (80 - RelStrLen) \ 2
'SpcRight = 80 - RelStrLen - SpcLeft
'RelevanceStr$ = SPACES(SpcLeft) + RelevanceStr$ + SPACES(SpcRight)
'QPrintRC RelevanceStr$, 24, 1, RevAttr IF Curr <= 25 THEN
        Finish = MinInt%(NumShow, 25)
        Start = 1
ELSE
        Finish = Curr
        Start = Finish - 24
END IF FOR i = Start TO Finish   'NumBars
        FOR j = 1 TO 16
                IF (SQR(MatchRecVals(i).Value) >= (.0625 * j * SQR(MatchRecVals(1).Value))) THEN
                        QPrintRC HistChar$, HistStart - j, 3 * (i - Start + 1), NormAttr
                        QPrintRC HistChar$, HistStart - j, 3 * (i - Start + 1) - 1, NormAttr
                        IF i <> Start THEN QPrintRC HistChar$, HistStart - j, 3 * (i - Start + 1) - 2, 0

IF j = 1 AND i <> Curr THEN
                                QPrintRC " ", HistStart - 1, 3 * (i - Start + 1) - 2, RevAttr
                                QPrintRC STR$(i), HistStart - 1, 3 * (i - Start + 1) - 2, RevAttr
                                IF i <> Start THEN
                                        QPrintRC " ", HistStart - 1, 3 * (i - Start + 1) - 2, 0
                                ELSE
                                        QPrintRC HighChar$, HistStart - 1, 3 * (i - Start + 1) - 2, 1
                                END IF
                                QPrintRC HistChar$, HistStart - 2, 3 * (i - Start + 1), NormAttr
                                QPrintRC HistChar$, HistStart - 2, 3 * (i - Start + 1) - 1, NormAttr
                                IF i <> Start THEN QPrintRC HistChar$, HistStart - 2, 3 * (i - Start + 1) - 2, 0
                        END IF
```

```
                        IF i = Curr THEN
                                QPrintRC HighChar$, HistStart - j, 3 * (i - Start + 1), NormAttr
                                QPrintRC HighChar$, HistStart - j, 3 * (i - Start + 1) - 1, NormAttr
                                IF i <> Start THEN QPrintRC HighChar$, HistStart - j, 3 * (i - Start + 1) - 2, 0
                                IF j = 1 THEN
                                        QPrintRC HighChar$, HistStart - 2, 3 * (i - Start + 1), NormAttr
                                        QPrintRC HighChar$, HistStart - 2, 3 * (i - Start + 1) - 1, NormAttr
                                        IF i <> Start THEN QPrintRC HighChar$, HistStart - 2, 3 * (i - Start + 1) - 2, 0
                                END IF
                           END IF
                    END IF
                    'if no bar, print number
                    IF (SQR(MatchRecVals(i).Value) < (.0625 * SQR(MatchRecVals(1).Value))) THEN
                                IF i = Curr THEN
                                        QPrintRC HighChar$, HistStart - 1, 3 * (i - Start + 1), NormAttr
                                        QPrintRC HighChar$, HistStart - 1, 3 * (i - Start + 1) - 1, NormAttr
                                        IF i <> Start THEN QPrintRC HighChar$, HistStart - 1, 3 * (i - Start + 1) - 2, 0
                                        QPrintRC HighChar$, HistStart - 2, 3 * (i - Start + 1), NormAttr
                                        QPrintRC HighChar$, HistStart - 2, 3 * (i - Start + 1) - 1, NormAttr
                                        IF i <> Start THEN QPrintRC HighChar$, HistStart - 2, 3 * (i - Start + 1) - 2, 0
                                ELSE
                                        QPrintRC "  ", HistStart - 1, 0 + 3 * (i - Start + 1) - 2, RevAttr
                                        QPrintRC STR$(i), HistStart - 1, 0 + 3 * (i - Start + 1) - 2, RevAttr
                                        IF i <> Start THEN QPrintRC HighChar$, HistStart - 1, 0 + 3 * (i - Start + 1) - 2, 0
                                        QPrintRC HistChar$, HistStart - 2, 3 * (i - Start + 1), NormAttr
                                        QPrintRC HistChar$, HistStart - 2, 3 * (i - Start + 1) - 1, NormAttr
                                        IF i <> Start THEN QPrintRC HistChar$, HistStart - 2, 3 * (i - Start + 1) - 2, 0
                                END IF
                    END IF
            NEXT j
NEXT i
IF Ratio! < 1! THEN
        FMsgRow = 24 - 16
ELSE
        FMsgRow = 24 - 16! / Ratio!
END IF
FMsgCol = 1
IF TermTypeFlag THEN
        ch = 196
ELSE
        ch = ASC("-")
END IF IF Lang$ = "GERMAN" THEN
        QPrintRC STRING$(12, ch) + " HISTORISCHER DURCHSCHNITTSWERT FUER ERSTE DOKUMENTE " + STRING$(12, ch), FMsgRow, FMsgCol, NormAt
ELSE
        QPrintRC STRING$(10, ch) + " AVERAGE RELEVANCE OF FIRST DOCUMENT FOR SIMILAR QUERIES " + STRING$(10, ch), FMsgRow, FMsgCol, No
END IF IF Curr > 1 THEN
        IF MatchRecVals(Curr).Value < .6 * MatchRecVals(Curr - 1).Value THEN
            IF Lang$ = "GERMAN" THEN
                        QPrintRC "Dokument" + STR$(Curr) + " vermutlich weniger relevant als vorhergehendes", 7, 14, -1
            ELSE
                        QPrintRC "Document" + STR$(Curr) + " may be less relevant than previous document", 7, 15, -1
            END IF
            FullFlag = TRUE
     END IF
  END IF
IF Curr > 2 THEN
        IF MatchRecVals(Curr).Value < .4 * MatchRecVals(Curr - 2).Value THEN
            IF Lang$ = "GERMAN" THEN
                        QPrintRC "Dokument" + STR$(Curr) + " vermutlich weniger relevant als vornergehendes", 7, 14, -1
            ELSE
                        QPrintRC "Document" + STR$(Curr) + " may be less relevant than previous documents", 7, 15, -1
            END IF
            FullFlag = TRUE
        END IF
END IF
CALL HistMessage
DO
        DO
            ch$ = INKEY$
        LOOP UNTIL ch$ <> ""
        IF LEN(ch$) = 1 THEN
                c = ASC(UCASE$(ch$))
        ELSEIF LEN(ch$) = 2 THEN
                c = ASC(RIGHT$(ch$, 1)) + 200
        END IF
        SELECT CASE c
        CASE ESC, CR, RigntArrowKey, LeftArrowKey, DirNumKey, ShowExprKey, HomeKey, EndKey, 275, 277, F3, F4, F5, F2, HM, EN
                HistFlag = c
        CASE NewSearchKey, F10
        IF Lang$ = "GERMAN" THEN
                i$ = Question$("NEUE SUCHE ? [J/N]  ", "JN", "ACHTUNG !")
                IF i$ = "J" THEN
                        HistFlag = c
                END IF
        ELSE
                i$ = Question$("New Search? [Y/N]", "YN", "WARNING!")
                IF i$ = "Y" THEN
                 HistFlag = c
                END IF
            END IF
        END SELECT
LOOP UNTIL HistFlag 'CALL MScrnRest(1, 1, 25, 80, SEG AScr2%(1))
ERASE AScr2%

END SUB
```

```
SUB SortEMSRankInfo (Handle%, NumEls&) STATIC

'— sorts RankInfo types by Value in Descending order

DIM Array1 AS RankInfo, Array2 AS RankInfo
ArrayLEN = LEN(Array1)

Span& = NumEls& \ 2
DO WHILE Span& > 0
        FOR i& = Span& TO NumEls& - 1
                j& = i& - Span& + 1
                FOR j& = (i& - Span& + 1) TO 1 STEP -Span&
                        EmsGet Array1, ArrayLEN, j&, Handle%
                        EmsGet Array2, ArrayLEN, j& + Span&, Handle%

IF Array2.Value <= Array1.Value THEN EXIT FOR

'— Swap array elements that are out of order.

EmsSet Array1, ArrayLEN, j& + Span&, Handle%
                        EmsSet Array2, ArrayLEN, j&, Handle%
                NEXT j&
        NEXT i&
        Span& = Span& \ 2
LOOP

END SUB

SUB SortSwapEMS (Handle%, NumEls%) STATIC
'— sorts Synth BitValue types by Value in Descending order DIM Array1 AS BitValue, Array2 AS BitValue
ArrayLEN = LEN(Array1)

Span& = NumEls \ 2
DO WHILE Span& > 0
        FOR i& = Span& TO NumEls - 1
                j& = i& - Span& + 1
                FOR j& = (i& - Span& + 1) TO 1 STEP -Span&
                        EmsGet Array1, ArrayLEN, j&, Handle%
                        EmsGet Array2, ArrayLEN, j& + Span&, Handle%

IF Array2.Value <= Array1.Value THEN EXIT FOR

'— Swap array elements that are out of order.

EmsSet Array1, ArrayLEN, j& + Span&, Handle%
                        EmsSet Array2, ArrayLEN, j&, Handle%
                NEXT j&
        NEXT i&
        Span& = Span& \ 2
LOOP

END SUB

SUB TermMatch (TermxS, Expr AS ExpressionType, m() AS CollectType, NumM, Repeate, ExactFlag) STATIC ' collect code #'s from the Dictionary which match Term$
' uses the same technique as the CheckKey in the AIM program
' which uses the table of the first 3 chars and does a
' "reverse" match, i.e., matching all words in the dictionary
' to the Term$ ' Note that the arrays necessary for these routines are globally
' shared, so do not need to be passed ' Also Note: The SINGKEY.STR and COMBKEY.STR used below are not
' in memory, but are accessed directly from disk using FGetRT DIM WordCompare AS SingKeyType
DIM CombKeyTemp AS CombKeyType
DIM SingKeyTemp AS SingKeyType
DIM DictTemp AS DictType
Repeate = FALSE
IF Lang$ = "ENGLISH" THEN
        Term$ = TermxS
ELSE
        Term$ = LCASE$(TermxS)
END IF ExactFlag = FALSE
' replace only SOME punctuation with spaces
New$ = " "
Old$ = ":/.-()[]{}"
FOR j = 1 TO LEN(Old$)
        CALL ReplaceChar(Term$, MID$(Old$, j, 1), New$)
NEXT NumM = 0
SELECT CASE ASC(Term$)
  CASE AscA TO AscZ: SearchStep = 1
  CASE AscUpperA TO AscUpperZ:
                        IF ASC(MID$(Term$, 2, 1)) < AscUpperA OR ASC(MID$(Term$, 2, 1)) > AscUpperZ THEN
                                SearchStep = 2
                        END IF
  CASE ELSE:     SearchStep = 3
END SELECT
IF INSTR(Term$, " ") <> 0 GOTO FindCombKey
OriginTerm$ = Term$
' check if the first 3 letters of the word return
' a valid range from the 3-dimensional table array
```

```
IF FirstLast%(LCASE$(Term$), First, Last, Sing) THEN 'yes, search thru range
AddSearchAgain:
        FOR j = First TO Last
                CALL FGetRT(SingKeyFILE, SingKeyTemp, CLNG(j), LEN(SingKeyTemp))
                CurrKey$ = RTRIM$(SingKeyTemp.Str)
                Exact = FALSE
                DO WHILE RIGHT$(CurrKey$, 1) = "/"
                        Exact = TRUE
                        CurrKey$ = LEFT$(CurrKey$, LEN(CurrKey$) - 1)
                LOOP '-- compare the single keyword [CurrKey$/SingKeyTemp.Str]
                '   against the search word [Term$]

Match = (Term$ = LEFT$(CurrKey$, LEN(Term$)))

IF NOT Exact AND NOT Match THEN
                        Match = (CurrKey$ = LEFT$(Term$, LEN(CurrKey$)))
                END IF
                IF Match THEN GOSUB SaveSingStr NEXT' key in range
                IF NOT Match THEN SELECT CASE SearchStep
                          CASE 1: Term$ = UCASE$(LEFT$(Term$, 1)) + LCASE$(RIGHT$(Term$, LEN(Term$) - 1))
                                  SearchStep = SearchStep + 1
                          CASE 2:  Term$ = UCASE$(Term$)
                                   SearchStep = SearchStep + 1
                          CASE ELSE: GOTO AddNextKey
                        END SELECT
                        GOTO AddSearchAgain
                ELSE GOSUB SaveSingStr
                        IF Term$ = CurrKey$ THEN ExactFlag = TRUE
                END IF
AddNextKey:
END IF' the range was valid '  FOR j = 1 TO NumSingKey
'       CALL FGetRT(SingKeyFILE, SingKeyTemp, CLNG(j), LEN(SingKeyTemp))
'       CurrKey$ = RTRIM$(SingKeyTemp.Str)
'       DO WHILE RIGHT$(CurrKey$, 1) = "/"
'              CurrKey$ = LEFT$(CurrKey$, LEN(CurrKey$) - 1)
'       LOOP
'       IF CurrKey$ = LEFT$(Term$, LEN(CurrKey$)) THEN
'              GOSUB SaveSingStr
'       END IF
'  NEXT ' Done searching for single keys, go into FindCombKey routine now
'Term$ = Term$ + " "

EXIT SUB

' =-=-=-=-=-=-=-=-=-=-=-=-=-=-=-=-=-=-=-=-=-=-=-=-=-=-=-=-=-=-=

FindCombKey:

Term$ = LCASE$(Term$)

'if it's a valid range, then check words in range
IF FirstLast%(Term$, First, Last, Comb) THEN
        FOR j = First TO Last CALL FGetRT(CombKeyFILE, CombKeyTemp, CLNG(j), LEN(CombKeyTemp))
                Words = InCount(RTRIM$(CombKeyTemp.Str), " ") + 1'count number of words in combined key
                CombKeyTemp.Str = LCASE$(CombKeyTemp.Str)
                CALL Extract(CombKeyTemp.Str, " ", 1, Strt, Slen)'extract first word
                CurrKey$ = MID$(CombKeyTemp.Str, Strt, Slen)'     of combined keyword IF RIGHT$(CurrKey$, 1) = "/" THEN
                        Exact = TRUE
                        IF RIGHT$(CurrKey$, 2) = "//" THEN
                                Slen = Slen - 2' account for // at end
                        ELSE
                                Slen = Slen - 1' account for / at end
                        END IF
                        CurrKey$ = LEFT$(CurrKey$, Slen)
                ELSE
                        Exact = FALSE
                END IF ' get first word to compare
                CALL Extract(Term$, " ", 1, Strt, DLen)
                DocWord$ = MID$(Term$, Strt, DLen)
                'compare first word of combined key [CurrKey$]
                'against the first word of the search word [DocWord$]
                Match = (DocWord$ = LEFT$(CurrKey$, LEN(DocWord$)))
                IF NOT Match THEN
                        IF Exact THEN ' check for *exact* match
                                Match = (CurrKey$ = DocWord$)
                        ELSE
                                Match = (CurrKey$ = LEFT$(DocWord$, Slen))
                        END IF
                END IF ' no match, skip to next combined key in the First-Last range
                IF NOT Match GOTO NextCombKey '' if Term$ was a single keyword, then skip over continued matching
```

```
                IF RIGHT$(Term$, 1) = " " GOTO CombKeyMatched

' continue matching the rest of the words in the combined key
                ' exiting out as soon as there's a non-match FOR k = 1 TO Words - 1' number of words left in combined key
                        ' extract the next word from the current combined keyword (j)
                        CALL Extract(CombKeyTemp.Str, " ", k + 1, Strt, Slen)
                        CurrKey$ = MID$(CombKeyTemp.Str, Strt, Slen)
                        IF RIGHT$(CurrKey$, 1) = "/" THEN ' remove / at end of word
                                Exact = TRUE
                                CurrKey$ = LEFT$(CurrKey$, Slen - 1)
                                Slen = Slen - 1' account for / at end
                        ELSE
                                Exact = FALSE
                        END IF ' get next word to compare
                        CALL Extract(Term$, " ", k + 1, Strt, DLen)
                        DocWord$ = MID$(Term$, Strt, DLen)

IF CurrKey$ = "@" THEN ' special processing for @ wildcard
                                IF INSTR(AtList$, "/" + DocWord$ + "/") THEN
                                        Match = TRUE' the word was in the @ list, so continue
                                ELSE
                                        Match = FALSE
                                END IF
                        ELSE
                                Match = (DocWord$ = LEFT$(CurrKey$, LEN(DocWord$)))
                                IF NOT Match THEN
                                        IF Exact THEN ' check for *exact* match
                                                Match = (CurrKey$ = DocWord$)
                                        ELSE ' wildcard match, only compare # of chars in CurrKey$
                                                Match = (CurrKey$ = LEFT$(DocWord$, Slen))
                                        END IF
                                END IF
                        END IF IF NOT Match THEN EXIT FOR NEXT' word in current combined keyword CombKeyMatched:

IF Match THEN GOSUB SaveCombStr

NextCombKey:

NEXT
END IF' Table range was valid

'Term$ = RTRIM$(Term$)
'FOR j = 1 TO NumCombKey
'    CALL FGetRT(CombKeyFILE, CombKeyTemp, CLNG(j), LEN(CombKeyTemp))
'    CurrKey$ = LEFT$(CombKeyTemp.Str, INSTR(CombKeyTemp.Str, " ") - 1)
'    DO WHILE RIGHT$(CurrKey$, 1) = "/"
'       CurrKey$ = LEFT$(CurrKey$, LEN(CurrKey$) - 1)
'    LOOP
'    IF CurrKey$ = LEFT$(Term$, LEN(CurrKey$)) THEN
'       GOSUB SaveCombStr
'    END IF
'NEXT

EXIT SUB

'-----------------------------------------------------------------------
' check if this Code was already added by a previous match to a synonym SaveCombStr:

'-- don't need the dict lookup, the code is in the .STR structure already
        '** 4/26/91 4:50p THY
        'DictTemp.Str = CombKeyTemp.Str TempCode = CombKeyTemp.Code
        GOTO CheckStr SaveSingStr:

'-- don't need the dict lookup, the code is in the .STR structure already
        '** 4/26/91 4:50p THY
        'DictTemp.Str = SingKeyTemp.Str TempCode = SingKeyTemp.Code CheckStr:

'-- don't need the dict lookup, the code is in the .STR structure already
        '** 4/26/91 4:50p THY
        'TempCode = DictSrch%(DictTemp)

IF KYIndx(TempCode).Num > 0 THEN ' it appeared in this database
                Found = FALSE
                FOR i = 1 TO NumM
                        IF m(i).Code = TempCode THEN Found = TRUE: EXIT FOR
                NEXT
```

```
        IF NOT Found THEN 'then add the single keyword to the list of matches
        '— check to see if it's already in the expression
        IF KeyInstr%(Expr.SubExpr(1).Phrase, MKI$(TempCode)) = 0 THEN
            NumM = NumM + 1
            REDIM PRESERVE m(1 TO NumM) AS CollectType
            m(NumM).Code = TempCode
        ELSE
            Repeate = TRUE
        END IF
    END IF
END IF

RETURN

END SUB
```

What is claimed is:

1. A method of indexing and retrieving documents, said method using a digital computer system having a central processing unit, a memory, a display screen, a keyboard, and a large capacity file system, said method comprising the steps of:

(a) storing in said memory a vocabulary of terms, each term consisting of one or more words, and for each term an associated term-code;

(b) storing on said file system a collection of documents each with an associated unique document-number;

(c) creating index files which contain for each said term-code in (a)
  (i) the set of document-numbers in (b) such that the corresponding documents contain the corresponding term; and
  (ii) for each said document-identifying-number in (i) the frequency-in-document of the corresponding term which is the number of times that said term appears in the corresponding document;

(d) creating a weight-in-document file which contains for each document-number in (c)(i) the weight-in-document of the corresponding term which is calculated using the frequency-in-document in (c) (ii), the number of document-numbers in (c) (i), and the total number of terms in (a) which are in the corresponding document (counted multiple times);

(e) creating a frequent-companion file which contains for each occurring term-code in (a) a ranked set of pairs of numbers where each pair consists of a first element term-code and a second element companion-percentage, where the companion-percentage is calculated by summing the weight-in-document values of said first element term-code over documents that contain both the term corresponding to said first element term-code and the term corresponding to said occurring term-code and then dividing by the sum over all documents of the weight-in-document of said occurring term-code;

(f) creating a relative file which contains for each occurring term-code in (a) a ranked set of pairs of numbers where each pair consists of a first element relative term-code and a second element relative-percentage, where the relative-percentage is calculated by taking a weighted average of the companion-percentage of said first element term-code calculated in step (e) and the companion-percentage of said occurring term-code that was calculated in step (e) when said first element term-code was the occurring term-code and said occurring term-code was the first element term-code;

(g) creating a polysemantic file which contains for each occurring term-code in (a), a polysemantic weight which is calculated using the number of sets of pairs in the relative file created in step (f) that said occurring term-code appears in, the number of documents-numbers for which the weight-in-document of said occurring term-code calculated in step (d) is greater than some threshold value, and the averages for several values of N of the first N relative-percentages of said occurring term-code calculated and ranked in step (f);

(h) accepting a query consisting of a sequence of words entered by a user using said keyboard and creating a parsed-query table of term-codes which consist of the term-codes in said vocabulary that are associated with the terms that are contained in said query;

(i) creating a temporary swap table of pairs of first element term-codes and corresponding second element summed-relative-percentages consisting of those relative term-codes created in step (f) where said corresponding second element summed-relative-percentages are the sum, over all said occurring term-codes that are in said parsed-query table, of the relative percentages of said first element term-codes;

(j) creating a modified swap table by modifying said second element summed-relative-percentages created in step (i) by multiplying them by a function of the polysemantic weight of the corresponding first element term-codes;

(k) sorting said modified swap table by said modified summed-relative-percentages in descending order;

(l) displaying on said display the terms corresponding to the term-codes of said modified swap table;

(m) accepting user keypresses or other actions which identify one or more of the terms displayed in step (l) and adding the corresponding term-codes to the parsed-query-table;

(n) repeating steps (i) through (m) as many times as the user indicates by his input;

(o) accepting an input from the user indicating a command to retrieve documents;

(p) creating a temporary rank table of pairs of first element document-numbers and corresponding second element summed-document-weight×poly values which pairs comprise those document-numbers for which any of the term-codes that are in said parsed-query table have weight-in-document above a threshold value, and summed-document-weight×poly values which are the sums, over all term-codes in said parsed-query table, of a function of me polysemantic weight of the term-code and the weight-in-document of the term-code;

(r) creating a sorted rank table by sorting said temporary rank table by the value of the second elements of the pairs in descending order;

(s) displaying on the display screen some portion of the document corresponding to the first document number in the sorted rank table and some indication of the corresponding summed-document-weight×poly value;

(t) displaying other documents corresponding to other document-numbers in the sorted rank table in response to inputs from the user.

2. A method as in claim 1 wherein additional steps (j)(l) and (p)(l) are carried out after steps (j) and (p) respectively to implement the soft boolean connector algorithm which consists of the following steps:

(A) creating a table of relative penalties for each pair of said term-codes in said parsed-query table where said relative penalty is a function of the relative percentage corresponding to the two term-codes of said pair, the number of documents that each of the term-codes of the pair are contained in with a document-weight above a threshold, and the average over all terms of the number of documents that the term is contained in with a document-weight above said threshold;

(B) modifying said relative penalties by taking the minimum of the relative penalty and some maximum value which depends on the number of terms in the parsed-query table;

(C) summing said modified relative penalties to produce a sum of relative penalties;

(D) modifying said sum of relative penalties by taking the minimum of said sum and some maximum sum value which depends on the number of terms in the parsed-query table to produce a modified sum of penalties;

(E) summing some function of the polysemantic weights of the term-codes in the parsed-query table that are either relatives of a potential SWAPS term (jl) or are contained in a document (pl) to produce a number of hits value;

(F) Calculating some function of the number of hits value and the modified sum of penalties value to produce a power value;

(G) Raising a number approximately equal to 2 to the power value to produce an adjust value;

(H) Multiplying either the modified summed relative percentages calculated in step j) or the summed document weight×poly values calculated in step (p) by the adjust value.

3. A method as in claim 1 where the formula for calculating the weight-in-document in step (d) is:

$$\text{Weight(Word)} = \frac{\text{Log}_2(\text{FreqInDoc} + 1) \times \text{Log}_2\left(\frac{\text{TotDocs} \times 1.5}{\text{DocsWithWord} + 3 + \frac{\text{TotDocs}}{1000}}\right)}{\text{Log}_2\left(2 + \frac{\text{TotalKeywordsInDoc}}{10}\right)}$$

4. A method as in claim 1 where the formula for calculating the polysemantic weight in step (g) is:

$$\text{PolyValue} = \sqrt{\left(\text{Avg}_3 \times \frac{\text{Avg}_3}{\text{Avg}_{20}} + \text{Avg}_6 \times \frac{\text{Avg}_6}{\text{Avg}_{63}}\right)} \times \sqrt{\frac{\text{TotRelVal}}{\text{DocFreq}^{1.2}}}$$

5. A method as in claim 1 where the function in step (j) is the identity function.

6. A method as in claim 1 where the function in step (p) is the identity function.

* * * * *